US012810364B2

(12) United States Patent
Hariprasad

(10) Patent No.: US 12,810,364 B2
(45) Date of Patent: Nov. 24, 2026

(54) AI-DRIVEN HEALTHCARE PLATFORM FOR INTEGRATED AND AUTOMATED CARE WORKFLOWS

(71) Applicant: Ravi Hariprasad, MD, A PC, Folsom, CA (US)

(72) Inventor: Ravi Hariprasad, Folsom, CA (US)

(73) Assignee: Ravi Hariprasad, MD, A PC, Folsom, CA (US)

( * ) Notice: Subject to any disclaimer, the term of this patent is extended or adjusted under 35 U.S.C. 154(b) by 0 days.

(21) Appl. No.: 19/531,838

(22) Filed: Feb. 6, 2026

(65) Prior Publication Data

US 2026/0195822 A1 Jul. 9, 2026

Related U.S. Application Data

(63) Continuation-in-part of application No. 19/425,142, filed on Dec. 18, 2025, which is a continuation of application No. PCT/US2025/030111, filed on May 20, 2025.

(60) Provisional application No. 63/741,627, filed on Jan. 3, 2025.

(51) Int. Cl.
*G06Q 40/08* (2012.01)

(52) U.S. Cl.
CPC .................................. *G06Q 40/084* (2025.08)

(58) Field of Classification Search
CPC .................................................... G06Q 40/084
See application file for complete search history.

(56) References Cited

U.S. PATENT DOCUMENTS

| | | | | |
|---|---|---|---|---|
| 9,471,585 | B1 * | 10/2016 | Theimer | G06F 3/0641 |
| 9,909,408 | B2 | 3/2018 | Rodgers et al. | |
| 9,926,777 | B2 | 3/2018 | Rodgers et al. | |
| 10,923,231 | B2 | 2/2021 | Kelly et al. | |
| 11,037,682 | B2 | 6/2021 | Kelly et al. | |
| 12,395,457 | B1 * | 8/2025 | Cichy | H04L 51/212 |
| 2007/0027714 | A1 | 2/2007 | Fenno | |
| 2009/0240525 | A1 | 9/2009 | Sadler et al. | |

(Continued)

FOREIGN PATENT DOCUMENTS

| | | | |
|---|---|---|---|
| EP | 4320630 | A1 | 2/2024 |
| WO | 2015123466 | A1 | 8/2015 |

OTHER PUBLICATIONS

International Search Report and Written Opinion dated Jul. 21, 2025 re PCT/US2025/030111 (17 pages).

(Continued)

*Primary Examiner* — Scott S Trotter
(74) *Attorney, Agent, or Firm* — Aurora Consulting LLC; Madison West; Ashley Sloat

(57) ABSTRACT

An AI-driven healthcare billing orchestration system comprising a billing plane hidden from clinical interfaces, automatically selecting among multiple billing regimes based on eligibility, enforcing regime-specific validation, and generating compliant claims with attestation ledger audit trails. The system switches documentation modes between attestation-based and time-based approaches transparently, validates against concurrency constraints and MUE limits, and processes X12 transactions with automated denial mapping and correction workflows. Generalizable architecture extends to financial services and regulated transaction environments beyond healthcare.

30 Claims, 66 Drawing Sheets

(56) References Cited

U.S. PATENT DOCUMENTS

| | | | | |
|---|---|---|---|---|
| 2011/0125527 | A1 | 5/2011 | Nair | |
| 2014/0027783 | A1* | 1/2014 | Yin | H10D 30/6212 257/77 |
| 2014/0081652 | A1 | 3/2014 | Klindworth | |
| 2015/0066529 | A1 | 3/2015 | Lattuca et al. | |
| 2017/0004424 | A1 | 1/2017 | Chapman et al. | |
| 2017/0091421 | A1 | 3/2017 | Kumar et al. | |
| 2017/0091422 | A1 | 3/2017 | Kumar et al. | |
| 2017/0091423 | A1 | 3/2017 | Kumar et al. | |
| 2017/0277854 | A1 | 9/2017 | Kelly et al. | |
| 2017/0286640 | A1 | 10/2017 | Kumar et al. | |
| 2017/0293733 | A1 | 10/2017 | Kelly et al. | |
| 2017/0300637 | A1 | 10/2017 | Kumar et al. | |
| 2017/0300662 | A1 | 10/2017 | Kumar et al. | |
| 2017/0351821 | A1* | 12/2017 | Tanner, Jr. | G16H 50/20 |
| 2018/0089385 | A1 | 3/2018 | Gupta et al. | |
| 2019/0237203 | A1 | 8/2019 | Schwabl et al. | |
| 2021/0169417 | A1 | 6/2021 | Burton | |
| 2021/0338080 | A1 | 11/2021 | Redei | |
| 2022/0309592 | A1 | 9/2022 | Zahora et al. | |
| 2023/0377748 | A1 | 11/2023 | Yang et al. | |
| 2024/0304074 | A1 | 9/2024 | Neubauer | |
| 2025/0095075 | A1 | 3/2025 | Chiang et al. | |
| 2026/0039635 | A1* | 2/2026 | Ronen | G06F 16/258 |

OTHER PUBLICATIONS

International Search Report and Written Opinion mailed Mar. 13, 2025 re PCT/US2025/010240 (16 pages).

* cited by examiner metadata in processing, and
differentiating patient-specific contexts

AI-DRIVEN HEALTHCARE PLATFORM FOR INTEGRATED AND AUTOMATED CARE WORKFLOWS

CROSS-REFERENCE TO RELATED APPLICATION

This application is a continuation-in-part of U.S. application Ser. No. 19/425,142 filed Dec. 18, 2025, which is a continuation of International Patent Application No. PCT/US2025030111 filed May 20, 2025, which claims a priority benefit of U.S. Application No. 63/741,627, filed Jan. 3, 2025, the disclosures of each of which are herein incorporated by reference in their entirety.

TECHNICAL FIELD

This present disclosure relates generally to the field of healthcare information management systems, and more specifically to AI-driven, automated healthcare platforms.

BACKGROUND

Healthcare billing and reimbursement processes involve complex interactions between care providers, payers, clearinghouses, and regulatory bodies. The healthcare industry relies on standardized electronic transaction formats, such as X12 837 claim submissions, X12 835 remittance advice transactions, and various acknowledgment transactions, including TA1, 999, and 277CA, to facilitate the exchange of billing information between parties. These transactions contain structured segments and codes, including claim payment segments, service payment segments, claim adjustment segments, group codes, claim adjustment reason codes, and remittance advice remark codes, that convey detailed information about claim status, payment determinations, and adjustment reasons. Traditional healthcare models often face limitations such as high costs, fragmented care, and inefficient workflows, making it difficult for patients to receive timely and coordinated treatment. Additionally, the administrative burden on healthcare providers and clinicians further exacerbates the inefficiencies within the system.

SUMMARY

Care management programs have evolved to include multiple billing regimes with distinct documentation and billing requirements. Some billing regimes, such as Advanced Primary Care Management (APCM) and General Primary Care Management (GPCM), operate on attestation-based documentation models where clinicians review completed activities and provide attestation without tracking cumulative service time. Other billing regimes, such as Chronic Care Management (CCM) and Collaborative Care Management (CoCM), operate on time-based documentation models requiring tracking of cumulative non-face-to-face minutes per billing period. Additional billing regimes include Principal Care Management (PCM), Remote Patient Monitoring (RPM), and Remote Therapeutic Monitoring (RTM), each with its own eligibility criteria, frequency limits, unit constraints, and documentation requirements.

Payer policies and regulatory requirements impose various constraints on billing, including concurrency restrictions that prevent certain billing regimes from being billed together in the same billing period, frequency limits such as one unit per calendar month for certain codes, and medically unlikely edit (MUE) constraints with different adjudication indicator types. These constraints vary by payer and are subject to periodic updates from regulatory bodies such as the Centers for Medicare and Medicaid Services (CMS) through quarterly National Correct Coding Initiative (NCCI) updates and from commercial payers through companion guides and policy bulletins.

Healthcare providers face challenges in managing the complexity of multiple billing regimes, each with different eligibility criteria, documentation modes, and compliance constraints. Selecting an appropriate billing regime for a given patient encounter indicates evaluation of provider role eligibility, payer coverage, site of service, diagnosis indicators, and patient enrollment status. When claims are denied or rejected, providers must parse remittance advice transactions to extract denial reasons and determine appropriate corrective actions, which may include generating corrected claims, assembling additional documentation, or initiating appeal workflows.

Remote patient monitoring and remote therapeutic monitoring programs present additional complexity due to their reliance on device-generated telemetry data that must be aggregated over monthly billing periods, validated for signal quality and data completeness, and attributed to appropriate billing codes based on the type of monitoring activity performed. These programs may have minimum day-spread requirements specifying that data must be collected across a minimum number of distinct calendar days within a billing period.

The integration of artificial intelligence systems, including large language models, machine learning models, and rules-based inference engines, into healthcare workflows presents opportunities for automating aspects of billing regime selection, claim preparation, compliance validation, and denial management. However, healthcare billing requires accountability and auditability, with the ability to trace billing decisions to authorized approvers and to maintain records of the rules and policies applied at the time of claim submission.

Multi-clearinghouse environments require routing logic to direct claim submissions to appropriate clearinghouse interfaces based on payer identifiers, plan identifiers, or other routing rules. Claim resubmission workflows benefit from idempotent processing that prevents duplicate submissions by tracking claim control identifiers. Batch processing capabilities can improve throughput for high-volume billing operations.

Beyond healthcare, other regulated transaction environments share similar characteristics, including policy-based eligibility determination, compliance validation against published rules, approval workflows with audit requirements, standardized electronic transaction formats such as ISO 20022 for financial services, response parsing with reason code classification, and dispute or appeal mechanisms. These environments may benefit from similar architectural approaches to transaction processing.

Care management programs have evolved to include multiple billing regimes with distinct documentation and billing requirements. Some billing regimes, such as Advanced Primary Care Management (APCM) and General Primary Care Management (GPCM), operate on attestation-based documentation models where clinicians review completed activities and provide attestation without tracking cumulative service time. Other billing regimes, such as Chronic Care Management (CCM) and Collaborative Care Management (CoCM), operate on time-based documentation models requiring tracking of cumulative non-face-to-face minutes per billing period. Additional billing regimes include Principal Care Management (PCM), Remote Patient Monitoring (RPM), and Remote Therapeutic Monitoring (RTM), each with its own eligibility criteria, frequency limits, unit constraints, and documentation requirements.

Payer policies and regulatory requirements impose various constraints on billing, including concurrency restrictions that prevent certain billing regimes from being billed together in the same billing period, frequency limits such as one unit per calendar month for certain codes, and medically unlikely edit (MUE) constraints with different adjudication indicator types. These constraints vary by payer and are subject to periodic updates from regulatory bodies such as the Centers for Medicare and Medicaid Services (CMS) through quarterly National Correct Coding Initiative (NCCI) updates and from commercial payers through companion guides and policy bulletins.

Healthcare providers face challenges in managing the complexity of multiple billing regimes, each with different eligibility criteria, documentation modes, and compliance constraints. Selecting an appropriate billing regime for a given patient encounter requires evaluation of provider role eligibility, payer coverage, site of service, diagnosis indicators, and patient enrollment status. When claims are denied or rejected, providers must parse remittance advice transactions to extract denial reasons and determine appropriate corrective actions, which may include generating corrected claims, assembling additional documentation, or initiating appeal workflows.

Remote patient monitoring and remote therapeutic monitoring programs present additional complexity due to their reliance on device-generated telemetry data that must be aggregated over monthly billing periods, validated for signal quality and data completeness, and attributed to appropriate billing codes based on the type of monitoring activity performed. These programs may have minimum day-spread requirements specifying that data must be collected across a minimum number of distinct calendar days within a billing period.

The integration of artificial intelligence systems, including large language models, machine learning models, and rules-based inference engines, into healthcare workflows presents opportunities for automating aspects of billing regime selection, claim preparation, compliance validation, and denial management.

In some aspects, the techniques described herein relate to a computer-implemented system for automated care to claim orchestration, including: an event ingestion bus configured to receive patient interactions and clinical signals; an extractor configured to convert unstructured inputs into structured clinical facts; a canonical mapper configured to map facts to standardized clinical schemas; a graph store including versioned nodes and edges representing patient state; a care-plan update engine configured to update care plans in response to graph changes; a billing engine configured to: select at least one billing regime based on provider role, patient eligibility, payer policy, and date of service; enforce regime-specific validation rules including monthly frequency, stacking restrictions, and documentation mode (attestation vs time-based); generate claims using X12 837 transactions; receive and parse acknowledgments associated with the generated claims; classify errors, correct, and resubmit; and maintain claim provenance; an audit and security layer configured to record append-only entries with timestamps, actor identity, claim versions, and operation types; and a presentation layer providing a unified clinician workflow independent of the selected at least one billing regime.

In some aspects, the techniques described herein relate to a computer-implemented healthcare billing automation system including: a billing regime registry storing a plurality of care management billing regimes, wherein each billing regime is associated with: a documentation mode type selected from attestation-based or time-based, frequency limitation rules, unit restriction rules, and stacking compatibility data indicating which other billing regimes cannot be billed concurrently within a calendar month; a regime selection engine configured to: receive regime selection inputs including provider role taxonomy, provider qualifications, site of service, patient eligibility criteria, payer policy identifier, and date of service; apply regime selection logic matching the regime selection inputs to regime requirements stored in the billing regime registry; select an applicable billing regime from the plurality of care management billing regimes; and output a selected documentation mode including attestation-based mode when the applicable billing regime is Advanced Primary Care Management (APCM) or General Primary Care Management (GPCM), and time-based mode when the applicable billing regime is Chronic Care Management (CCM) or Collaborative Care Management (CoCM); an attestation capture engine configured to operate when the selected documentation mode is attestation-based mode; a one unit per month enforcement engine configured to enforce a billing constraint that one unit per calendar month is permitted for billing codes from APCM or GPCM regime families, a concurrency detection engine configured to: scan billing codes to identify a first billing code and a second billing code for a given patient and calendar month, retrieve stacking compatibility data for the first billing code, determine whether the second billing code violates the stacking compatibility data, flag a concurrency conflict when a stacking violation is detected, retrieve payer-specific stacking rules from a payer policy database, and either prevent claim submission or generate a regime adjustment recommendation based on the payer-specific stacking rules.

In some aspects, the techniques described herein relate to a computer-implemented method for automated healthcare billing regime selection and claim processing, the method including: storing, by a processor, a billing regime registry including a plurality of care management billing regimes, wherein each billing regime is associated with a documentation mode type, frequency limitation rules, unit restriction rules, and stacking compatibility data; receiving, by the processor, regime selection inputs including provider role taxonomy, provider qualifications, site of service, patient eligibility criteria, payer policy identifier, and date of service; applying, by the processor, regime selection logic to match the regime selection inputs to regime requirements; selecting, by the processor, an applicable billing regime from the plurality of care management billing regimes; determining, by the processor, a selected documentation mode including attestation-based mode for a first portion of the plurality of regimes and a time-based mode for a second portion of the plurality of regimes.

BRIEF DESCRIPTION OF THE DRAWINGS

There is a need for new and useful system and method for generating a patient-specific clinical assessment. In particular, there is a need for systems, devices, and methods that can effectively analyze patient health data, including biometric information, historical medical records, and patient-reported symptoms, to generate personalized clinical insights.

DETAILED DESCRIPTION

Figure 1A:
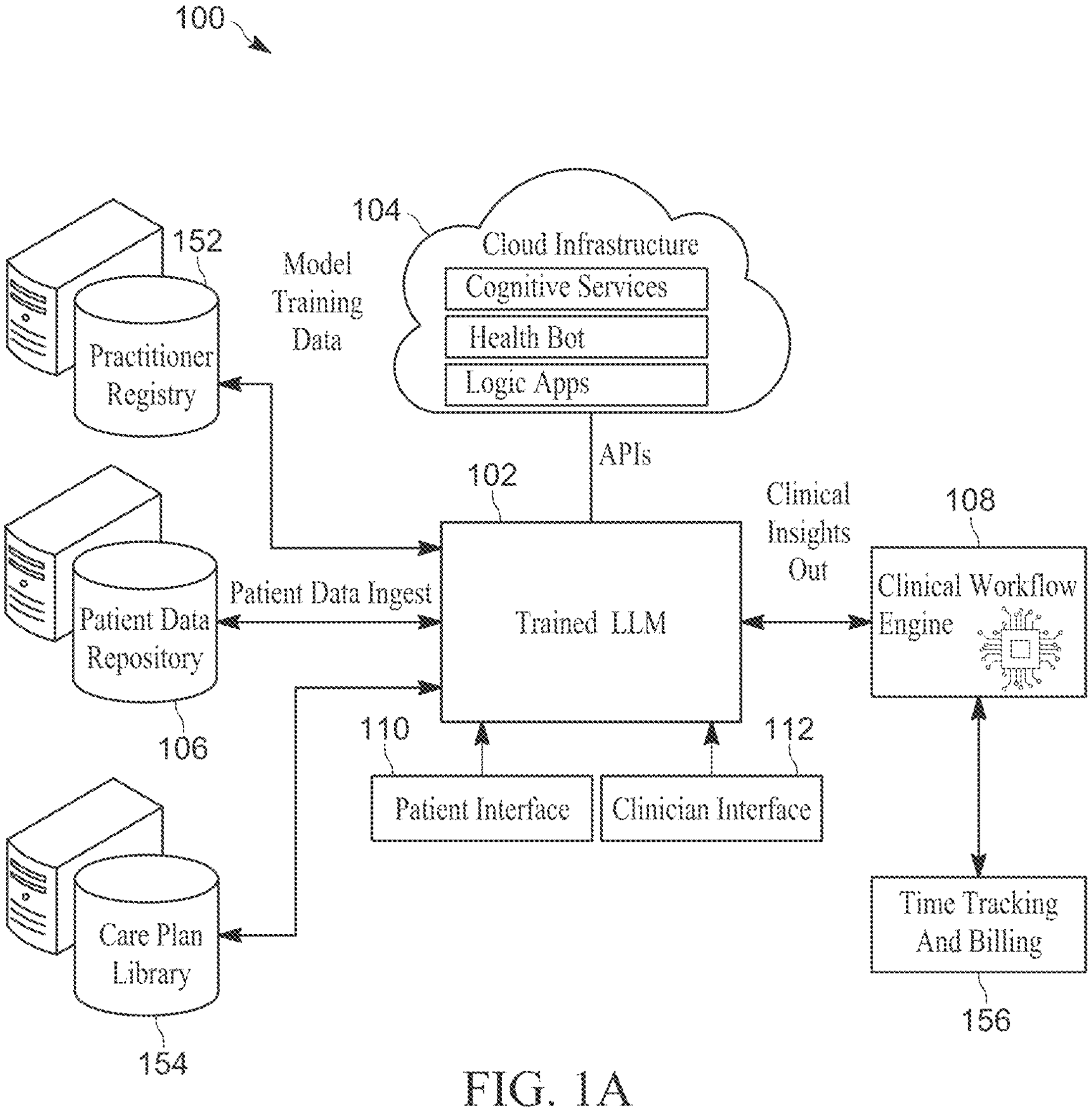
FIG. 1A illustrates a block diagram of an example clinical assessment system for generating a patient-specific clinical assessment, in accordance with an embodiment of the present disclosure.

The foregoing is a summary, and thus, necessarily limited in detail. The above-mentioned aspects, as well as other aspects, features, and advantages of the present technology, will now be described in connection with various embodiments. The inclusion of the following embodiments is not intended to limit the disclosure of these embodiments, but rather to enable any person skilled in the art to make and use the claimed subject matter. Other embodiments may be utilized, and modifications may be made without departing from the spirit or scope of the subject matter presented herein. Aspects of the disclosure, as described and illustrated herein, can be arranged, combined, modified, and designed in a variety of different formulations, all of which are explicitly contemplated and form part of this disclosure.

In conventional healthcare, interactions between patients and clinicians are constrained by specific time limitations imposed by insurance reimbursement models and industry productivity standards. These time constraints, combined with increasing clinician workloads, prevent thorough health-related patient assessments while simultaneously requiring comprehensive documentation. Administrative requirements further impede meaningful patient-clinician communication. Consequently, clinicians often obtain incomplete patient histories, potentially resulting in suboptimal or inappropriate treatment plans. The challenges of data management are further exacerbated when implementing personalized healthcare approaches, which inherently demand more comprehensive patient information and more complex data analysis. The psychiatric care sector faces unprecedented challenges stemming from a quantifiable shortage of specialized practitioners. This deficiency directly causes restricted availability of essential mental health services and/or other health services, creating a measurable disparity between patient needs and healthcare system capacity. The resulting service gap prevents timely intervention for many patients that would benefit from specialized psychiatric assessment and treatment and/or specialized health-related assessments and treatments, with particularly severe impacts in underserved communities where specialist-to-patient ratios fall below recommended clinical guidelines. Unlike conventional healthcare assessment or billing solutions, the systems and methods described herein encompass a unified, orchestrating platform wherein clinical and operational data streams mutually adapt, supporting truly closed-loop, multi-specialty care.

While mental health care examples are utilized in some examples described herein, the systems and methods described herein can be adapted for any specialty or subspecialty of health care. For example, in some embodiments, specialized modules for other health care examples (e.g., cardiology care, diabetes care, endocrinology care, geriatric care, pediatric care, neurologic care, oncology care, disease management care, primary health care, or other health care) may be utilized with the systems described herein. In particular, other health care specialties can be utilized with the healthcare platform including, but not limited to the clinical workflow engine, the real time analytics, claims, and care coordination described herein. Further, although specific mental health use cases (e.g., screening instruments, therapy codes) are described in detail, these are representative. Comparable approaches apply for any standardized assessment or healthcare codes, such as those used for oncology, cardiology, endocrine disorders, or the like. In general, the codes described herein may pertain to any standardized procedure code, billing code, or code representative of a service event or a line item for a healthcare procedure, including, but not limited to, region-specific or payer-specific equivalents.

Conventional systems such as Electronic Health Records (EHRs) and other basic automation tools try to solve some of these problems but do not offer a total solution. Generally, these systems have failed to utilize patient data to streamline the treatment and optimize clinical workflow. Clinician burnout that is driven by administrative workload underscores the long felt need for an improved solution that can streamline tasks like data collection from patients, data entry, data analysis, assessment and tracking of billing events, assessment and tracking of practitioner time entry, events, and schedules, generation and assessment of referral plans, generation and assessment of care plans, and assessment of patient progress.

The present disclosure addresses these conventional challenges by providing an innovative digital healthcare platform designed to optimize health service delivery. By integrating health care such as physical health care, psychiatric care (and/or other medical specialties), lifestyle interventions, chronic care management, and assessment services into a unified system, the platform enables holistic and continuous patient care. The platform is built on a scalable digital infrastructure, leveraging cloud-based technologies and AI-driven insights to enhance clinician workflows, improve patient engagement, and ensure secure data interoperability.

Through automation-driven workflows, AI-powered analytics, and compliance with healthcare data exchange standards, the platform described herein streamlines administrative processes, reduces clinician burnout, and improves treatment outcomes. By bridging technology with compassionate care, the platform redefines the accessibility and efficiency of health services, setting a new standard for the future of digital healthcare. The system and health modules described herein may be powered by artificial intelligence or other computing technology to execute cohort analytics, risk stratification, and real-time (or near real-time) outcome-triggered intervention recommendations that may be adaptive across any care specialty. In general, workflow logic and system configuration may be continuously or periodically improved in response to observed patient outcomes, feedback, and/or regulatory landscape.

At a high level, the systems and methods described herein represent a patient-centered mental and/or physical healthcare platform designed to address the growing challenges of accessibility, affordability, and scalability in mental and/or physical health services. The systems are built on a robust and scalable digital framework, that seamlessly integrates patient care (e.g., psychiatric care, lifestyle interventions, chronic care management, and assessment services) into a unified ecosystem. In some embodiments, the systems and methods described herein may manage patient care workflows, billing workflows, and clinician workflows and may provide output for such workflows in a user interface. Such systems may function as (or integrate with) other modules for generating a patient-specific clinical assessment of a patient journey, for example. In some embodiments, the systems and methods described herein may provide an integrated system of patient care and/or tracking, clinician management, billing management, and referral management. In some embodiments, the systems and methods described herein may provide health indicator monitoring along with patient journey assessments.

The systems and methods described herein solve the technical problem of efficiently processing and analyzing complex, heterogeneous patient data, CPT code data (or other data indicating a standardized procedure code or code representative of a service event or a line item for a healthcare procedure), clinician data, and billing data, including unstructured text, biometric information, and historical medical records, to generate patient-specific clinical assessments and insights. By utilizing a trained LLM within a cloud-based environment, the systems and methods address technical challenges such as real-time data normalization, semantic understanding of medical information, and secure integration with electronic medical records (EMR) systems. This approach reduces the computational overhead associated with traditional manual processes which improves the accuracy and timeliness of clinical recommendations and enables unified interoperability across disparate healthcare systems.

In particular, the technical problem sought to be solved by the present disclosure is to provide a system and method for generating at least one analytics dashboard that includes patient outcomes, referral effectiveness, and team (e.g., clinician) performance metrics in near real time. The systems and methods described herein may function to integrate heterogeneous patient data into a unified framework, utilizing advanced artificial intelligence (AI) techniques, including LLMs, to deliver accurate, real-time diagnostic support, personalized treatment recommendations, billing and claim generation with CPT code (or other standardized procedure code or code representative of a service event or a line item for a healthcare procedure) mapping analysis while ensuring compliance with healthcare data security and interoperability standards.

The systems and methods described herein can be used to generate patient journey data covering a lifecycle of patient management, beginning with the referral phase and extending through service line workflows, continuous progress monitoring, and iterative care plan adjustments to ensure optimal healthcare outcomes for the patient. The patient journey data may include one or more of referral intake data, pre-assessment data, multi-service treatment workflow data, continuous progress tracking data, and iterative care modification data to ensure optimal patient outcomes. By dynamically managing practitioner assignments, streamlining service coordination, and implementing automated intervention mechanisms, the systems and methods described herein may improve care delivery efficiency over conventional systems while maintaining a patient-centric, scalable, and outcome-focused care management model. In some embodiments, the systems and methods described herein may use patient journey data to determine particular lifestyle interventions in which to embed into patient care plans, allowing psychiatrists, health coaches, and care teams to work together in real-time to monitor progress.

Some conventional systems and/or methods may utilize static rule-based algorithms or predefined templates for patient assessment and clinical data processing that fail to embrace the dynamic and adaptive needs of modern personalized healthcare. A potential drawback with such conventional solutions may include limited flexibility in adapting to heterogeneous data sources, inability to provide context-aware clinical insights, and a lack of real-time responsiveness to patient-specific changes or clinician inputs. Thus, the devices, methods, and/or MOTs described herein may provide an improvement over conventional solutions by employing an LLM trained to process and analyze diverse patient health data dynamically, utilizing advanced natural language processing techniques for data normalization, and incorporating retrieval-augmented generation (RAG) techniques for enhanced clinical recommendations. These improvements enable personalized, adaptive, and contextually relevant patient care while reducing administrative burdens on clinicians and enhancing interoperability with existing healthcare infrastructure.

In some embodiments, the systems and methods described herein may provide health indicator monitoring. For example, the method may function to proactively track and respond to patient health risks through automated data collection and intervention processes. The method may capture health data from multiple sources, including patient self-reporting, device integrations, and clinician updates, which are logged into a centralized health indicators registry. An automated validation system may check incoming data against predefined clinical thresholds for indicators such as blood pressure, blood glucose levels, and/or mental health screening scores. For example, a claim may be validated by cross-referencing a CPT code (or other standardized mental or physical procedure code or code representative of a service event or a line item for a healthcare procedure) with particular payer policies. When a measurement exceeds normal parameters (e.g., predefined per patient or per population of patients), the system automatically triggers a critical flag and initiates a multi-stage notification protocol. Assigned clinicians receive immediate alerts detailing the patient's critical health information and recommended actions. If no clinician response occurs within a specified timeframe, the case escalates to management with high-priority notifications sent through SMS and/or email. Patients with critical indicators receive automated communications prompting immediate medical attention, and a follow-up consultation is scheduled. The method may be is supported by application programming interface dashboards that enable care teams and managers to monitor aggregate data, track response effectiveness, and identify emerging health trends across the patient population.

The method may further include generating, by the processor, a set of interactive prompts for a patient interface based on the identified clinical insights and/or monitoring output. The set of interactive prompts may be used to obtain additional information associated with the patient. The method may further include receiving, by the processor, a set of patient responses responsive to the generated set of interactive prompts. The method may further include displaying, by the processor, the clinical insights, health indicators, patient journey indicators and/or the set of patient responses on a clinician interface.

Referring now to FIG. 1A, a block diagram of an example clinical assessment system for generating a patient-specific clinical assessment, is illustrated, in accordance with an embodiment of the present disclosure. The clinical assessment system 100 may integrate advanced AI technologies, specifically a trained LLM 102, practitioner registry 152, patient data repository 106, and care plan library 154 to analyze patient health data and provide clinical insights. In addition, the system 100 may interface with clinical workflow engine 108 and/or time tracking and billing 156 system for claims, billing, and clinician time tracking.

In some embodiments, the clinical assessment system 100 represents a comprehensive mental and/or overall health care platform designed to integrate physical health care, psychiatric care, psychotherapy, lifestyle interventions, and continuous patient monitoring. The clinical assessment system 100 may be built around a structured framework, with a focus on integrating service lines, care plans, testing, and monitoring protocols. These components ensure that patients receive comprehensive, coordinated care at every step of their health journey. The clinical assessment system 100 may be used to automate workflows, streamline care coordination, and provide real-time insights into patient outcomes. The system 100 provides a scalable and adaptable structure, supporting continuous improvements in patient care by integrating lifestyle psychiatry, wellness coaching, and mindfulness programs into its core features, supporting the holistic care. Through automated workflows, dynamic role management, and comprehensive reporting, the system 100 ensures patients receive continuous, personalized, and integrative care across both clinical and wellness service lines.

The clinical assessment system 100 may operate within a cloud-based infrastructure 104. The cloud-based infrastructure 104 may provide one or more services such as cognitive services, health bots, and logic apps, which collectively support AI processing, natural language processing, and workflow automation. The trained LLM 102 may serve as a central processing unit of the clinical assessment system 100 and may be trained on a comprehensive healthcare knowledge database (not shown) that may include but is not limited to, psychiatric research, historical patient data, treatment outcomes, and medical literature. The trained LLM 102 may analyze received patient health data corresponding to a patient, which may include, but is not limited to patient biometric data (e.g., heart rate, blood pressure, oxygen saturation), patient historical medical data (e.g., previous diagnoses, prescribed medications, surgical history), patient journey data, and patient-reported symptoms (e.g., fatigue, chest pain, difficulty breathing). The patient health data may be received from, but is not limited to, a patient data repository 106 and may be processed through Application Programming Interfaces (APIs) connecting the patient data repository 106 to the trained LLM 102. The patient data repository 106 may include one or more input sources that may include but are not limited to, electronic health records, wearable devices, or patient self-reports.

The practitioner registry 152 may store practitioner data (e.g., clinician data/clinic data) that tracks provider credentials, specialties, and role assignments, dynamically linking care team members to patients based on determined service needs. The patient data repository 106 stores patient data, including demographics, payor information, and care history, ensuring that all care plans and service line engagements are documented. The care plan library 154 stores preconfigured templates for evidence-based care plans, enabling rapid customization and deployment.

The trained LLM 102 may perform contextual processing of the patient health data of patient data repository 106, data from practitioner registry 152, and/or data from care plan library 154 to generate clinical insights, including potential diagnoses, prioritized patient conditions, treatment recommendations, and patient monitoring over a journey of a patient over time. The generated clinical insights, which include potential diagnoses, prioritized patient conditions, and treatment recommendations, may be communicated to the clinical workflow engine 108 for further processing and operational integration. The clinical assessment system 100 may interface with one or more user components, for example, a patient interface 110 and a clinician interface 112. The patient interface 110 enables the patient to complete structured intake forms, receive interactive health prompts, and engage interactively with the trained LLM 102 through dynamically generated prompts. The interactive prompts may be generated based on the clinical insights generated by the trained LLM 102 and may be contextualized to gather additional patient-specific information.

The clinician interface 112 may provide healthcare providers with real-time access to clinical insights, patient health data, and workflow management tools. Through the clinician interface 112, clinicians may review the LLM-generated recommendations, validate diagnoses, and tailor treatment plans based on their professional judgment. The clinician interface 112 may also enable seamless synchronization of clinician-reviewed data with existing EMR systems. In some embodiments, the clinician interface 112 may be integrated with time tracking and billing system 156 through the clinical workflow engine 108.

The clinical assessment system 100 incorporates a care plan library 154, which houses standardized treatment protocols and personalized care pathways for various medical conditions. The care plan library 154 ensures that treatment recommendations generated by the trained LLM 102 align with evidence-based medical guidelines. The trained LLM 102 dynamically retrieves relevant care plans from the care plan library 154 to support clinical decision-making and improve patient outcomes.

Additionally, the system maintains the practitioner registry 152, which serves as a database of licensed healthcare providers, their specializations, and professional credentials. The practitioner registry 152 is utilized by both the trained LLM 102 and the clinical workflow engine 108 to assign patient cases to relevant healthcare provider based on expertise, availability, and geographic proximity. This ensures personalized and efficient patient care delivery.

The clinical workflow engine 108 may be integrated with the time tracking and billing system 156, which automates service documentation, provider time tracking, and financial transactions. When a clinician reviews AI-generated insights, validates diagnoses or modifies treatment plans, the time tracking and billing system 156 logs the corresponding actions and calculates billable hours or reimbursable services. This integration ensures that healthcare providers receive accurate compensation while maintaining compliance with insurance requirements and medical billing standards.

The patient health data processing pipeline incorporates multiple stages, including data normalization, metadata augmentation, and interoperability mapping to standardized coding systems such as SNOMED CT and LOINC. Using natural language processing (NLP), the trained LLM 102 contextualizes patient data and enriches it with metadata attributes (e.g., timestamps, locations, and categorical classifications). The system further enhances clinical assessment accuracy through Retrieval-Augmented Generation (RAG) techniques, enabling the LLM to retrieve and dynamically integrate relevant data from the healthcare knowledge database. This approach ensures that clinical recommendations remain evidence-based and up-to-date. Additionally, the trained LLM 102 is designed for continuous learning and adaptation, allowing it to refine its assessment capabilities based on new medical research, patient outcomes, and clinician feedback. The integration of time tracking and billing system 156 ensures that patient care workflows remain efficient and financially accountable.

Figure 1B:
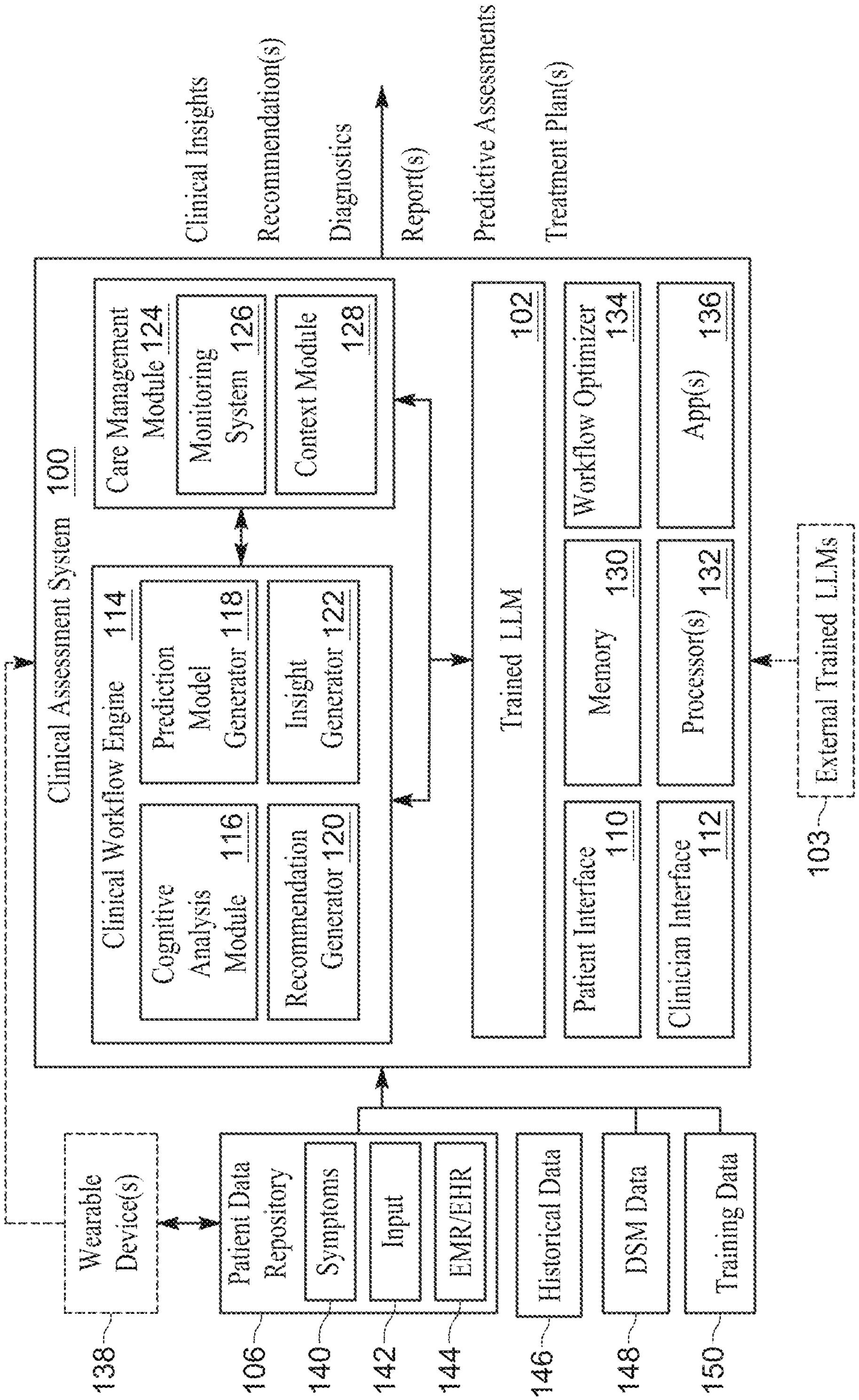
FIG. 1B illustrates a functional block diagram of the example clinical assessment system, in accordance with an embodiment of the present disclosure.

Referring now to FIG. 1B, a functional block diagram of the example clinical assessment system, is illustrated, in accordance with an embodiment of the present disclosure. The clinical assessment system 100 integrates various hardware and software components to enable efficient data processing. The clinical assessment system 100 may include but is not limited to, the trained LLM 102, the clinical workflow engine 108, the patient interface 110, the clinician interface 112, a care management module 124, a memory 130, one or more processors 132, a workflow optimizer 134, and one or more applications 136.

The processor 132 may include one or more processors, such as central processing units (CPUs), graphics processing units (GPUs), or specialized accelerators designed for machine learning tasks. The one or more processors may include one or more devices capable of executing instructions stored by the memory 130, to perform operations and/or communications amongst systems, engines, modules, and/or devices described herein. The memory 130 may include one or more non-transitory computer-readable storage media, such as solid-state drives (SSDs), dynamic random-access memory (DRAM), or flash storage devices. The memory 130 may store instructions and data that are usable in combination with processor 132 to execute the processes and/or algorithms described herein as well as to execute or interface with trained LLM 102. The memory 130 may also function to store or have access to the trained LLM 102.

The trained LLM 102 is an analytical component of the clinical assessment system 100 and operates as an advanced LLM or other machine learning framework. The trained LLM 102 may be implemented using frameworks such as TensorFlow®, PyTorch®, or other machine learning platforms, and may operate locally or in a cloud-based environment. Alternate embodiments may include multiple AI/ML models to handle specialized tasks, such as predictive or natural language processing. In some embodiments, the trained LLM 102 may be trained on training data 150 received from the healthcare knowledge database (not shown). The training data 150 includes but is not limited to, psychiatric research, historical patient data, treatment outcomes, and medical literature to ensure that the trained LLM 102 is well-versed in both theoretical and practical medical knowledge. To achieve this, the trained LLM 102 employs RAG techniques, which allow it to dynamically retrieve relevant data from connected repositories such as the historical medical data 146 and Diagnostic and Statistical Manual of Mental Disorders (DSM) data sources 148. Other health data sources are of course accessible to the system 100 depending on the particular health care being addressed for a patient. The retrieved information is then combined with the patient data to generate insights that are both comprehensive and individualized.

The clinical workflow engine 108 may include one or more modules or a plurality of modules, including at least a cognitive analysis module 116, a prediction model generator 118, a recommendation generator 120, and an insight generator 122. These modules collectively manage the processing of the patient health data. In some embodiments, the clinical workflow engine 108 may include additional modules for advanced analytics or be integrated with external systems for multi-department coordination.

The care management module 124 includes a monitoring system 126 and a context module 128 to support the real-time tracking of patient progress and the contextualization of data. These sub-modules work in tandem with the clinical workflow engine 108 to ensure personalized and adaptive patient care. Alternate embodiments of the care management module 124 may incorporate predictive monitoring capabilities or AI-driven alerts for high-risk scenarios.

The patient interface 110 represents a patient-centric platform designed to interact directly with patients. The patient interface 110 allows for the collection of patient-reported symptoms, displays clinical insights, and dynamically adapts interactive prompts based on analysis of the trained LLM 102. The patient interface 110 may be implemented as a web-based application, a mobile app, or integrated with the wearable devices 138.

The clinician interface 112 is tailored for healthcare providers or clinicians to offer access to patient health data, LLM-generated insights, and workflow management tools. The clinician interface 112 enables clinicians to review, validate, and update care plans in real-time. The clinician interface 112 may support integration with EMR 144 and may include customization options for individual provider workflows.

The applications 136 within the clinical assessment system 100 provide supplementary functionalities, such as task automation, data visualization, and remote access to the clinical assessment system 100. These applications 136 can operate on various hardware platforms, including computing devices, desktops, tablets, and mobile devices.

Input sources may include wearable devices 138 and the patient data repository 106, which may include patient-reported symptoms 140, input 142, and EMR 144. The input sources may also include historical medical data 146, and DSM data sources 148. These input sources supply real-time or historical data, which is processed by the clinical assessment system 100 for patient analysis. The clinical assessment system 100 may also include training data 150 for continuous refinement of the trained LLM 102.

In some embodiments, the clinical assessment system 100 may execute a computer-implemented method for managing patient care workflows. The method may include generating a customized care plan for a patient stored in a patient registry. The patient registry may include patient information including, but not limited to, demographic details, payer details, assigned care teams, and service line history. The method may include tracking data including, but not limited to, at least one service duration, session notes, and billing of a practitioner when care is provided to the patient. The method may further include matching the at least one service duration and the care provided to the patient with one or more CPT codes (or other standardized procedure code or code representative of a service event or a line item for a healthcare procedure) and may track progress of the patient across the service line history over time. The method may further include generating at least one analytics dashboard. The analytics dashboard(s) may include functionality to generate and display any combination of patient outcomes, referral effectiveness, and team performance metrics using one or more images, text, visualizations, or the like, and may do so in near real time based at least in part on the customized care plan, the tracked data, and the tracked progress. The method may trigger display of the at least one analytics dashboard automatically and/or responsive to a request from a patient, clinician, or other user with approved access to patient data being displayed. The patient information in the at least one analytics dashboard is generally encrypted and accessible for view according to predefined patient permissions.

By way of a non-limiting example, the patient interface 110, the wearable devices 138, or other input sources may provide patient health data corresponding to a patient, to the clinical workflow engine 108 for further processing. In some embodiments, the patient health data may include but is not limited to, one or more of biometric data from the wearable devices 138, historical medical data 146, and patient-reported symptoms 140. The clinical workflow engine 108 may receive the patient health data. The cognitive analysis module 116 of the clinical workflow engine 108 may normalize the patient health data using natural language processing techniques and data standardization techniques. The context module 128 within the care management module 124 may further augment the normalized data with metadata corresponding to the patient health data. In some embodiments, the metadata may be received from one or more of the input sources, such as the wearable devices 138, electronic health records from the EMR 144, or the patient-reported symptoms 140. The metadata may include temporal attributes, locational attributes, and/or categorical attributes corresponding to the patient health data. The cognitive analysis module 116 may further map the normalized and/or augmented data to a standardized medical coding system, such as SNOMED CT or LOINC. The clinical workflow engine 108 may encrypt the patient health data using an end-to-end encryption protocol to ensure data privacy and security.

The trained LLM 102, as part of the clinical workflow engine 108, may analyze the patient health data to generate clinical insights. The insight generator 122 performs this analysis by using the contextual processing of the trained LLM 102, which personalizes the identified clinical insights. The contextual processing may be based, at least in part, on historical medical data 146, real-time updates from the wearable devices 138 associated with the patient, and diagnostic criteria from the DSM data sources 148. The insight generator 122 using the trained LLM 102 identifies clinical insights, which may include, but are not limited to, potential diagnoses, treatment recommendations, and prioritized patient conditions. The monitoring system 126 of the care management module 124 may assist in dynamically tracking symptom progression or health trends to further refine the identified clinical insights. The recommendation generator 120 generates a set of interactive prompts for the patient interface 110 based on the identified clinical insights. These interactive prompts may be used to obtain additional information associated with the patient. The recommendation generator 120, in conjunction with the trained LLM 102, dynamically adapts the set of prompts using a decision-tree algorithm based on the patient responses. The patient interface 110 receives and transmits these responses back to the clinical workflow engine 108, where the insight generator 122 processes the input 142 to refine clinical insights. The updated clinical insights and patient responses are then displayed on the clinician interface 112 (e.g., via one or more dashboards described herein), allowing healthcare providers to validate or modify the care recommendations.

The processor 132 may further generate a set of interactive prompts for a patient interface 110 based on the identified clinical insights, the set of interactive prompts being configured to obtain additional information associated with the patient. The processor 132 may further dynamically adapt the set of prompts based on the set of patient responses, using a decision-tree algorithm implemented by the trained LLM 102. The processor 132 may further receive a set of patient responses responsive to the generated set of interactive prompts. The processor 132 may further display the clinical insights and the set of patient responses on the clinician interface 112.

The trained LLM 102 is dynamically updated with the patient health data and clinician feedback using the clinical workflow engine 108 to improve diagnostic accuracy and treatment recommendations over time. The clinical workflow engine 108 synchronizes the identified clinical insights and clinician-reviewed data with the EMR 144 to maintain up-to-date patient records.

In a non-limiting example, consider a patient, Sarah, a 45-year-old with a history of Type 2 diabetes, generalized anxiety disorder (GAD), and mild hypertension. Sarah uses the wearable device 138 to track her physical activity, glucose levels, and heart rate. Additionally, she provides patient-reported symptoms 140 such as fatigue and occasional dizziness through the patient interface 110. This example demonstrates how the clinical assessment system 100 processes her health data (i.e., patient health data) to generate personalized clinical insights and care recommendations.

Sarah's wearable device transmits real-time biometric data, including her glucose levels, heart rate variability, and daily step count, to the clinical workflow engine 108. In parallel, Sarah logs her fatigue severity and dietary intake (i.e., input 142) using the patient interface 110, while her historical medical data 146, such as past treatments and lab results, is retrieved from EMR 144. Additionally, the clinical assessment system 100 incorporates DSM data sources 148 to cross-reference diagnostic criteria for her anxiety symptoms.

The cognitive analysis module 116 within the clinical workflow engine 108 normalizes this patient health data using natural language processing (NLP) and data standardization techniques. Metadata such as the time of day, location, and context of Sarah's logged symptoms are appended by the context module 128 in the care management module 124 to ensure that the data is enriched with temporal, locational, and/or categorical attributes. The normalized and augmented data is then mapped to a standardized medical coding system, such as SNOMED CT, for interoperability.

The trained LLM 102, integrated with the clinical workflow engine 108, analyzes Sarah's health data (i.e., patient health data) to identify clinical insights. The insight generator 122 processes this patient's health data using contextual processing techniques, utilizing her historical medical records and real-time updates from her wearable device 138. For Sarah, the insight generator 122 identifies a potential diagnosis of prediabetic neuropathy based on her elevated glucose levels and reported symptoms of fatigue and dizziness. The insight generator 122 also identifies a recommendation for cognitive behavioral therapy (CBT) to manage her anxiety, tailored to DSM data sources 148. The insight generator 122 also identifies a prioritized condition list with her fluctuating glucose levels flagged as urgent for immediate intervention. The monitoring system 126 tracks Sarah's symptom progression, dynamically updating the clinical insights to reflect trends in her glucose levels and heart rate.

The recommendation generator 120 generates interactive prompts for the patient interface 110 based on the generated clinical insights. Sarah is asked to answer the interactive prompts about her dietary habits, stress levels, and sleep quality. The trained LLM 102, in conjunction with the recommendation generator 120, dynamically adapts these interactive prompts using a decision-tree algorithm to ensure that the questions are personalized and relevant. For example, if Sarah indicates high-stress levels, the clinical assessment system 100 generates additional prompts about recent life changes or work-related stressors. Sarah's responses are transmitted back to the clinical workflow engine 108, where the insight generator 122 refines its recommendations based on her inputs. The refined clinical insights and Sarah's responses are displayed on the clinician interface 112. The provider sees a flagged alert for immediate glucose level management. The provider also sees a recommendation to adjust Sarah's dietary plan and increase her physical activity. The provider also sees a proposed referral to a therapist for CBT sessions. The clinician interface 112 provides an interactive dashboard that allows the provider to modify care plans in real-time and synchronize the updates with Sarah's EMR.

The clinical assessment system 100 dynamically updates the trained LLM 102 with Sarah's new data and the provider's feedback, improving the accuracy of future insights. Using a RAG technique, the cognitive analysis module 116 retrieves the latest clinical research on prediabetic neuropathy and anxiety management from the healthcare knowledge database. The clinical assessment system 100 generates and delivers the clinical insights such as identified conditions, including potential prediabetic neuropathy and high-stress levels, prioritized for intervention. The clinical assessment system 100 also generates and delivers treatment recommendations such as tailored dietary adjustments, physical activity plans, and CBT sessions. The clinical assessment system 100 also generates and delivers interactive reports such as a summary of Sarah's glucose trends, anxiety triggers, and real-time symptom progression for clinician review. The clinical assessment system 100 also generates and delivers predictive assessments such as a projection of Sarah's glucose trends based on her current dietary patterns and physical activity levels. The clinical assessment system 100 also generates and delivers personalized treatment plans such as updated care recommendations synchronized with Sarah's EMR for continuity of care.

Figure 2:
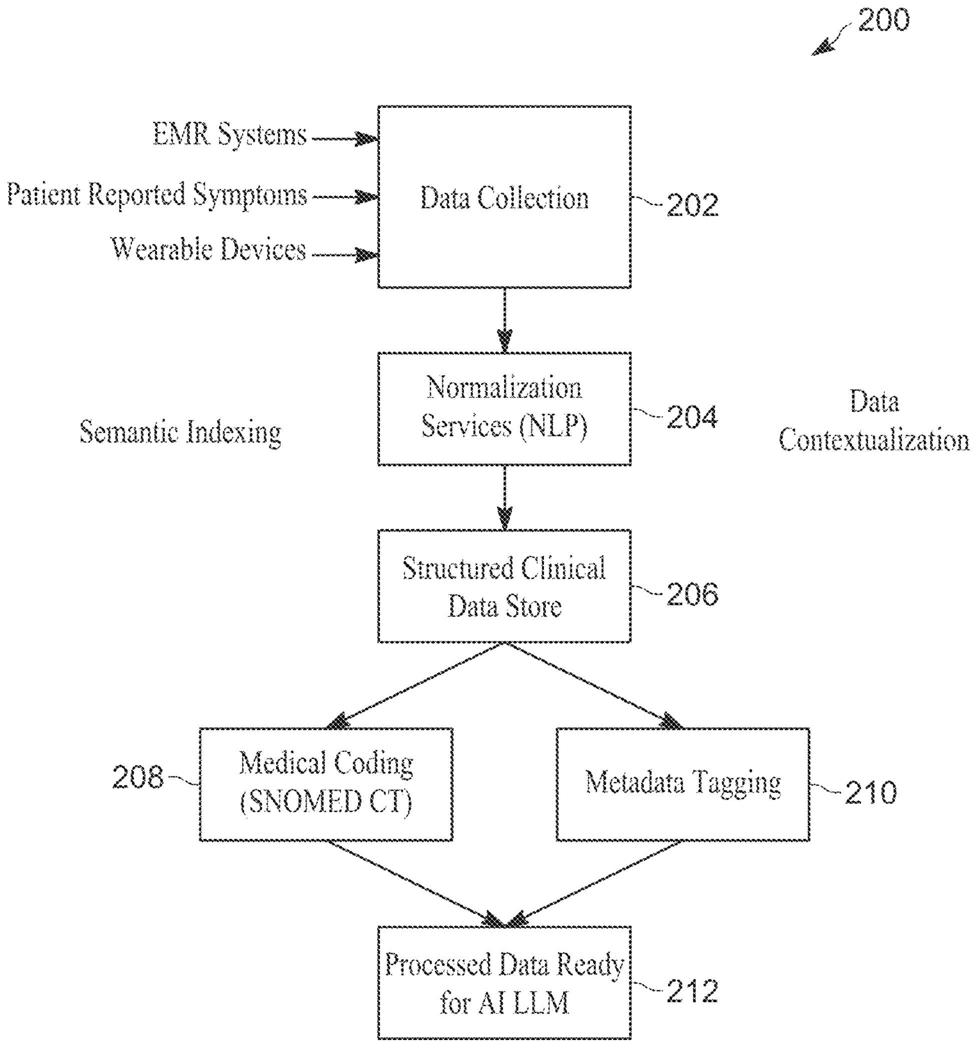
FIG. 2 illustrates an example flow diagram of processing patient health data, in accordance with an embodiment of the present disclosure.

Referring now to FIG. 2, an example flow diagram of processing the patient health data, is illustrated, in accordance with an embodiment of the present disclosure. The flow diagram 200 demonstrates the operations involved in processing patient health data for subsequent analysis by the trained LLM 102.

The process begins at a data collection block 202, which receives patient health data from the input sources. These input sources may include the wearable devices 138 and the patient data repository 106, which may include patient-reported symptoms 140, input 142, and the EMR 144. The patient health data received may include, but not limited to, one or more of biometric data from the wearable devices 138, historical medical data 146, and patient-reported symptoms 140.

Thereafter, the received data is subsequently passed to a normalization services block 204, which employs NLP techniques to standardize the patient health data. The normalization services block 204 involves semantic indexing to ensure that the patient health data from the input sources is translated into a uniform format. The normalization process resolves inconsistencies in terminology, structure, and representation of the patient health data. For example, NLP may standardize patient-reported symptoms or wearable device metrics into a structured format compatible with the clinical assessment system 100. The normalized data is stored within a structured clinical data store 206, which acts as a central repository for organized and indexed patient health data. This structured format ensures that the patient health data is readily accessible for subsequent processing tasks. The structured clinical data store 206 enables data contextualization. The contextualized data from the structured clinical data store 206 is further processed through two parallel pathways: medical coding block 208 and metadata tagging block 210. The medical coding block 208 maps the structured data to standardized medical coding systems such as SNOMED CT or LOINC. This ensures interoperability across various healthcare systems and platforms, allowing consistent interpretation of clinical data. For instance, symptoms and diagnoses are encoded in a standardized format, which can be universally understood.

Concurrently, the metadata tagging block 210 augments the patient health data with metadata. These metadata may include temporal data (e.g., the timing of symptom onset), locational data (e.g., where the patient received care), and categorical data (e.g., type of medical intervention). For example, metadata may indicate a correlation between specific patient-reported symptoms and time of day. Both the coded data from the medical coding block 208 and the patient health data from the metadata tagging block 210 are combined to form a processed data 212, which is ready for analysis by the trained LLM 102. The processed data 212 serves as an input to the trained LLM 102.

Figure 3:
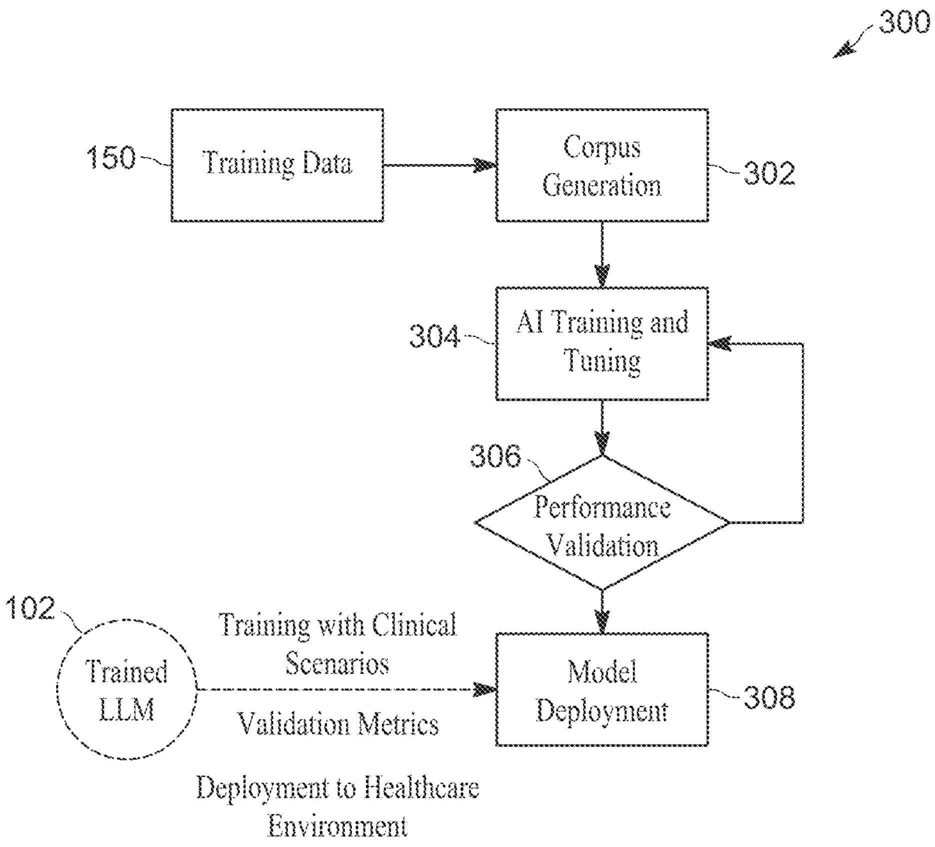
FIG. 3 illustrates an example flow diagram of training and initialization of the trained LLM, in accordance with an embodiment of the present disclosure.

Referring now to FIG. 3, an example flow diagram of training and initialization of the trained LLM 102, is illustrated, in accordance with an embodiment of the present disclosure. The flow diagram 300 represents the structured approach to building, training, validating, and deploying the trained LLM 102 to operate as an analytical component of the clinical assessment system 100. The process begins with the training data 150, which forms the foundational knowledge base for training the LLM 102. The training data 150 may include, but is not limited to, a diverse range of healthcare-related data such as psychiatric research, historical patient data, treatment outcomes, and medical literature.

The training data 150 is fed into the corpus generation module 302, which preprocesses and structures the training data 150 into a training-ready format. The corpus generation module 302 performs tasks such as data cleaning, tokenization, and semantic tagging. The corpus generation module 302 ensures that the training data 150 is transformed into an optimized, structured corpus that captures the semantic and contextual degrees required for effective LLM training. The structured training data is then passed to an AI training and tuning module 304, where the initial training of the LLM 102 occurs. The tuning module 304 utilizes machine learning frameworks such as TensorFlow® or PyTorch® to train the LLM 102 on the training data 150. The training process involves adjusting the LLM 102 parameters through iterative learning cycles to optimize performance.

Once the initial training is complete, the trained LLM 102 undergoes performance validation module 306, which serves as an evaluation step. The performance validation module 306 assesses the trained LLM 102 against predefined validation metrics, including accuracy, recall, precision, and contextual understanding. This step may also include testing the trained LLM 102 with real-world clinical scenarios to gauge its effectiveness in generating clinical insights, diagnoses, and recommendations. If the trained LLM 102 fails to meet the performance thresholds, the training and tuning module 304 may be re-engaged for additional refinement.

Following successful validation, the trained LLM 102 progresses to model deployment step 308. At this stage, the trained LLM 102 is prepared for integration into the clinical assessment system 100. The deployment process involves embedding the trained LLM 102 into the system architecture of the clinical assessment system 100, including integration with the clinical workflow engine 108, the patient interface 110, and the clinician interface 112. The model deployment step 308 ensures seamless operation of the trained LLM 102 in a live healthcare environment. The trained LLM 102 may be initialized within the healthcare environment. The trained LLM 102 undergoes additional training with clinical scenarios provided by real-world healthcare settings, as will be described in greater detail in FIG. 4.

Figure 4:
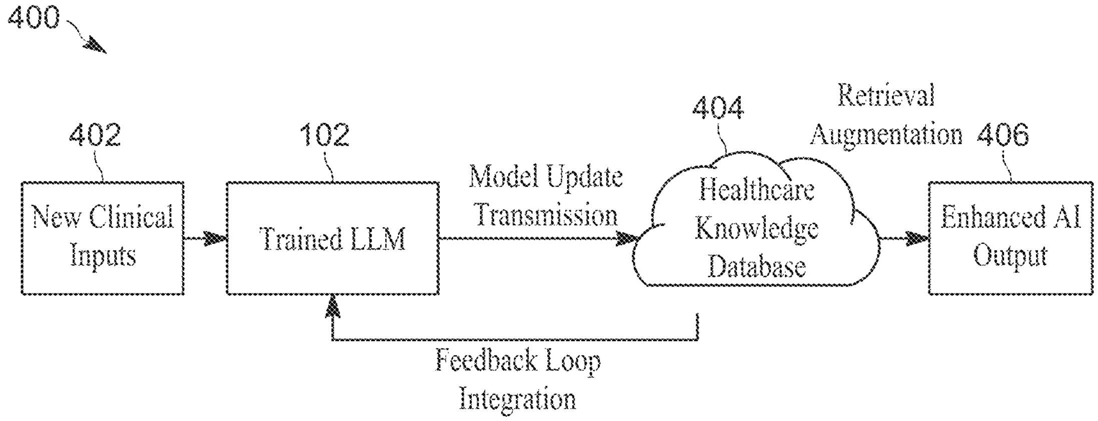
FIG. 4 illustrates an example flow diagram of dynamically updating the trained LLM, in accordance with an embodiment of the present disclosure.

Referring now to FIG. 4, an example flow diagram of dynamically updating the trained LLM 102, is illustrated, in accordance with an embodiment of the present disclosure. The flow diagram 400 depicts the iterative process by which the trained LLM 102 is dynamically updated with the patient health data.

New clinical inputs 402, which may include the patient health data, real-time updates from the wearable devices 138, the EMR 144, and clinician feedback from the clinical workflow engine 108 may be received. These new clinical inputs 402 provide real-time patient health data for continuous refinement of the trained LLM 102. The new clinical inputs 402 are processed by a trained LLM 102, which serves as a component for analyzing and integrating the new clinical inputs 402. The trained LLM 102 utilizes advanced machine learning techniques, including contextual analysis, semantic understanding, and pattern recognition, to extract meaningful insights from the new clinical inputs 402. The trained LLM 102 also incorporates existing metadata and standardized coding systems (e.g., SNOMED CT, LOINC) to ensure interoperability and consistency in the analysis. The processed data are transmitted as a model update transmission to the healthcare knowledge database 404. The healthcare knowledge database 404 functions as a centralized repository of accumulated clinical knowledge, including prior training datasets, medical literature, and historical patient data. This healthcare knowledge database 404 is continuously updated through RAG techniques to enable the LLM to expand its contextual and semantic understanding dynamically.

The RAG techniques employed by the healthcare knowledge database 404 retrieve relevant data subsets from the healthcare knowledge database 404 to supplement the processing capabilities of the trained LLM 102. By doing so, the trained LLM 102 utilizes both historical knowledge and real-time updates (e.g., new clinical research studies, recent diagnostic guidelines, updated medication protocols, or real-time wearable device data) to enhance its predictive accuracy and contextual relevance. Based on the enriched knowledge from the healthcare knowledge database 404, the trained LLM 102 generates enhanced AI outputs 406. These outputs may include potential diagnoses, treatment recommendations, prioritized clinical conditions, predictive health assessments, and adaptive care plans tailored to individual patient needs. The enhanced AI outputs 406 are further validated and contextualized through a feedback loop integration. The feedback loop integration enables continuous improvement of the trained LLM 102. Feedback may be received from clinicians using the clinician interface 112 and/or patient responses using the patient interface 110.

Figure 5:
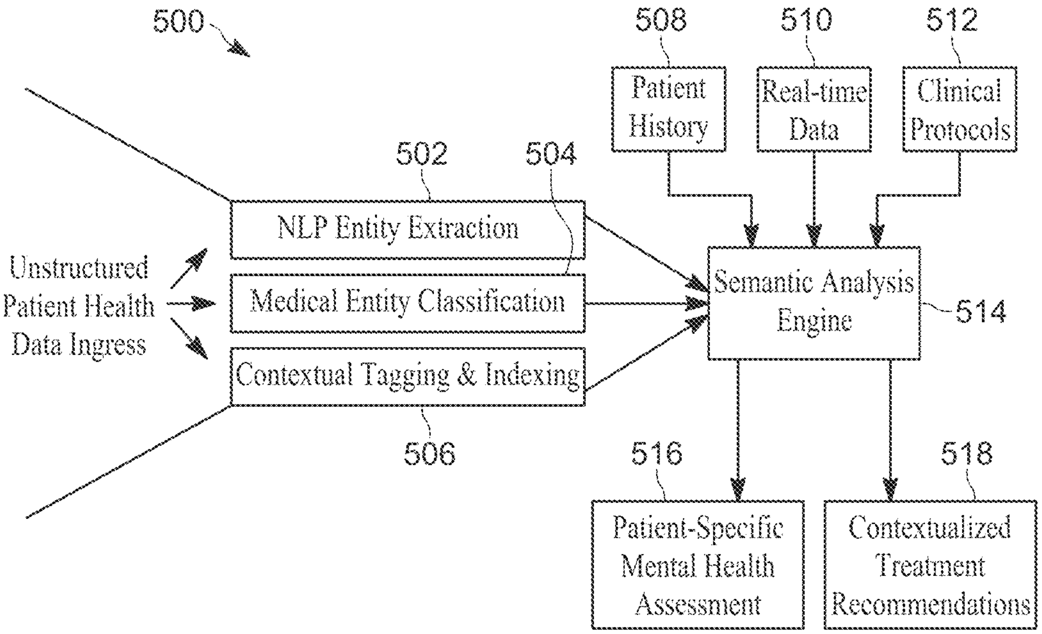
FIG. 5 illustrates an example flow diagram of semantic analysis and context-aware processing, in accordance with an embodiment of the present disclosure.

Referring now to FIG. 5, an example flow diagram 500 of semantic analysis and context-aware processing is illustrated, in accordance with an embodiment of the present disclosure. FIG. 5 depicts the process by which unstructured clinical data is transformed into patient-specific mental health assessments and contextualized treatment recommendations through a series of semantic and contextual analysis steps. While the example of FIG. 5 includes details about mental health, physical health may also be addressed as well and/or assessed separately to mental health.

Unstructured patient health data may be input into the system. In some embodiments, the patient health data may include, but is not limited to, one or more of biometric data from the wearable devices 138, historical medical data 146, patient-reported symptoms 140, and the EMR 144. This unstructured patient health data is processed through multiple analytical stages to extract relevant medical information and provide clinical insights. The process may include NLP entity extraction 502, which utilizes NLP techniques to identify medical entities/data, such as symptoms, conditions, medications, and lab results, from unstructured clinical data. The extracted entities serve as elements for subsequent analyses.

The extracted entities are then categorized through medical entity classification 504, where the clinical assessment system 100 assigns standardized medical codes, such as SNOMED CT or LOINC, or the like, to the identified entities. This classification ensures interoperability and enables consistent interpretation across healthcare systems. In parallel, the clinical assessment system 100 performs contextual tagging and indexing 506 to enrich the patient health data with metadata. These metadata include, but are not limited to, temporal information (e.g., event timestamps), locational details (e.g., healthcare facility), and/or categorical classifications (e.g., patient demographics).

The outputs from the NLP entity extraction 502, the medical entity classification 504, and the contextual tagging and indexing 506 are transmitted to the semantic analysis engine 514, which integrates these components with additional data sources, including patient history 508, real-time data 510, and clinical protocols 512. The patient history 508 may include longitudinal medical records, such as past diagnoses and treatments. The real-time data 510 includes dynamic inputs, such as wearable device readings and recent lab results. The clinical protocols 512 encompass evidence-based guidelines and best medical practices.

The semantic analysis engine 514 utilizes machine learning models, including the trained LLM 102, to perform advanced semantic and contextual processing. By synthesizing data from multiple sources, the semantic analysis engine 514 may generate one or more primary outputs, for example, patient-specific mental health assessments 516 (and/or physical health assessments) and contextualized treatment recommendations 518. The patient-specific mental health assessments 516 (and/or physical health assessments) provide a detailed understanding of the current mental health status (or physical health status) of the patient, including prioritized conditions, potential risk factors, and symptom trajectories. These assessments are tailored to the individual clinical context. The contextualized treatment recommendations 518 offer clinical insights for healthcare providers, such as personalized treatment plans, medication adjustments, and lifestyle intervention strategies. These recommendations are aligned with the patient's unique clinical profile and adhere to established medical guidelines.

Figure 6:
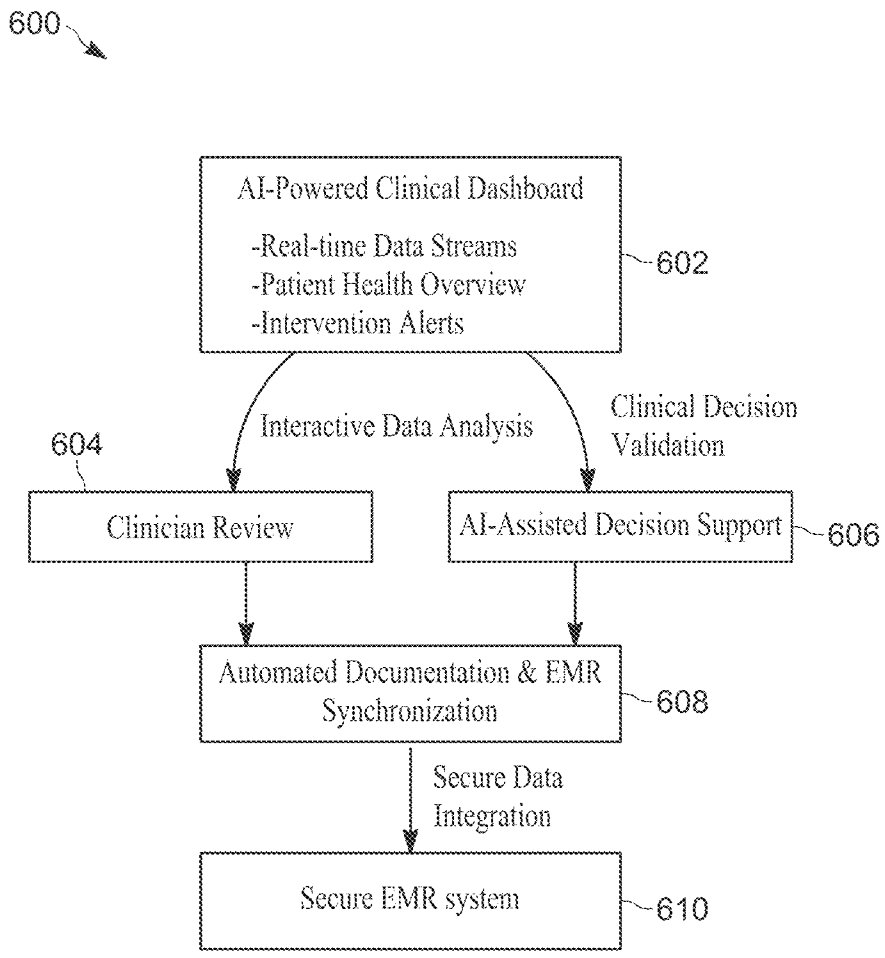
FIG. 6 illustrates an example flow diagram of clinical workflow and decision support, in accordance with an embodiment of the present disclosure.

Referring now to FIG. 6, an example flow diagram of clinical workflow and decision support is illustrated, in accordance with an embodiment of the present disclosure. FIG. 6 depicts the interconnected components and processes involved in enabling real-time clinical decision-making and seamless integration with EMR 144.

The clinician dashboard 602 may be integrated into the clinician interface 112, which provides clinicians with a consolidated view of real-time data streams, a comprehensive patient health overview, and intervention alerts. This clinician dashboard 602 acts as the primary interface for interacting with the clinical insights and serves as a decision-making hub. The clinician dashboard 602 provides clinicians with clinical insights in a user-friendly format. The clinician dashboard 602 enables interactive data analysis and clinical decision validation through one or more pathways: the clinician review pathway 604 and AI-assisted decision support pathway 606. In the clinician review pathway 604, healthcare providers manually evaluate the clinical insights, utilizing their expertise to validate or modify the recommendations. This clinician review pathway 604 ensures that clinical decisions align with established medical practices and patient-specific contexts. Alternatively, the AI-assisted decision support pathway 606 utilizes advanced algorithms within the clinical workflow engine to autonomously suggest potential treatment plans, identify critical risk factors, and flag inconsistencies in the patient health data. This pathway streamlines the decision-making process, thereby allowing clinicians to focus on high-priority cases and improving efficiency in high-volume clinical settings. Once decisions are validated or refined through either pathway, the flow diagram 600 proceeds to automated documentation and EMR synchronization 608. The EMR synchronization 608 involves the automatic generation of clinical notes, treatment plans, and diagnostic summaries based on the finalized decisions. The documentation is formatted to comply with standards such as FHIR (Fast Healthcare Interoperability Resources) to ensure compatibility with diverse EMR systems. The documentation generated at the EMR synchronization 608 is securely integrated with the secure EMR system 610 through a robust data integration framework. This framework employs encryption protocols and role-based access controls to maintain the confidentiality and integrity of patient health data.

Figure 7:
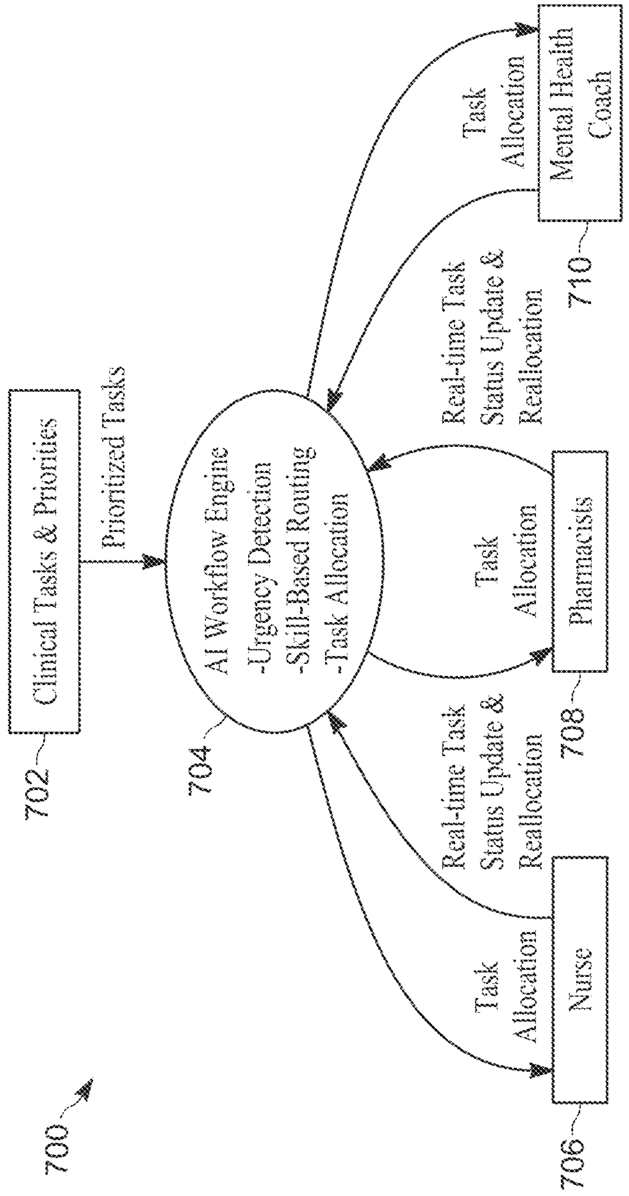
FIG. 7 illustrates an example flow diagram of task allocation and workflow management, in accordance with an embodiment of the present disclosure.

Referring now to FIG. 7, an example flow diagram 700 of task allocation and workflow management is illustrated, in accordance with an embodiment of the present disclosure. FIG. 7 depicts the operational framework of a task allocation system integrated with an AI workflow engine 704 to ensure optimized resource utilization and efficient management of clinical workflows. The clinical tasks and priorities module 702 receives a list of tasks based on current clinical demands, patient care priorities, and organizational objectives. The priorities module 702 organizes the tasks and assigns priority levels, ensuring that high-urgency tasks are flagged for immediate attention. For example, tasks such as medication review or patient monitoring with critical conditions may be prioritized over routine follow-ups.

The prioritized tasks are transmitted to the AI workflow engine 704, which is equipped with capabilities for urgency detection, skill-based routing, and task allocation. The urgency detection component evaluates the criticality of each task using real-time patient data and predefined clinical protocols. The skill-based routing functionality maps tasks to appropriate healthcare providers based on their expertise, availability, and workload. The task allocation mechanism ensures that each task is dynamically assigned to suitable team member. The task allocation process is illustrated through three representative roles in FIG. 7, nurse 706, pharmacist 708, and mental health coach 710. The AI workflow engine 704 allocates tasks to these roles based on specific criteria. For instance, medication reconciliation tasks may be routed to the pharmacist 708, while patient counseling activities could be allocated to the mental health coach 710. Similarly, tasks such as vital sign monitoring may be assigned to the nurse 706.

Once tasks are assigned, the clinical assessment system 100 enables real-time task status updates and reallocation. This feature ensures continuous monitoring of task progress and allows the AI workflow engine 704 to dynamically reallocate tasks in response to delays, resource availability changes, or unforeseen circumstances. For example, if the nurse 706 encounters an unexpected workload, the system may reassign non-critical tasks to other team members, such as the mental health coach 710.

Figure 8:
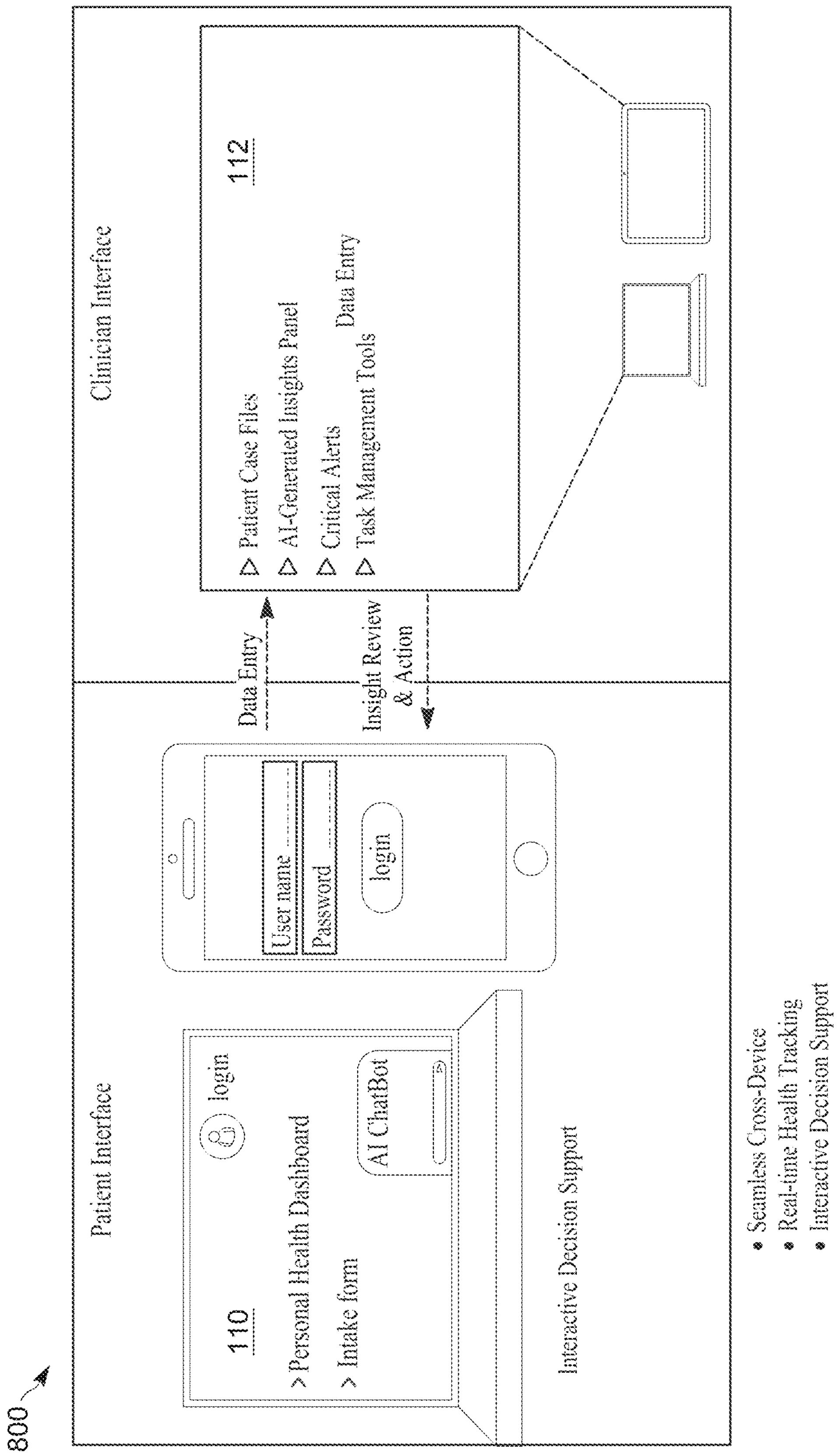
FIG. 8 illustrates an example dual-panel diagram depicting a patient interface and a clinician interface, in accordance with an embodiment of the present disclosure.

Referring now to FIG. 8, an example dual-panel diagram depicting the patient interface 110 and the clinician interface 112, is illustrated, in accordance with an embodiment of the present disclosure. Left side of the dual-panel diagram 800 represents the patient interface 110, which is designed for direct interaction with patients to enable data input, real-time health tracking, and interactive decision support. The patient interface 110 can be accessed through multiple devices, including desktop computers, mobile phones, and tablets. The patient interface 110 provides several functionalities such as a Personal Health Dashboard which enables patients to view their health metrics, treatment progress, and personalized insights generated by the trained LLM 102. The patient interface 110 further provides an intake form in which patients can input symptoms, medical history, and lifestyle information, which is processed and analyzed by the cognitive analysis module 116 of the clinical workflow engine 108. The patient interface 110 further provides an AI Chatbot which is embedded within the patient interface 110, the AI chatbot provides a conversational interface for patients to ask questions, receive guidance, and clarify medical instructions.

The right side of the dual-panel diagram 800 represents the clinician interface 112, which provides healthcare providers with tools for reviewing and managing patient health data, as well as LLM-generated clinical insights. The clinician interface 112 offers features such as patient case files in which clinicians can access the patient health data, including the historical medical data 146, real-time updates from wearable devices 138, and the EMR 144. The clinician interface 112 further offers an AI-generated insights panel that displays clinical insights, such as potential diagnoses, prioritized conditions, and treatment recommendations, generated by the insight generator 122. The clinician interface 112 further offers critical alerts for urgent matters, such as potential medication contraindications or significant health deterioration. The clinician interface 112 further offers task management tools that enable workflow management by allowing clinicians to assign tasks, track progress, and collaborate with other healthcare providers.

Data flow between the patient interface 110 and the clinician interface 112 is bidirectional. Patients enter data using intake forms or the AI chatbot, which is processed by the clinical workflow engine 108. The resulting clinical insights and updates are transmitted to the clinician interface 112 for review and validation. Conversely, clinicians can update care plans or recommendations, which are communicated back to the patient interface 110 for patient action or acknowledgment.

Figure 9:
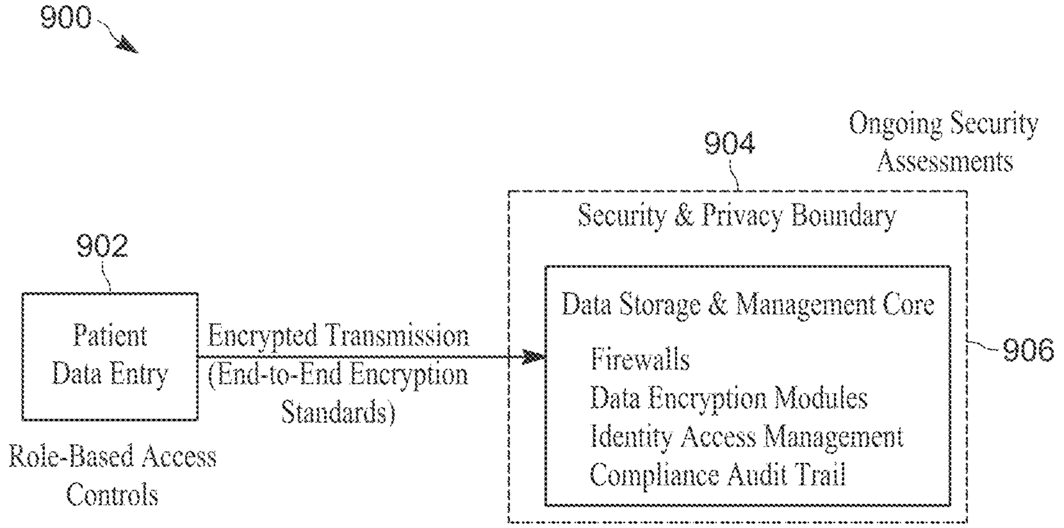
FIG. 9 illustrates an example schematic diagram depicting encryption of the patient health data, in accordance with an embodiment of the present disclosure.

Referring now to FIG. 9, an example schematic diagram depicting encryption of the patient health data, is disclosed, in accordance with an embodiment of the present disclosure. The schematic diagram 900 depicts the secure handling, storage, and management of the patient health data within the clinical assessment system 100. The process begins with the patient data entry module 902, which represents the point at which patient health data, such as one or more of biometric data from the wearable devices 138, historical medical data 146, and patient-reported symptoms 140, is entered into the clinical assessment system 100. This patient health data may be entered at the patient interface 110 or other integrated data collection devices, such as the wearable devices 138 or the EMR 144. To ensure role-based access control, the clinical assessment system 100 enforces strict authentication and authorization protocols, thereby preventing unauthorized access to sensitive information. Data entered through the patient data entry module 902 is transmitted securely using end-to-end encryption standards, thereby ensuring that data integrity and confidentiality are maintained during transmission.

The encrypted data is then directed into the Security and Privacy Boundary 904, which defines the protected perimeter of the data storage and management infrastructure of the clinical assessment system 100. The Security and Privacy Boundary 904 employs multiple layers of security controls to ensure robust protection against unauthorized access or breaches. Components within the Security and Privacy Boundary 904 may include firewalls, data encryption modules, identity access management (IAM), and compliance audit trail. In some embodiments, the firewalls filter incoming and outgoing network traffic, blocking unauthorized access and preventing potential threats. In some embodiments, the data encryption modules ensure that data remains encrypted both in transit and at rest, utilizing encryption protocols that comply with healthcare standards such as HIPAA. In some embodiments, the IAM enforces role-based access control, allowing authorized users to access specific datasets or functionalities within the clinical assessment system. In some embodiments, the compliance audit trail logs access attempts, modifications, and system interactions, ensuring traceability and accountability. It supports compliance with regulatory standards, including HIPAA and GDPR.

Within the data storage and management core 906, the patient health data is securely stored and managed. This data storage and management core 906 ensures that the patient health data is structured, indexed, and accessible for clinical analysis and AI/ML model training (e.g., the trained LLM 102). Additionally, ongoing security assessments are performed, which include vulnerability scans, penetration testing, and real-time monitoring to identify and mitigate emerging threats.

In some embodiments, the system is designed to provide the highest levels of security, compliance, and data protection, ensuring that patient information remains confidential and secure. The system adheres to regulatory standards such as HIPAA (Health Insurance Portability and Accountability Act) and HITECH (Health Information Technology for Economic and Clinical Health Act), guaranteeing that Protected Health Information (PHI) is handled securely. Furthermore, in the event that system 100 is utilized in a country outside of the United States, other protocols, rules, laws, and/or regulatory standards can be employed or otherwise accessed. The system maintains confidentiality, integrity, and availability through measures such as role-based access control (RBAC), automated validation processes, and disaster recovery strategies, ensuring patient data remains protected even in the event of system failures or cyberattacks. Additionally, since the system operates on one or more a cloud servers (e.g., healthcare-specific cloud server(s)), it includes a Business Associate Agreement (BAA) that further ensures compliance with HIPAA standards and/or other predetermined standards, protocols, rules, or laws.

To protect data from unauthorized access, encryption mechanisms are in place, securing information both at rest and in transit using encryption (e.g., AES-256 or the like). Furthermore, the system implements end-to-end encryption, allowing sensitive information like psychiatric reports and medication plans to be encrypted based on access privileges. The system also integrates Advanced Threat Protection (ATP) across services that such as one or more chat services, file sharing services, file storage services, and analytics tools, etc., providing continuous monitoring for security threats like malware and ransomware. Any detected threats generate real-time alerts to system administrators for immediate action.

A Role-Based Access Control (RBAC) system ensures that users can access data relevant to their specific roles. This dynamic system automatically adjusts permissions as user roles change, minimizing unauthorized access. Granular access controls further restrict sensitive fields, such as psychiatric care plans, to authorized personnel like Lead Psychiatrists or Care Managers. Additionally, audit trails track all user activity, including data access and modifications, with security analytics software to provide a centralized monitoring dashboard for detecting anomalies and unauthorized access attempts.

To maintain accountability and ensure transparency, the system keeps comprehensive audit logs of all activities, from patient record updates to workflow changes. These logs are integrated with security analytics software, allowing administrators to track access patterns and potential security breaches in real-time. Automated compliance audits are also conducted using system 100, which generates reports identifying data access violations or unusual activity. If any compliance breaches are detected, the system triggers automated alerts for immediate resolution.

The system also features real-time security monitoring, which continuously scans for vulnerabilities and configuration risks. With Security Information and Event Management (SIEM) capabilities, threats are proactively identified, alerts are generated, and security incidents are swiftly addressed. Additionally, Advanced Threat Protection (ATP) is deployed across all services provided by system 100, ensuring that malware and ransomware attacks are flagged before they can cause damage.

For data governance and privacy, the system leverages data governing software to classify and manage patient data according to regulatory standards. This allows for the enforcement of Data Loss Prevention (DLP) policies, preventing unauthorized sharing of sensitive patient information across other services accessible to system 100. Furthermore, the system complies with regional data residency laws, such as General Data Protection Regulation (GDPR) and California Consumer Privacy Act (CCPA) (or the like), ensuring that patient data is stored within legally approved regions. The cloud computing platforms used by the clinical assessment system 100 may provide regional services to allow data to be stored in compliance with local regulations, and regular audits ensure continued adherence to these legal requirements.

The system provides a robust framework for security, compliance, and data protection, integrating advanced encryption, real-time threat monitoring, role-based access control, and automated compliance audits. By leveraging the described security tools, the system 100 ensures data integrity, confidentiality, and availability, while proactively defending against evolving cyber threats.

The Compliance Audits and Reporting module in the system is designed to ensure that healthcare organizations comply with critical regulatory standards such as HIPAA (Health Insurance Portability and Accountability Act) and HITECH (Health Information Technology for Economic and Clinical Health Act), along with internal compliance policies. This module plays a role in maintaining the security, privacy, and integrity of patient data while ensuring operational transparency and accountability within care teams.

To achieve this, the system utilizes automated tools that continuously monitor and track user activities within the platform. It generates detailed audit logs that document actions such as patient record access, data modifications, and task completions. These logs help administrators review system usage, detect potential security breaches, and ensure that staff members adhere to compliance guidelines.

Additionally, the module includes automated policy violation reporting, which identifies unauthorized access, irregular activity, or deviations from established compliance protocols. When a potential violation is detected, the system can trigger alerts, notify administrators, and provide corrective action recommendations.

By leveraging real-time monitoring, automated reporting, and robust audit capabilities, the Compliance Audits and Reporting module enables healthcare organizations to proactively manage compliance risks, streamline regulatory audits, and protect sensitive patient information. This ensures that care teams operate within legal and ethical standards while maintaining trust and accountability in patient care operations.

Figure 10:
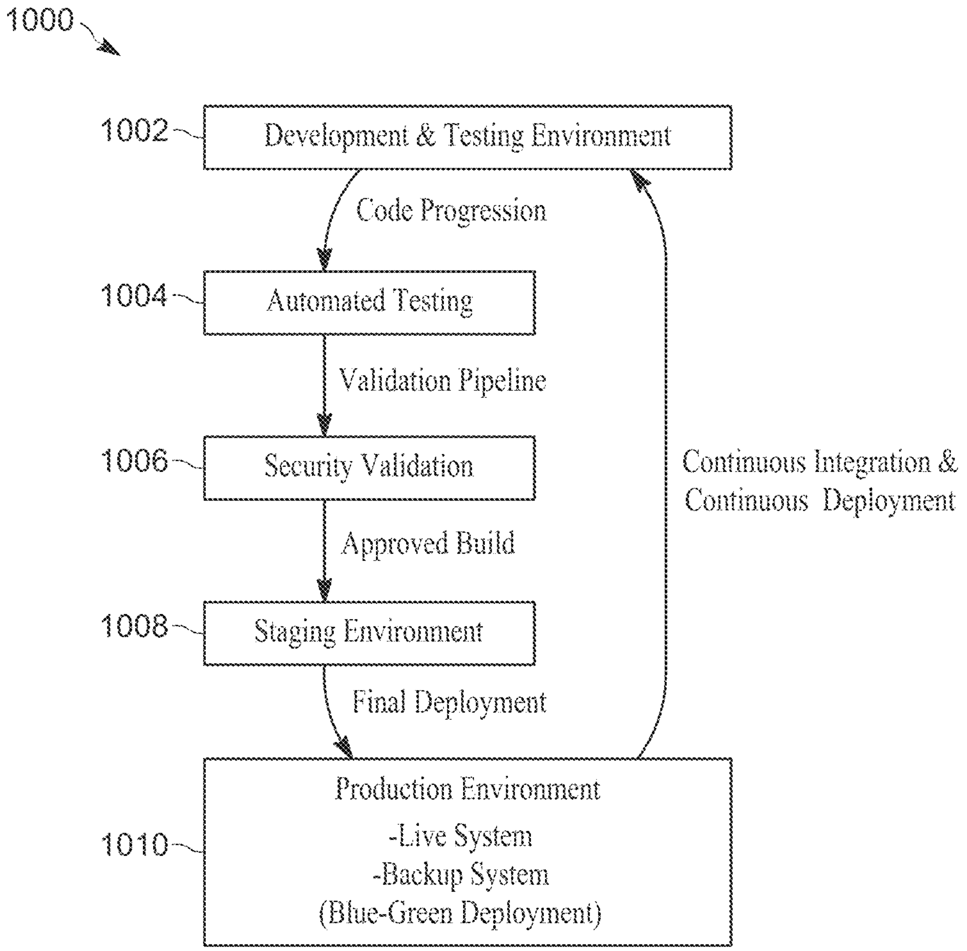
FIG. 10 illustrates an example flow diagram of testing, deployment, and updates of the clinical assessment system, in accordance with an embodiment of the present disclosure.

Referring now to FIG. 10, an example flow diagram of testing, deployment, and updates of the clinical assessment system 100 is illustrated, in accordance with an embodiment of the present disclosure. This flow diagram 1000 depicts the systematic approach for continuous integration (CI) and continuous deployment (CD) of the clinical assessment system 100.

The initial code progression of the clinical assessment system 100 occurs in the development and testing environment 1002. The testing environment 1002 serves as the workspace for developing new features, fixing bugs, and implementing updates to the clinical assessment system 100. Once changes are made, the initial code enters the testing pipeline for further validation. The next phase involves automated testing 1004, which includes running a series of automated test cases designed to identify bugs, verify functionality, and ensure code quality. This step may include unit tests, integration tests, and regression tests. Automated testing ensures that new code does not disrupt existing system functionalities. Following successful automated testing, the code proceeds to the security validation phase 1006, where it undergoes rigorous checks to identify and mitigate potential vulnerabilities. This may include static and dynamic application security testing, penetration testing, and compliance verification with healthcare industry standards such as HIPAA. A code that passes all security checks is approved for further deployment.

After security validation, the code enters the staging environment 1008, which mimics the production environment. This staging phase allows for live testing of the approved build in a controlled environment to identify any issues that might arise in a real-world setting. This block helps ensure that the system can handle expected user loads and provides a seamless user experience.

Upon successful validation in the staging environment, the system proceeds to the production environment 1010 for final deployment. The production environment employs a blue-green deployment strategy, where identical or substantially identical environments (e.g., live system and backup system) are maintained. During deployment, updates are first applied to the backup system (green environment) while the live system (blue environment) continues to operate without interruptions. Once the updates are validated in the backup system, traffic is rerouted to it, effectively making it the new live system. This approach minimizes downtime and ensures rollback capability in case of deployment issues.

Figure 11:
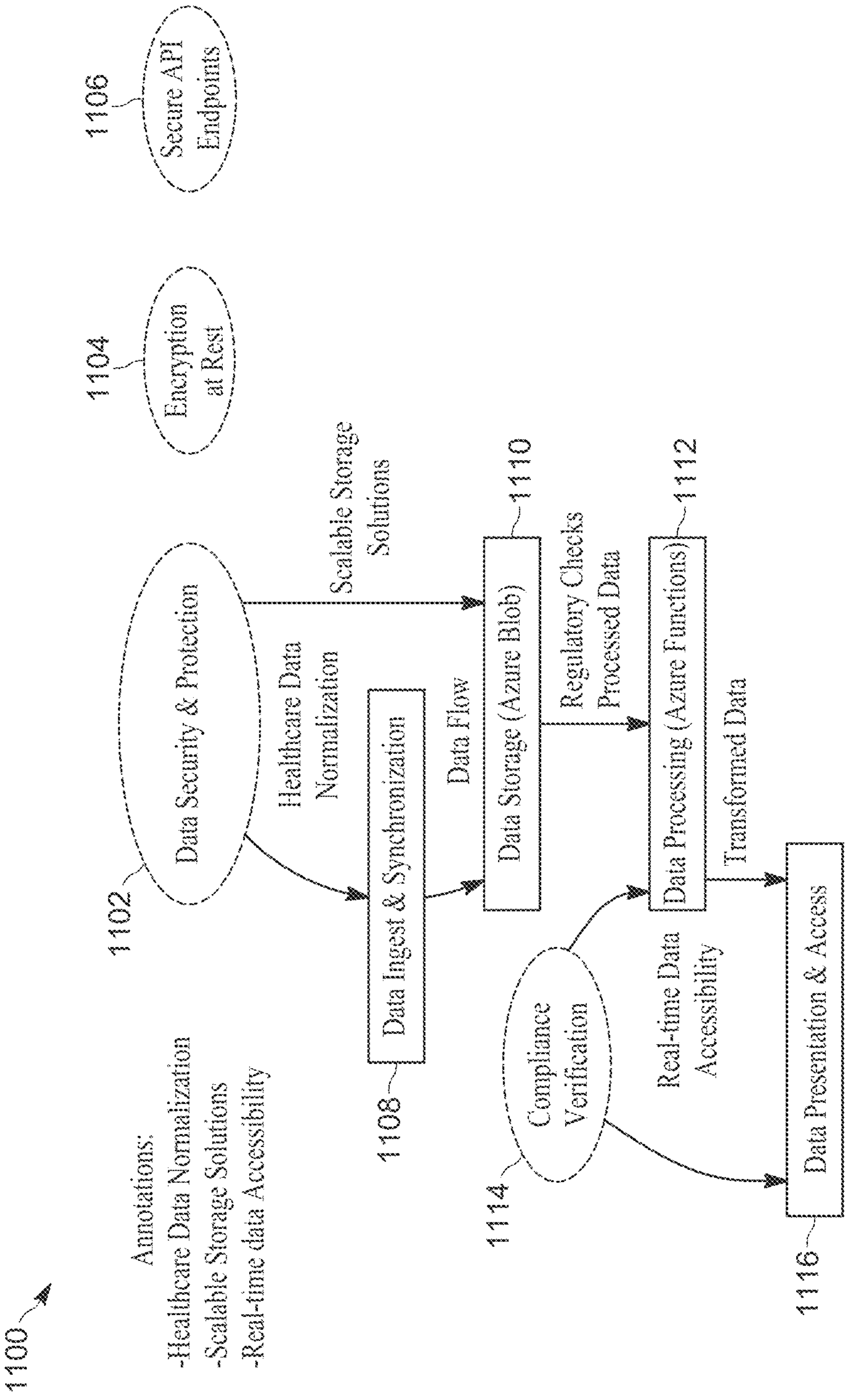
FIG. 11 illustrates an example architectural diagram of cloud-based data management, in accordance with an embodiment of the present disclosure.

Referring now to FIG. 11, an example architectural diagram of cloud-based data management, is illustrated, in accordance with an embodiment of the present disclosure. The architectural diagram 1100 depicts the multi-layered approach employed for the secure, scalable, and efficient management of healthcare data within the clinical assessment system 100.

The data management workflow includes data ingest and synchronization 1108, which is responsible for aggregating data from various input sources such as the wearable devices 138, the patient data repository 106 that includes patient-reported symptoms 140, input 142, and the EMR 144. Data security and protection 1102 ensures that patient health data operations adhere to stringent security protocols. This includes the implementation of encryption at rest 1104, which safeguards stored data using encryption technologies, and secure API endpoints 1106, which protect data during transmission to and from external systems. Once ingested, the data is routed to data storage 1110, which utilizes cloud storage solutions such as Azure Blob for scalable and secure storage. The storage architecture is optimized to handle large volumes of healthcare data efficiently while maintaining redundancy for data integrity. The next layer, data processing 1112, employs serverless computing capabilities such as Azure Functions to perform complex transformations and analyses on the raw data. This block ensures that the processed data meets the system's requirements for subsequent stages, such as clinical insights generation. The architecture incorporates a compliance verification 1114 module, which performs regulatory checks to ensure that all data operations are in compliance with healthcare standards and regulations such as HIPAA and GDPR. This module also audits the data handling processes to maintain accountability and transparency. The processed and verified data is then made available through the data presentation and access 1116 layer, which delivers transformed data to the system's various interfaces, including the patient interface 110 and clinician interface 112. This layer ensures real-time data accessibility and supports seamless integration with external systems.

Figure 12:
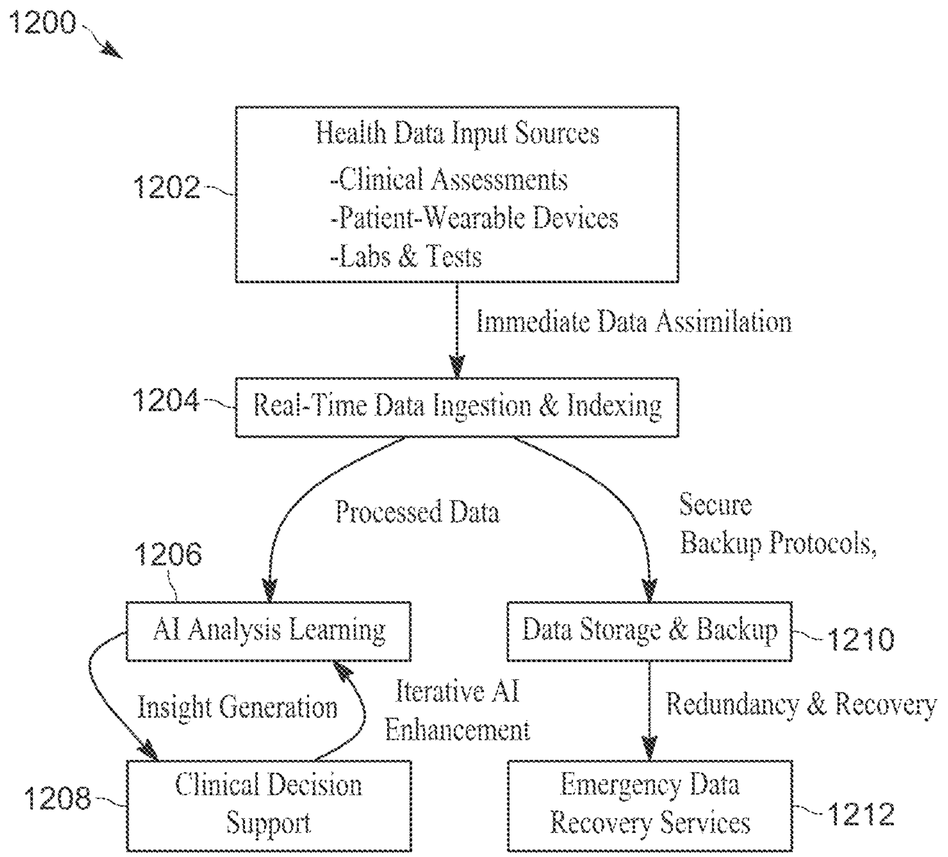
FIG. 12 illustrates an example flow diagram of real-time data handling within the clinical assessment system, in accordance with an embodiment of the present disclosure.

Referring now to FIG. 12, an example flow diagram of real-time data handling within the clinical assessment system 100, is illustrated, in accordance with an embodiment of the present disclosure. The flow diagram 1200 demonstrates the systematic processing of patient health data. The process includes health data input sources 1202, which include the wearable devices 138, and the patient data repository 106 which includes patient-reported symptoms 140, input 142, and the EMR 144.

The patient health data is passed to the real-time data ingestion and indexing module 1204, which organizes and indexes the patient health data for efficient processing. This block ensures that the patient health data is accessible and ready for use by various system components. The indexed data is subsequently bifurcated into one or more processing streams, AI analysis and learning module 1206 and data storage and backup module 1210. The AI analysis and learning module 1206 processes the indexed data to generate clinical insights through iterative AI enhancement. This AI analysis and learning module 1206 includes capabilities for real-time updates and refinement of the trained LLM 102. The insights generated by the learning module 1206 are directed to the clinical decision support module 1208, which provides healthcare providers with actionable recommendations and diagnoses to optimize patient care. Simultaneously, the processed data is stored securely in the data storage & backup module 1210. This 1210 module ensures that the data is maintained with redundancy protocols. Additionally, this data storage and backup module 1210 enables secure backup protocols to protect the data and enable seamless recovery in case of system failures. The emergency data recovery services module 1212 works in conjunction with the data storage and backup systems. The emergency data recovery services module 1212 ensures that critical data can be retrieved quickly during emergencies, minimizing downtime and ensuring the continuity of patient care.

Figure 13:
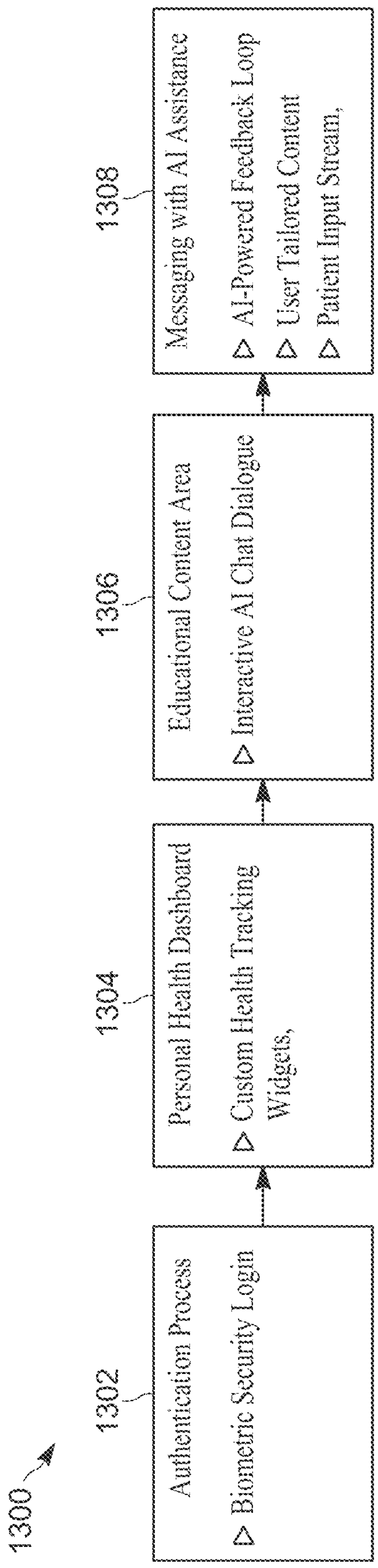
FIG. 13 illustrates an example schematic diagram of the patient interface, in accordance with an embodiment of the present disclosure.

Referring now to FIG. 13, an example schematic diagram 1300 of the patient interface 110, is illustrated, in accordance with an embodiment of the present disclosure. The patient interface 110 provides a user-centric platform designed to enable seamless interaction between patients and the healthcare system while offering personalized features to enhance patient engagement and care management. The process includes the authentication process 1302, which ensures secure access to the patient interface 110. The authentication process may involve a biometric security login, such as fingerprint scanning, facial recognition, or other biometric authentication methods. Upon successful authentication, the patient interface 110 transitions to the personal health dashboard 1304, which serves as the primary hub for the patient. The personal health dashboard 1304 includes custom health tracking widgets, allowing patients to monitor vital statistics, medication schedules, and other health parameters. These widgets can be tailored to the specific needs and preferences of individual patients, enhancing usability and personalization.

The patient interface 110 further incorporates an educational content area 1306, designed to empower patients with knowledge about their conditions and care plans. This area includes an interactive AI chat dialogue, where patients can ask questions, receive real-time answers, and engage with AI-powered educational resources. This feature promotes patient awareness and enables informed decision-making regarding their healthcare. The final component of the patient interface is messaging with AI assistance 1308, which enables seamless communication between patients and the system.

Figure 14:
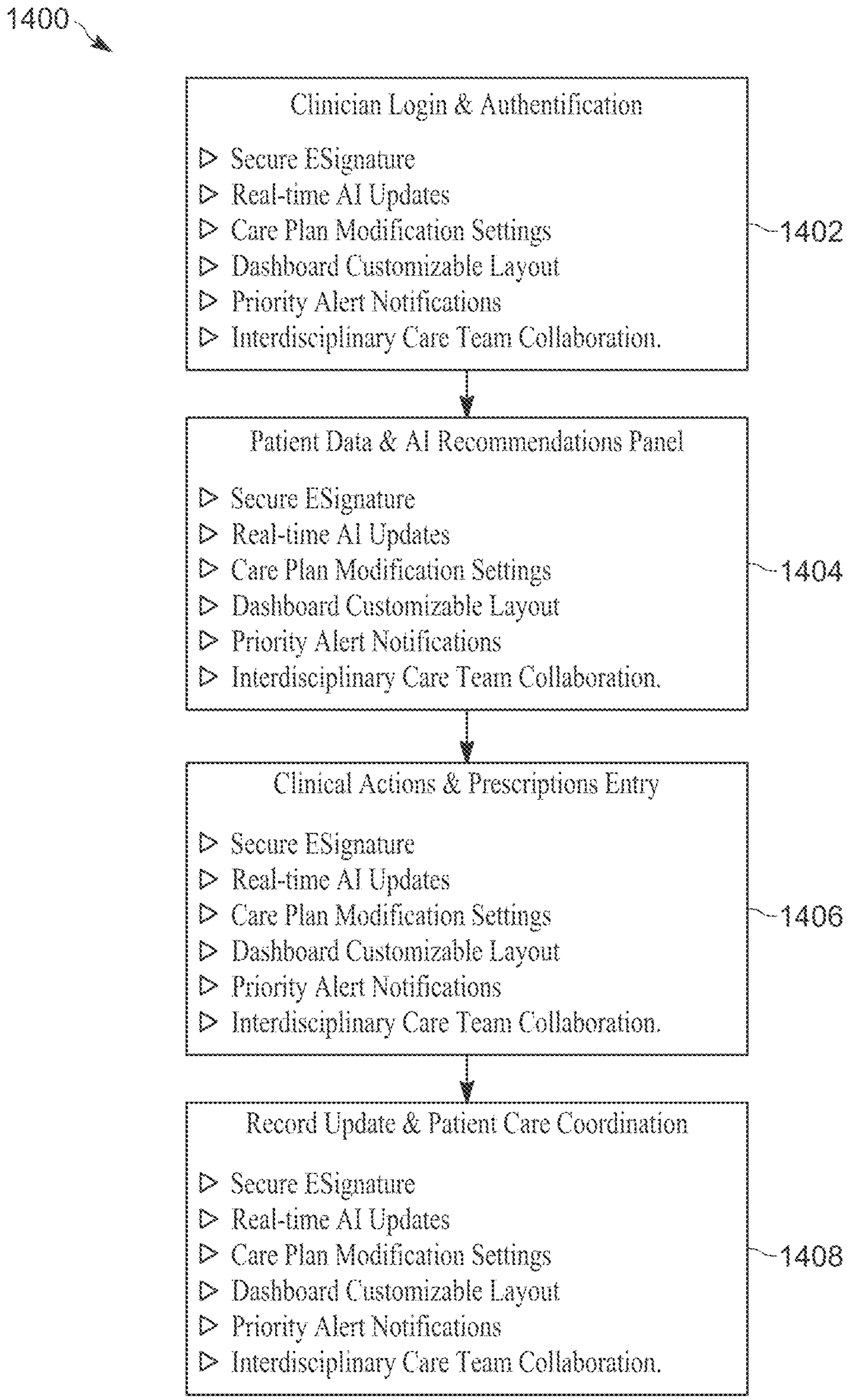
FIG. 14 illustrates an example schematic diagram of the clinician interface, in accordance with an embodiment of the present disclosure.

Referring now to FIG. 14, an example schematic diagram 1400 of the clinician interface 112, is illustrated, in accordance with an embodiment of the present disclosure. The clinician interface 112 is designed to enable efficient clinical workflows, enabling healthcare providers to manage patient data, review AI-generated recommendations, and perform critical actions seamlessly.

The clinician interface 112 includes a clinician login and authentication module 1402, which ensures secure access to the clinical assessment system 100. The clinician login and authentication module 1402 includes features such as "Secure E-Signature" for authentication and authorization of the clinician, "Real-Time AI Updates" for keeping clinicians informed about patient statuses, and "Care Plan Modification Settings" for customizing treatment plans. Additionally, the clinician login and authentication module 1402 supports a "Dashboard Customizable Layout", allowing clinicians to tailor the clinician interface 112 to their specific workflow needs. Features such as "Priority Alert Notifications" highlight critical cases requiring immediate attention, and "Interdisciplinary Care Team Collaboration" enables communication and coordination among different healthcare providers.

After logging in, clinicians access the patient health data and AI recommendations panel 1404, which consolidates patient information and AI-driven clinical insights. This panel includes tools for Secure E-Signature, enabling clinicians to approve AI-generated recommendations securely. Real-Time AI Updates provide instant visibility into evolving patient data, while care plan modification settings allow adjustments to treatment protocols. The clinical actions and prescriptions entry module 1406 enables clinicians to input treatment decisions, orders, and prescriptions. This clinical actions and prescriptions entry module 1406 also incorporates secure E-signature for validation, real-time AI updates for contextual guidance, and care plan modification settings for dynamic changes. The customizable dashboard layout enhances usability, and notifications and collaboration tools ensure cohesive care delivery across teams. The record update and patient care coordination module 1408 enables updating patient records and coordinating care activities. The record update and patient care coordination module 1408 integrates secure E-signature functionality, ensuring compliance and security, along with real-time AI updates for keeping records current. Clinicians can utilize care plan modification settings and a dashboard customizable layout to manage patient data effectively. Priority alert notifications ensure timely interventions, while interdisciplinary care team collaboration supports patient care planning.

Figure 15:
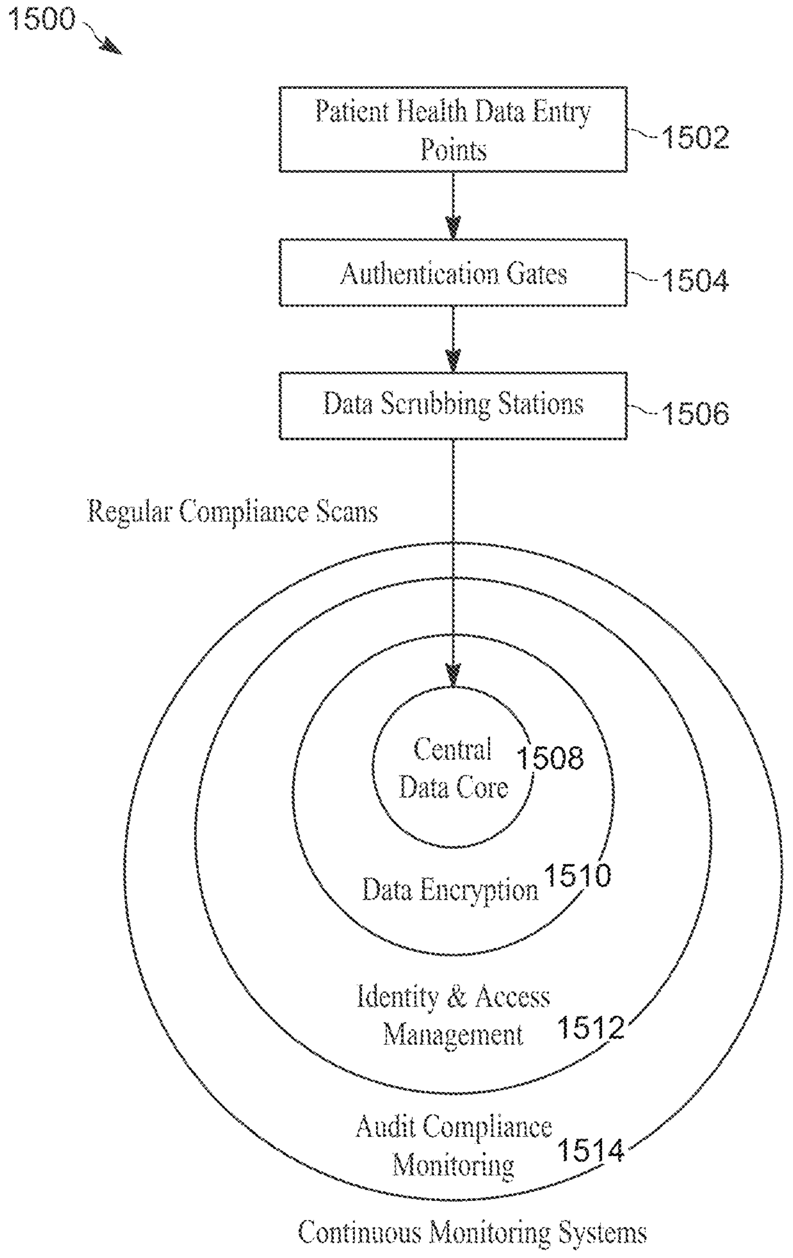
FIG. 15 illustrates an example flow diagram of data security and privacy protocol within the clinical assessment system, in accordance with an embodiment of the present disclosure.

Referring now to FIG. 15, an example flow diagram 1500 of data security and privacy protocol within the clinical assessment system 100, is illustrated, in accordance with an embodiment of the present disclosure. The protocol ensures comprehensive protection for sensitive data through a multi-layered approach, encompassing data entry, authentication, and core-level encryption with compliance monitoring.

The protocol includes user data entry points 1502, where patient health data is collected through designated interfaces such as the patient interface 110, the clinician interface 112, or input sources such as the wearable devices 138 and the patient data repository 106 that includes the patient-reported symptoms 140, input(s) 142, and EMR 144. The input sources may also include the historical medical data 146, and DSM data sources 148. These entry points are designed to handle various forms of input, including structured data, free text, and multimedia files. The patient health data collected at these points undergoes preliminary checks for validity and completeness. The collected patient health data proceeds to authentication gates 1504, which verify the credentials of patients accessing the clinical assessment system 100. This layer includes multifactor authentication (MFA), biometric verification, and/or secure token-based access to prevent unauthorized entry. The authentication gates ensure that verified personnel or systems can proceed further into the workflow, maintaining data integrity and restricting unauthorized access.

After authentication, the patient health data is directed to data scrubbing station 1506, where it is cleansed and normalized. These stations remove redundant, erroneous, or irrelevant information and apply data transformation techniques to ensure consistency and standardization. In some embodiments, the data scrubbing stations utilize NLP algorithms to extract meaningful entities from unstructured text and semantic indexing techniques to align the data with predefined schemas. Following data scrubbing, patient health data enters the central data core 1508, which acts as a repository for securely storing and processing data. The core employs advanced data encryption techniques, depicted as data encryption 1510, to ensure that stored data remains confidential and protected from unauthorized access. Encryption is performed using industry-standard protocols such as AES-256 to safeguard the information both at rest and during transit.

Surrounding the central data core is an identity and access management layer 1512, which governs permissions and access controls. This layer ensures that authorized users and systems can retrieve or modify data. Role-based access controls (RBAC) and dynamic policy enforcement are implemented to restrict access based on user roles and the sensitivity of the data. An outer layer of the protocol includes audit compliance monitoring 1514, which conducts regular compliance scans and audits to ensure adherence to regulatory standards, such as HIPAA, GDPR, or FHIR guidelines. This layer enables real-time monitoring of system activities, generating logs for anomaly detection and forensic investigations in case of a breach. The framework may be supported by continuous monitoring systems, which ensure the protocol remains robust and adaptable to emerging threats. These systems utilize machine learning models to detect and mitigate potential vulnerabilities dynamically.

Figure 16:
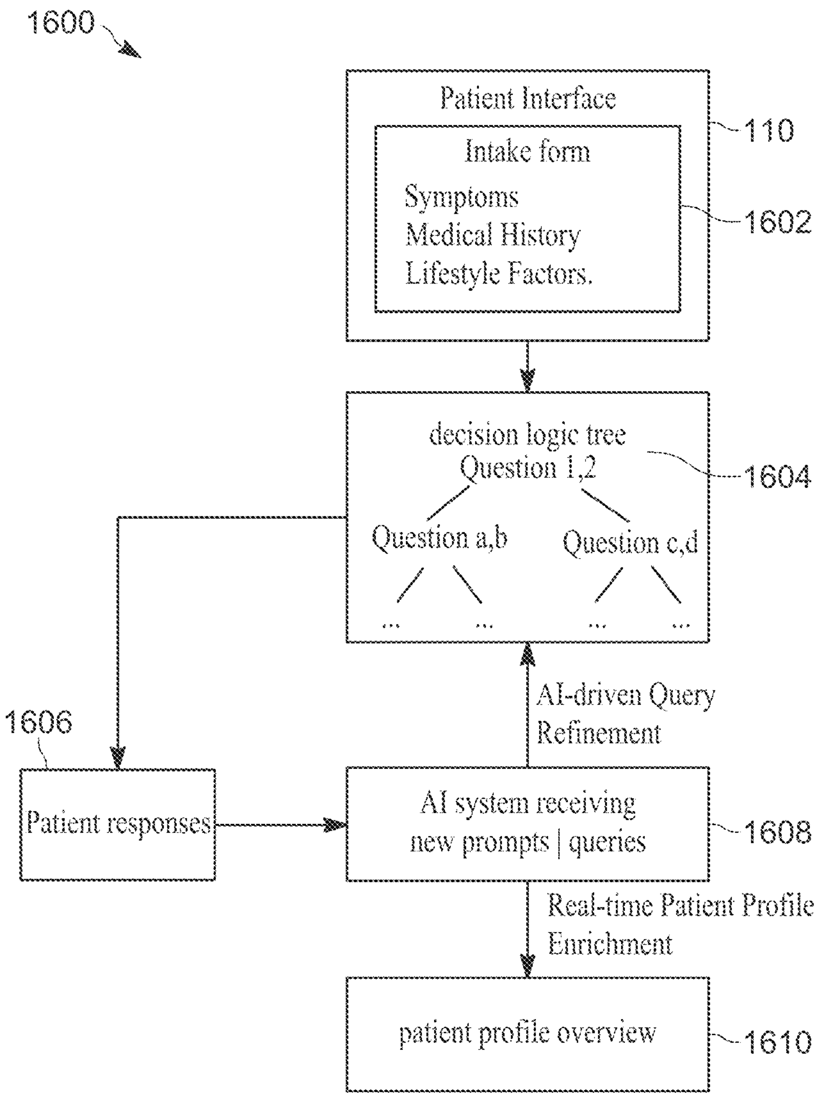
FIG. 16 illustrates an example flow diagram of interactive prompting and data capture process during patient intake, in accordance with an embodiment of the present disclosure.

Referring now to FIG. 16, an example flow diagram 1600 of interactive prompting and data capture process during patient intake, is illustrated, in accordance with an embodiment of the present disclosure. This process utilizes the patient interface 110 and advanced AI-driven mechanisms to collect, refine, and analyze patient data, ensuring a comprehensive and personalized intake experience.

The process begins at the patient interface 110, which includes an intake form 1602. The intake form 1602 captures various data points such as patient-reported symptoms, medical history, and lifestyle factors provided by the patient. The patient interface 110 may be presented in multiple formats, including web-based forms, mobile applications, or voice-enabled systems, offering flexibility in patient interaction. The captured patient health data is processed by a decision logic tree 1604, which operates as a branching algorithm to guide the interaction. The decision logic tree presents questions (e.g., "Question 1, 2") that branch into more specific queries (“Question a, b” and “Question c, d”) depending on the patient’s input. This mechanism ensures that data collection is both comprehensive and relevant, dynamically tailoring the flow of questions to the patient’s specific condition or context.

Based on the patient health data, patient responses 1606 are transmitted to an AI-driven system 1608 for refinement. The AI-driven system 1608, receiving new prompts and queries, utilizes the trained LLM 102 to analyze patient responses and generate additional prompts as needed. The AI-driven system 1608 employs advanced algorithms to refine the line of questioning to ensure that relevant information is captured in real-time. This iterative refinement may include semantic analysis and contextual understanding of patient-provided data. The responses and refined prompts are used for real-time patient profile enrichment 1610. The AI system consolidates and processes the collected data to create a comprehensive patient profile. This profile includes detailed insights into the patient’s condition, potential risk factors, and personalized recommendations for subsequent clinical evaluation. The enriched profile is made accessible to healthcare providers using the clinician interface 112 for further review and decision-making.

Figure 17:
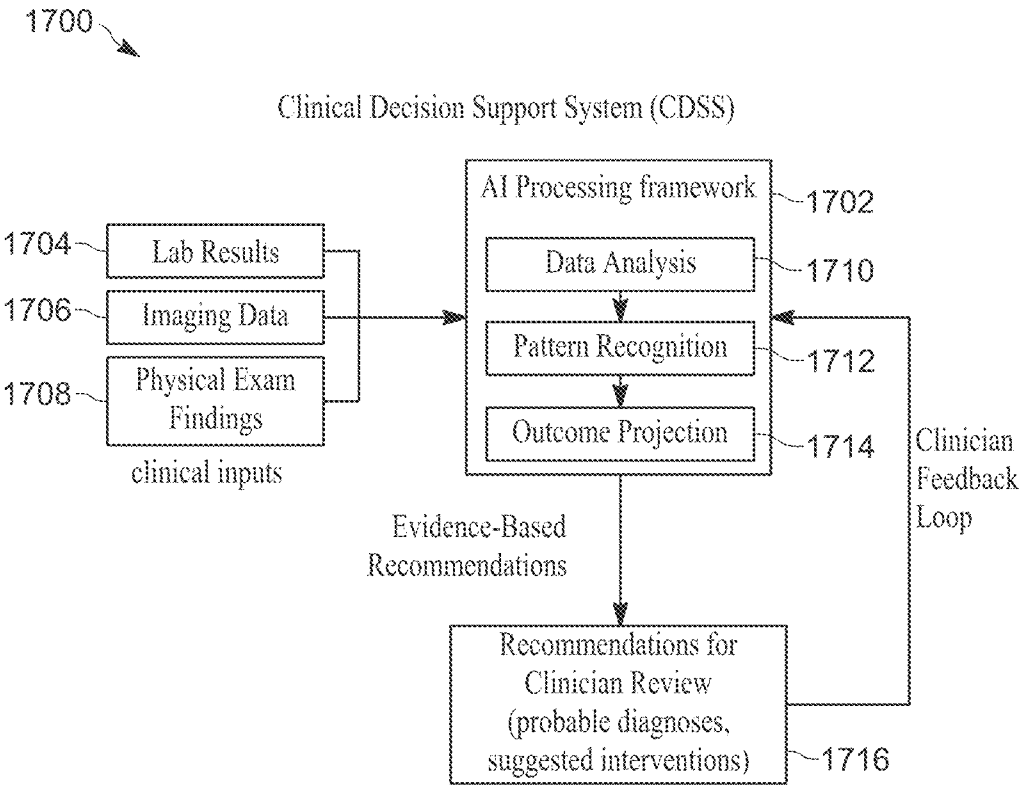
FIG. 17 illustrates an example flow diagram of analyzing clinical data and generating treatment recommendations within the clinical assessment system, in accordance with an embodiment of the present disclosure.

Referring now to FIG. 17, an example flow diagram 1700 of analyzing clinical data and generating treatment recommendations within the clinical assessment system 100, is illustrated, in accordance with an embodiment of the present disclosure. The clinical assessment system 100 integrates multiple data sources, applies advanced AI-based processing, and provides actionable recommendations for clinician review.

The process includes the input of clinical data, which includes lab results 1704, imaging data 1706, and physical exam findings 1708. These clinical inputs represent patient data from various diagnostic and examination procedures. The system supports diverse input formats, including structured, semi-structured, and unstructured data, ensuring compatibility with various healthcare systems. The clinical inputs are processed by the AI processing framework 1702, which serves as the computational engine of the clinical assessment system 100. This framework includes one or more sub-modules, for example, data analysis module 1710, pattern recognition module 1712, and/or outcome projection module 1714. The data analysis module 1710 preprocesses and contextualizes the clinical data, applying NLP, statistical methods, and semantic indexing to extract meaningful insights. The pattern recognition module 1712 utilizes machine learning algorithms to identify trends, anomalies, or correlations in the data, enabling the system to uncover hidden patterns that may inform clinical decision-making. The outcome projection module 1714 utilizes predictive analytics and probabilistic modeling to forecast potential outcomes based on the patient’s clinical profile, considering historical data, known treatment pathways, and relevant medical literature.

Once processed, the AI processing framework 1702 generates evidence-based recommendations that are forwarded to the recommendations module 1716 for clinician review. This module consolidates probable diagnoses, suggested interventions, and other relevant clinical actions into a structured output. The recommendations are presented to clinicians in an interpretable format through the clinician interface 112, enabling validation, modification, or acceptance. The clinical assessment system 100 includes a clinician feedback loop which allows healthcare providers to input their decisions and feedback into the system. This feedback is transmitted back to the AI processing framework 1702, where it is used to refine the pattern recognition and outcome projection processes, ensuring continuous improvement and learning over time.

Figure 18:
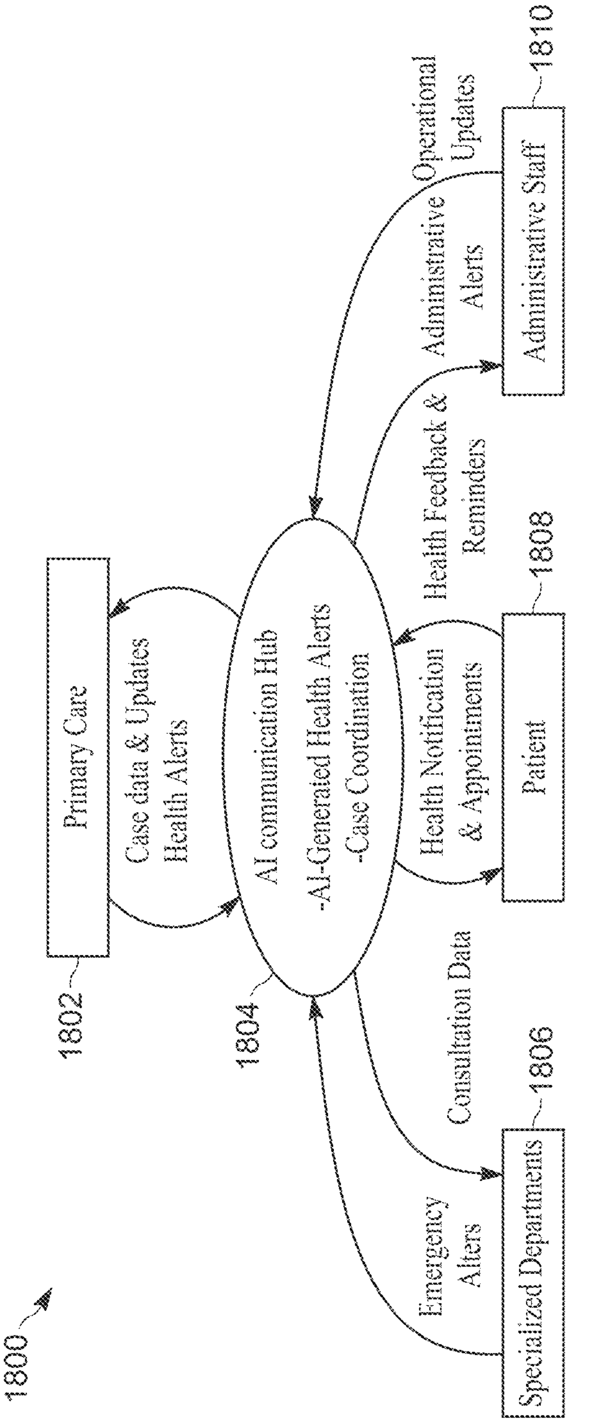
FIG. 18 illustrates an example flow diagram of communication flow and notification within the clinical assessment system, in accordance with an embodiment of the present disclosure.

Referring now to FIG. 18, an example flow diagram 1800 of communication flow and notification within the clinical assessment system 100, is disclosed, in accordance with an embodiment of the present disclosure. The clinical assessment system 100 enables real-time communication, health alerts, and/or coordination between various stakeholders, enhancing patient care and operational efficiency. The central component of the system 100 may include an AI communication hub 1804, which integrates various data sources and manages notifications, case updates, and health alerts. The AI communication hub 1804 utilizes advanced algorithms, which may include, but are not limited to, NLP algorithms for interpreting unstructured patient inputs, decision-tree algorithms for prioritizing notifications based on urgency, and machine learning algorithms for predictive analytics. These algorithms may work collaboratively to ensure seamless communication and efficient case coordination.

The communication flow originates from a primary care 1802, which provides case data, updates, and health alerts to the AI communication hub 1804. The AI communication hub 1804 may act as a primary point for initiating patient health monitoring and care coordination. Information from primary care is disseminated to relevant stakeholders through the hub. The communication flow proceeds to specialized departments 1806 which contribute specialized consultation data and receive emergency alerts from the AI communication hub 1804. This interaction ensures that critical patient cases are escalated and addressed promptly. Furthermore, patients 1808 receive health notifications, appointment reminders, and feedback through the AI communication hub 1804. Additionally, administrative staff 1810 interacts with the clinical assessment system 100 by receiving operational updates and administrative alerts. The AI communication hub 1804 processes incoming data streams from all these entities, using AI algorithms (e.g., NLP algorithms for interpreting unstructured patient inputs, decision-tree algorithms for prioritizing notifications based on urgency, and machine learning algorithms for predictive analytics) to prioritize and route information efficiently. Health alerts and case updates are dynamically generated based on real-time patient conditions, operational changes, or new consultation inputs.

Figure 19:
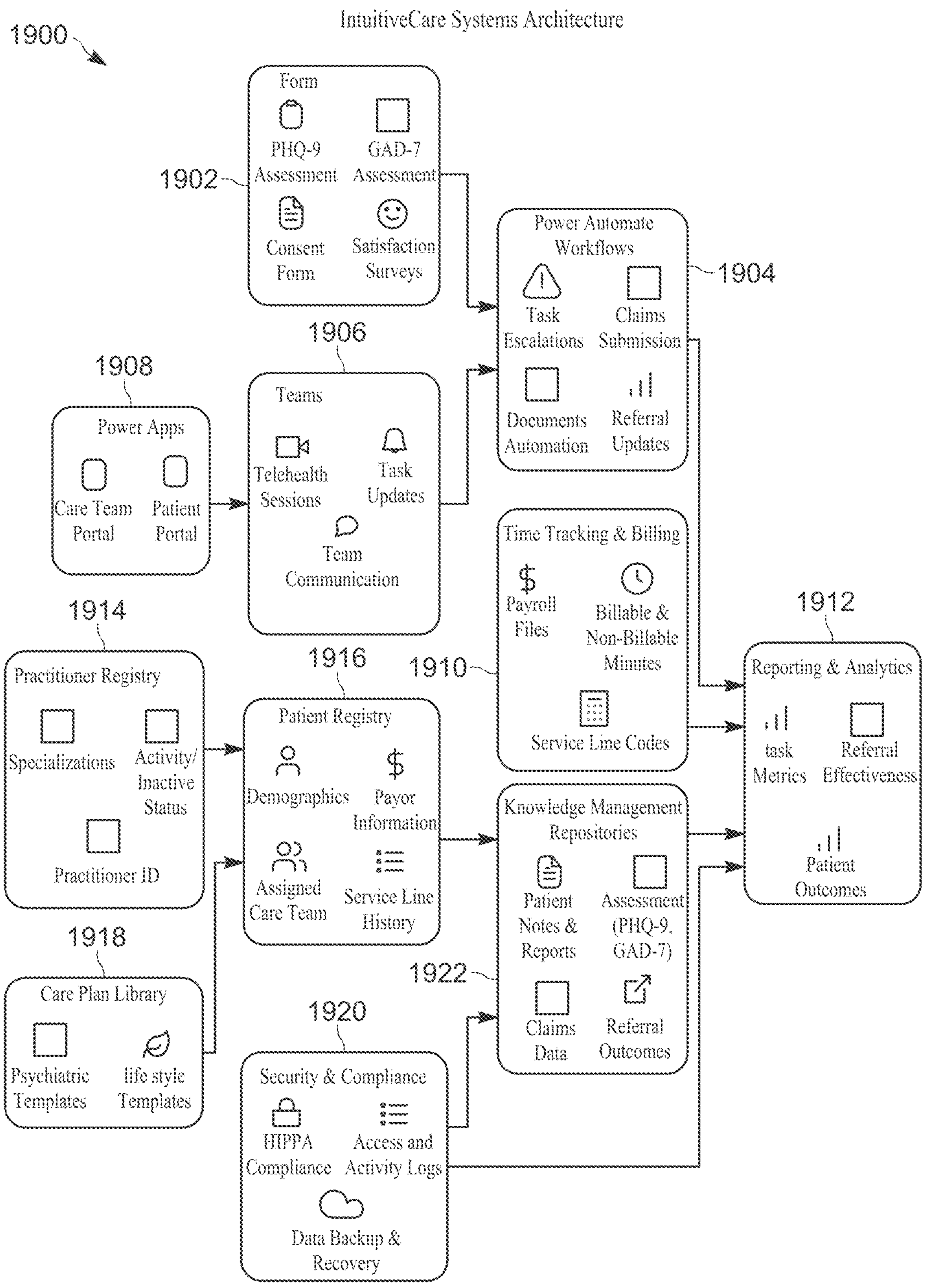
FIG. 19 illustrates an example architectural diagram depicting patient-centered care delivery, in accordance with an embodiment of the present disclosure.

Referring now to FIG. 19, an example architectural diagram 1900 depicting patient-centered care delivery, is illustrated, in accordance with an embodiment of the present disclosure. The architecture integrates various modules and workflows to enable efficient care coordination, secure data management, and actionable analytics, ensuring holistic patient care. The process includes form submissions 1902, which include assessments, consent forms, and surveys capturing essential patient data. These data flow into subsequent workflows for further processing and integration. Further, workflows and automation 1904 streamline tasks such as escalations, claims submissions, and document generation. Automated processes ensure timely notifications and updates across the system, enhancing operational efficiency. Further, communication modules 1906 enables real-time interactions among care teams. These modules support telehealth sessions, task updates, and secure messaging, enabling seamless collaboration. In some embodiments, the system 100 supports synchronous and asynchronous: telehealth, remote monitoring, and multi-tenant deployment with configurable privacy, workflow, and interoperability per tenant or per jurisdiction. Further, portals 1908, including care team and patient interfaces, serve as access points for interacting with the system. The portals provide functionalities such as monitoring patient progress, scheduling tasks, and retrieving care plans. The time tracking and billing module 1910 captures billable and non-billable minutes associated with care delivery. The time tracking and billing module 1910 (e.g., time tracking and billing system 156 of FIG. 1A) integrates with service line codes to support automated claims generation and financial reconciliation.

Additionally, a reporting and analytics module 1912 aggregate data from multiple modules to provide insights into task metrics, referral effectiveness, and patient outcomes. This module enables care teams and administrators to make data-driven decisions. The practitioner registry 1914 (e.g., registry 152) may be used to manage information about care providers, including their specializations, active or inactive statuses, and assigned roles. This registry dynamically links practitioners to relevant workflows. The care plan library 1918 (e.g., care plan library 154) provides pre-configured templates for psychiatric and lifestyle care, cardiovascular care, endocrinology care, geriatric care, pediatric care, neurologic care, oncology care, disease management care, primary health care, or other health care. These templates can be customized in real-time by utilizing the patient health data (i.e., the biometric data, the historical medical data, and the patient-reported symptoms) and clinician inputs. For example, clinicians may use the clinician interface 112 to adjust the frequency of therapeutic sessions, update recommended lifestyle interventions, or add/remove milestones based on a patient's progress. Real-time customization is facilitated by integration with the patient registry 1916 (e.g., patient data repository 106), which ensures that up-to-date patient health data, such as changes in medical conditions or new diagnostic results, is automatically reflected in the care plan. The patient registry 1916 acts as the central repository for patient data, including demographics, payer information, assigned care teams, and service line history. This registry ensures a unified view of patient records, accessible across modules. The repositories integrate with workflows to automate document handling and reporting. Security and compliance module 1920 ensures adherence to regulatory requirements, such as HIPAA compliance. The security and compliance module 1920 employs role-based access, data encryption, and backup mechanisms to safeguard sensitive information. The knowledge management repositories 1922 manage clinical notes, assessment reports, claims data, and referral outcomes.

The data flow and integration within this architecture enable seamless execution of workflows to enhance patient care and operational efficiency. During patient onboarding, data collected is stored in the patient registry and linked to care teams, facilitating personalized care delivery. In the care plan development phase, templates from the care plan library are customized and shared with patients and clinicians for effective implementation. Service delivery is streamlined as care teams manage tasks and monitor progress using communication tools, while patients access real-time updates through dedicated portals. For claims and billing, time-tracking data is utilized to generate claims, which are efficiently processed using automated workflows. Additionally, aggregated data is visualized through reporting and analytics, providing valuable insights into patient outcomes, team performance, and overall system efficiency.

The system 100 is designed with interoperability as a core feature, ensuring seamless integration with FHIR (Fast Healthcare Interoperability Resources) servers, which are widely used for Electronic Health Record (EHR) data exchange. The system's ability to migrate to a FHIR-compliant structure allows it to communicate with external healthcare networks and national health exchanges, making patient data easily portable while maintaining data integrity and compliance. This migration process involves mapping existing data structures (such as IMH PatientRegistry, ServiceLineHistory, and PatientCarePlanMaster) to FHIR Resources, enabling standardized, real-time data exchange with external healthcare providers.

The migration process begins by identifying and mapping existing data lists to FHIR Resources. For example, the IMH PatientRegistry is mapped to the FHIR Patient Resource, ensuring that patient demographic information such as name, birthdate, gender, and contact details follows the FHIR standard format. Similarly, the PatientCarePlanMaster is linked to the FHIR CarePlan Resource, which allows patient treatment plans, goals, and tasks to be structured in a way that aligns with healthcare interoperability requirements. ServiceLineHistory is mapped to the FHIR ServiceRequest Resource, allowing the system to track patient services (such as psychiatry, wellness coaching, or lifestyle interventions) and ensure that service requests are standardized. Additionally, the TimeTracker is aligned with the FHIR Task Resource, enabling accurate tracking of patient consultations, wellness sessions, and psychiatric evaluations.

Once data mapping is completed, the data export process ensures that system data is converted into FHIR-compliant JSON format, allowing it to be transferred seamlessly to an FHIR server using security software and secure software programs to extract patient data and structure it according to FHIR specifications. Each data point, such as patient demographics, care plan goals, and service requests, is mapped to its respective FHIR attributes to ensure consistency and integrity. The system also employs FHIR Structure Validation Tools to verify that exported data adheres to FHIR standards before being uploaded to the server.

Integration with the FHIR server is the final step, enabling real-time data synchronization between the system and external healthcare systems. This is achieved through API integration, where the system interacts with the FHIR API to send, retrieve, and update patient records dynamically. For instance, when a patient's care plan is modified within the system, the update is automatically reflected in the FHIR CarePlan Resource on the server. Similarly, any external updates, such as new referrals or service requests, are incorporated into the patient registry, ensuring a two-way data flow that keeps all systems up to date.

Figure 20:
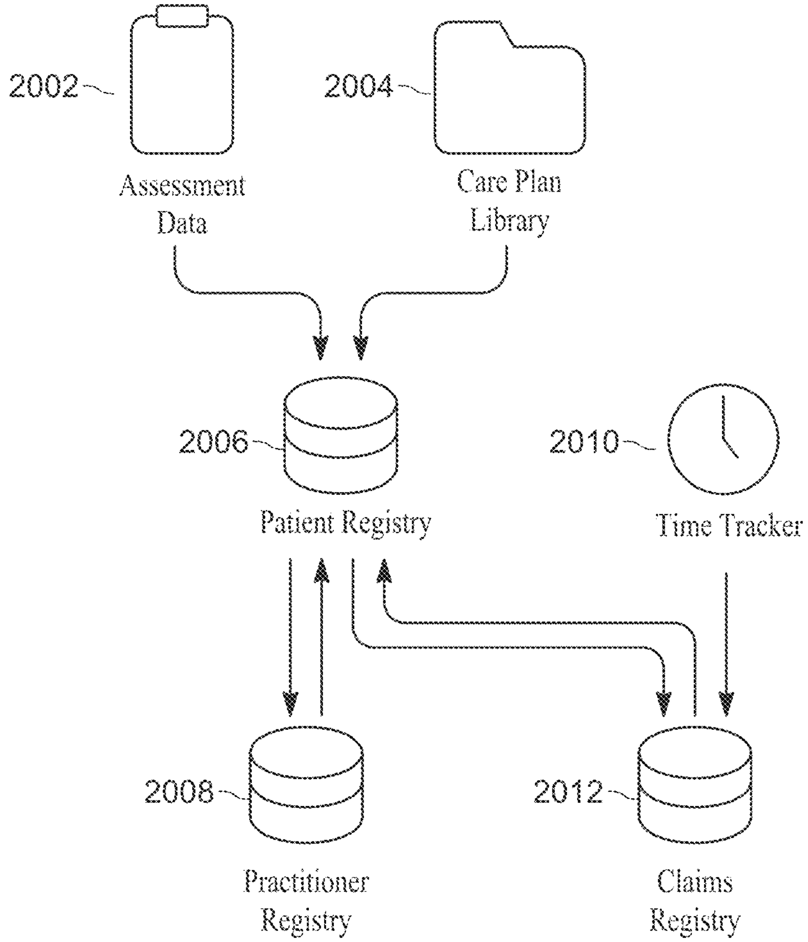
FIG. 20 illustrates the interaction between different registries within the Patient Care Management platform, demonstrating the various components working together to streamline patient onboarding, care coordination, and billing, in accordance with an embodiment of the present disclosure.

FIG. 20 illustrates the interaction between different registries within the patient care management platform, demonstrating how various components work together to streamline patient onboarding, care coordination, and billing. The process begins with patient enrollment, where individuals either self-enroll through the patient portal (or app) or are referred by their primary care physicians (PCPS). Their demographic and medical details are recorded in the patient registry 2006, which serves as the central hub for managing patient information, care history, and care team assignments. This registry continuously updates and stores data, ensuring that all patient interactions are logged and accessible for future reference.

The practitioner registry 2008 operates in coordination with the patient registry 2006, dynamically assigning care providers based on their specialization and availability. This bidirectional interaction ensures that patients are matched with suitable practitioners while also keeping provider schedules optimized. In parallel, the claims registry 2012 handles the financial aspects of patient care. It collects data from both the patient registry 2006 and the time tracker 2010 to manage billing, claim submission, and payment reconciliation. The time tracker 2010 plays a role in ensuring accurate billing by logging the duration of care activities, which then informs the claims registry 2012 for invoicing and reimbursement purposes.

Additional components support care delivery by providing structured assessments and treatment plans. The system integrates assessment data 2002, such as PHQ-9 and GAD-7 scores or other health-based assessment, which guide care teams in designing personalized treatment plans. These assessments feed into the patient registry 2006, contributing to an evidence-based approach to patient management. The care plan library 2004 further enhances this process by offering predefined treatment protocols that ensure consistency across different cases. The time tracker 2010 also interacts with the patient registry 2006 to maintain accurate records of patient interactions and service durations.

The registries and intermediate components collaborate to enhance patient outcomes, optimize provider assignments, and streamline financial operations. By centralizing patient and practitioner data while automating claims processing and care tracking, the patient care management platform ensures efficiency, accuracy, and improved healthcare delivery.

Figure 21:
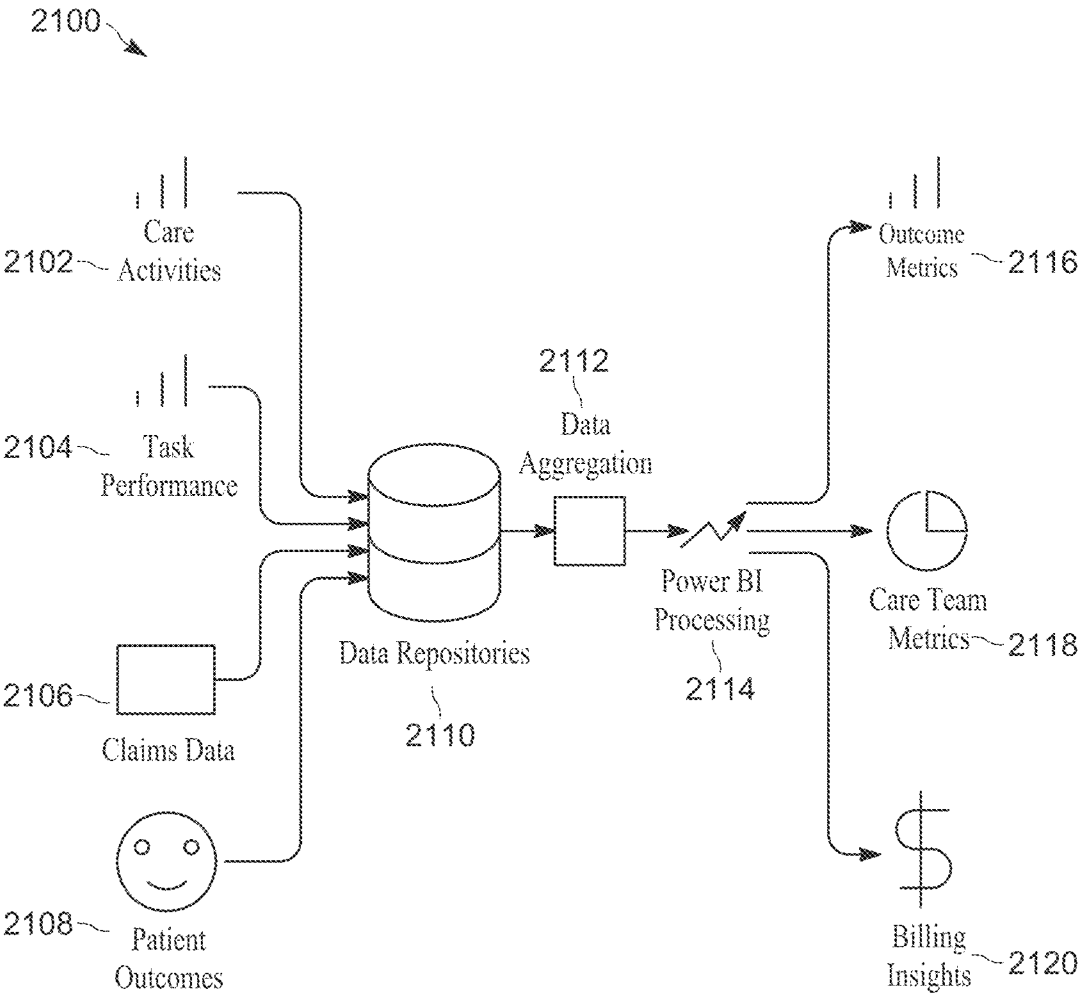
FIG. 21 illustrates an example data flow diagram of aggregation and processing of data from care activities, task performance, claims data, and patient outcomes into clinical insights via business intelligence dashboards, in accordance with an embodiment of the present disclosure.

Referring now to FIG. 21, an example data flow diagram 2100 of aggregation and processing of data from care activities, task performance, claims data, and patient outcomes into clinical insights using business intelligence dashboards, is illustrated, in accordance with an embodiment of the present disclosure.

At care activities 2102, data is collected from the patient registry and practitioner registry, including information related to care plans, clinical interventions, and overall healthcare delivery activities. At task performance 2104, escalations, task updates, and completion metrics are logged through automation tools such as Microsoft's Power Automate®. These data reflect the efficiency and responsiveness of task management workflows. The claims data 2106 includes data related to insurance claims, approvals, and denials, providing insight into financial workflows and reimbursement trends. At patient outcomes 2108, health outcomes such as recovery rates, adherence to treatment plans, and patient satisfaction metrics are tracked.

These data streams are stored in the data repositories 2110, which serve as centralized storage hubs for real-time updates from various system activities. The data repositories ensure secure and structured storage, maintaining the integrity and accessibility of logged information. The stored data undergoes data aggregation 2112, where it is combined and processed from multiple sources, such as patient records, task logs, and financial data, to generate a unified dataset. The aggregated data is then processed using business intelligence processing 2114, where advanced data visualization and analytics tools are applied to generate insights. These insights are categorized into one or more dashboards, for example, outcome metrics 2116, care team metrics 2118, and/or billing insights 2120. The outcome metrics 2116 displays care effectiveness metrics, such as patient recovery rates, adherence to care plans, and health improvement statistics, providing clinicians with clinical insights into treatment success. The care team metrics 2118 highlight task completion rates, escalation resolution times, and team performance, enabling supervisors to monitor and optimize workforce efficiency. The billing insights 2120 provides a view of claims approval rates, revenue trends, and financial health, allowing administrative staff 1810 to manage financial workflows effectively.

Figure 22:
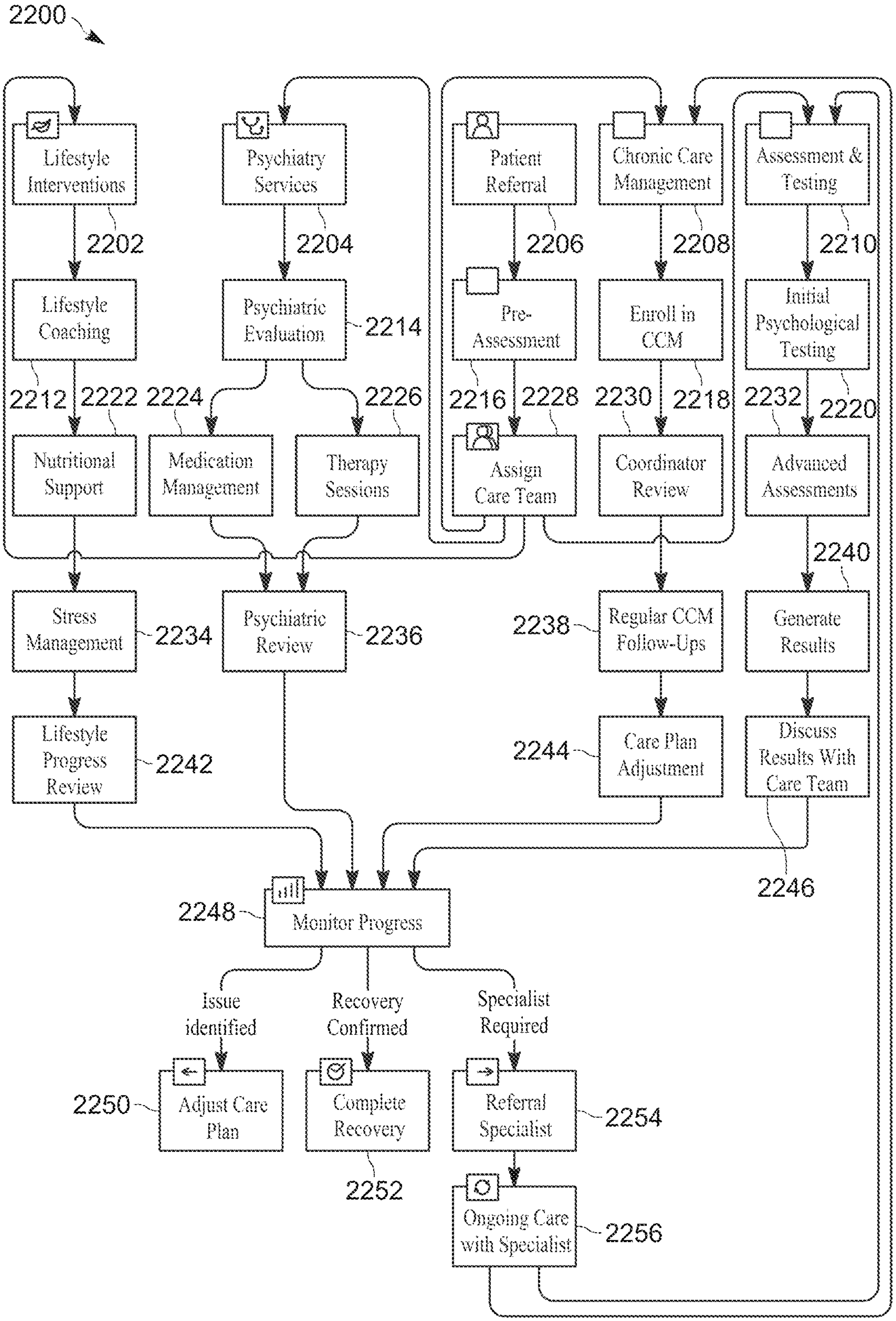
FIG. 22 illustrates an example flow diagram of the phases of a patient journey within the Patient Care Management platform, in accordance with an embodiment of the present disclosure.

Referring now to FIG. 22, an example flow diagram illustrating the particular phases of a patient journey within the patient care management platform is provided in accordance with an embodiment of the present disclosure. The flow diagram 2200 represents a structured and systematic approach to patient care, covering the entire lifecycle of patient management, beginning with the referral phase and extending through service line workflows, continuous progress monitoring, and iterative care plan adjustments to ensure optimal healthcare outcomes.

The patient journey begins with the patient referral phase 2206, where individuals may be referred by primary care physicians (PCPs), specialists, or through self-enrollment. This stage is represented in the diagram as the "patient referral" 2206 and "pre-Assessment" 2216 steps, ensuring that essential patient data is collected and stored in the patient registry for seamless care coordination. Once the referral is received, the pre-assessment phase 2216 involves preliminary clinical evaluations using standardized assessment tools such as PHQ-9 and GAD-7 or other health-based assessment, which help determine the appropriate service lines and facilitate the care team assignment. The diagram illustrates the transition from "pre-assessment" 2216 to "assign care team" 2228, reflecting the platform's ability to dynamically allocate healthcare professionals based on patient needs.

Following the assignment, the care team, which may consist of psychiatrists, therapists, and health coaches, takes over the management of the patient's treatment plan. The patient journey then diverges into multiple service lines, each addressing different aspects of care. Psychiatry services 2204 focuses on mental health treatment, including psychiatric evaluations 2214, medication management 2224, therapy sessions 2226, and periodic psychiatric reviews 2236. This structured workflow ensures that patients receive continuous, specialized care throughout their treatment. Additionally, lifestyle intervention module 2202 offers guidance in areas such as lifestyle coaching 2212, nutritional support 2222, stress management 2234, and ongoing progress tracking, catering to patients who utilize behavioral and lifestyle modifications. For individuals needing long-term support, the Chronic Care Management (CCM) 2208 program provides continuous monitoring and adaptive care strategies, including enrollment 2230, periodic coordinator reviews 2218, regular CCM follow-ups 2232, and care plan adjustments 2244 to ensure sustained health outcomes. The system also integrates assessment and testing services 2210 to facilitate comprehensive psychological and cognitive evaluations, including initial psychological testing 2220 and advanced assessments, which feed directly into personalized treatment strategies based on diagnostic findings.

One example aspect of the patient journey is cross-service coordination, which ensures seamless integration across multiple service lines. The monitor progress functionality 2248 provides real-time patient status updates through interactive dashboards, enabling clinicians to assess treatment effectiveness and identify areas requiring intervention. The care plan adjustments 2244 allows healthcare providers to modify treatment strategies based on patient progress, ensuring that care remains responsive and individualized. If a patient achieves full recovery, the journey concludes with "complete recovery" 2252, signifying the end of active treatment. However, if further intervention is required, the system enables care plan refinements 2250 or facilitates a "referral to specialist" 2254, ensuring continuity of treatment through external healthcare providers while maintaining oversight from the original care team. For cases requiring ongoing specialist care, "ongoing care with specialist" 2256 ensures continued management of the patient's condition.

The system also accounts for edge cases and task escalations, ensuring that disruptions in care are minimized. If a patient requires multiple referrals, such as concurrent treatment in psychiatry services 2204 and chronic care management 2208, the system effectively manages parallel workflows, preventing service overlap or administrative inefficiencies. In cases where a patient drops out mid-journey, automated reminders and follow-ups are triggered to re-engage the patient and reduce attrition. Additionally, if a service line experiences overload, the platform dynamically reassigns practitioners, balancing workloads and maintaining efficient service distribution without compromising patient care.

The process visually encapsulates a structured and adaptive patient journey facilitated by the patient care management platform. Through its data-driven approach, the system seamlessly integrates referral intake, pre-assessment, multi-service treatment workflows, continuous progress tracking, and iterative care modifications to ensure optimal patient outcomes. By dynamically managing practitioner assignments, streamlining service coordination, and implementing automated intervention mechanisms, the platform enhances care delivery efficiency while maintaining a patient-centric, scalable, and outcome-focused care management model.

The Lifestyle Intervention module 2202 within the system is designed to help patients incorporate healthy habits into their mental and/or physical health treatment. By integrating changes related to diet, exercise, and stress management, this module ensures that lifestyle modifications are an active part of a patient's care plan. These interventions are continuously tracked and adjusted based on patient progress, supporting the concept of lifestyle psychiatry, which focuses on both physical and emotional well-being for long-term health improvements.

The system embeds lifestyle interventions directly into patient care plans, allowing psychiatrists, health coaches, and care teams to work together in real-time to monitor progress. Patients receive personalized goals, such as nutritional support 2222, exercise targets, or stress management 2234 like mindfulness or meditation. These goals can be customized for individual patients or selected from predefined templates based on evidence-based practices in Lifestyle Psychiatry. The system automatically generates daily tasks for patients, such as completing mindfulness exercises or tracking diet changes, using software/dashboards to ensure seamless integration into the patient's daily routine. The status of these tasks is monitored, allowing care teams to adjust goals based on real-time patient feedback. If a patient struggles with a certain activity, such as regular meditation, the care team can modify the plan to better fit the patient's needs.

To monitor lifestyle outcomes, the system collects both biometric data (such as heart rate, sleep patterns, and physical activity levels) and behavioral data (such as mood tracking and self-reported stress levels). This data is gathered from wearable devices or entered manually by patients or care team members, ensuring that mental health progress and/or health progress, in general, can be correlated with physical health improvements. Dashboards aggregate this information at both the individual and population levels, providing insights into how lifestyle changes are affecting mental health outcomes or health outcomes, in general. These dashboards display metrics, such as the percentage of patients meeting their goals, trends in sleep improvement, and engagement rates for activities like mindfulness practice or exercise.

Successful lifestyle interventions require collaboration among multiple healthcare roles, including health coaches, care managers, and psychiatrists. health coaches lead patient engagement in activities like diet changes and physical exercise, while care managers and psychiatrists ensure that these lifestyle modifications align with psychiatric treatments. The system employs role-based permissions, allowing health coaches to access lifestyle-related data while restricting access to sensitive psychiatric information, ensuring privacy and compliance. Additionally, automated workflows assign tasks across roles, such as scheduling wellness check-ins or tracking patient adherence to interventions.

Patient engagement is a part of the system 100, as patients are encouraged to self-report their daily activities, such as exercise routines or mindfulness sessions, using the patient portal or patient app. This real-time data is synced with care plans, allowing care teams to monitor adherence and provide feedback. To further encourage participation, the portal provides educational resources, including articles, videos, and interactive tools focused on diet, exercise, and stress management. Additionally, motivational prompts and reminders help patients stay engaged by suggesting ways to improve sleep quality or maintain a mindfulness routine.

The effectiveness of lifestyle interventions is continuously evaluated through reports and analytics. Care teams and health administrators can track adherence rates to lifestyle changes and assess their impact on mental and physical health. If data shows that patients are struggling with a certain intervention, the system allows for care plan adjustments 2244 to make goals more achievable, such as modifying an exercise routine to include less intensive activities. These adjustments are tracked and analyzed to ensure that changes lead to better outcomes.

Figure 23:
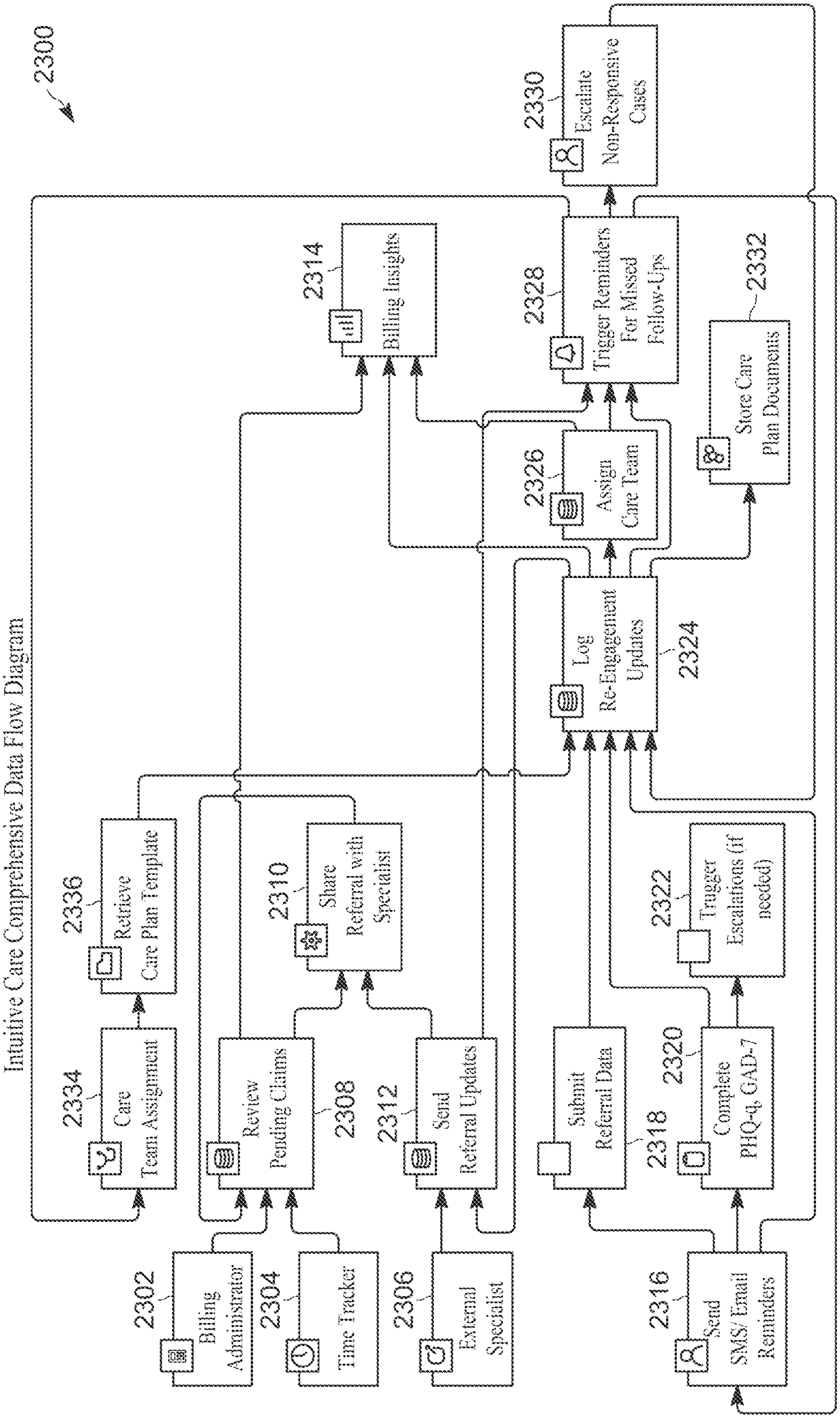
FIG. 23 illustrates an example flow diagram of the structured movement of data across various workflows, enabling seamless coordination, real-time insights, and operational efficiency, in accordance with an embodiment of the present disclosure.

Referring now to FIG. 23, an example data flow diagram 2300 illustrates the structured movement of data across various workflows, enabling seamless coordination, real-time insights, and operational efficiency in accordance with an embodiment of the present disclosure. The diagram demonstrates how different system components dynamically interact to facilitate efficient patient management, care coordination, and financial operations, ensuring that all processes function in a streamlined and integrated manner.

The data flow initiates at the Patient Referral and Initial Assessments phase, where patient information is submitted to begin the intake process. As illustrated in the "submit referral data" 2320 step, this ensures that the referral request is logged and processed. The system then communicates real-time updates to specialists using the example sequence "send referral updates" 2312→"Share Referral with Specialist" 2310, allowing immediate access to referral details. Following the referral, patients undergo initial clinical assessments, such as PHQ-9 and GAD-7 2318 or other health-based assessment, which evaluate their condition and determine a suitable care path. These assessments provide input for treatment planning, ensuring that each patient receives a care approach tailored to their needs.

Once the intake and assessment phase is completed, the data flow advances to care team assignment and plan management, where specialists are dynamically assigned based on assessment results. The "assign care team" 2326 step ensures that appropriate healthcare professionals are allocated for each case, optimizing provider-patient matching.

Subsequently, a predefined "care plan template" 2336 is retrieved and structured into a standardized treatment pathway. To ensure accessibility and continuity, all care plans are securely stored through the "store care plan documents" 2332 function, allowing providers to reference and update treatment plans as needed. This structured approach to care planning enhances treatment consistency and ensures proper documentation for compliance and care coordination.

Throughout the treatment process, patient engagement and follow-ups play a role in ensuring adherence to prescribed care plans. The system continuously monitors engagement levels by capturing "re-engagement updates" 2324, which track patient participation and response to treatments. To prevent disengagement, the platform automatically triggers reminders from the "trigger reminders for missed follow-ups" 2328 step, encouraging patients to remain active in their treatment plans. If a patient remains unresponsive, the case is escalated through "escalate non-responsive cases" 2330, enabling care teams to intervene and take corrective actions to re-engage the patient before critical gaps in care occur.

In parallel with clinical workflows, billing and claims processing ensures efficient financial operations by routing billing data to the billing administrator 2302, who is responsible for overseeing claim approvals and financial reconciliations. Within this framework, the "review pending claims" 2308 step ensures that all claims undergo verification, validation, and approval before submission to payers, reducing errors and delays in reimbursement. Additionally, "billing insights" 2314 provides real-time financial visibility, offering administrators an up-to-date overview of claim statuses, revenue management, and outstanding financial transactions, thereby improving financial decision-making and transparency.

In scenarios requiring specialized interventions or escalations, the escalations and external coordination workflow ensure that necessary actions are taken efficiently. If an urgent issue arises, the system initiates "trigger escalations (if needed)" 2322, prompting intervention from senior care managers or external specialists. The data flow also facilitates coordination with external healthcare providers by allowing referral updates to be shared with external specialists through "external specialist" 2306→"send referral updates" 2312, ensuring a smooth transition of care and preserving continuity in treatment delivery.

In some embodiments, the system includes a testing and monitoring (TM) service line designed to conduct regular mental and/or physical health assessments and screenings, providing data to track patient progress and refine treatment plans. This service helps care teams make informed decisions by utilizing health screening tools such as PHQ-9 for depression, GAD-7 for anxiety, and MDQ for mood disorders, or another health-based assessment. These assessments are conducted using a form or other linked access to information, with results automatically linked to the patient's care plan for ongoing evaluation.

The TM service also monitors lifestyle interventions, but this is done manually rather than through automated tracking. Patients or care teams input lifestyle metrics, such as adherence to exercise or mindfulness routines, into the system. The clinical assessment system 100 may trigger workflows based on task completion and patient-reported outcomes. For example, if a patient fails to follow a prescribed mindfulness routine, the system alerts the care manager for follow-up.

To ensure consistency in testing, the system provides automated reminders to both patients and care teams about upcoming assessments. These reminders managed through system 100, help maintain regular screening schedules and prevent delays in evaluations.

The care team—including care managers, psychiatrists, and health coaches-plays a role in interpreting test results and adjusting care plans manually. Unlike future versions, the current system does not use AI-driven decision-making but relies on expert human judgment. Instant messaging platforms may facilitate communication among care team members, ensuring that all relevant professionals are informed of changes in patient health.

For reporting and analytics, the system utilizes one or more dashboards to provide both patient-specific and population-level insights. Individual reports track assessment scores over time, helping care teams monitor progress, while aggregated reports highlight broader trends across the patient population.

In some embodiments, the TM service may include remote patient monitoring (RPM) with biometric tracking through wearable devices, allowing automatic data collection for factors like heart rate and activity levels. Additionally, predictive analytics and AI-based forecasting will eventually be integrated to anticipate patient health trends based on historical data. However, the current version focuses solely on manual data collection and static assessments to ensure care teams receive reliable periodic data for decision-making.

In some embodiments, the system includes a telehealth and remote care integration module that enhances the delivery of virtual healthcare services, allowing patients and care teams to connect remotely while ensuring high-quality care. This module provides a seamless and secure platform for virtual consultations, remote communication, and future advancements in remote patient monitoring.

The system integrates with widely used communication tools like instant messaging platforms, telephone platforms, and a secured text messaging platform. These integrations enable real-time video consultations, voice calls, and secure text-based communication between patients and providers. This ensures that patients can access healthcare services conveniently from their homes while care teams can conduct virtual assessments, follow-ups, and consultations without requiring in-person visits.

In some embodiments, the module is configured to include remote patient monitoring (RPM) capabilities and the integration of emerging remote care models. RPM will allow healthcare providers to track patients' vital signs, symptoms, and adherence to treatment plans in real-time through connected devices and smart technology. This proactive approach will help detect health issues early, reduce hospital readmissions, and improve long-term patient outcomes.

Figure 24:
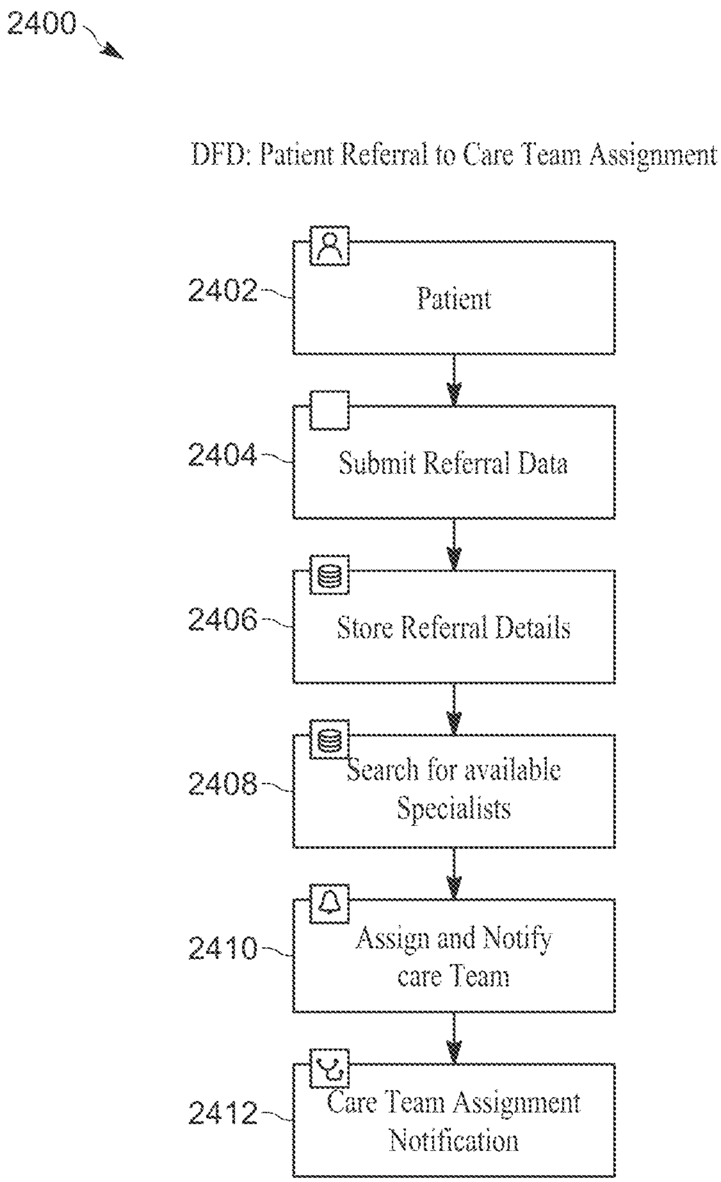
FIG. 24 illustrates an example flow diagram of the flow of the patient referral to care team assignment, in accordance with an embodiment of the present disclosure.

Referring now to FIG. 24, an example data flow diagram illustrates the flow of patient referral to care team assignment, in accordance with an embodiment of the present disclosure. The process 2400 represents a structured and automated process that ensures patient referrals are efficiently processed, specialists are dynamically assigned, and care teams are promptly notified.

The data flow initiates with the patient referral submission 2402, wherein the patient submits referral data 2404, triggering the workflow. This action marks the beginning of the referral process, ensuring that the patient's need for care is recorded and processed in real-time.

Following submission, the storing referral details phase 2406 is executed, where the patient registry serves as the central repository for securely storing referral details. The patient registry maintains the integrity of patient records, ensuring that demographic data, medical history, and referral specifics are accurately documented.

Once the referral data is securely stored, the system proceeds to search for available specialists 2408 by dynamically querying the practitioner registry. The practitioner registry 152 plays a role in identifying appropriate providers based on availability, specialization, and patient needs. This automated process optimizes resource allocation by ensuring that relevant and available care providers are considered for assignment.

Upon identification of the appropriate specialist or care team, the workflow advances to assigning and notifying the care team 2410. At this stage, the system assigns the selected specialist(s) and generates an automated notification, ensuring that all necessary personnel are informed of their newly assigned case. This mechanism eliminates inefficiencies associated with manual referrals, reducing response time and improving care coordination.

The final step in the process is care team assignment notification 2412, where the assigned care team formally receives a notification confirming their responsibility for the referred patient. This step ensures accountability within the care management system and enables practitioners to take immediate action regarding patient assessment and treatment planning.

The data flow diagram effectively visualizes the seamless handling of referrals and automated care team assignment, ensuring minimal delays in patient care initiation. The patient data repository 106 and practitioner registry 152 facilitate secure data storage, real-time provider matching, and efficient case allocation. Furthermore, any inefficient manual steps within this workflow can be flagged for automation or optimization, reinforcing the objective of streamlining referral management and enhancing operational efficiency.

Figure 25:
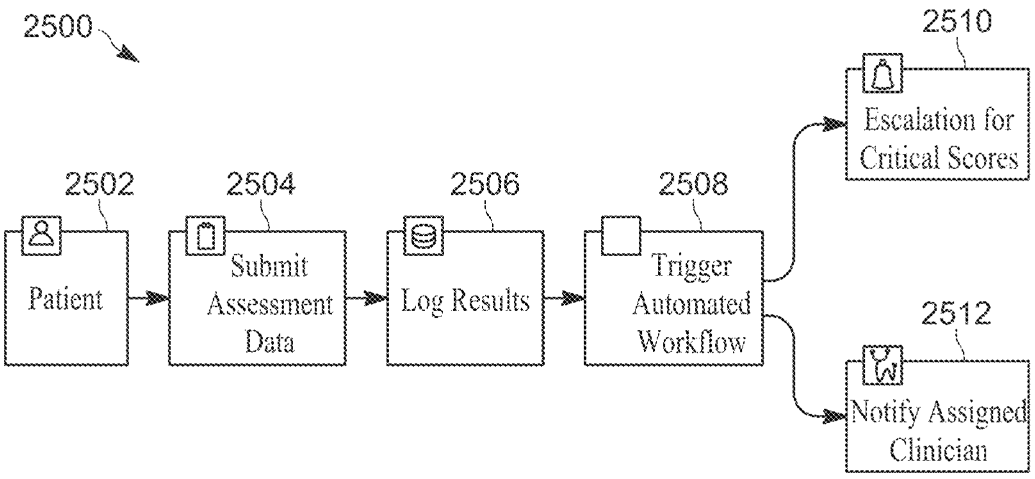
FIG. 25 illustrates an example flow diagram for the patient health data processing within the clinical assessment system, in accordance with an embodiment of the present disclosure.

Referring now to FIG. 25, an example flow diagram for the patient health data processing within the clinical assessment system 100, is illustrated, in accordance with an embodiment of the present disclosure. The flow diagram 2500 represents a seamless integration of the patient health data 2502 into clinical insights and workflows for clinical decision-making. The process includes receiving assessment data 2504 (i.e., patient health data), related to a patient, through the patient interface 110. These data may include responses to clinical surveys, diagnostic assessments, or lifestyle-related inputs. Once submitted, the data is logged 2506 into a secure repository, ensuring the data is stored in the Patient Registry for subsequent analysis and reference. This secure logging ensures compliance with data protection standards and allows for real-time or retrospective analysis.

Following data logging, an automated workflow is triggered 2508 based on pre-configured thresholds or criteria within the system. These workflows are designed to detect critical scores such as high-risk PHQ-9 scores (e.g., ≥20, indicating severe depression), elevated GAD-7 scores (e.g., ≥15, reflecting severe anxiety), or abnormal biometric readings (e.g., heart rate variability below a certain threshold) in the assessment data. If critical scores are identified, the workflow enables escalation 2510 may ensure that urgent cases are flagged for immediate action. In parallel, the workflow notifies the assigned clinician 2512 to enable timely review and intervention tailored to the needs of the patient.

The escalation workflow ensures that any missed or delayed psychiatric or wellness-related tasks are promptly identified and addressed to maintain continuity of care. Administrators play a role in monitoring these escalations, ensuring that appropriate follow-ups are conducted to keep patients engaged with their care plans. The system flags missed wellness tasks, such as mindfulness sessions or wellness check-ins, in patient interface 110, for example, which then escalates the issue to the responsible team member, such as a health coach. This automated escalation triggers follow-up workflows designed to re-engage the patient and prevent lapses in their wellness routines. For high-risk patients who are not adhering to their mindfulness programs or other wellness interventions, the system issues additional alerts to the operations lead, prompting more intensive engagement strategies to reinforce participation.

Beyond wellness-related escalations, the system also prioritizes clinical-critical escalations for high-risk psychiatric cases. Tasks such as overdue medication reviews or unaddressed high PHQ-9 scores, which indicate worsening mental health, or other health-based assessment indicating worsening health are escalated with the highest urgency. These escalations ensure that care managers and supervisors are immediately notified, allowing them to intervene before the patient's condition deteriorates further. The escalation workflow is integrated with dashboards, providing real-time visibility into outstanding critical tasks, and enabling administrators and clinicians to track and resolve urgent cases efficiently. This structured approach to escalation enhances patient safety, promotes adherence to treatment plans, and ensures that both psychiatric and wellness-related concerns are proactively managed.

Figure 26:
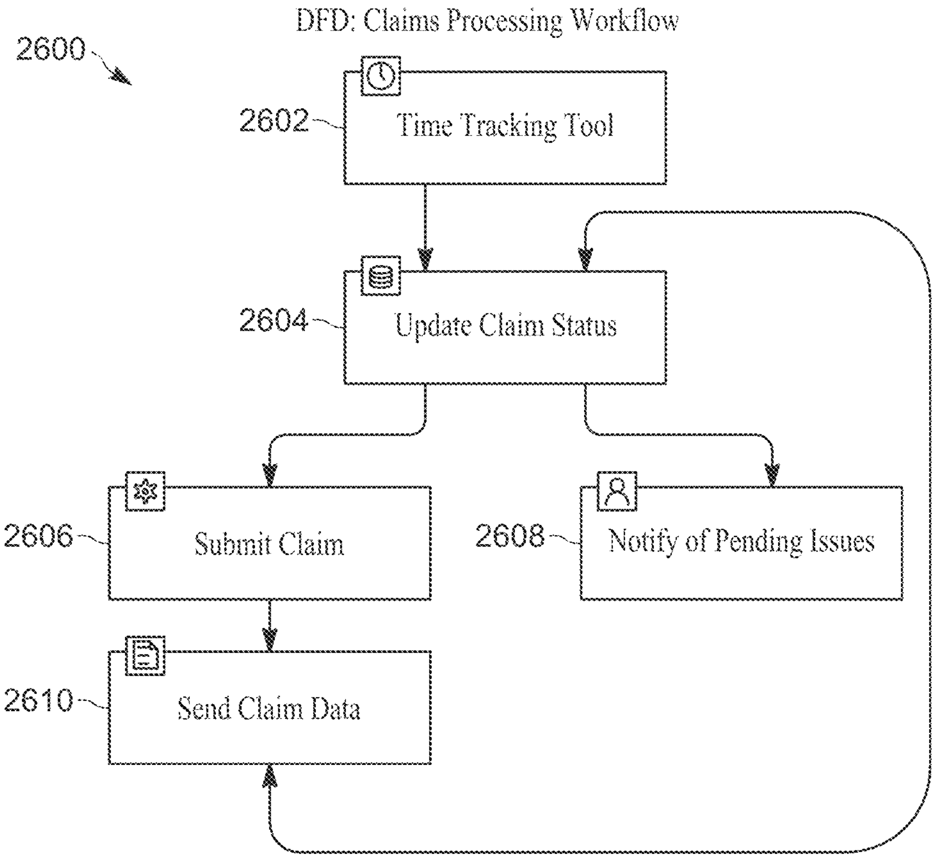
FIG. 26 illustrates an example flow diagram of the claim processing workflow, in accordance with an embodiment of the present disclosure.

Referring now to FIG. 26, an example data flow diagram illustrating the claim processing workflow is provided in accordance with an embodiment of the present disclosure. The process 2600 represents the structured movement of claim-related data, ensuring billing accuracy, real-time status updates, and seamless integration with external payor systems to facilitate efficient claim management.

The workflow initiates with the time tracking tool 2602, which records billable activities associated with patient care. By capturing these activities in real-time, the system ensures that claim submissions are based on accurately logged services, reducing discrepancies in medical billing and preventing potential claim denials due to missing or incorrect information. The recorded billing data is then transmitted to the claims registry, where the system updates the claim status dynamically 2604. These real-time status updates are utilized by billing administrators, providing visibility into claim progression, pending actions, and potential issues requiring intervention.

Once the claims registry is updated, the system proceeds to the submitting 2606 and sending claim data phase 2610. At this stage, validated claims are transmitted to external payor systems using FHIR API integration. This ensures real-time data exchange between the healthcare platform and insurance providers, expediting claim approvals and reimbursement processing. By automating the claim submission process, the system enhances operational efficiency and minimizes delays caused by manual data entry or paper-based submissions.

If any issues arise during claim processing, such as missing documentation, incorrect coding, or validation errors, the system automatically triggers pending issue notifications 2608. These notifications alert billing administrators and relevant stakeholders to potential claim discrepancies, allowing for prompt resolution before the final claim submission. Automating this notification process reduces administrative workload, prevents claim rejections, and ensures compliance with payor-specific billing requirements.

The claims processing workflow provides several functionalities to optimize billing operations. claims registry management ensures that billable activities are accurately logged, tracked, and resolved, minimizing revenue loss due to claim errors. FHIR API Integration facilitates real-time communication with payor systems, reducing processing time and improving claim approval rates. Additionally, billing insights using dashboards offers comprehensive financial oversight by providing billing administrators with a dashboard view of claim statuses, pending actions, and revenue metrics, enhancing decision-making and financial transparency.

This workflow efficiently manages claims from submission to resolution, ensuring billing transparency, automated tracking, and seamless integration with external insurance systems. By leveraging FHIR API for automated payor communication and dashboards for financial visibility, the system enhances billing accuracy, claim efficiency, and reimbursement speed.

Furthermore, the system may further provide automation of pending issue notifications, allowing for quicker resolutions and reducing manual intervention. By improving the automated error detection and resolution mechanism, the system could further streamline claim processing, enhance compliance, and optimize overall billing efficiency.

Figure 27:
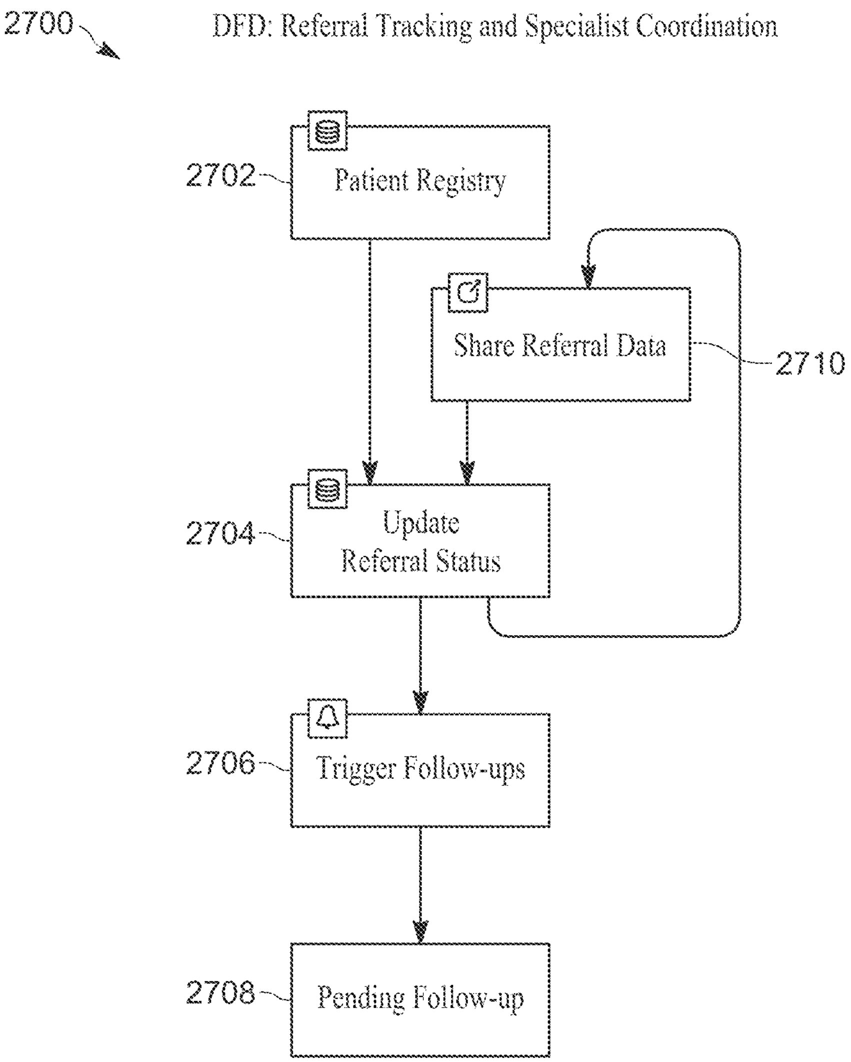
FIG. 27 illustrates an example flow diagram for a patient referral tracking and coordination workflow, in accordance with an embodiment of the present disclosure.

Referring now to FIG. 27, an example flow diagram illustrating a patient referral tracking and coordination workflow is provided in accordance with an embodiment of the present disclosure. The workflow 2700 is designed to ensure efficient referral management, real-time tracking, and automated follow-ups, thereby streamlining the process of assigning, monitoring, and completing patient referrals without administrative delays.

The referral tracking process begins with the patient registry 2702, which serves as a centralized repository for storing referral-related data, including patient demographics, referral history, and ongoing case status. By maintaining a structured and accessible record of referrals, the system facilitates seamless care coordination and prevents information silos that can arise when multiple providers are involved in a patient's treatment.

Upon receiving a referral request, the system automatically directs the referral data to relevant specialists 2710. This assignment is performed dynamically based on a range of factors, including provider availability, specialization, and the urgency of the referral. By leveraging an intelligent referral matching mechanism, the system ensures that patients are connected to appropriate specialists in a timely manner, reducing delays in specialist access and improving the overall efficiency of the referral process.

Once a referral is processed or reviewed, the system updates the referral status in real-time 2704, enabling continuous tracking by care teams, administrative staff, and referring providers. This transparency ensures that all stakeholders have visibility into the progress of each referral, minimizing the risk of referrals being misplaced, forgotten, or subject to administrative bottlenecks.

To further enhance efficiency, the system integrates an automated follow-up mechanism that proactively monitors referrals that remain unaddressed or pending beyond a predefined threshold. If a referral is not acted upon within the expected timeframe, the system triggers a notification 2706 prompting the appropriate stakeholders to take corrective action. This feature helps eliminate unnecessary delays, ensuring that referrals are actively managed and do not stall at any stage of the process.

In cases where additional action is required before a referral can proceed, the system moves the referral into a pending follow-up state 2708, where it is continuously monitored until it is either resolved or escalated for further review. This step ensures that no referral is left unattended, allowing care teams to intervene as needed to address any outstanding issues.

By integrating real-time referral tracking, automated follow-ups, and a centralized referral management system, the disclosed workflow optimizes specialist coordination, reduces administrative workload, and enhances overall patient care efficiency. Through structured referral tracking and intelligent automation, the system ensures that referrals are completed promptly and accurately, ultimately improving patient outcomes and streamlining healthcare operations.

Figure 28:
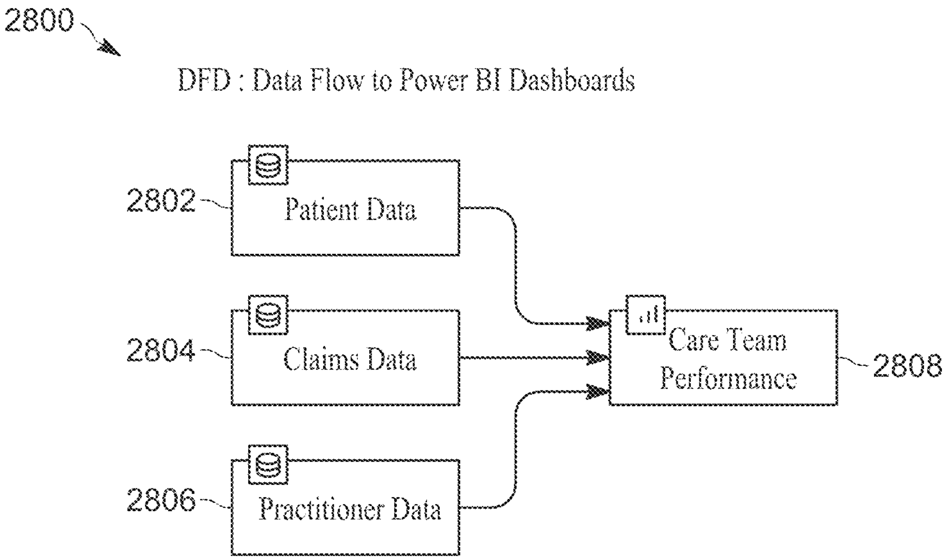
FIG. 28 illustrates an example data flow diagram depicting the integration of various data streams into business intelligence dashboards for clinical insights, in accordance with an embodiment of the present disclosure.

Referring now to FIG. 28, an example data flow diagram 2800 depicting the integration of various data streams into business intelligence dashboards for clinical insights, is illustrated, in accordance with an embodiment of the present disclosure. FIG. 28 highlights the aggregation of patient data 2802, claims data 2804, and practitioner data 2806 into a system to evaluate and enhance care team performance 2808.

The process includes the patient data 2802, which includes demographic details, health records, and outcomes from clinical interactions. These data are continuously updated within the patient registry and securely integrated into the analytical framework. Claims data 2804 provides financial and administrative information, such as billing statuses, payment records, and claim approvals. These data ensure visibility into the revenue cycle and identify opportunities for efficiency improvements. Practitioner data 2806 encompasses care team details, including task completion rates, specializations, and performance metrics, enabling a comprehensive understanding of resource utilization. These datasets are aggregated and fed into the care team performance module 2808, which powers real-time dashboards. The business intelligence dashboards serve as a unified platform for decision-making by visualizing key performance indicators such as patient outcomes, task efficiency, and financial metrics.

Figure 29:
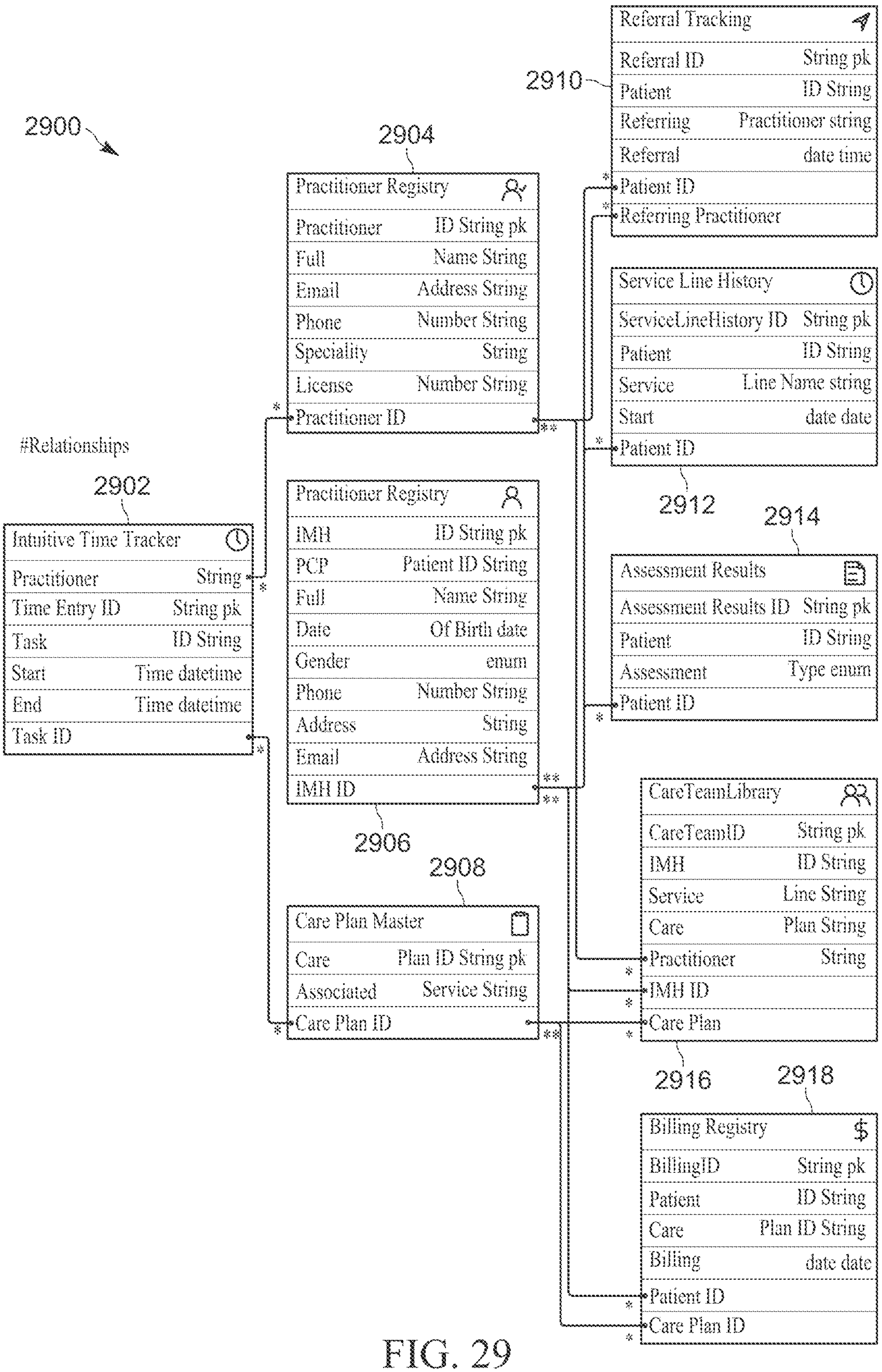
FIG. 29 illustrates an example flow diagram of the data structure of the patient care management platform, in accordance with an embodiment of the present disclosure.

Referring now to FIG. 29, an example flow diagram illustrating the data structure of the patient care management platform is provided in accordance with an embodiment of the present disclosure. The process 2900 highlights the entities and their relationships, showcasing how patient data, practitioner details, referrals, assessments, billing, and care plans are interconnected to facilitate seamless healthcare coordination and data management. The Entity-Relationship Diagram (ERD) ensures data integrity, scalability, and real-world interaction mapping, enabling efficient healthcare management by defining structured relationships and enforcing constraints that eliminate inconsistencies and enhance future system expansions.

At the core of this system is the patient registry 2906, which serves as the central repository for storing patient demographics, medical history, ongoing treatments, and care team assignments. The practitioner registry 2904 maintains information on healthcare providers, their specializations, licenses, and availability, ensuring that referrals and assignments are dynamically managed. The Care Plan Master stores structured care plans, linking them with both the Care Team Library and the Billing Registry to ensure that treatment plans are correctly implemented and financial processes align with clinical workflows.

The patient registry 2906 interacts with multiple entities to streamline healthcare operations. It maintains a direct connection with the service line history 2912, tracking patient interactions across different service offerings. It also links to the assessment results 2914, ensuring that diagnostic evaluations are integrated into the care process. Furthermore, its connection with the billing registry 2918 ensures that all financial transactions related to patient care services are systematically recorded, supporting accurate claims processing. Similarly, the practitioner registry 2904 plays a role in facilitating provider coordination, linking with the referral tracking system 2910 to route patients to appropriate specialists and ensuring that practitioner assignments align with patient needs. Additionally, the care team library 2916 is integrated with the practitioner registry 2904, allowing the system to dynamically assign providers to multidisciplinary care teams and ensuring structured, team-based patient management.

The billing registry 2918 is another vital component of the system, synchronizing financial records with the care plan master 2908 to ensure that all treatment plans are accurately billed and compliant with healthcare reimbursement standards. By establishing these structured connections, the platform enhances centralized data management, optimized referral handling, and seamless financial operations. This interconnected framework ensures that patient, provider, and billing information remains synchronized and easily accessible, allowing for real-time tracking, automated referral handling, and transparent billing processes.

The ERD representation of the patient care management platform supports scalability and system expansion, allowing for future enhancements and the integration of additional healthcare services. By defining robust data relationships, the system ensures that all healthcare activities, from patient assessments and referrals to care team assignments and financial transactions, remain well-coordinated and efficiently managed. This structured approach enhances operational efficiency, promotes evidence-based care, and ensures financial accountability, ultimately contributing to improved healthcare delivery and optimized resource utilization.

Figure 30:
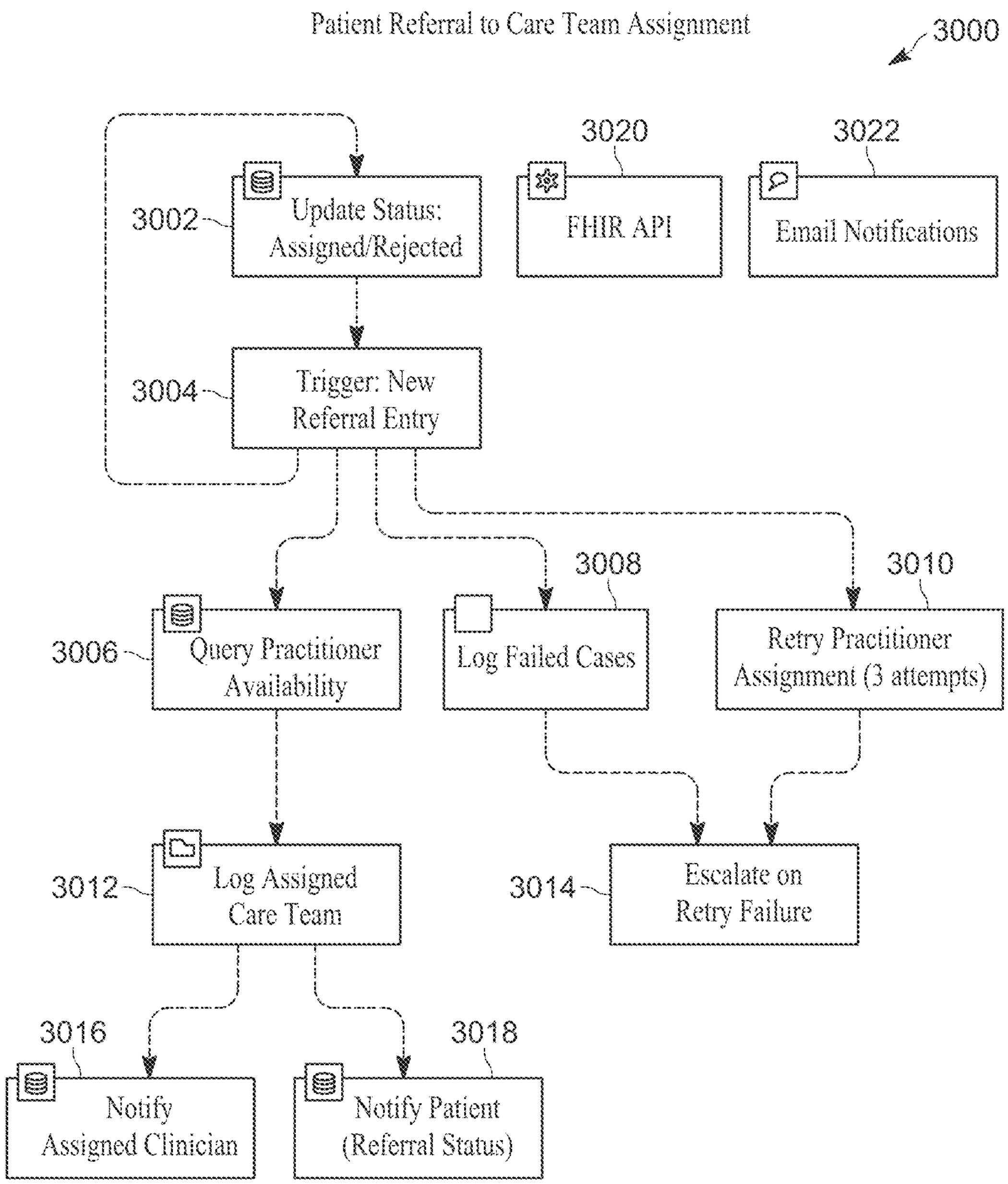
FIG. 30 illustrates an example flow diagram of the patient referral to care team assignment, in accordance with an embodiment of the present disclosure.

Referring now to FIG. 30, an example flow diagram illustrating the patient referral to the care team assignment process is provided in accordance with an embodiment of the present disclosure. The process 3000 maps out the combination of automated and manual steps necessary to ensure the seamless and efficient assignment of patients to the appropriate care team. The system is designed to enhance workflow automation by streamlining task delegation, exception handling, and notification processes, ensuring that referrals are processed without unnecessary delays or inefficiencies.

The workflow begins with the triggering of a new referral entry 3004 into the Patient Registry, which can occur through manual input by healthcare staff or using FHIR API integration from external systems. Once a referral is logged, the system automatically initiates a query 3006 within the practitioner registry to identify an available specialist based on service line specialization, workload capacity, and practitioner availability. If a suitable provider is found, the system proceeds with automated assignment, ensuring a smooth transition from referral intake to care team allocation. However, if no provider is available at the initial attempt, the system is programmed to retry the query up to three times before escalating the issue for manual intervention. The system updates the status 3002, whether the practitioner is assigned or rejected.

In cases where practitioner assignment fails after three attempts 3010, the system logs the failed cases 3008 and escalates them for manual review and intervention by a care coordinator 3014. This escalation mechanism ensures that patients are not left without appropriate care due to temporary practitioner unavailability. Once a practitioner is successfully assigned, the system updates the care plan library with the newly designated care team information and logs the referral status in the Patient Registry to maintain a structured and traceable record of assignments.

Following the successful assignment of a care team 3012, the system triggers notifications to various stakeholders to ensure all parties are informed of the referral outcome. The assigned clinician receives an internal system alert 3016, the patient is notified by email or patient portal 3018, and the referral source is updated on the status of the referral to ensure transparency in care coordination.

To address error handling and escalation logic, the system incorporates predefined failure detection mechanisms. If a referral entry is missing required fields, a validation error is triggered, prompting staff to correct the input before proceeding. If no available practitioners are found after three automated attempts, the system flags the issue for escalation to a regional supervisor if the referral remains unprocessed beyond 24 hours. The system also includes a fallback mechanism that ensures, in cases where automated retries fail, a care coordinator is notified for manual intervention.

The workflow relies on several tools and integrations to maintain efficiency and accuracy. In some embodiments, Microsoft's Power Automate® is used to manage workflow automation, ensuring the timely execution of tasks. The FHIR API 3020 facilitates external data integration, allowing interoperability with other healthcare systems. The system uses email notification 3022 to notify different stakeholders. SharePoint (or another sharing site) serves as a repository for workflow logs and tracking data, maintaining audit trails for administrative review. The patient and practitioner registries provide the necessary data points for making real-time assignments based on practitioner availability and patient needs.

This automated workflow enhances referral handling efficiency by reducing manual workload, ensuring structured assignments, and improving notification accuracy. The inclusion of retry mechanisms, escalation protocols, and error handling guarantees that no referral is left unprocessed, ultimately enhancing patient care coordination and ensuring timely interventions.

Figure 31:
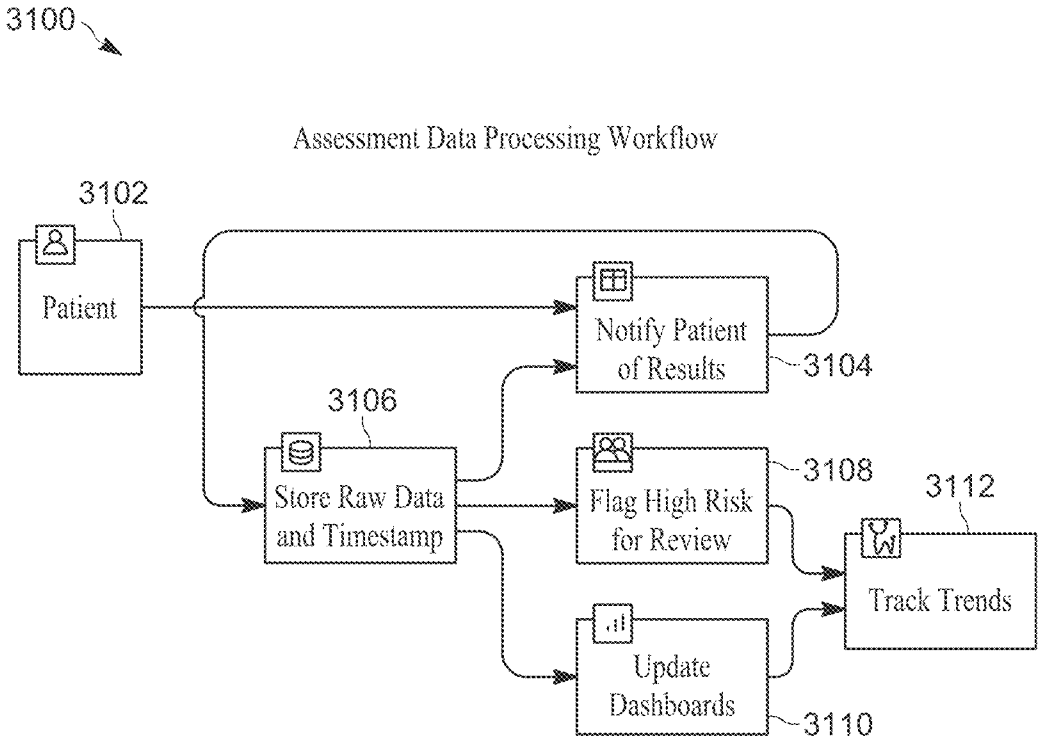
FIG. 31 illustrates an example workflow diagram for assessment data processing, showcasing the end-to-end handling of patient-submitted assessments to generate clinical insights, in accordance with an embodiment of the present disclosure.

Referring now to FIG. 31, an example workflow diagram 3100 for assessment data processing, showcasing the end-to-end handling of patient-submitted assessments to generate clinical insights, is illustrated, in accordance with an embodiment of the present disclosure. The workflow begins with a patient 3102 submitting an assessment, which may include standardized tools such as PHQ-9 or GAD-7, through a patient-facing interface, such as a web portal, mobile application, or clinician-guided submission. The assessment submission includes metadata such as the assessment type, patient identification, and timestamp. This information forms the foundational layer for downstream processing. The submitted data is then automatically forwarded to a storage module 3106, which securely stores the raw responses alongside the associated timestamp for traceability and compliance. This module acts as the repository for submitted assessments, ensuring data integrity and accessibility for subsequent workflows.

Upon successful submission, the system validates the assessment data to ensure that fields are populated and that responses match the expected format. For example, the system checks that numerical values are provided for all scored questions in a PHQ-9 form. If any data is incomplete or invalid, the workflow flags the submission as "incomplete" and sends a notification to the patient 3104 to resubmit the form, minimizing gaps in data processing. This validation step helps maintain the quality and accuracy of clinical insights generated later in the workflow. For example, the clinical insights may include, the severity of depressive symptoms based on PHQ-9 scores, correlations between patient-reported symptoms and historical medical data, prioritized care recommendations tailored to a patient's risk level, personalized treatment plans that address comorbid conditions, and predictive health assessments to foresee potential complications or progression in the patient's condition.

Once validated, the system processes the data by calculating assessment scores based on predefined rules. For example, in the case of PHQ-9, the system sums the individual question scores to compute a total score. This calculated score, along with the raw responses, is stored within the assessment results table in the storage module 3106. The system then analyzes the calculated score to determine the patient's risk level. For instance, a PHQ-9 score of 20 or above may be flagged as high risk, while scores in the range of 10-14 may be categorized as moderate risk. A score less than about 10 may be categorized as low risk. Based on the risk level, the system determines the appropriate course of action.

If the risk level is categorized as high or above a predefined threshold, the workflow triggers an automated flagging process 3108 to escalate the results to the assigned clinician or care team for urgent review. Notifications for flagged results are sent to the clinician through secure channels such as email, text messages, or integrated notifications in a clinician-facing dashboard. This ensures that high-priority cases receive immediate attention, minimizing the risk of delayed intervention. In parallel or sequentially, the system notifies the patient 3104 of their results along with any recommended next steps. For low-risk cases, the notification may include a reassurance message and educational resources to help the patient understand their assessment results. For moderate-risk cases, the notification may suggest scheduling a follow-up assessment or consultation. The system ensures that patient communication is clear, timely, and aligned with clinical guidelines.

The workflow further integrates advanced analytics by updating real-time dashboard 3110 with the assessment results. These dashboards provide a holistic view of trends across multiple patients, enabling clinicians and care administrators to monitor patterns such as an increase in high-risk assessments over time. The dashboards also allow for tracking individual patient progress, offering insights into the effectiveness of ongoing care plans. Additionally, the system includes a trend-tracking module 3112 that monitors historical data to identify long-term patterns and deviations. For example, a patient's scores across multiple PHQ-9 assessments or other health-based assessment may be analyzed to determine whether their condition is improving or worsening. This module provides insights for clinicians to adjust treatment plans proactively.

The workflow incorporates error-handling mechanisms to ensure reliability. If notifications to patients or clinicians fail due to technical issues, the system retries the notifications multiple times at predefined intervals. If repeated failures occur, the system escalates the issue to the system administrator for manual intervention. Similarly, if flagged assessments are not reviewed by clinicians within a predefined time frame, the system sends reminders and escalates the matter to supervisory staff to ensure timely action. To support compliance and auditing, the system logs actions and notifications in an audit trail, ensuring that steps of the workflow can be traced back for accountability. This may be used for meeting regulatory requirements such as HIPAA, which mandates secure handling of patient data.

In some embodiments, the system allows for the customization of thresholds for both psychiatric assessments and wellness metrics. These thresholds can trigger real-time alerts, ensuring that care teams receive notifications for significant changes in either psychiatric status or wellness participation, such as missed mindfulness sessions. Default thresholds are defined in the GlobalMeasurementThresholds List for psychiatric and wellness scores, including PHQ-9, GAD-7, and mindfulness engagement. These thresholds apply to all patients unless specifically customized by a care manager.

In cases where patient-specific adjustments are needed, Care Managers can modify thresholds to align with a patient's individual psychiatric and lifestyle needs. For example, patients with higher tolerance for psychiatric score variations or those requiring personalized mindfulness goals will have customized thresholds tracked by the system. The clinical assessment system 100 may ensure that these custom thresholds are consistently applied across workflows and reflected in reports.

To facilitate timely intervention, system 100 generates alerts when psychiatric or wellness thresholds are exceeded. These alerts are transmitted through instant messaging platforms, ensuring immediate attention from the care team. If critical alerts remain unaddressed within a predefined timeframe, they are automatically escalated to a supervisor or the operations lead. Additionally, system 100 continuously monitors real-time psychiatric and wellness scores and logs alerts directly into the patient's care plan, maintaining ongoing oversight of their health status.

This integration strengthens patient monitoring and proactive care intervention, ensuring that deviations from psychiatric and wellness benchmarks are swiftly identified and addressed.

Figure 32:
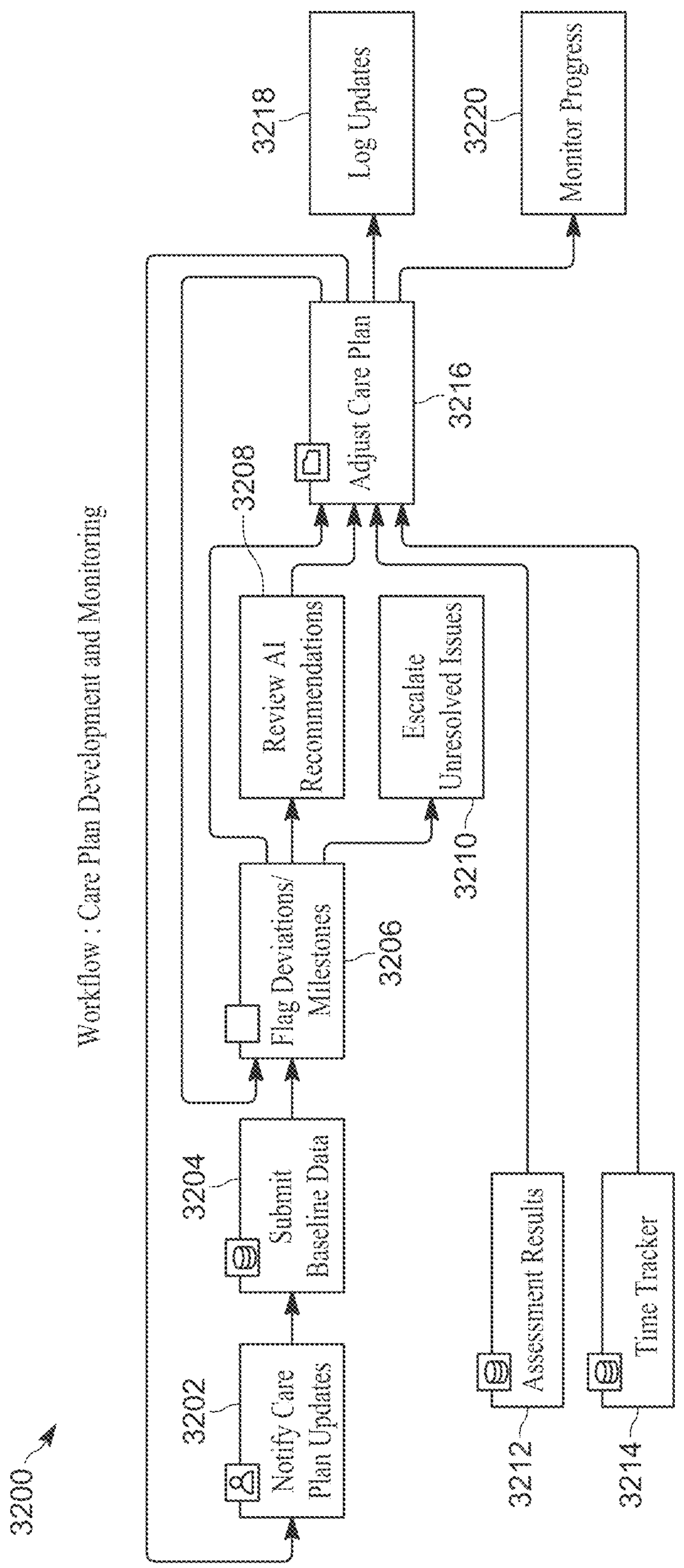
FIG. 32 illustrates an example workflow diagram for care plan development and monitoring, depicting the processes for creating, updating, and tracking patient-specific care plans dynamically, in accordance with an embodiment of the present disclosure.

Referring now to FIG. 32, an example workflow diagram 3200 for care plan development and monitoring, depicting the processes for creating, updating, and tracking patient-specific care plans dynamically, is illustrated, in accordance with an embodiment of the present disclosure. This workflow integrates automated notifications, clinician oversight, and patient feedback, ensuring a responsive and adaptive approach to personalized care delivery.

The workflow begins with notifying the relevant care team or patient about updates or initiation of a care plan through a notification module 3202. Notifications may include a summary of the care plan objectives, milestones, and required tasks, ensuring stakeholders are informed of the plan details. The patient or care team then submits baseline data 3204, including assessments, demographic details, and prior health records. These baseline data are used for establishing the initial conditions of the care plan and serve as the foundation for subsequent monitoring and adjustments.

As the care plan progresses, the system monitors milestones and tasks, flagging any deviations or unmet goals through the milestone flagging module 3206. Deviations could include missed sessions, incomplete tasks, or a lack of measurable improvement in patient outcomes. These flagged issues are routed to the review module 3208, where AI-generated recommendations are presented to clinicians. The AI suggestions may include changes to session frequencies, introducing new interventions, or modifying outcome targets based on the identified deviations.

For unresolved or critical deviations, the system automatically triggers an escalation process 3210. This ensures that urgent issues, such as declining patient health metrics or repeated missed appointments, are brought to the attention of senior care managers or specialized clinicians. Escalations are communicated through secure notifications, ensuring timely intervention. Following a review of flagged deviations and AI recommendations, clinicians may adjust the care plan 3216 as necessary. Adjustments could include updating intervention strategies, revising milestones, or altering task deadlines to better align with the patient's progress and needs. These updates are documented in the system using the log updates module 3218, ensuring that changes are recorded for compliance and future reference.

The adjusted care plan is monitored for adherence and effectiveness through the monitoring module 3220. This module integrates data from the assessment results table 3212 and the time tracker 3214 to provide a comprehensive view of patient progress. Metrics such as adherence rates, assessment scores, and task completion timelines are analyzed to determine the effectiveness of the care plan. Real-time dashboards are updated to provide clinicians with clinical insights, enabling continuous monitoring and improvement of care delivery. The workflow includes automated notifications for patients and clinicians to ensure engagement and adherence. For example, patients may receive reminders for upcoming sessions or overdue tasks, while clinicians are alerted about flagged deviations or pending approvals for care plan adjustments. This ensures that parties are consistently aligned with the care plan objectives.

Error handling mechanisms are incorporated into the workflow to address potential issues such as missing data, unresponsive patients, or delays in clinician reviews. The system retries failed notifications and escalate unresolved issues to higher authorities, such as care managers, ensuring that no critical tasks are overlooked. Additionally, all actions and decisions within the workflow are logged in audit trails, providing transparency and supporting compliance with regulatory requirements.

Figure 33:
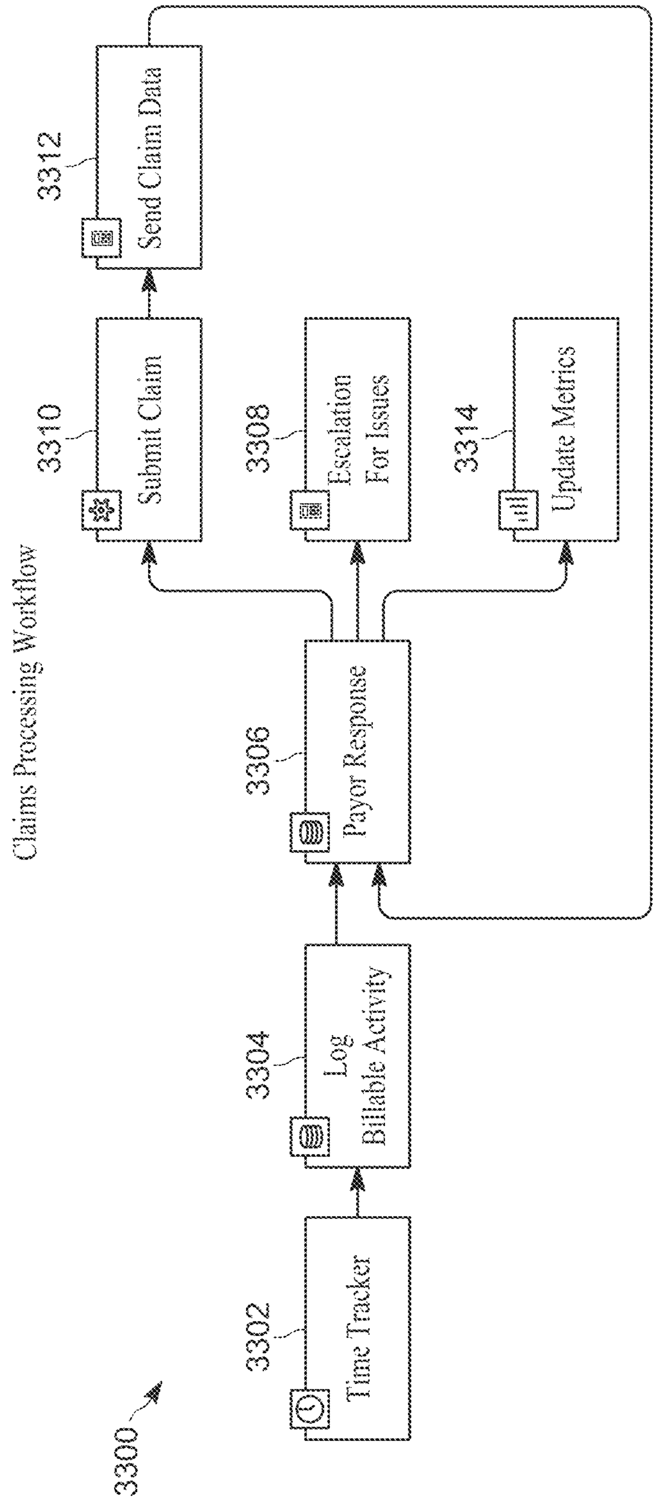
FIG. 33 illustrates an example flow diagram of a claim processing workflow, in accordance with an embodiment of the present disclosure.

Referring now to FIG. 33, an example flow diagram illustrating a claim processing workflow is provided in accordance with an embodiment of the present disclosure. The claims processing workflow 3300 ensures that billable sessions and tasks are accurately recorded, validated, and submitted while maintaining compliance with payer requirements. By integrating automated processes with manual interventions, the system enhances efficiency in claims management, reducing errors and ensuring timely reimbursement.

The workflow automates the entire claims lifecycle, covering steps from logging billable activities to handling payer responses, claim rejections, and financial reporting. The primary objectives include ensuring compliance with Current Procedural Terminology (CPT) codes (or other standardized procedure code or code representative of a service event or a line item for a healthcare procedure) and payer policies, automating claim submissions for improved efficiency, handling claim denials with retry and escalation mechanisms, and providing financial insights through reporting tools.

The process begins with time tracking 3302 and logging billable activities 3304, where clinicians record billable tasks or sessions using the timetracker module. The data points logged include CPT codes (such as a code therapy sessions or other standardized procedure code or code representative of a service event or a line item for a healthcare procedure), duration for time-based codes, clinician identification, and service line information (e.g., Psychiatry, Lifestyle Coaching). This ensures that all claimable services are properly documented before submission.

Once the billable data is captured, the system proceeds with payer response handling 3306 by validating claims against CPT code rules (e.g., cross-referencing CPT codes or other standardized procedure code or code representative of a service event or a line item for a healthcare procedure with payer policies), completeness of documentation, and compliance with Medically Unlikely Edits (MUE). If a claim fails validation, it is rejected, and the clinician is notified to correct and resubmit the claim. Validated claims are then automatically submitted to payer systems by the FHIR API for connected payers or through manual export for payers lacking API integration. The claim submission 3310 includes detailed patient information, clinician details, service specifics, and total billable amounts to ensure complete financial transparency.

In cases where claims are rejected or remain pending, the system employs escalation mechanism 3308 to prevent delays in reimbursement. The system retries submission up to three times before escalating the issue for manual review by managers. If errors persist, the billing team is notified for further intervention and resolution. Claims that remain unresolved beyond 30 days are escalated to the department head to ensure priority handling.

To maintain financial oversight, successful claims are logged in the Claims Registry 3312, and real-time financial metrics are updated 3314 in dashboards. This enables stakeholders to track claim success rates, revenue trends by service line, and pending or rejected claims, offering data-driven insights into financial performance.

The system includes robust error handling and escalation logic to minimize claim processing delays. If required claim fields are missing, the system notifies clinicians to complete the entry before submission. For rejected claims, the billing team is alerted to resolve the issue, and for claims that remain pending for more than 30 days, department heads are engaged to expedite resolution.

Several integrations and tools support the seamless execution of this workflow. The timetracker module captures billable clinician activities, while the claims registry tracks the status of each claim. FHIR APIs facilitate direct electronic claim submission to payer systems, and system 100 streamlines claim validation and processing workflows. Additionally, dashboards provide real-time financial insights, ensuring that administrative and financial teams have visibility into claim trends and revenue performance.

In some embodiments, the claims and billing module is designed to automate and streamline the process of generating, tracking, and managing claims for services such as psychiatric evaluations, psychotherapy, and wellness coaching. It ensures that billing is accurate for both insurance and patient payments while also integrating with payroll to manage team compensation. The system 100 automatically assigns billing codes (e.g., CPT codes or other standardized procedure code or code representative of a service event or a line item for a healthcare procedure) to services provided, ensuring compliance with industry standards and payer requirements. Claim generation may be triggered once a service is completed, linking tasks directly to claims to reduce administrative workload. Claims are tracked through various stages, including pending, submitted, paid, and denied, allowing care teams to monitor financial performance effectively. In case of denials, the system alerts billing managers for quick resolution and resubmission.

Additionally, the module incorporates time tracking to ensure proper billing and payroll processing. Using system 100, care team members can log time spent on tasks, with a persistent tracking banner preventing overlap or errors. The system differentiates between billable and non-billable minutes, ensuring that eligible services are charged while still logging all time for payroll purposes. This data seamlessly integrates into payroll processing, where team members are compensated based on logged minutes and predefined pay rates. Payroll files are automatically generated and exported to financial tools for further analysis and/or billing, with administrators able to review and resolve discrepancies before processing payments.

To maintain financial transparency, the system includes real-time payment tracking and reporting using dashboards, which provide insights into total claims submitted, revenue generated, and outstanding payments. The system reconciles billed time with payroll records, ensuring fair compensation and identifying discrepancies between services rendered and services billed. Furthermore, the module is HIPAA-compliant, safeguarding sensitive patient data, and generates audit logs for every claim submission, payment, and payroll file, helping organizations stay compliant with healthcare regulations. The claims and billing module minimizes administrative burden, enhances financial tracking, and ensures accurate billing and payroll management, ultimately improving operational efficiency and compliance within healthcare organizations.

In summary, this automated claims processing workflow significantly enhances efficiency, compliance, and financial tracking by integrating automated submission, validation, escalation, and reporting tools. The combination of automated retries, manual escalation pathways, and real-time data analytics ensures that billing errors are minimized, reimbursement timelines are optimized, and financial oversight is maintained across the healthcare system.

Figure 34:
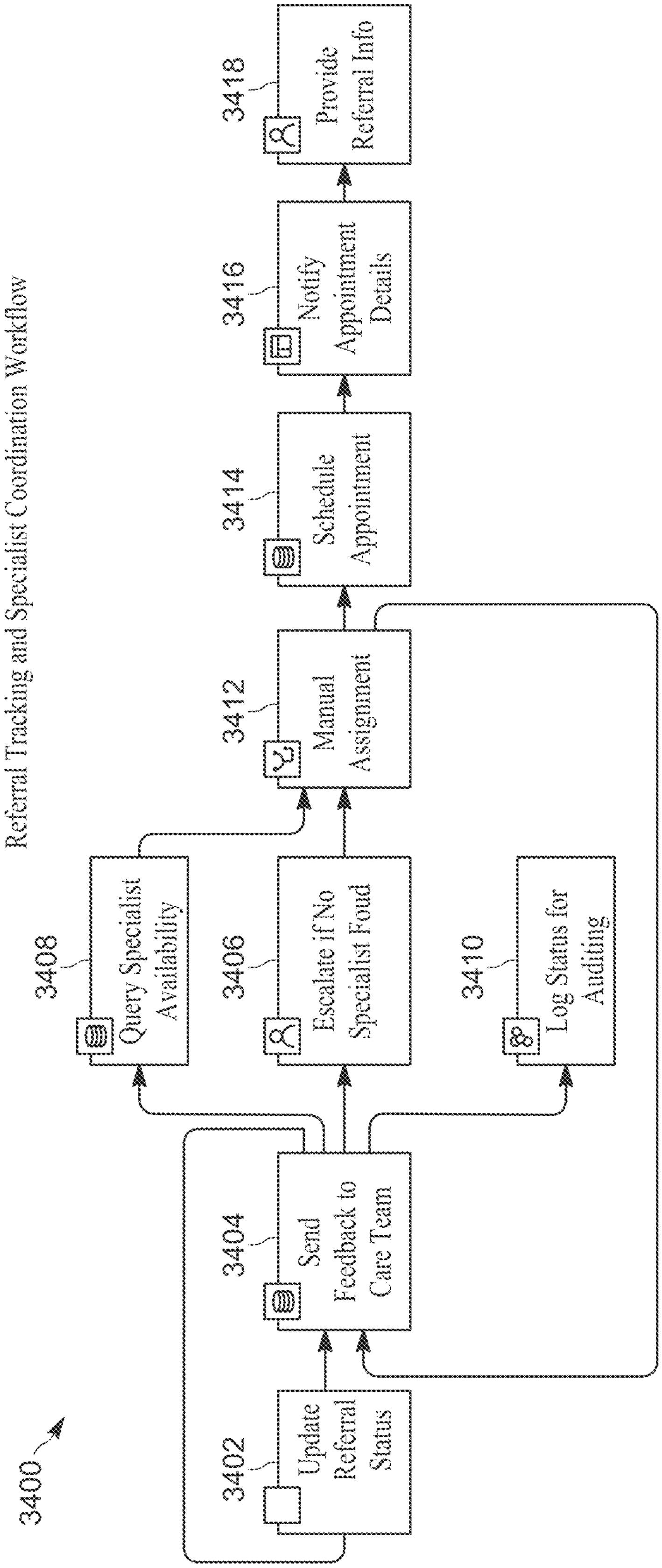
FIG. 34 illustrates an example flow diagram of a referral tracking and specialist coordination workflow, in accordance with an embodiment of the present disclosure.

Referring now to FIG. 34, an example flow diagram illustrating a referral tracking and specialist coordination workflow is provided in accordance with an embodiment of the present disclosure. The referral workflow 3400 ensures efficient referral management, enabling seamless coordination between care teams, specialists, and patients. By integrating automated processes with manual intervention mechanisms, the system facilitates timely referral assignments, status updates, and appointment scheduling, thereby enhancing transparency and efficiency in patient care.

The referral workflow 3400 is designed to facilitate referrals to external specialists or within the system while ensuring timely updates on referral status and appointment outcomes. The process is triggered when a care team member identifies the need for a referral, such as in cases where a patient requires specialized consultation. Additionally, automated clinical flags—for example, based on elevated PHQ-9 or GAD-7 scores—can trigger a referral without manual intervention.

The workflow begins with updating the referral status 3402 in the system when a referral is initiated, assigned, or completed. A feedback is forwarded to care team 3404. This ensures that real-time progress tracking is available for both care teams and patients. Once the referral is logged, the system automatically queries available specialists 3408 by matching the referral request with providers in the practitioner registry. the matching process considers parameters such as specialty (e.g., neurology, cardiology, etc.), availability (open time slots), and urgency level (routine vs. urgent referrals).

If no specialist is found, the system initiates an escalation process 3406 by notifying the manager for manual intervention. The manager or assigned personnel can then manually assign 3412 a specialist to ensure that the referral is not left unprocessed. Once a specialist is assigned, the appointment is scheduled 3414. If the referral is directed to an internal specialist, the appointment details are logged in the booking tracker, while for external specialists, the patient receives scheduling details to coordinate their visit independently.

Following the scheduling process, automated notifications are sent to patients 3416, referring clinicians, and care teams through multiple communication channels, including the patient app, email notifications, and instant messaging platforms. The patient is also provided with comprehensive referral details 3418, such as the assigned specialist's contact information, appointment time, and location, ensuring that they have all the necessary information for their consultation.

To maintain the integrity and efficiency of the referral system, robust error handling, and escalation mechanisms are implemented. If a referral is missing essential details, the system flags validation errors and prompts for corrections before submission. If no specialist is available, the issue is escalated for manual assignment. In cases where a referral is not acknowledged within 48 hours, the care coordinator is notified, and if unresolved after 72 hours, the case is escalated to a supervisor for immediate intervention.

The workflow is supported by multiple integrations and automation tools. The referral tracking table logs referral details and status 3410, while the practitioner registry enables real-time specialist availability queries. Bookings tracker stores scheduled appointments, ensuring structured data management. Instant messaging platforms and email notifications facilitate communication with care teams and patients, and example programs such as Microsoft's Power Automate® automates workflow tracking and escalations. Additionally, dashboards provide real-time analytics to monitor referral performance metrics, such as completion rates and pending cases.

The automated referral tracking and specialist coordination workflow enhances efficiency, transparency, and accountability in patient referral management. By combining automated referral handling, real-time tracking, escalation mechanisms, and integrated communication tools, the system ensures that patients are seamlessly connected with specialists, minimizing delays in care delivery while keeping all stakeholders informed.

Figure 35:
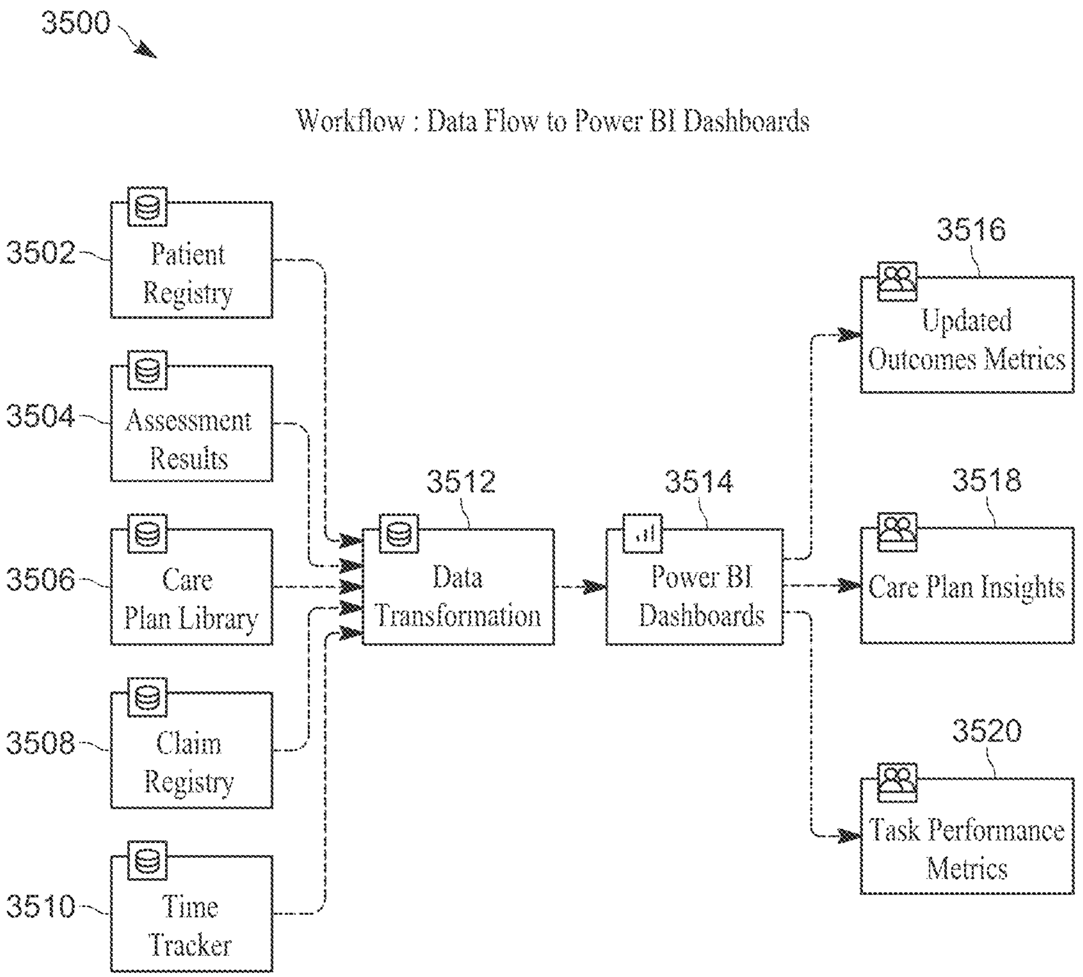
FIG. 35 illustrates an example workflow diagram for the seamless data flow into dashboards designed for real-time insights, in accordance with an embodiment of the present disclosure.

Referring now to FIG. 35, an example workflow diagram 3500 for the seamless data flow into dashboards designed for real-time insights, is illustrated, in accordance with an embodiment of the present disclosure. This workflow consolidates clinical, operational, and administrative data from multiple sources to enable clinical insights into patient outcomes, clinician performance, task efficiency, and financial metrics, including claims processing. By centralizing and transforming data, the system ensures timely and accurate visualization for stakeholders, fostering data-driven decision-making.

The workflow begins with data consolidation from various sources. The patient registry 3502 serves as a repository for patient demographics, service line enrollments, and engagement history. Assessment results 3504 provide longitudinal trends and recent scores from assessments such as PHQ-9 or GAD-7, offering a quantitative measure of patient progress. The care plan library 3506 supplies active and completed care plan data, while the claims registry 3508 contributes financial and billing details, including CPT codes (or other standardized procedure code or code representative of a service event or a line item for a healthcare procedure) and claim statuses. The time tracker 3510 records task completion logs and the allocation of time for both billable and non-billable activities. These collected data form the foundation for the transformation process. Next, the data transformation module 3512 processes and cleanses the raw data to ensure compatibility with dashboard visualizations. The module maps database fields to pre-defined dashboard categories, such as mapping "PHQ-9 Score" to "Assessment Metrics." Filters may be applied to focus on specific service lines, such as psychiatry, or aggregated timelines, such as weekly trends. This transformation step normalizes the data, preparing it for integration into the reporting system.

Once processed, the transformed data is sent to the dashboard engine 3514, where it is integrated into pre-configured templates. The dashboards automatically refresh to reflect the latest metrics, including patient trends, care plan adherence, task performance, and claims statuses. Updated outcomes metrics 3516 showcase patient recovery rates or trends in assessment scores, while care plan insights 3518 detail adherence rates and progress against established milestones. Task performance metrics 3520 visualize task completion rates, escalation trends, and time allocation efficiency. These dashboards serve as a single source of truth for monitoring and strategic planning. The system ensures proactive notifications to stakeholders about updates or changes in the dashboards. For example, care teams may receive alerts about flagged patient metrics, such as worsening assessment scores or overdue tasks, prompting immediate action. Notifications may also highlight operational metrics, such as an increase in claims rejection rates or task escalation rates exceeding predefined thresholds.

Error handling mechanisms are embedded within the workflow to ensure data accuracy and system reliability. The system logs errors during data retrieval, such as missing fields or failed queries, and attempts retries with incremental delays. If repeated attempts fail, a task is generated for manual reconciliation, and stakeholders are notified of persistent issues. Escalations are triggered for errors, such as discrepancies in claims data or prolonged dashboard synchronization failures, ensuring swift resolution. The decision-making framework within the workflow includes multiple escalation points. For example, if a patient registry lacks care plan updates or if discrepancies are found in task timestamps, the system alerts relevant stakeholders, such as clinicians or administrators, to resolve the issue. Similarly, flagged metrics from dashboards, such as overdue tasks or claims statuses, trigger notifications to ensure prompt action by the appropriate team.

In some embodiments, the system tracks all referral services, including both internal and external referrals to specialists such as nutritionists and sleep specialists. These reports ensure that patient care remains coordinated, and outcomes are linked back to the original care plan. The referral tracking component logs referrals made for psychiatric and lifestyle services, identifying external providers involved and tracking referral statuses such as pending or completed. Additionally, it provides insights into post-referral outcomes, ensuring continuity of care after external services have been utilized.

One or more analysis tools/dashboards (e.g., Microsoft's Power BI®) monitors patient outcomes post-referral, tracking whether the referral resulted in improvement or if additional follow-up is necessary. It also enables comparative data analysis on referral effectiveness across various patient demographics and service lines, allowing for data-driven optimization of referral strategies.

Supervisors and administrative personnel require a high-level view of patient care and operational efficiency. Dashboards aggregate data on care team performance across psychiatric and wellness services, ensuring alignment with Chronic Care Management (CCM) goals and patient outcomes. These dashboards include a timesheet review feature, providing supervisors with insights into how time is allocated across psychiatric and lifestyle care plans. Such dashboards highlight team members who are managing their time efficiently and track clinical and wellness task completion.

An escalation management report is also included, tracking psychiatric and wellness tasks that have been escalated due to delays or importance. This allows supervisors to intervene in cases where team members encounter challenges in task completion. Additionally, overall team productivity metrics aggregate task completion and care plan progress across psychiatric and lifestyle service lines, offering performance comparisons across different care roles such as psychiatrists, health coaches, and psychotherapists.

System 100 facilitates automation across all reporting features, ensuring that psychiatric, lifestyle, and referral data remains synchronized in real-time across patient data and dashboards. This real-time reporting capability ensures that live data is continuously available for patient care, task tracking, and operational performance monitoring.

The enhanced reporting and analytics in the system enable continuous tracking of psychiatric and wellness outcomes, ensuring seamless integration into care plans. By providing insights into patient progress, task efficiency, and team performance, the system enhances holistic care, integrating mindfulness, wellness coaching, and psychiatric care across all service lines.

Figure 36:
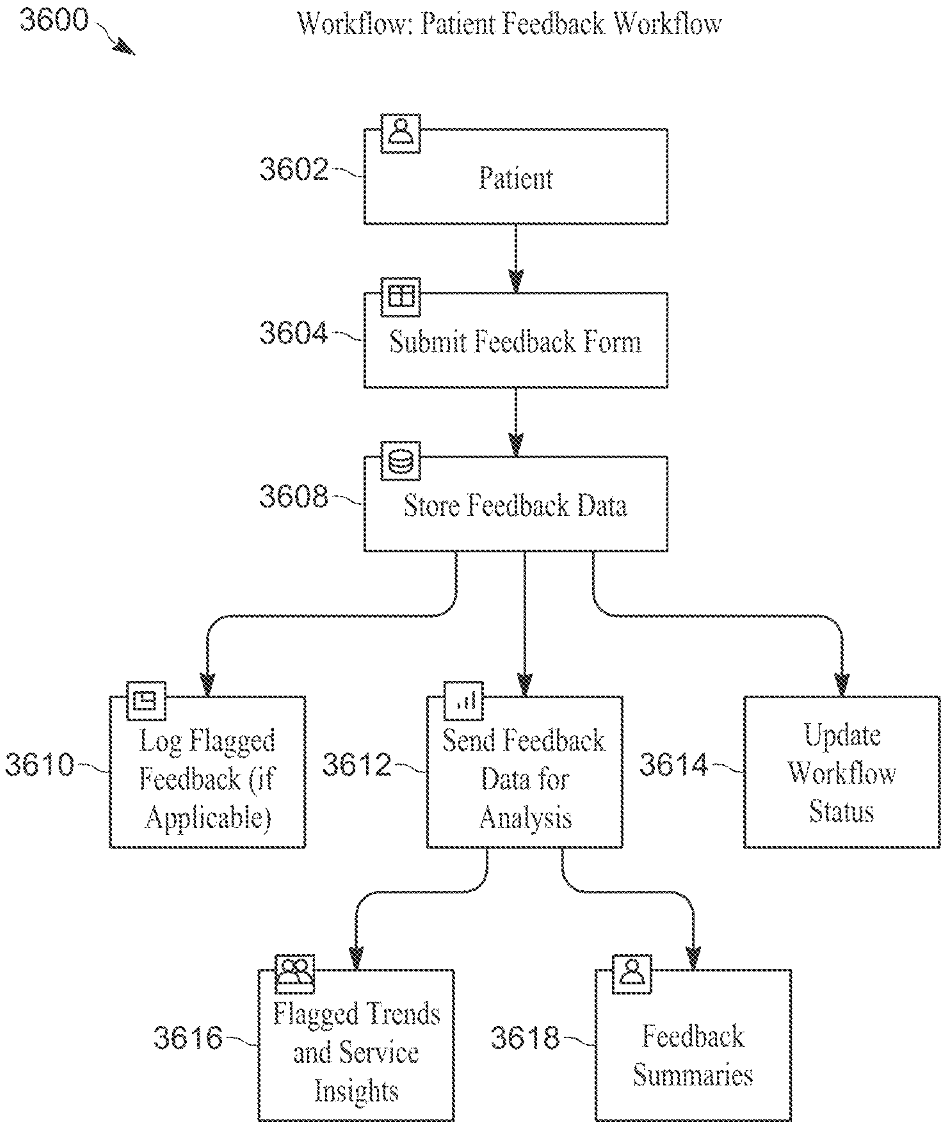
FIG. 36 illustrates an example workflow for collecting, processing, and analyzing patient feedback, in accordance with an embodiment of the present disclosure.

Referring now to FIG. 36, an example workflow 3600 for collecting, processing, and analyzing patient feedback, is illustrated, in accordance with an embodiment of the present disclosure. This workflow ensures the efficient capture of patient experiences following particular interactions, such as therapy sessions or care plan reviews, and enables automated processing, escalation of flagged concerns, and continuous improvement of services.

The workflow including providing to a patient 3602 a feedback form using various channels, such as app notifications or email prompts. Feedback forms 3604 are designed to capture metrics, including satisfaction ratings, open-ended comments, and specific session details. These forms may also include mandatory fields to ensure comprehensive data collection. Upon submission, the feedback data is securely stored 3608 in a feedback registry. This registry links the feedback to relevant patient records, interaction types (e.g., therapy sessions), and submission timestamps for traceability.

The stored feedback undergoes processing to identify clinical insights. In cases of flagged feedback, such as low ratings or negative comments, the system logs the flagged feedback 3610 for prioritized attention. Flagged responses are further categorized based on keywords indicating dissatisfaction or systemic issues, such as delays or unfulfilled expectations. Feedback data, including flagged and non-flagged entries, may also be transmitted 3612 for detailed analysis. The analysis phase generates aggregate trends, identifies recurring issues, and highlights specific areas for service improvement.

The system updates workflow status 3614 in real-time to reflect the completion of feedback collection, validation, and processing. This ensures end-to-end visibility into the feedback management lifecycle. Updated workflow statuses are logged to enable oversight and auditability of actions taken. The analyzed data contributes to flagged trends and service insights 3616, providing high-level visibility into systemic challenges or areas needing immediate intervention. Additionally, feedback summaries 3618 are compiled to offer individual clinicians or care teams concise insights into their interactions, promoting accountability and service enhancement.

The feedback workflow incorporates escalation logic for handling critical cases. For example, if a patient provides a satisfaction rating below a predefined threshold, such as 3 out of 5, the system automatically escalates the feedback to a care coordinator or supervisor. Similarly, flagged comments containing negative keywords trigger notifications to appropriate stakeholders for resolution. Unresolved escalations after a predefined time frame, such as 48 hours, are further escalated to departmental leads for immediate action. Error detection and fallback mechanisms ensure workflow reliability. If mandatory fields in feedback forms are incomplete, the system prompts the patient to resubmit. Errors during data storage, such as connectivity issues, trigger retries, and unresolved failures are logged for administrative review. Patients are notified of submission errors and provided with options to retry, ensuring a seamless experience.

Figure 37:
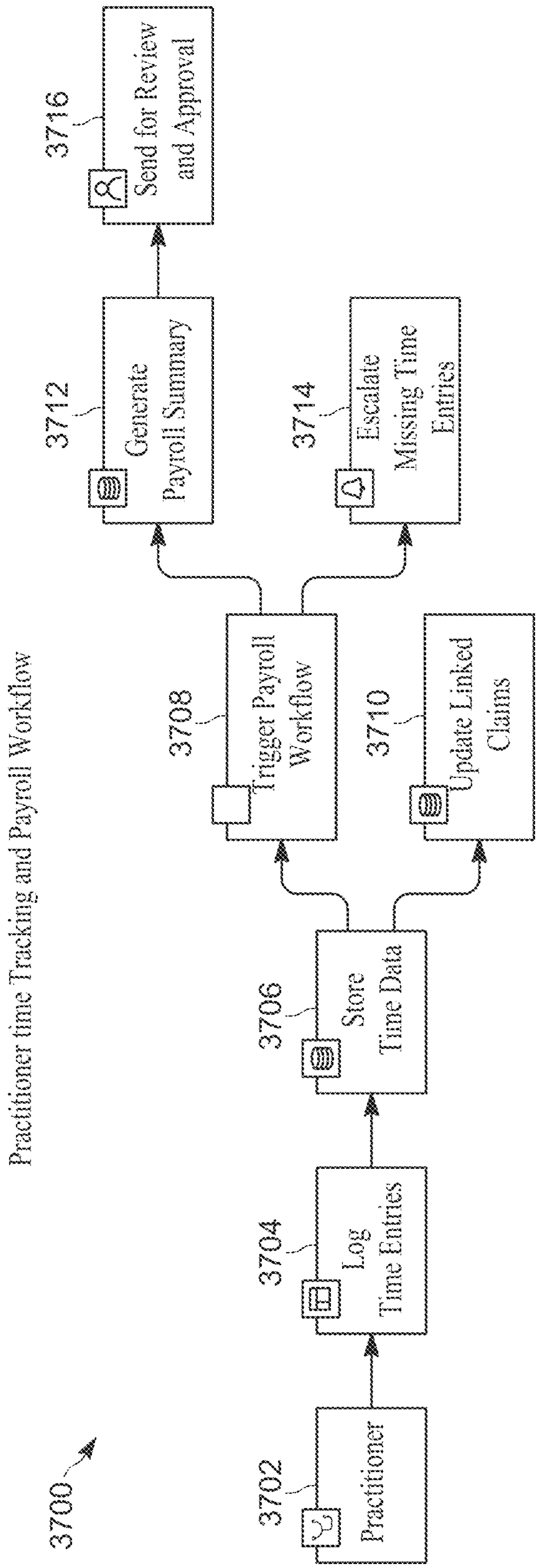
FIG. 37 illustrates an example flow diagram of a workflow that automates time tracking for practitioners, ensuring accurate payroll processing while integrating with the claims and billing system, in accordance with an embodiment of the present disclosure.

Referring now to FIG. 37, an example flow diagram illustrating a workflow 3700 that automates time tracking for practitioners, ensuring accurate payroll processing while integrating with the claims and billing system, is provided in accordance with an embodiment of the present disclosure. The workflow 3700 further incorporates approval mechanisms and escalations to address errors or missing time entries, ensuring compliance and operational efficiency.

The workflow 3700 is designed to accurately log, categorize, and process practitioner time entries, facilitating seamless integration with payroll and billing systems. It also automates notifications, approvals, and error-handling mechanisms to streamline administrative workflows. The process is triggered either when a practitioner completes a task 3702, such as a therapy session or care plan review, or when a missed time entry is detected, prompting an escalation for resolution.

The process begins with practitioners logging their work hours in the system 3702, distinguishing between billable activities, which involve patient-facing tasks linked to CPT codes or other new or standardized procedure codes or codes representative of a service event or a line item for a healthcare procedure (e.g., therapy sessions), and non-billable activities, such as team meetings or documentation reviews. Once logged, the time data is stored and categorized 3704, with billable activities linked to the claims registry for claim validation and non-billable activities stored in the timetracker for payroll processing.

Upon storing the time entries, the system automatically triggers the payroll workflow 3708, ensuring that all recorded hours are processed for compensation. If any missing time entries are detected 3714, an escalation process is initiated to prompt resolution. The system then updates the linked claim 3710, reconciling billable hours with claims submissions. If discrepancies arise—such as incorrect CPT codes (or other standardized procedure code or code representative of a service event or a line item for a healthcare procedure) or duplicate entries—the system flags the errors for review to prevent billing inconsistencies.

Once the payroll summary is generated 3712, it includes total hours worked, a breakdown of billable vs. non-billable time, and compensation calculations based on predefined rates. If a practitioner fails to log time for a scheduled task, they receive an automated reminder to submit their entries. If no action is taken within 24 hours, the issue is escalated to the care coordinator for further resolution.

Before finalizing payroll processing, managers review payroll summaries and approve or reject entries 3716. If approvals are delayed beyond 48 hours, the system escalates the issue to the finance head, ensuring that payroll processing remains on schedule.

To maintain the accuracy and integrity of time tracking and payroll processing, robust error handling and escalation mechanisms are embedded in the workflow. If time entries are missing, practitioners receive a reminder notification. If unresolved within 24 hours, the issue is escalated to the care coordinator. In cases where payroll discrepancies occur, such as incorrect CPT codes (or other standardized procedure code or code representative of a service event or a line item for a healthcare procedure) or duplicate time logs, the issue is escalated to the billing administrator for resolution. If payroll approvals remain pending beyond 48 hours, the finance head is notified to intervene.

The workflow leverages multiple tools and integrations to automate and streamline time tracking and payroll processing. The clinician app enables practitioners to log time entries, while the timetracker table stores all logged time data for reporting and categorization. The Claims Registry ensures that billable hours are accurately linked to claims, preventing discrepancies. Payroll summary Table maintains payroll reports for review and approval, and system 100 facilitates automation of time tracking, payroll processing, and approval workflows. Instant messaging notifications and email notifications ensure that practitioners, managers, and finance teams receive timely updates and alerts.

The automated payroll workflow enhances accuracy, compliance, and efficiency by reducing manual errors, ensuring proper categorization of work hours, and integrating seamlessly with billing and payroll systems. The incorporation of escalation mechanisms ensures that missing entries, billing discrepancies, and delayed approvals are promptly addressed, thereby improving transparency, practitioner accountability, and financial management.

Figure 38:
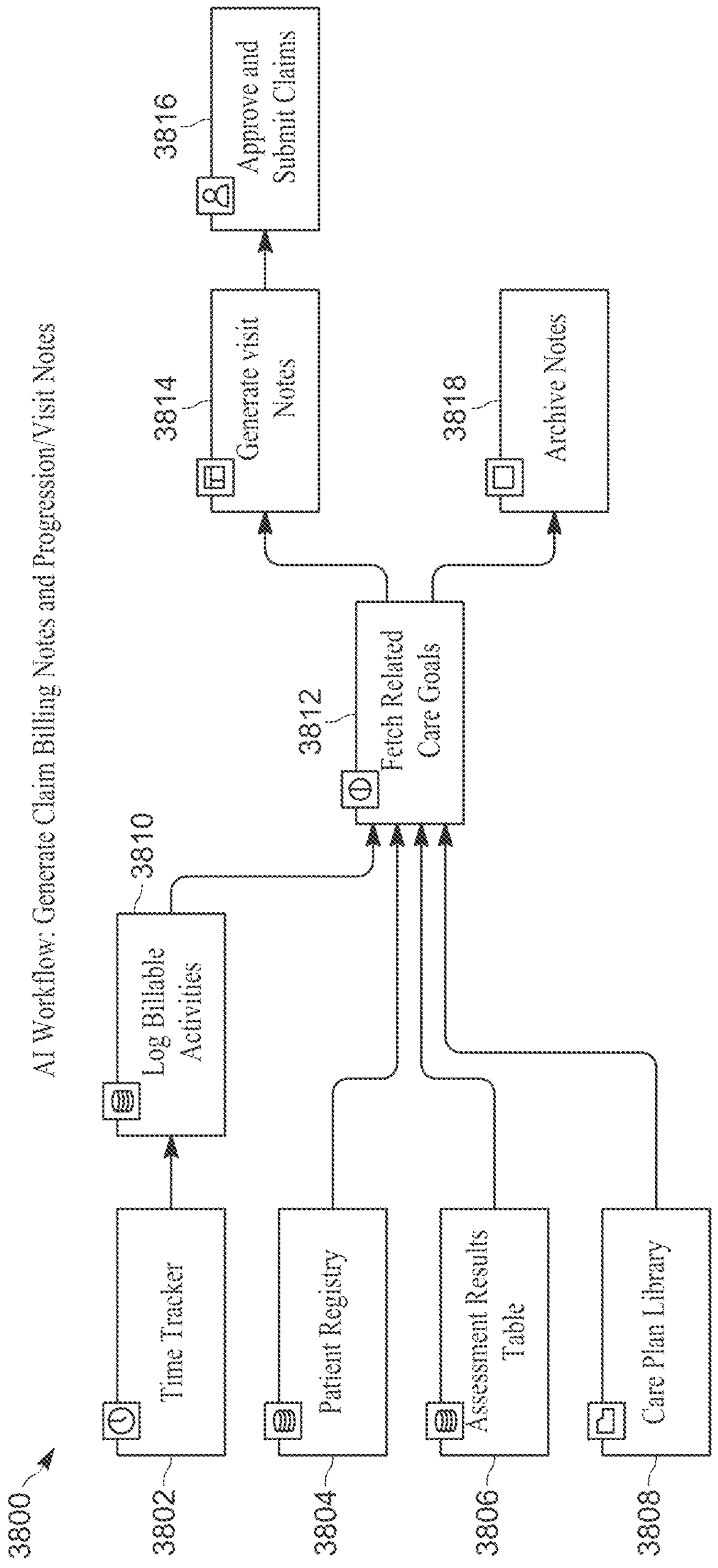
FIG. 38 illustrates an example flow diagram of a process for generating claims billing notes and progress visit notes, in accordance with an embodiment of the present disclosure.

Referring now to FIG. 38, an example flow diagram illustrating a process for generating claims billing notes and progress visit notes is provided in accordance with an embodiment of the present disclosure. The workflow 3800 automates the generation of billing notes and visit summaries, ensuring accurate claim submission and streamlined care documentation.

The process facilitates automated documentation of billable activities, retrieval of patient care data, AI-driven generation of billing and progress notes, and seamless claim submission. This workflow minimizes administrative workload, enhances accuracy, and ensures compliance with standardized documentation practices.

The workflow is initiated when practitioners log billable tasks 3810 into the Timetracker 3802, such as therapy sessions or medical consultations. This logging process ensures that all services rendered are accurately recorded for subsequent claim generation. The system then fetches related care goals 3812 and patient data from multiple sources, including the patient registry 3804 for demographics and history, the assessment results table 3806 for test scores and evaluations, and the care plan library 3808 for long-term treatment objectives. These retrieved data points serve as inputs for generating personalized billing and progress notes.

The AI-driven claim billing note generation process utilizes multiple data sources, including session duration from timetracker, CPT codes (or other standardized procedure code or code representative of a service event or a line item for a healthcare procedure) from claims registry, and practitioner notes detailing session observations. For instance, the AI automatically constructs billing notes, such as claim billing note: "45-minute CBT session for depression, CPT Code XXXX. Practitioner: Dr. Jane Doe."

Following billing note creation, the AI compiles progress and visit notes 3814, summarizing patient progress based on care plan milestones, practitioner observations, and assessment results. These notes provide a comprehensive clinical summary of the patient's condition and ongoing treatment progress. For example Progress Note: "Patient reports improved mood and decreased anxiety. Next steps: Introduce the journaling task."

Once billing and progress notes are generated, they undergo a review process for accuracy and completeness. Upon approval, claims are submitted for processing 3816, ensuring that all billable services are properly documented and compliant with reimbursement requirements.

The final stage of the workflow involves archiving billing and progress notes 3818 for compliance and record-keeping purposes. This ensures that historical patient and billing data are maintained for auditing, reporting, and regulatory compliance.

By integrating automated documentation, AI-powered content generation, and claim submission workflows, this process reduces administrative burden, ensures standardized documentation, and expedites claim approval. The workflow enhances operational efficiency, minimizes errors, and facilitates seamless financial and clinical documentation processes, ultimately improving patient care coordination and reimbursement accuracy.

In some embodiments, the document automation and management system streamlines the creation, organization, and accessibility of patient-related records, ensuring that psychiatric progress notes, lifestyle evaluations, and mindfulness progress reports are automatically generated and stored in a centralized repository. This eliminates the need for manual documentation and enhances efficiency in patient care management. The clinical assessment system 100 uses predefined templates for psychiatric and wellness assessments, such as mindfulness evaluations and psychiatric progress notes, which ensures consistency and standardization across all patient records. These templates are automatically populated with patient-specific data and stored in the designated teams channel or an equivalent document management system.

To further enhance workflow efficiency, the system integrates with form/list software, allowing health coaches and mindfulness instructors to track wellness progress and mindfulness outcomes. The data collected through these forms is automatically converted into structured reports and linked directly to the patient's care plan, providing real-time visibility to the care team. Additionally, automated workflows trigger document generation and storage immediately upon completion of assessments, ensuring that wellness-related records, such as mindfulness session summaries, are readily available without the need for manual intervention.

Another feature of the system is the real-time alerting mechanism. If an assessment reveals significant deviations in psychiatric or wellness metrics, such as a high PHQ-9 score indicating severe depression or a decline in mindfulness engagement, the system generates an alert and notifies the care manager. This proactive approach allows for timely intervention, ensuring that potential health concerns are addressed before they escalate. By automating documentation, integrating assessment tracking, and enabling real-time alerts, the system improves patient care coordination, reduces administrative workload, and enhances the overall efficiency of psychiatric and wellness care.

Figure 39:
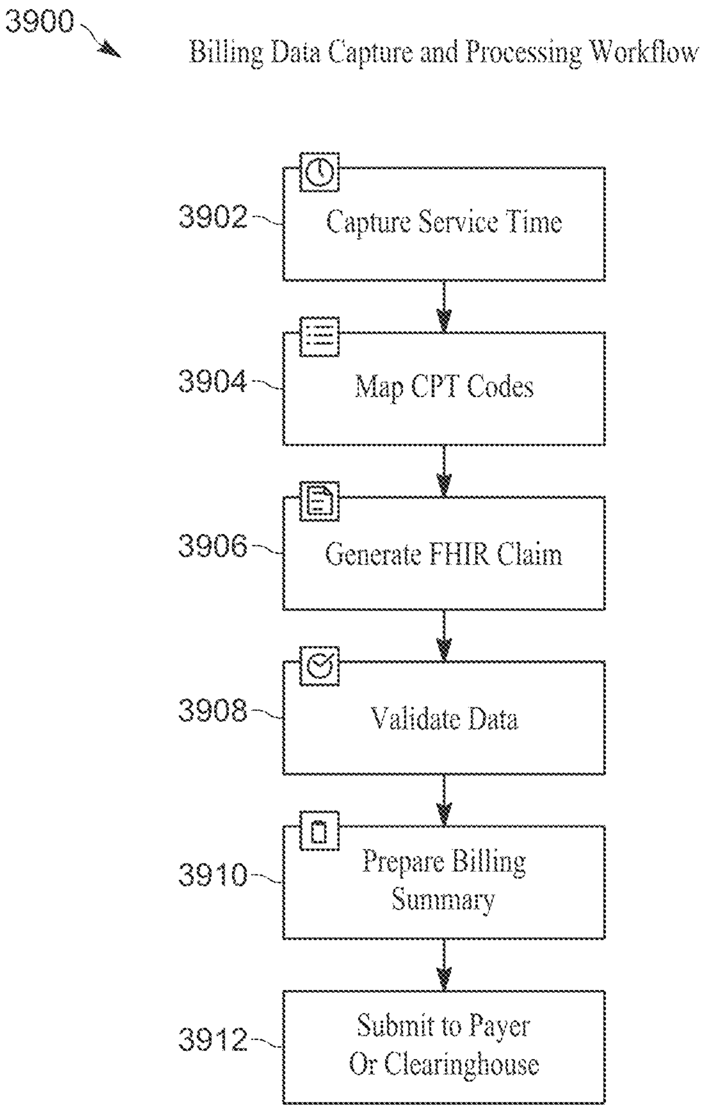
FIG. 39 illustrates an example flow diagram of a process of capturing, validating, and submitting billing data to ensure accurate claim generation and seamless payer integration, in accordance with an embodiment of the present disclosure.

Referring now to FIG. 39, an example flow diagram illustrating the process of capturing, validating, and submitting billing data to ensure accurate claim generation and seamless payer integration is depicted in accordance with an embodiment of the present disclosure. The workflow 3900 automates the billing data capture process, maps appropriate CPT codes (or other standardized procedure code or code representative of a service event or a line item for a healthcare procedure), generates FHIR-compliant claims, validates claim data, prepares billing summaries, and submits claims to payers or clearinghouses. This automation optimizes billing accuracy and enhances reimbursement efficiency while ensuring compliance with payer regulations.

The process begins with the capture of service time 3902, where clinicians record the duration of services provided. The system tracks this time in real-time for all billable activities, ensuring accurate logging of session durations. Once the service time is captured, the system assigns the appropriate CPT code 3904 (or other standardized procedure code or code representative of a service event or a line item for a healthcare procedure) based on service type, duration, and billing rules. For example, if a therapy session lasts for 90 minutes, the system automatically maps it to a CPT Code (or other standardized procedure code or code representative of a service event or a line item for a healthcare procedure), utilizing two add-on codes of 30 minutes each. This ensures that billing is correctly structured according to payer policies, reducing errors and potential denials.

Once the CPT codes (or other standardized procedure code or code representative of a service event or a line item for a healthcare procedure) are mapped 3904, the system proceeds to generate a FHIR-compliant claim 3906. Captured billing data is converted into standardized FHIR resources to maintain interoperability with payer systems. Several FHIR resources are utilized in this process. The patient resource stores demographic information, ensuring that claims are correctly linked to individuals receiving care. The service request resource documents session details, including the nature of the service and its duration. The practitioner resource links the provided service to the respective healthcare provider, ensuring accurate attribution of the claim.

Before submission, the system validates the claim data 3908 by applying predefined validation rules to ensure accuracy and compliance with payer requirements. This validation process confirms that CPT codes (or other standardized procedure code or code representative of a service event or a line item for a healthcare procedure) conform to payer-defined billing limits and guidelines, ensuring that claims are not flagged for errors. Additionally, all mandatory claim fields, including provider and patient details, must be complete before submission. The system also leverages FHIR validation tools to confirm adherence to industry standards, ensuring that claims are correctly formatted and interoperable with payer systems.

After successful validation, the system prepares a billing summary 3910, organizing the billing information based on multiple parameters. The summary categorizes claims by service type, such as therapy, medical consultations, or diagnostic services. It also consolidates patient encounters to streamline claim submissions and prevent duplicate entries. Additionally, the billing summary accounts for payer contract rates, ensuring that claims are categorized and priced according to the agreements with different insurance providers.

In the final step, the system submits the finalized billing data to the payer or clearinghouse in FHIR-compatible batches 3912. This structured submission process enables fast claim processing and reduces the likelihood of denials due to formatting or compliance errors. The use of FHIR APIs ensures seamless integration with payer systems, facilitating real-time data synchronization and improving the overall accuracy of reimbursements.

By leveraging FHIR standards, automated validation mechanisms, and optimized billing workflows, this system enhances claim submission efficiency, minimizes administrative errors, and improves financial outcomes for healthcare providers. The automation of time tracking, CPT code mapping (or mapping of other standardized procedure code or code representative of a service event or a line item for a healthcare procedure), claim validation, and payer submission significantly reduces the manual workload while ensuring that claims are processed swiftly and accurately.

Figure 40:
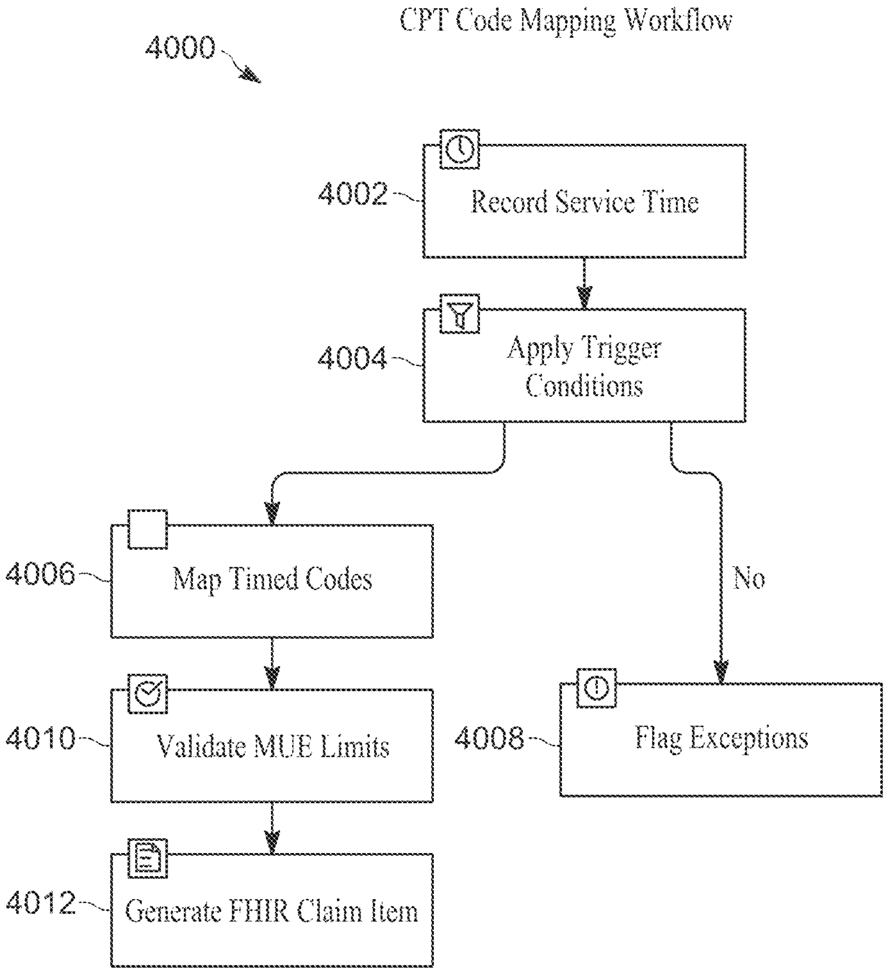
FIG. 40 illustrates an example flow diagram of a workflow that automates the assignment of Current Procedural Terminology (CPT) codes to healthcare services, ensuring compliance with billing regulations and seamless claim processing, in accordance with an embodiment of the present disclosure.

Referring now to FIG. 40, an example flow diagram illustrating a workflow 4000 that automates the assignment of CPT codes (or other standardized procedure code or code representative of a service event or a line item for a healthcare procedure) to healthcare services, ensuring compliance with billing regulations and seamless claim processing, is depicted in accordance with an embodiment of the present disclosure. The system optimizes the assignment of CPT codes (or other standardized procedure code or code representative of a service event or a line item for a healthcare procedure) by recording service time 4002, applying predefined trigger conditions 4004, mapping time-based codes 4006, validating payer-imposed limits 4010, flagging exceptions 4008, and generating standardized FHIR claim items 4012. By automating these processes, the workflow ensures accurate billing and regulatory compliance while minimizing manual intervention.

The process begins with recording service time 4002, where clinicians log the duration of services provided. The system captures and stores this data in real-time, ensuring that billable activities are properly documented. This step enables determination of the appropriate CPT code assignment (or assignment of other standardized procedure code or code representative of a service event or a line item for a healthcare procedure) based on service type and duration.

Next, the system applies trigger condition 4004 to determine whether a specific CPT code should be assigned to a service. Each CPT code (or other standardized procedure code or code representative of a service event or a line item for a healthcare procedure) is associated with predefined conditions that dictate its applicability. For example, a code representing Health Behavior Assessment may be automatically triggered when a patient completes an assessment form and the care team finalizes the preliminary analysis report. These conditions ensure that valid and medically necessary services are billed, reducing errors and claim rejections.

The system then proceeds to map timed code 4006, where service durations are aligned with the appropriate CPT codes (or other standardized procedure code or code representative of a service event or a line item for a healthcare procedure). Timed codes, such as those used in psychological testing, are assigned based on the length of the session. For example, a 90-minute psychological test would be mapped as follows: CPT Code A (Base Code, 30 minutes)=1 unit and CPT Code B (Add-on Code, 30 minutes)=2 units. Non-timed codes, such as CPT Code C, are assigned based on a single instance of the service, regardless of duration. This mapping ensures that claims accurately reflect the services rendered while adhering to payer policies.

To maintain compliance with billing regulations, the system validates MUE (Medically Unlikely Edits) limits imposed by payers 4010. This validation process ensures that CPT codes do not exceed predefined unit thresholds. For example, CPT Code B allows a maximum of 11 units per day, and any additional units beyond this limit are automatically flagged and excluded from claim submission. This step prevents overbilling and ensures that claims remain within payer-approved limits.

If a service does not meet the necessary billing criteria, the system flags exceptions 4008 for manual review. For example, non-billable activities such as administrative tasks may be logged in the system but are assigned dummy codes for tracking purposes instead of being submitted for reimbursement. This flagging mechanism allows billing administrators to review and resolve discrepancies before claim submission, ensuring billing accuracy.

In the final step, the system generates an FHIR claim item 4012, embedding the finalized CPT codes (or other standardized procedure code or code representative of a service event or a line item for a healthcare procedure) into FHIR-compliant claims (or other predefined claim compliance rules) for seamless submission to payers. This ensures that all billing records adhere to standardized, interoperable formats, allowing for efficient claim processing and integration with payer systems. The use of FHIR APIs enhances data consistency and facilitates real-time synchronization with billing platforms.

By automating CPT code (or other code) assignment and validation, this workflow minimizes administrative burden, improves claim accuracy, and enhances compliance with payer regulations. The structured approach ensures that all billable services are appropriately coded, medically necessary, and within regulatory limits, ultimately optimizing revenue cycle management within the automated billing system.

Figure 41A:
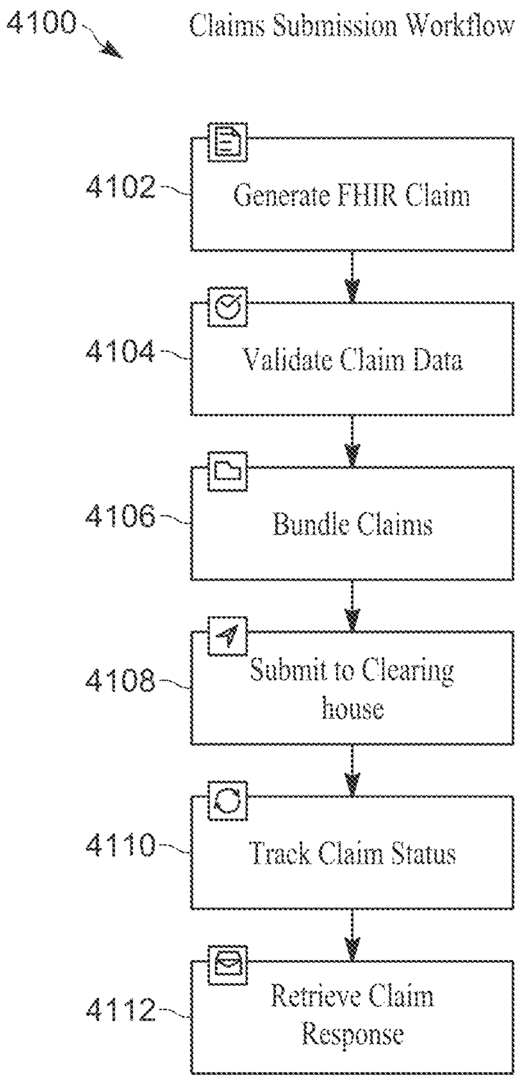
FIG. 41A illustrates an exemplary flow diagram of an automated claim submission and tracking process, according to aspects of the present disclosure.

Referring now to FIG. 41A, an example flow diagram illustrating an automated claim submission and tracking process is depicted in accordance with an embodiment of the present disclosure. The workflow 4100 ensures efficient integration with payers and clearinghouses, facilitating seamless reimbursement processing through automation, validation, and real-time tracking mechanisms.

The process begins with generating an FHIR Claim 4102, wherein the system processes billing data to create an FHIR-compliant claim. Each generated claim includes elements such as CPT codes (or other standardized procedure code or code representative of a service event or a line item for a healthcare procedure), service details, and patient information, ensuring structured and standardized claim submission. By utilizing FHIR (Fast Healthcare Interoperability Resources) APIs, the system enhances interoperability and ensures seamless exchange of billing information with external payer systems.

Following claim generation, the system performs claim data validation 4104 to minimize rejections and ensure accuracy before submission. The validation process includes multiple checks, such as matching CPT codes (or other standardized procedure code or code representative of a service event or a line item for a healthcare procedure) with service duration, verifying patient insurance coverage, and ensuring the presence of all required fields. If any discrepancies are detected, such as missing insurance details, the claim is flagged for correction before proceeding to submission. This proactive approach reduces claim denials and enhances processing efficiency.

Once validated, claims are bundled into FHIR-compatible batches 4106 to optimize submission efficiency. Grouping multiple claims into batches streamlines processing, reduces submission overhead, and accelerates reimbursement cycles. For instance, claims for multiple payers can be consolidated into a single submission, reducing administrative workload and improving claim turnaround times.

The bundled claims are then submitted to a clearinghouse 4108, which acts as an intermediary between the system and multiple payers. The clearinghouse enhances claim processing efficiency by handling multi-payer integration, providing real-time error feedback, and facilitating faster claim adjudication. By leveraging clearinghouse services, the system ensures that claims are submitted in compliance with payer-specific requirements, thereby reducing the risk of rejections and delays.

After submission, the system actively tracks the status of each claim using the FHIR claim response resource 4110. Possible claim statuses include approved (accepted for payment), rejected (requiring manual correction), or pending (under review by the payer). This real-time tracking mechanism enables billing administrators to monitor claim progress, identify issues promptly, and take corrective action if necessary.

Upon receiving the final claim response, the system records and processes the outcome 4112. If the claim is approved, it moves forward to payment processing, ensuring timely reimbursement. If the claim is rejected, it is flagged for resubmission with the necessary corrections, allowing for efficient issue resolution. For example, if a psychologist submits a claim for CPT Code D (Cognitive Assessment), the initial response may indicate that the claim is pending review. Once processed, the final response may indicate approval, along with the associated Explanation of Benefits (EOB).

The workflow automates and streamlines the claims submission and tracking process, ensuring error-free claim submissions, faster reimbursements, and compliance with payer regulations. By leveraging FHIR-based interoperability, automated validation checks, and real-time claim tracking, the billing system enhances operational efficiency and optimizes revenue cycle management.

Figure 42A:
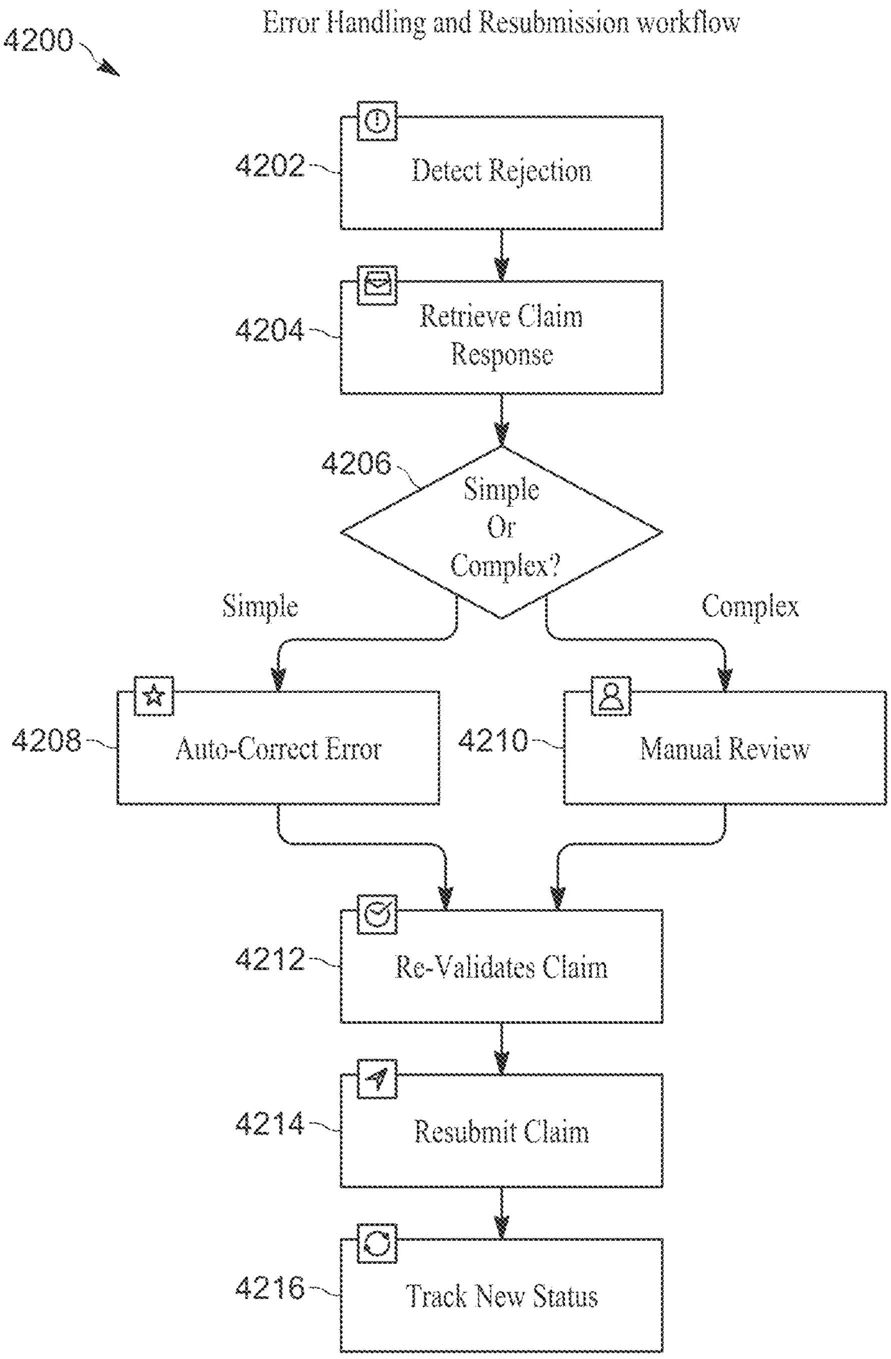
FIG. 42A illustrates an exemplary flow diagram of an automated error handling and resubmission process for claim rejections, according to aspects of the present disclosure.

Referring now to FIG. 42A, an example flow diagram illustrating an automated error handling and resubmission process for claim rejections is depicted in accordance with an embodiment of the present disclosure. The automated error handling and resubmission process workflow 4200 ensures efficient identification, correction, and resubmission of rejected claims while maintaining compliance with payer regulations and optimizing reimbursement efficiency.

The process begins with detecting rejected claims, step 4202, wherein the system leverages the FHIR claim response resource to identify claims that have been denied by payers. The rejection may occur due to various reasons, including data inconsistencies (e.g., missing patient details), CPT code (or other code) mismatches (e.g., exceeding Medically Unlikely Edit (MUE) limits), coverage limitations (e.g., non-covered services), or technical issues (e.g., incorrect formatting in the FHIR claim submission). By automating the detection of claim denials, the system ensures that errors are promptly addressed.

Following rejection detection, the system proceeds to retrieve the claim response from the payer, step 4204, which contains status updates, error messages, and specific reasons for rejection. This detailed feedback allows the system to determine the necessary corrective actions. For example, if a claim is rejected due to an invalid policy number, the system flags the issue for resolution.

Next, the system performs an error complexity analysis to classify the issue as either a simple error (automatically correctable) or a complex error (requiring manual intervention), step 4206. Simple errors, such as minor formatting mistakes or missing patient details, can be auto-corrected by the system, step 4208. In contrast, complex errors, such as CPT code/code mismatches, exceeding billing limitations, or policy-related denials, require manual review by billing specialists, step 4210. For example, if a psychologist submits 12 units for a psychological test instead of the allowed 11, the billing team may be triggered by the system 100 to manually adjust the claim to comply with the MUE limit.

Once errors are identified, the system moves to the error correction phase, wherein simple errors are automatically rectified by updating missing fields, correcting formatting errors, or adjusting minor discrepancies. In contrast, complex errors undergo manual review, ensuring that payer-specific requirements and policy constraints are correctly addressed. This structured correction approach minimizes resubmission delays and enhances claim acceptance rates.

After correction, the claim undergoes re-validation, step 4212, where the system performs a secondary verification to ensure that all required data fields are complete, payer-specific rules are met, and FHIR schema validation is maintained for proper formatting. This additional validation step ensures that the resubmitted claim has a higher likelihood of approval.

Following successful validation, the corrected claim is resubmitted to the clearinghouse, which processes the claim for payer review, step 4214. The resubmission may result in two possible outcomes:

Approved—The claim is accepted, allowing it to proceed to payment processing.

Rejected Again—If additional corrections are required, the process is repeated, and further manual review may be necessary.

Throughout this process, the system actively tracks the status of the resubmitted claim, ensuring real-time monitoring of payer feedback, step 4216. If the claim is approved, it advances to the reimbursement stage. If the claim is rejected again, the system flags it for further review, and additional corrective actions are taken as needed.

For example, consider a scenario where a claim for a psychological test is rejected due to exceeding the MUE limit. The system automatically detects the rejection using the claim response resource, and the billing team reviews the error. Upon determining that 12 units were submitted instead of the allowed 11, the claim is corrected, validated, and resubmitted with the correct MUE limit. Upon review, the payer approves the corrected claim, ensuring successful reimbursement.

The automated and structured resubmission process significantly minimizes claim rejections, optimizes reimbursement efficiency, and ensures compliance with payer rules.

By integrating FHIR-based claim tracking, automated error detection, and intelligent correction mechanisms, the system enhances revenue cycle management, reducing administrative burden while improving financial outcomes for healthcare providers.

Figure 43A:
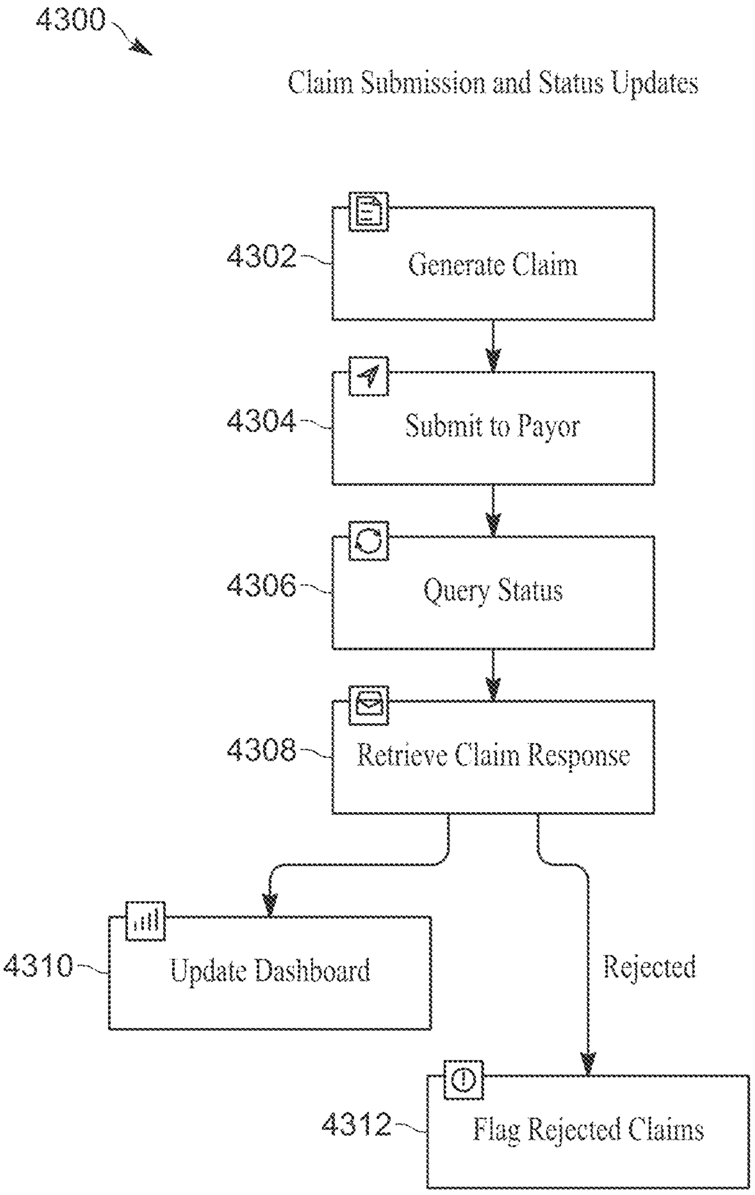
FIG. 43A illustrates an exemplary flow diagram of an automated claim submission and status update process, according to aspects of the present disclosure.

Referring now to FIG. 43A, an example flow diagram illustrating the automated claim submission and status update process is depicted in accordance with an embodiment of the present disclosure. The workflow 4300 ensures seamless submission, real-time tracking, and efficient management of claims, thereby optimizing reimbursement cycles and reducing administrative overhead.

The process begins with claim generation 4302, wherein billing data is processed and converted into an FHIR claim. This ensures that the claim includes all necessary information, such as patient demographics, provider details, service codes, and billing classifications, while also ensuring compliance with payer-specific formatting and submission requirements. By utilizing the FHIR standard, the system enhances interoperability and standardization, facilitating smoother transactions between healthcare providers and payers.

Once the claim is generated, it is submitted to the payer or clearinghouse 4304 for processing. The FHIR claim is transmitted directly to insurance companies (payers) or clearinghouses, which act as intermediaries for multi-payer integration. For instance, a psychologist submitting a claim for CPT Code D (Cognitive Assessment) can do so through this automated process, ensuring that all required data is properly structured and transmitted for swift review.

Following submission, the system initiates a claim status query 4306, periodically checking the status of the submitted claim by querying the FHIR server. This enables real-time tracking of claim progress and ensures that providers are promptly informed of their claim's status. The system categorizes claims into three possible states:

Pending—The claim is under review by the payer.

Approved—The claim has been successfully processed and is ready for invoicing and payment.

Rejected—The claim has been denied and requires correction before resubmission.

To facilitate further processing, the system retrieves the FHIR claim response resource 4308, which contains detailed feedback from the payer regarding the claim status. This resource provides insights into whether the claim has been approved, rejected, or remains pending for additional review. In cases where a claim is rejected, the claim response resource provides specific error messages, allowing the billing team to identify and correct issues efficiently.

Subsequently, the claim status is updated on the system dashboard 4310, providing billing teams with real-time visibility into claim progress. The dashboard enables efficient monitoring, ensuring that approved claims proceed to invoicing workflows, while rejected claims are flagged for immediate review and correction. This centralized tracking system reduces administrative burden and ensures that billing teams can manage claims more effectively.

If a claim is rejected, the system automatically flags it for correction 4312, leveraging the error details from the claim response resource to provide actionable insights for resolution. For instance, if a claim is rejected due to a missing policy number, the system immediately alerts the billing team, prompting them to update the claim and resubmit it. This proactive approach reduces claim denials and improves reimbursement rates.

The automated claim submission and tracking workflow ensures efficient claim processing, minimizes errors, and accelerates reimbursements. By integrating FHIR-based claim generation, real-time tracking, and intelligent error handling, the system streamlines revenue cycle management, enabling healthcare providers to reduce administrative workload, enhance billing accuracy, and optimize financial performance.

Figure 44A:
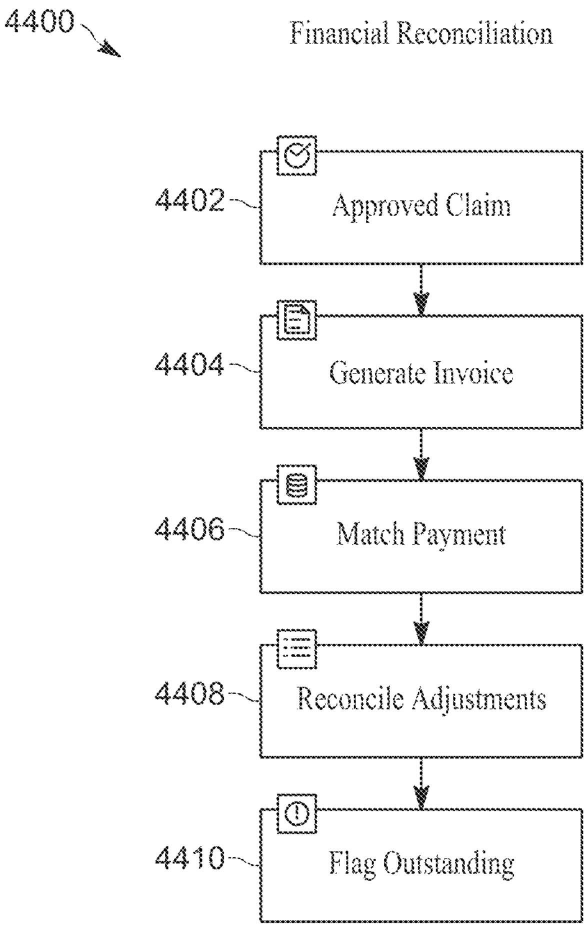
FIG. 44A illustrates an exemplary flow diagram of a financial reconciliation workflow, according to aspects of the present disclosure.

Referring now to FIG. 44A, an example flow diagram illustrating the financial reconciliation workflow is depicted in accordance with an embodiment of the present disclosure. The workflow 4400 ensures that approved claims are accurately processed, invoices are generated, payments are reconciled, and outstanding balances are efficiently managed, thereby optimizing the revenue cycle and ensuring financial accuracy.

Upon claim approval 4402, the system transitions the claim into the financial reconciliation process. This step ensures that the payer has successfully processed the claim and that it is ready for invoicing without requiring further corrections or resubmissions. The approved claim data serves as the foundation for subsequent financial transactions, ensuring that validated claims proceed to billing and revenue processing.

Once a claim is approved, the system generates an invoice 4404 based on the approved claim details. The invoice contains essential billing information, including the billed amount, expected payment due date, and payer details. This structured invoicing approach ensures clear and accurate financial records, reducing errors in payment processing. Additionally, all invoices are stored in Dataverse, enabling centralized tracking, auditing, and financial reporting.

Following invoice generation, the system matches payments 4406 received from payers with corresponding invoices. This reconciliation process involves reviewing the Explanation of Benefits (EOB) to validate payment details, applying any adjustments (such as credits, refunds, or partial payments), and ensuring that invoice amounts align with received payments. The clinical assessment system 100 may automate this matching process, minimizing manual errors and improving efficiency in financial operations.

If discrepancies arise, the system reconciles adjustments 4408 to address underpayments, overpayments, or denied claims. Underpayments are flagged for follow-up, ensuring that providers receive the correct reimbursement amount. Overpayments are identified, and in some examples, refunds or balance adjustments are processed. Additionally, in cases where payments are reduced due to denials or deductions, the system reviews the reasons for adjustment, providing transparency and enabling appropriate resolution measures.

In cases where payments do not fully cover the invoiced amount, the system 100 flags outstanding balances 4410 and triggers automated alerts for necessary follow-up actions. These actions may include sending reminders to payers for unpaid amounts, escalating overdue invoices for further review, or coordinating with collections teams if required. By automating outstanding balance tracking and follow-up, the system ensures that unresolved financial issues are promptly addressed, reducing revenue leakage and improving cash flow management.

The financial reconciliation workflow provides a structured, automated approach to claim approval, invoicing, payment matching, and outstanding balance resolution. By leveraging data validation, automated payment reconciliation, and proactive issue flagging, this workflow enhances financial accuracy, optimizes revenue cycles, and ensures compliance with payer reimbursement policies within the billing system.

Figure 45:
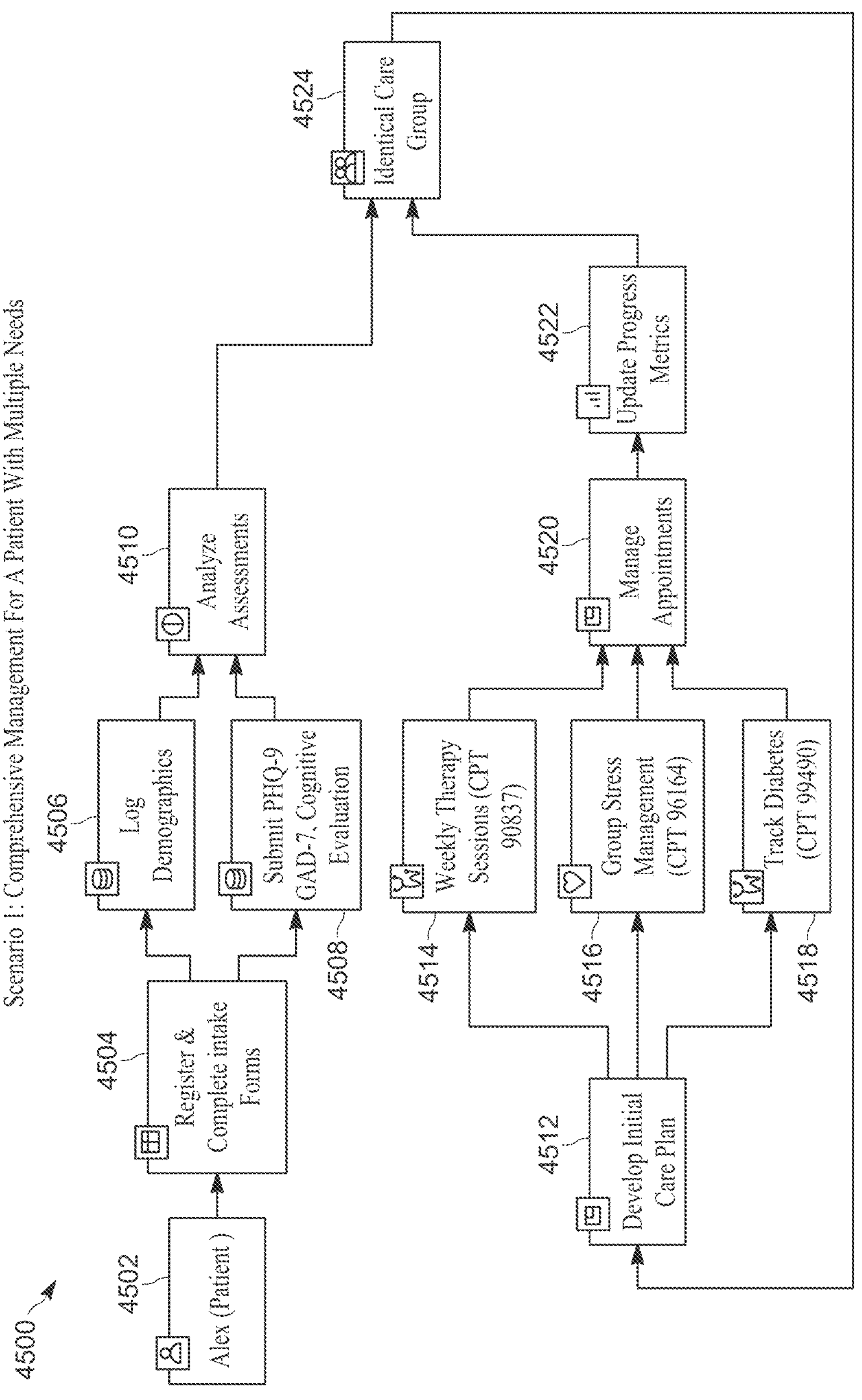
FIG. 45 illustrates an exemplary use case scenario for comprehensive management of a patient, according to aspects of the present disclosure.

Referring now to FIG. 45, an example use case scenario 4500 for the comprehensive management of a patient, is illustrated, in accordance with an example embodiment of the present disclosure. Alex (i.e., a patient), has multiple medical and mental health needs, including severe anxiety, Type 2 diabetes, and cognitive impairment. This workflow demonstrates the seamless integration of multiple service lines, AI-powered recommendations, and coordinated care to ensure holistic management of Alex's conditions.

The workflow includes receiving completed intake forms 4504 from Alex 4502 through a patient-facing interface. These forms collect, for example, health history, demographics, and preliminary details, which are then logged into the log demographics system 4506. The process may include receiving a series of completed assessments 4508, including PHQ-9, GAD-7, and a cognitive evaluation. The assessment results, such as a high GAD-7 score of 19, are analyzed 4510, triggering notifications for necessary interventions, such as a psychiatric evaluation and enrollment in Chronic Care Management (CCM).

Based on the collected data and assessments, an initial care plan is created 4512. This care plan outlines specific interventions, such as weekly therapy sessions for anxiety 4514 (CPT 90837), group stress management sessions 4516 (CPT 96164), and diabetes monitoring and education 4518 (CPT 99490). The care plan is tailored to address Alex's physical and mental health needs holistically, combining psychiatric services, lifestyle interventions, and chronic care management. Throughout the process, appointments are managed 4520 to ensure Alex has access to scheduled sessions and evaluations. Progress metrics are updated 4522 in real-time to monitor his outcomes across various parameters, such as anxiety improvement and diabetes control. The system utilizes these metrics to identify trends, such as plateauing improvements and recommends adjustments to the care plan. For example, AI-powered analysis suggests increasing therapy frequency and incorporating family counseling to better address Alex's anxiety. The workflow integrates Alex into an identical care group 4524 to provide peer support and shared experiences, which are beneficial for managing his stress and anxiety. Updates to his care plan and interventions are logged and monitored continuously to ensure that his treatment remains adaptive and responsive to his evolving needs.

Figure 46:
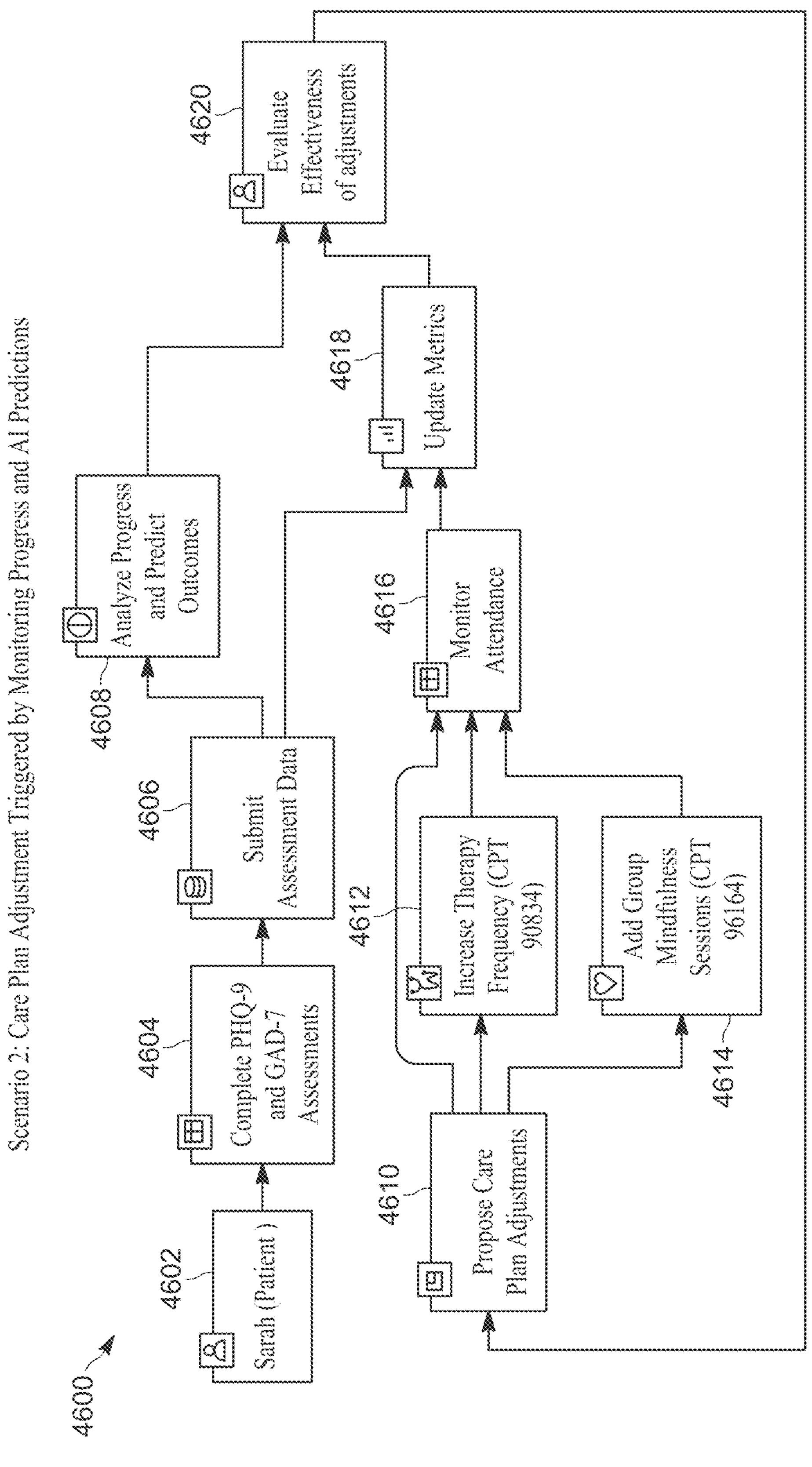
FIG. 46 illustrates an exemplary scenario highlighting a care plan adjustment process, according to aspects of the present disclosure.

Referring now to FIG. 46, an example scenario 4600, highlighting a care plan adjustment process triggered by monitoring patient progress and AI-based predictions, is illustrated, in accordance with an example embodiment of the preset disclosure. This scenario focuses on Sarah, a patient whose progress stagnates, necessitating a reassessment and tailored modifications to her care plan to achieve better outcomes. The workflow integrates patient assessments, AI-generated recommendations, and care team interventions, ensuring seamless tracking and evaluation.

The process includes receiving completed PHQ-9 and GAD-7 assessments 4604 from Sarah 4602, which are integral to tracking her mental health progress. These assessments are submitted 4606 using a patient-facing interface, and the results are logged into the system. The data undergoes a thorough analysis 4608, where the system evaluates Sarah's progress and predicts outcomes based on historical data, current metrics, and predictive analytics models. Based on the analysis, the system identifies the need for adjustments due to stagnation or lack of significant improvement. The care plan adjustment process 4610 is initiated, where the AI system suggests actionable modifications, such as increasing the frequency of therapy sessions 4612 (CPT 90834) and incorporating group mindfulness sessions 4614 (CPT 96164). These adjustments are tailored to Sarah's specific needs and historical patterns of responsiveness to interventions.

Once the proposed adjustments are approved, implementation is closely monitored 4616 to ensure Sarah attends the newly scheduled sessions and adheres to her updated care plan. Attendance and engagement data are logged and tracked in real-time, providing the care team with immediate visibility into her compliance and progress. The system continuously updates metrics 4618 related to Sarah's progress, which are visualized through dashboards for both care teams and administrators. This feedback loop enables timely evaluations of the effectiveness of the adjustments. If necessary, further modifications are made to the care plan to optimize outcomes. Finally, the effectiveness of the adjustments is thoroughly evaluated 4620. This involves comparing updated metrics with initial baselines to measure improvements and identify remaining challenges. The evaluation ensures that Sarah's care remains dynamic and responsive to her evolving needs.

Figure 47:
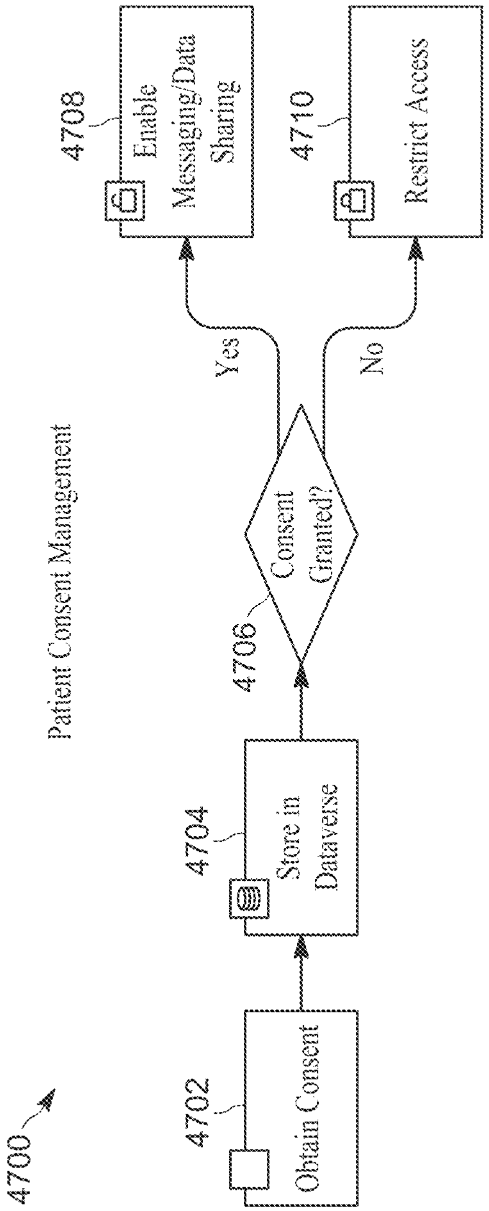
FIG. 47 illustrates an exemplary flow chart of a patient consent management workflow, according to aspects of the present disclosure.

Referring now to FIG. 47, an example flow diagram illustrating the patient consent management workflow is depicted in accordance with an embodiment of the present disclosure. The workflow 4700 ensures that patient privacy preferences are accurately recorded, enforced, and managed, thereby enabling compliance with regulatory requirements such as HIPAA and GDPR while allowing patients to control how their health data is shared.

In the initial step, the system prompts patients to review and provide consent regarding the sharing of their health data 4702. This consent can be obtained through multiple mechanisms, including privacy settings within the patient app, consent forms during patient registration, or explicit requests for third-party data sharing. By offering patients the ability to opt in or out of sharing their health information, the system ensures that data access aligns with patient preferences and regulatory obligations.

Once a patient makes a consent decision, the system securely records the consent status in dataverse 4704. This storage mechanism ensures that all consent records are maintained in real-time, allowing the system to track and enforce patient preferences dynamically. Any updates to the consent status are immediately reflected within the system, ensuring that data access permissions remain up to date and aligned with patient-authorized usage.

Before allowing data access, the system verifies the stored consent status 4706. If consent is granted, the system enables data sharing and messaging with authorized third-party payers, allowing secure API access for retrieving patient data in compliance with the patient's authorization 4708. Conversely, if consent is denied, the system restricts data access to external entities, ensuring that third-party payers cannot retrieve patient information 4710. In such cases, API access is automatically disabled, and any unauthorized access attempts are blocked and logged for security tracking.

For example, if a patient logs into the patient app and opts out of sharing their data with third-party payers, the system updates their consent record in dataverse. Any future attempts by external entities to access the patient's data are subsequently blocked and logged, ensuring that patient privacy settings are strictly enforced.

The patient consent management workflow provides a secure, transparent, and regulatory-compliant method for handling patient data-sharing preferences. By integrating real-time consent tracking, automated enforcement, and security logging, this workflow enhances patient autonomy, prevents unauthorized data access, and ensures adherence to data protection regulations within the healthcare ecosystem.

In some embodiments, the system 100 includes a workflow management and optimization module designed to enhance the efficiency of care teams by tracking their performance, distributing tasks effectively, and supporting their professional development. By leveraging advanced analytics and automation, this module ensures that care teams maintain high standards of patient care while optimizing productivity.

One example aspect of this module is care team performance dashboards, which provide real-time insights into team efficiency and workload distribution. Through dashboards, administrators can monitor metrics such as time spent on patient tasks, task completion rates, and patient caseloads per team member. These insights help ensure a fair distribution of work, prevent burnout, and identify areas for improvement. The system also tracks key performance indicators (KPIs), such as time per task, patient satisfaction scores, and task escalation frequency, allowing for data-driven performance evaluations and comparisons across different teams and service lines.

Task Distribution and Escalations is another essential feature, ensuring that workloads are assigned fairly and overdue tasks are promptly addressed. Using clinical assessment system 100, tasks are automatically allocated based on team members' roles, availability, and workload. For example, psychiatrists are assigned psychiatric evaluations, while health coaches handle wellness interventions. If tasks remain incomplete or become overdue, the system triggers escalation workflows to reassign or prioritize them, ensuring that critical patient care activities are never delayed.

To further optimize workforce efficiency, the system includes workforce optimization through time tracking, which logs time spent on each patient-related task. The timetracker ensures that all time is accounted for-whether billable or non-billable-allowing administrators to analyze workflow efficiency. Dashboards highlight trends in task completion times and idle periods, enabling care managers to refine scheduling and reduce downtime.

Training and professional development is another example component, ensuring that care teams remain compliant with certifications and receive ongoing education. The system tracks certifications and licenses, sending automated alerts when renewals or training are needed. Additionally, it provides role-specific training pathways, ensuring that psychiatrists, health coaches, and other professionals receive targeted learning opportunities. Dashboards monitor training progress, helping administrators support team members in meeting their professional development goals.

Lastly, the module integrates compensation and workforce productivity alignment, linking productivity data with payroll to ensure fair and efficient compensation. Time-tracking data determines productivity-based pay, with system 100 generating payroll files that integrate with accounting software like QuickBooks. Administrators can analyze compensation trends and resolve discrepancies, ensuring that employees are paid fairly while maintaining cost-effective operations.

The workforce management and optimization module streamlines care team operations by integrating performance tracking, automated task management, time tracking, training monitoring, and compensation alignment. By leveraging data-driven insights and automation, this system helps care teams work more efficiently, improve patient outcomes, and maintain high-quality care standards while supporting their professional growth.

In some embodiments, the system includes a Population Health Management (PHM) module designed to help care teams monitor and improve the health of entire patient populations by tracking trends, identifying high-risk individuals, and optimizing preventive care strategies. This system enables proactive healthcare management, ensuring that interventions are tailored to the needs of different patient groups to improve long-term health outcomes.

One example function of the PHM module is risk stratification, which classifies patients into different risk levels based on their assessment scores, care plans, and health outcomes. The system automatically identifies high-risk patients—such as those with worsening depression or anxiety scores, or those missing critical interventions—and alerts care teams to intervene. It uses risk-scoring algorithms, patient history analytics, and customizable parameters to refine risk categorization, ensuring that care is personalized and targeted.

Another example feature is preventive care analytics, which leverages data insights to design early intervention programs that reduce the likelihood of chronic mental and/or physical health conditions. The system, through dashboards, helps care teams analyze population-level trends, such as the success rates of lifestyle interventions and health patterns across demographic groups. This allows care teams to implement preventive strategies-like lifestyle coaching or routine mental health check-ins—to support patients before their conditions worsen. System, 100 also facilitates automated reminders for preventive care activities, such as scheduling wellness sessions or lifestyle interventions.

For patients with chronic mental and/or physical health conditions, the chronic disease management component ensures continuous monitoring of adherence to treatment plans and/or therapy sessions. For example, the system 100 flags signs of non-compliance, such as missed appointments or deteriorating mental or physical health scores, so care teams can adjust interventions proactively. The clinical assessment system 100 triggers alerts when adherence issues arise, and dashboards visually represent patient progress over time, allowing care managers to make data-driven adjustments to care plans.

The PHM module also provides real-time reporting and analytics to help care teams track population health and allocate resources effectively. Dashboards display risk distributions, intervention success rates, and adherence trends, allowing administrators to optimize staffing and funding decisions. These insights enable healthcare providers to prioritize high-risk patients, improve service delivery, and ensure that healthcare resources are used efficiently.

The PHM module in the clinical assessment system 100 enhances proactive care by integrating risk assessment, preventive care planning, and chronic disease management. By using data-driven insights and automated workflows, the system supports care teams in improving both individual patient outcomes and overall population health, leading to more effective and efficient healthcare management.

Methods

Figure 48:
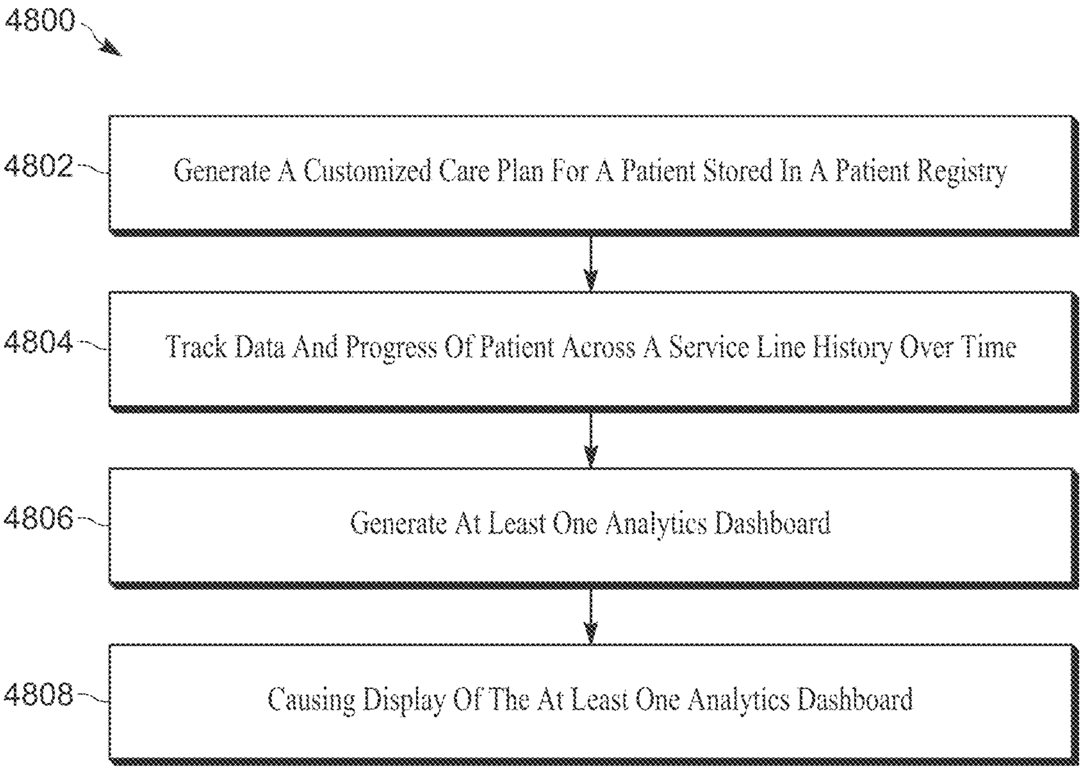
FIG. 48 illustrates a flow chart for managing patient care workflow, according to aspects of the present disclosure.

Referring to FIG. 48, a flowchart of a method 4800 for managing patient care workflows is provided. The method 4800 may be a computer-implemented process for managing patient care workflows operating on the clinical assessment system 100. For example, the method 4800 may be carried out on clinical assessment system 100 using one or more processors 132 and memory 130.

At block 4802, the method 4800 may include generating a customized care plan for a patient stored in a patient registry. For example, the patient registry may include patient information such as demographic details, payer details, assigned care teams, and service line history, as described elsewhere herein.

In general, a customized care plan may tailor healthcare services based on the patient's specific medical history, diagnosis, treatment needs, and preferences. The patient registry (e.g., patient data repository 106) may act as a central repository where healthcare providers can access and update treatment plans, ensuring coordinated and consistent care. By structuring care plans in a digital format, the clinical assessment system 100 enhances efficiency and reduces the chances of miscommunication between healthcare teams.

In some embodiments, generating a customized care plan can include first performing an assessment/testing process for a service line for the patient. For example, the method 4800 may further include obtaining results of an administered psychological test and/or clinical data assessment and/or other patient assessments (e.g., PHQ-9, GAD-7, cognitive assessments, and/or lifestyle evaluations). The obtained results may be used to clinical assessment system 100 At block 4804, following the creation of the care plan, the clinical assessment system 100 includes tracking data and progress of the patient across a service line history over time. The tracked data may include at least one service duration, session notes, and billing of a practitioner according to care provided to the patient. In some examples, the tracked data may further include various service-related data, including, but not limited to service duration, session notes, and billing information. Service duration helps in monitoring resource utilization, while session notes provide a record of diagnoses, treatment updates, and observations made by practitioners. Additionally, tracking billing information ensures transparency in financial transactions, allowing for proper reimbursement and compliance with healthcare regulations.

The tracking of the progress of the patient across a service line history over time may include tracking the journey of the patient. The patient journey may include phases such as an onboarding phase, an assessment phase, and a collaborative phase where patients engage with the personalized care plan while receiving treatments and lifestyle support, and an ongoing support and monitoring phase.

Example service lines may include, but are not limited to psychiatry service line, psychotherapy/care management service line, lifestyle psychiatry service line, assessment and testing service line, chronic care management (CCM) service line, and a referral care service line. The psychiatry service line may provide psychiatric treatment and medication management, overseen by the psychiatrist. This service line serves patients that have medication adjustments and psychiatric evaluations. The psychotherapy/care management (licensed psychotherapist) service line may focus on providing psychotherapy and managing care plans for patients, ensuring that both mental health and lifestyle interventions are integrated. The lifestyle psychiatry service line may be overseen by the health coach in collaboration with the psychotherapist. This service line focuses on integrating lifestyle interventions such as diet, exercise, and stress management into mental health care. The assessment and testing service line may be administered by the psychological testing technician and the clinical data specialist. This service line provides comprehensive assessments, including psychiatric evaluations (e.g., PHQ-9, GAD-7), cognitive assessments, and lifestyle evaluations. The results may guide the care planning process. The CCM service line may be responsible for coordinating long-term care and monitoring across other service lines. The CCM service line ensures that all care plans, assessments, and interventions are continuously managed and adjusted according to rules and clinician input. The referral care service line may be managed by a care coordinator. This service line handles patient referrals to external specialists, ensuring continuity of care across different providers (e.g., sleep specialists, nutritionists, etc.). The holistic patient care service line ensures that each patient is assigned a multidisciplinary care team that includes a psychiatrist, licensed psychotherapist (care manager), health coach, care coordinator, and clinical data specialist. these roles collaborate to create personalized care plans that integrate psychiatric treatment, psychotherapy, and lifestyle modifications. The testing and monitoring service line ensures regular assessments are performed through the testing and monitoring service line, overseen by the psychological testing technician and supported by the clinical data specialist. The assessments may include mental health tools like PHQ-9 and GAD-7, as well as lifestyle evaluations (e.g., sleep, stress, diet). The results may be shared with the care team for real-time adjustments to the care plan.

A CPT code (or other standardized procedure code or code representative of a service event or a line item for a healthcare procedure) integration service line or system may support claims management through the integration of CPT codes/codes for psychiatric evaluations, psychotherapy, patient self-education, and team-based care conferences. This may ensure that interventions are accurately tracked and billed.

At block 4806, once this data is collected, at least one analytics dashboard is generated. The at least one analytics dashboard may provide healthcare providers a centralized platform to visualize patient progress, service utilization trends, and financial metrics. This dashboard aids in informed decision-making by providing real-time insights into patient care effectiveness and operational efficiency. The dashboard may include one or more of patient outcomes, referral effectiveness, and team performance metrics. Such content may be visualized in near real time based at least in part on the customized care plan, the tracked data, and the tracked progress of the patient.

The at least one analytics dashboard may include any combination of the dashboards described herein. For example, the clinical assessment system 100 may generate adherence dashboards that provide care teams with a visual representation of patient adherence over time, highlighting trends that may indicate worsening conditions or lapses in care. This allows the team to adjust treatment plans proactively.

The clinical assessment system 100 may further generate patient history dashboards for long-term monitoring of chronic conditions, ensuring that care teams can track patients' progress over months or years. These patient history dashboards provide a comprehensive view of a patient's mental health journey, physical health journey, or the like highlighting milestones, relapses, and recovery periods.

The clinical assessment system 100 may generate health metric dashboards that may obtain data from wearables, which may allow care managers to monitor patient health trends over time. Alerts can be triggered if a patient's health metrics fall outside of the defined thresholds, enabling early intervention.

The system 100 may generate patient engagement dashboards to provide a comprehensive view of the patient including, but not limited to adherence to lifestyle goals (e.g., track how consistently patients are meeting their lifestyle intervention goals, completing exercise sessions, logging food intake, etc.); completion of educational modules (e.g., assess how actively patients are engaging with educational resources and learning modules); and patient check-in rates (e.g., track how often patients engage with care teams or check-in through the patient portal.

The system 100 may generate patient trends dashboards to provide insights on one or more of patient improvement trends based on successive assessments, including mental health metrics, physical health metrics, and wellness goals; distribution of patients within specific score ranges for psychiatric conditions and wellness markers like stress reduction and mindfulness adherence; and outcomes linked to specific care plans, showing how medical interventions (e.g., psychiatric and physiological) and lifestyle interventions impact overall health.

The system 100 may generate dashboards that track wellness progress for patients, such as mindfulness course completion rates and engagement in lifestyle interventions, alongside psychiatric task completion. The system 100 may generate dashboards for providing insight into claims and/or billing. For example, a dashboard may be generated to offer insights into total claims submitted, percentage of claims paid, total revenue generated, and outstanding claims. This allows for data-driven decision-making around service lines and resource allocation.

The system 100 may generate role-specific dashboards that provide insights relevant to each user's role. For instance. For example, care managers will see task completion rates and patient progress, while health coaches will have dashboards focused on wellness goals and patient adherence to lifestyle changes. This ensures that team members are exposed to data that is directly relevant to their responsibilities, improving efficiency and reducing data overload, while blocking other extraneous data. The system 100 may generate dashboards to track system health and care team performance in real time. Such dashboards may track system health (e.g., workflow efficiency, data synchronization, task delays). This helps detect and resolve performance issues before they impact patient care. Tracking system health and care team performance can provide a proactive monitoring system to flag potential issues, such as delayed task escalations or data synchronization errors, before they impact patient care.

At block 4808, the method 4800 further includes causing display of the at least one analytics dashboard. The at least one analytics dashboard may be encrypted and accessible for view according to predefined patient permissions. For example, the at least one dashboard may be triggered (with permissions) to display key performance indicators/metrics, including patient outcomes, referral effectiveness, and team performance evaluations. These metrics help assess the success of care plans, determine the impact of referrals on treatment, and evaluate healthcare staff productivity. By presenting these insights, the system supports continuous improvement in patient care, provider efficiency, and overall healthcare service quality.

The encryption of such dashboards/information in the dashboards may safeguard sensitive patient information by implementing end-to-end encryption. Encryption ensures that patient records remain confidential and secure, protecting them from unauthorized access and tampering. This security measure enhances compliance with healthcare regulations such as HIPAA and fosters trust between patients and healthcare providers.

In some embodiments, the method 4800 further includes matching the at least one service duration and the care provided to the patient with one or more Current Procedural Terminology (CPT) codes. For example, the system 100 may track/monitor data over a patient journey or service duration and once care is provided, the system 100 tracks service duration, session notes, and billing information. The system, 100 then matches the provided services with the appropriate Current Procedural Terminology (CPT) codes to ensure accurate billing and compliance.

The system 100 may further provide access to a centralized repository to manage patient assessments, care plans, claims, and billing records. The method 4800 may further include receiving from a clinician interface, billable service entries representing the care provided to the patient and generating, based on the billable service entries, a corresponding Fast Healthcare Interoperability Resources (FHIR)-compliant claim containing patient details, provider information, and the CPT codes (or other standardized procedure code or code representative of a service event or a line item for a healthcare procedure) matched to the care provided to the patient. The claim may then be validated for completeness and compliance and submitted to a payer or clearinghouse. In response to the submission, the system 100 may receive and process any claim responses and update the claim registry.

By way of example, as care progresses, the system 100 continuously monitors the patient's progress across various service lines, and real-time analytics dashboards are generated based on the customized care plan, tracked data, and overall patient progress. These dashboards visualize metrics such as patient outcomes, referral effectiveness, and team performance, ensuring that care teams and administrators have a comprehensive view of operations. The system 100 also facilitates claims processing by receiving billable service entries from clinicians and generating corresponding FHIR-compliant claims. Each claim undergoes validation to ensure completeness and compliance before being submitted to payers or clearinghouses. To minimize rejections, the system cross-references CPT codes (or other standardized procedure code or code representative of a service event or a line item for a healthcare procedure) with payer policies. In cases where claims are rejected, the system identifies missing fields or incorrect codes, classifies errors based on severity, and either auto-corrects minor issues or flags manual corrections before resubmitting the claim for approval.

In addition to claims management, the system efficiently handles patient referrals by assigning them based on provider availability, specialization, and patient needs. It also ensures that pending referrals are followed up on and flags unresolved cases for manual intervention. Real-time notifications are sent to specialists, referring clinicians, and patients, keeping all stakeholders informed about updates. Once claims are approved, the system generates invoices, matches received payments with the corresponding invoices, and identifies adjustments or discrepancies. Any outstanding balances are flagged for escalation and further action.

The system 100 may further assess and classify rejected claims based on error severity, distinguishing between minor auto-correctable errors and manually correctable errors. The system 100 may then correct rejected claims based on the classifying. The correction process may include automatically generating missing data for the missing fields or performing one or more suggested manual modifications classified as a manually correctable error. Upon completion of the correction, the system 100 may resubmit corrected claims to payers or clearing houses after validation.

In some embodiments, the method 4800 may further include receiving patient referrals and storing, updating and managing the patient referrals within the centralized repository. The method 4800 may further include assigning one or more of the received patient referrals based on provider availability, specialization, and patient needs, triggering follow-ups for pending referrals and flagging unresolved cases for manual intervention associated with one or more of the received patient referrals. The method 4800 may further include providing a real-time notification that alerts at least one of an assigned specialist, referring clinician, and the patient of the triggered follow-ups.

Task management is another component of the process flow of method 4800. The system 100 assigns tasks to clinicians based on workload balancing and availability, ensuring equitable distribution. If tasks become overdue, they are flagged and reassigned as needed. Real-time updates on pending patient referrals, claims, and follow-ups are continuously provided, with alerts notifying users of pending tasks, due dates, and urgent follow-ups. Furthermore, before sharing any patient data, the system verifies patient consent preferences using the patient registry. Unauthorized access attempts are blocked, and audit logs are generated to ensure regulatory compliance.

Throughout this workflow, compliance auditing tools track user activities, maintain adherence to regulatory standards such as HIPAA and HITECH, and generate necessary compliance reports. As illustrated in FIG. 48, the system integrates automation, analytics, and security measures to optimize patient care, streamline administrative workflows, and ensure operational transparency. This comprehensive process ensures efficiency, regulatory adherence, and improved patient outcomes.

Figure 49:
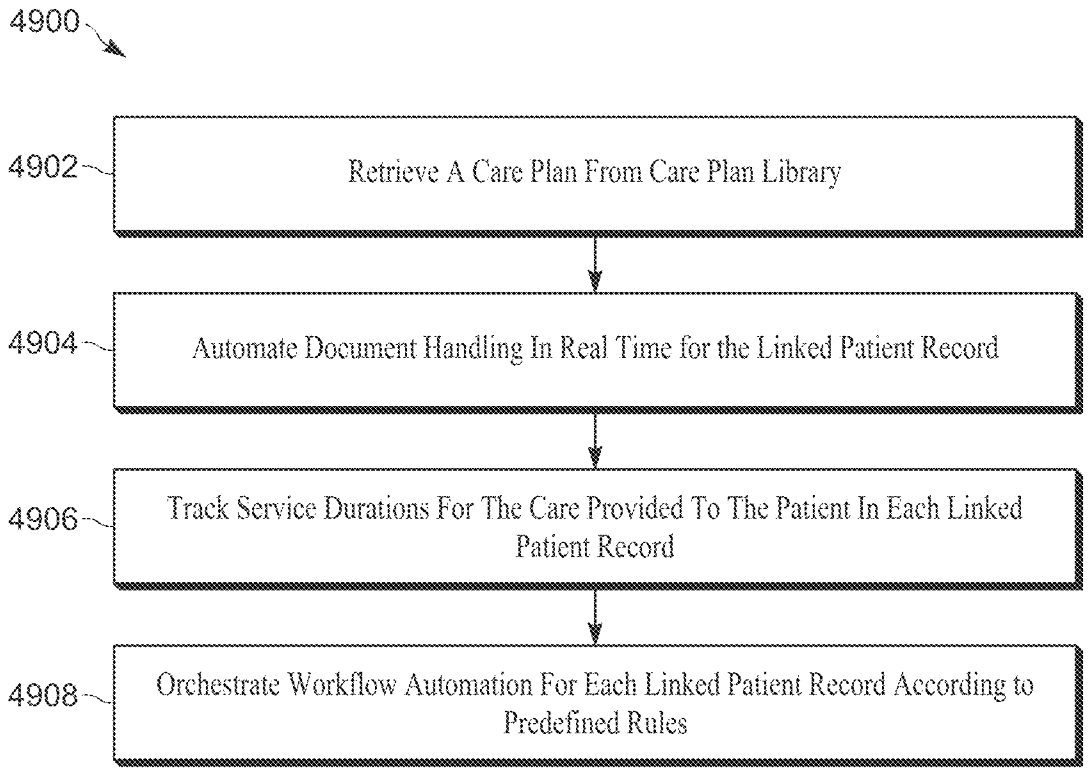
FIG. 49 illustrates a flow chart of a method for generating a patient-specific clinical assessment, according to aspects of the present disclosure.

Referring to FIG. 49, a method 4900 for managing patient care plans, automated document handling, tracking service duration, and orchestrating workflow automation based on predefined rules is provided. The workflow automation may orchestrate data for a patient or subject from a time of receiving care to a time of submitting a claim for such care.

At block 4902, the method 4900 begins with retrieving a care plan from a care plan library 154. The care plan library 154 serves as a repository containing standardized or customized care plans based on various medical conditions, treatment protocols, and patient needs. By selecting an appropriate care plan from this library, healthcare providers ensure that each patient receives a structured and evidence-based treatment approach. This step reduces the time utilized for care planning and promotes consistency in treatment across multiple cases.

At block 4904, the clinical assessment system 100 automates document handling in real-time for the linked patient record. This automation ensures that medical documents, including prescriptions, lab reports, consultation notes, and treatment histories, are automatically updated, categorized, and linked to the corresponding patient record. Real-time document handling minimizes manual data entry errors, streamlines administrative tasks, and ensures that all relevant information is readily accessible to healthcare professionals for informed decision-making.

At block 4906, the clinical assessment system 100 tracks service durations for the care provided to the patient in each linked patient record. Tracking service durations allows healthcare providers and administrators to monitor the time spent on various medical procedures, consultations, and therapies. This information is valuable for evaluating treatment efficiency, optimizing resource allocation, and ensuring compliance with healthcare billing regulations. Service duration tracking also supports performance analysis by providing insights into how different treatments impact patient outcomes over time.

At block 4908, the method 4900 involves orchestrating workflow automation for each linked patient record according to predefined rules. Workflow automation ensures that care processes are executed in a structured manner, reducing delays and inconsistencies in treatment delivery. Predefined rules can include guidelines for treatment escalation, medication reminders, follow-up appointment scheduling, and compliance checks. By automating workflows, healthcare providers can enhance coordination, improve patient engagement, and achieve better healthcare outcomes while minimizing administrative overhead.

The care plan library 154 contains pre-defined templates that are dynamically customized based on patient-specific data stored in the patient registry. Once the care plan is retrieved, the system automates document handling in real-time, ensuring that all relevant records—including care plans, assessment data, progress reports, and claims records—are generated or updated as necessary.

For both method 4800 and method 4900, as the patient receives care, the system 100 tracks service durations, logging the time spent by healthcare providers and associating it with standardized billing codes. The time tracking and billing module records these billable minutes to ensure accurate reimbursement and compliance with payer requirements. The clinical workflow engine then orchestrates workflow automation, which involves automatically generating claims based on the tracked service durations and matching them with the appropriate billing codes.

Once claims are generated, the clinical workflow engine processes them according to predefined rules. This includes validating claims for accuracy, tracking associated care referrals, and escalating tasks if issues arise during processing. Additionally, the system generates real-time reports containing referral tracking metrics and team performance analytics to enhance operational oversight.

To maintain compliance, the clinical workflow engine establishes an audit trail, recording all workflow automation activities. This audit trail is stored within the patient registry and practitioner registry, ensuring regulatory adherence and providing administrators with traceable logs for compliance tracking.

The system also submits claims in Fast Healthcare Interoperability Resources (FHIR)-compliant formats to external payer systems. Before submission, claims are verified against payer-specific rules, such as Current Procedural Terminology (CPT) code restrictions and Medically Unlikely Edits (MUE) limits, to minimize errors. Payer responses are then received, categorized, and processed for approval tracking, resubmissions, and financial reconciliation.

If claims are rejected, the clinical workflow engine categorizes them based on error types and triggers automated resubmission workflows after generating corrected claims. The error resolution process involves identifying missing fields, incorrect CPT codes (or other codes), or payer-specific compliance issues. The system classifies rejected claims by error severity, distinguishing between minor auto-correctable issues and major errors requiring manual review.

Auto-filling missing data or suggesting manual modifications ensures efficiency in claim corrections before resubmission.

In addition to claims processing, the system handles patient referrals, which are stored, updated, and managed within a centralized database. Referrals are dynamically assigned based on provider availability, specialization, and patient needs. To prevent delays, the system triggers follow-ups for pending referrals and flags unresolved cases for manual intervention. Real-time alerts notify assigned specialists, referring clinicians, and patients about referral status updates. If referrals exceed a predefined wait time, the system generates clinician notifications for expedited handling.

The method 4800 may further include financial reconciliation. Once a claim is approved, the system creates invoices, reconciles payments using Explanation of Benefits (EOB) data, and processes denials or underpayments. If unpaid invoices remain, the system flags them and triggers automated follow-ups for overdue payments, ensuring streamlined revenue cycle management.

As used herein, the term "CPT code" may refer to a United States insurance and or healthcare system of codes or other standardized procedure code or code representative of a service event or a line item for a healthcare procedure. Other codes are of course possible and may directly replace the term "CPT code" with a different healthcare system of codes or other standardized procedure code or code representative of a service event or a line item for a healthcare procedure represented in another country. While the United States healthcare and insurance systems utilize particular codes/CPT codes, other jurisdictions use different procedures and/or billing codes, which are also contemplated to work with the systems and methods described herein.

Figure 50:
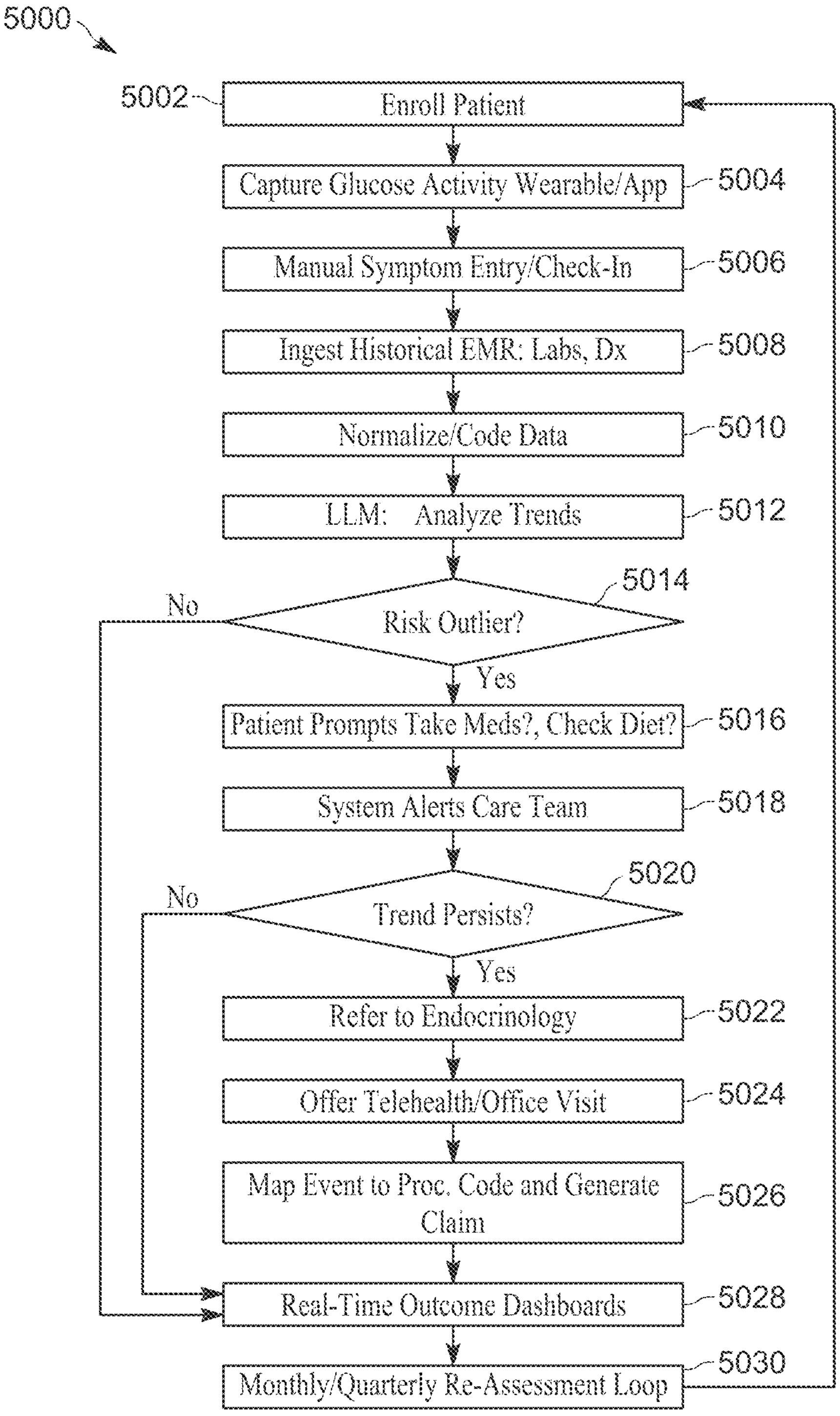
FIG. 50 illustrates an exemplary flow chart of a method for utilizing the clinical assessment system for a patient managing diabetes, according to aspects of the present disclosure.

FIG. 50 illustrates an example flow chart of a method for utilizing the clinical assessment system 100 for a patient managing diabetes. The method 5000 describes an intelligent, closed-loop system for patient monitoring and intervention, particularly suitable for managing chronic conditions such as diabetes. The method 5000 begins with patient enrollment (step 5002), wherein the patient is registered into the platform and linked with relevant health data sources as described elsewhere herein. Following enrollment, the clinical assessment system 100 initiates data capture through a wearable device or mobile application to continuously monitor glucose activity (step 5004). Patients can optionally manually input symptoms or conduct self-check-ins using an interface designed for real-time data supplementation (step 5006).

To provide a comprehensive clinical view, the clinical assessment system 100 also ingests historical electronic medical records (EMRs), including laboratory results and diagnostic codes (step 5008). The collected data—both real-time and historical—are normalized and coded into a standardized format for processing (step 5010). A large language model (LLM) or similar AI-based engine then analyzes this unified dataset to detect trends, anomalies, or clinical red flags (step 5012).

Upon completing the trend analysis, the system 100 determines whether the patient qualifies as a risk outlier (step 5014). If no risk is detected, the clinical assessment system 100 continues its monitoring cycle. If a risk is identified, the clinical assessment system 100 initiates a patient-directed intervention by prompting the user to confirm medication adherence, check dietary compliance, or review lifestyle factors (step 5016). If further action is warranted, the system 100 may optionally escalate the issue by alerting the care team (step 5018). If a risk is not identified, the system 100 may jump to step 5028 to generate an update, data, or message about the lack of risk.

A subsequent check evaluates whether the clinical trend persists over time (step 5020). If the trend stabilizes, the patient returns to the general monitoring flow. However, if the trend continues, the patient is referred to a specialist, such as an endocrinologist (step 5022), and offered either a telehealth session or an in-office consultation (step 5024).

Once the event is clinically processed, the system 100 maps the event to the appropriate procedural code for billing purposes and generates a claim associated with the event (step 5026). Outcomes and system actions are visualized through real-time dashboards for clinicians and administrators (step 5028). Finally, the system includes a structured re-assessment loop (step 5030), scheduled on a monthly or quarterly basis, to evaluate ongoing trends and update patient care plans accordingly.

Figure 51:
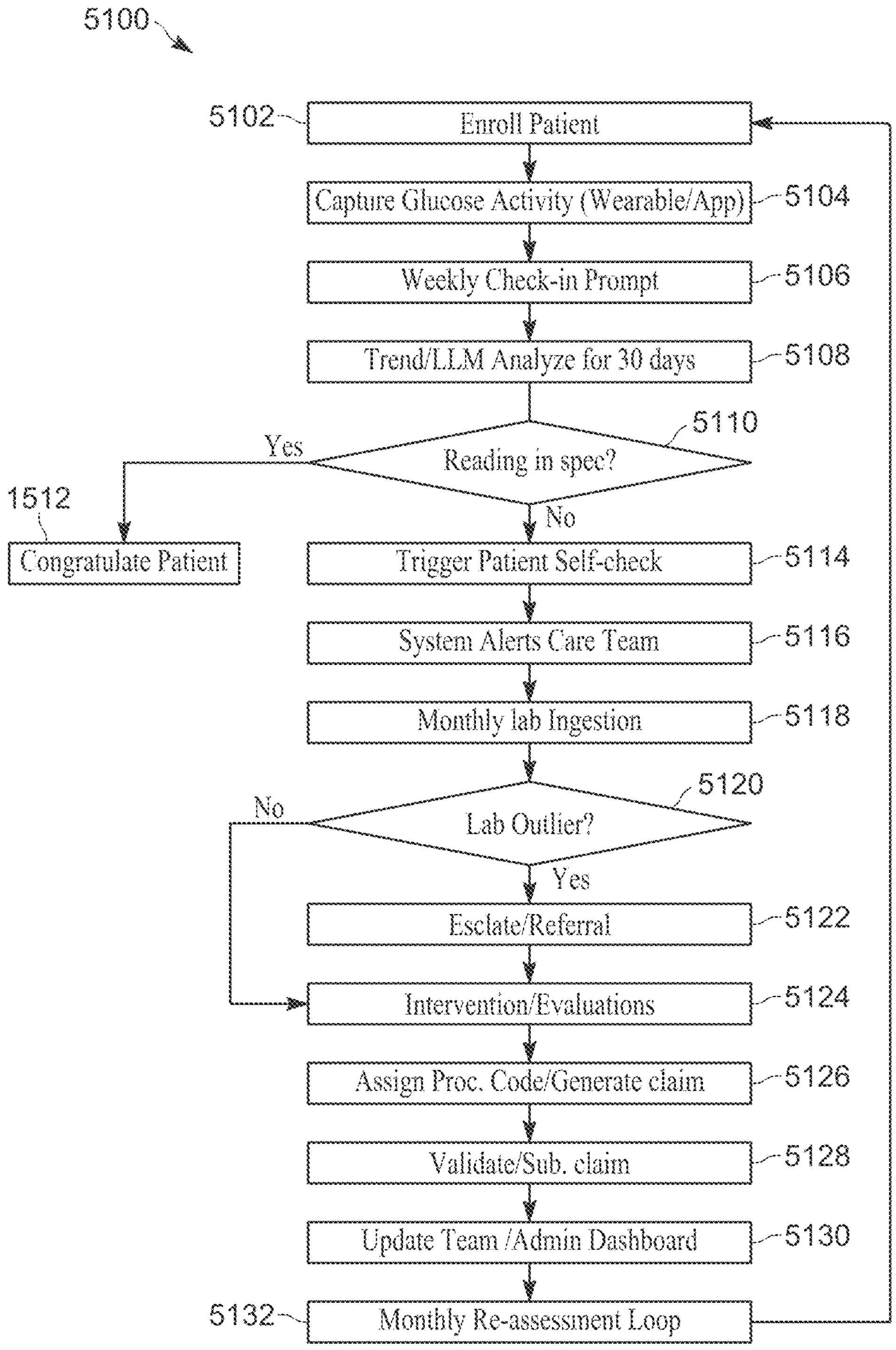
FIG. 51 illustrates an exemplary flow chart of a method for utilizing the clinical assessment system for a patient managing a chronic disease, according to aspects of the present disclosure.

FIG. 51 illustrates an example flow chart of a method 5100 for utilizing the clinical assessment system 100 for a patient managing a chronic disease. The method 5100 illustrates a patient monitoring and intervention system designed to manage glucose levels (or other measurable health metric) and related health outcomes through a hybrid of wearable technology, AI-based analysis, and clinical workflows. The method 5100 begins at step 5102 with the enrollment of a patient into the program. Once enrolled, the clinical assessment system 100 captures glucose activity data (or other measurable/detectable health metric) using a wearable device or mobile application (step 5104). To ensure patient engagement and consistent data entry, the clinical assessment system 100 may issue an optional weekly check-in prompt (step 5106). In some embodiments, the check-in prompt is hourly, daily, bi-weekly, monthly, or yearly instead of weekly.

The data gathered from the wearable and patient check-ins are then analyzed over a 30-day period using a trend analysis module powered by a large language model (LLM) or similar AI tool (step 5108). After this analysis, the system 100 determines whether the patient's glucose readings are within the expected clinical range (step 5110). If the readings are within specification, the system provides positive feedback to the patient (step 5112), reinforcing adherence and successful management. In this example, the positive feedback is a congratulatory message that may be provided in a dashboard and/or via messaging to a mobile device or the like.

However, if the readings fall outside the target range, the clinical assessment system 100 initiates a self-check prompt to the patient (step 5114), encouraging the patient to assess medication adherence, diet, and/or lifestyle factors. The system 100 may also alert the care team (step 5116) to facilitate early intervention. Monthly laboratory data are also ingested into the system 100 (step 5118), allowing for comprehensive, real-time assessment of the patient's condition.

The system 100 then evaluates the lab data to detect any clinical outliers (step 5120). If no anomalies are detected, the system 100 re-enters the monitoring cycle to continue monitoring the patient. If an outlier is detected, the system 100 triggers an escalation protocol (step 5122), leading to clinical intervention and patient evaluations (step 5124). Relevant procedural codes are assigned and used to generate billing claims (step 5126), which are then validated and submitted (step 5128). Once the administrative steps are completed, the care team and administrative dashboards are updated (step 5130) to reflect the patient's status and intervention history.

Finally, the clinical assessment system 100 enters a monthly re-assessment loop (step 5132), enabling continuous tracking, adjustment, and optimization of patient care. This cyclical and intelligent workflow supports proactive disease management and ensures that both patients and healthcare providers are engaged through automated alerts, data insights, and seamless coordination.

The systems and methods described herein can be embodied and/or implemented at least in part as a machine configured to receive a computer-readable medium storing computer-readable instructions. The instructions are preferably executed by computer-executable components preferably integrated with the system and one or more portions of the processor 132 on the clinical assessment system 100 and/or computing device. The computer-readable medium can be stored on any suitable computer-readable media such as RAMs, ROMs, flash memory, EEPROMs, optical devices (e.g., CD or DVD), hard drives, floppy drives, or any suitable device. The computer-executable component is preferably a general or application-specific processor, but any suitable dedicated hardware or hardware/firmware combination can alternatively or additionally execute the instructions.

For instance, the processor 132, as described in FIG. 1B, may include specialized accelerators for machine learning tasks, such as GPUs or TPUs, to execute computationally intensive operations like training and inference for the trained LLM 102. These processors may retrieve the instructions from the memory 130, where the instructions are stored in non-transitory storage media, and execute tasks such as normalizing patient data, performing contextual analysis, and generating clinical insights.

Additionally, the instructions may define the workflows of various modules such as the clinical workflow engine 108, care management module 124, and security and compliance module 1922, ensuring that each component performs its designated functions in an integrated manner. The computer-readable medium may also include software libraries and frameworks enabling the system to interface with external devices, such as wearable devices 138, patient interface 110, or clinician interface 112.

The present disclosure extends the care delivery platform described herein to include a billing plane architecture that automates the processing of reimbursement claims across multiple billing regimes. Healthcare billing and reimbursement involve complex interactions between care providers, payers, clearinghouses, and regulatory bodies. Care management programs have evolved to include multiple billing regime families with distinct documentation and billing requirements. Some billing regimes, such as Advanced Primary Care Management (APCM) and General Primary Care Management (GPCM), operate on attestation-based documentation models where clinicians review completed activities and provide attestation without tracking cumulative service time. Other billing regimes, such as Chronic Care Management (CCM) and Collaborative Care Management (CoCM), operate on time-based documentation models requiring tracking of cumulative non-face-to-face minutes per billing period. Additional billing regimes include Principal Care Management (PCM), Remote Patient Monitoring (RPM), and Remote Therapeutic Monitoring (RTM), each with its own eligibility criteria, frequency limits, unit constraints, and documentation requirements.

The billing plane architecture may address technical challenges associated with managing multiple billing regimes, including regime selection based on patient eligibility, provider qualifications, payer coverage, and site of service. The billing plane architecture may implement approval-gating mechanisms that present claim preparation output to authorized billing approvers in a signature queue and record approvals in an attestation ledger with timestamps, rule version identifiers, and evidence manifest references. The billing plane architecture may support delegation protocols that enable authorized billing approvers to delegate approval authority to artificial intelligence systems or staff members within defined constraints, with protocol versioning and revocation capabilities.

The billing plane architecture may implement standardized electronic transaction submission using X12 transaction sets, including X12 837P and 837I for professional and institutional claim submissions, X12 TA1 for interchange acknowledgments, X12 999 for functional acknowledgments, X12 277CA for claim acknowledgments, X12 276 and 277 for claim status inquiry and response, and X12 835 for electronic remittance advice. The billing plane architecture may parse remittance advice transactions to extract claim payment segments (CLP), service payment segments (SVD), and claim adjustment segments (CAS) containing group codes (PR, CO, PI, OA) and claim adjustment reason codes (CARC) and remittance advice remark codes (RARC). The billing plane architecture may implement denial playbooks that map extracted codes to corrective actions for automated or manual correction and resubmission.

The billing plane architecture may implement compliance validation against payer-specific concurrency constraints, frequency limits, unit limits, and medically unlikely edit (MUE) constraints with MAI type enforcement. The billing plane architecture may implement an optimization engine that generates multiple permissible billing strategies, evaluates strategies against compliance constraints, determines projected reimbursement values, ranks strategies, and presents recommended and alternative strategies to authorized billing approvers with explainability artifacts. The billing plane architecture may implement rules ingestion from authoritative sources such as Centers for Medicare and Medicaid Services (CMS), National Correct Coding Initiative (NCCI) quarterly updates, and payer companion guides, with effective date tagging and rule provenance tracking.

The billing plane architecture may implement multi-clearinghouse routing that directs claim submissions to appropriate clearinghouse interfaces based on payer identifiers, plan identifiers, or routing rules. The billing plane architecture may implement idempotent submission detection that prevents duplicate claim submissions using claim control identifiers. The billing plane architecture may implement batch processing capabilities for the submission of multiple claims in a single transmission. The billing plane architecture may implement appeals workflows that generate appeal packets, submit appeals through standardized channels, and track appeal status through resolution.

The billing plane architecture may be generalized beyond healthcare to other regulated transaction environments. In the generalized architecture, the billing regime registry may be referred to as a policy regime registry, the authorized billing approver may be referred to as an authorized transaction approver, and the clearinghouse interface may be referred to as a gateway interface. The standardized electronic transaction format may include X12 transaction sets for healthcare domains, ISO 20022 messages for financial services domains, or other standardized formats appropriate to the target domain. The cross-domain generalization may enable application of the pipeline architecture to regulated transaction environments, including legal billing, government grant management, insurance claims processing, and financial regulatory filings.

The billing plane architecture may provide a unified presentation layer that is independent of the selected billing regime, such that clinicians experience a consistent workflow for care coordination, documentation, and task management regardless of which billing regime applies to a given patient or billing period. The user interface may provide a unified clinical workflow presentation layer that is independent of the selected billing regime. The processor may execute a billing plane that performs selecting, validating, generating, transmitting, response-parsing, corrective workflow initiation, and appeal workflow initiation operations without requiring manual selection of the billing regime by the authorized billing approver. The billing plane operations may be performed automatically based on patient eligibility, provider eligibility, payer policy rules, and care event data.

Figure 1C:
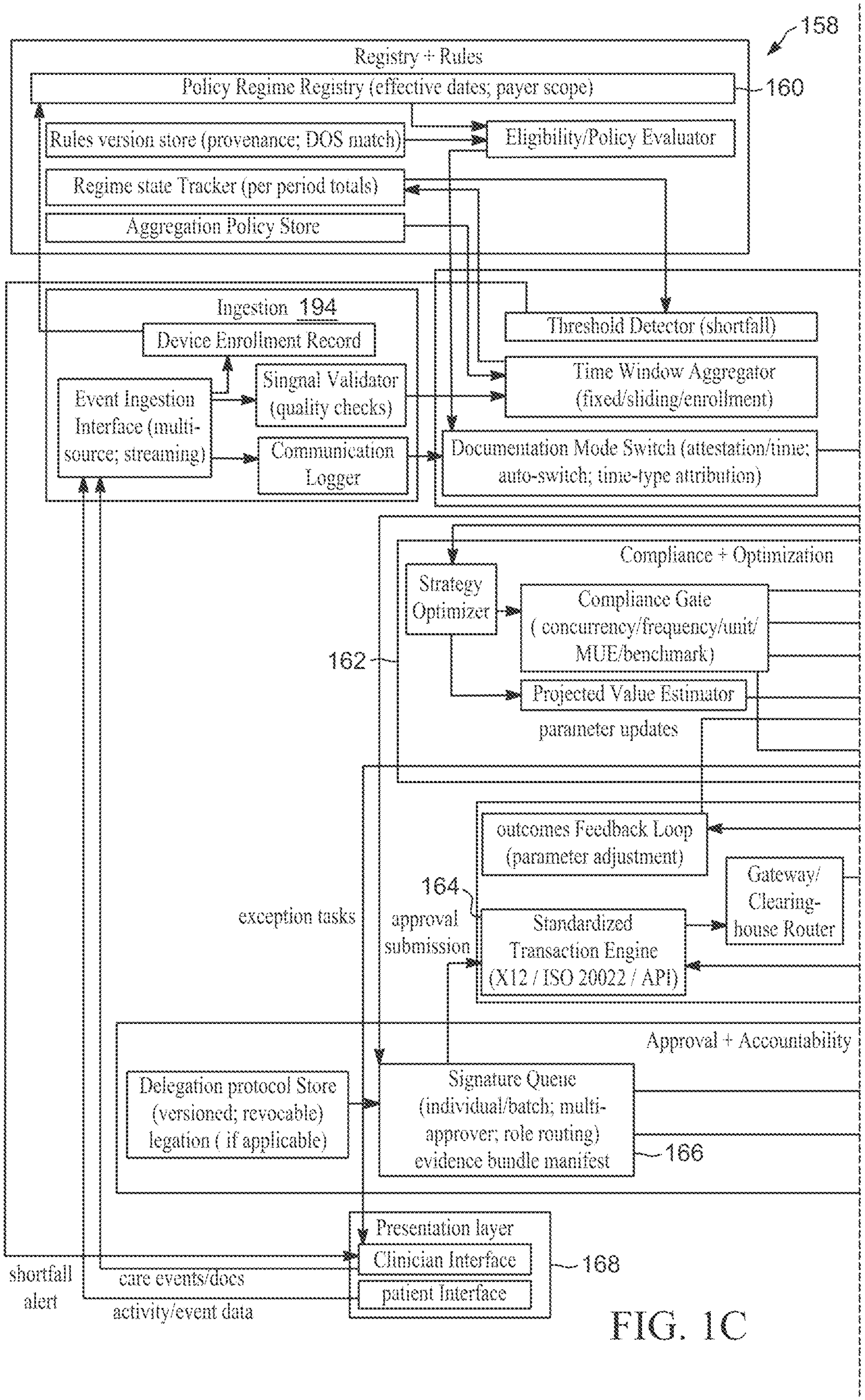
FIG. 1C illustrates a system architecture including a billing plane with a regime registry, compliance gate, signature queue, attestation ledger, and standardized transaction engine, according to aspects of the present disclosure.
Figure 1C:
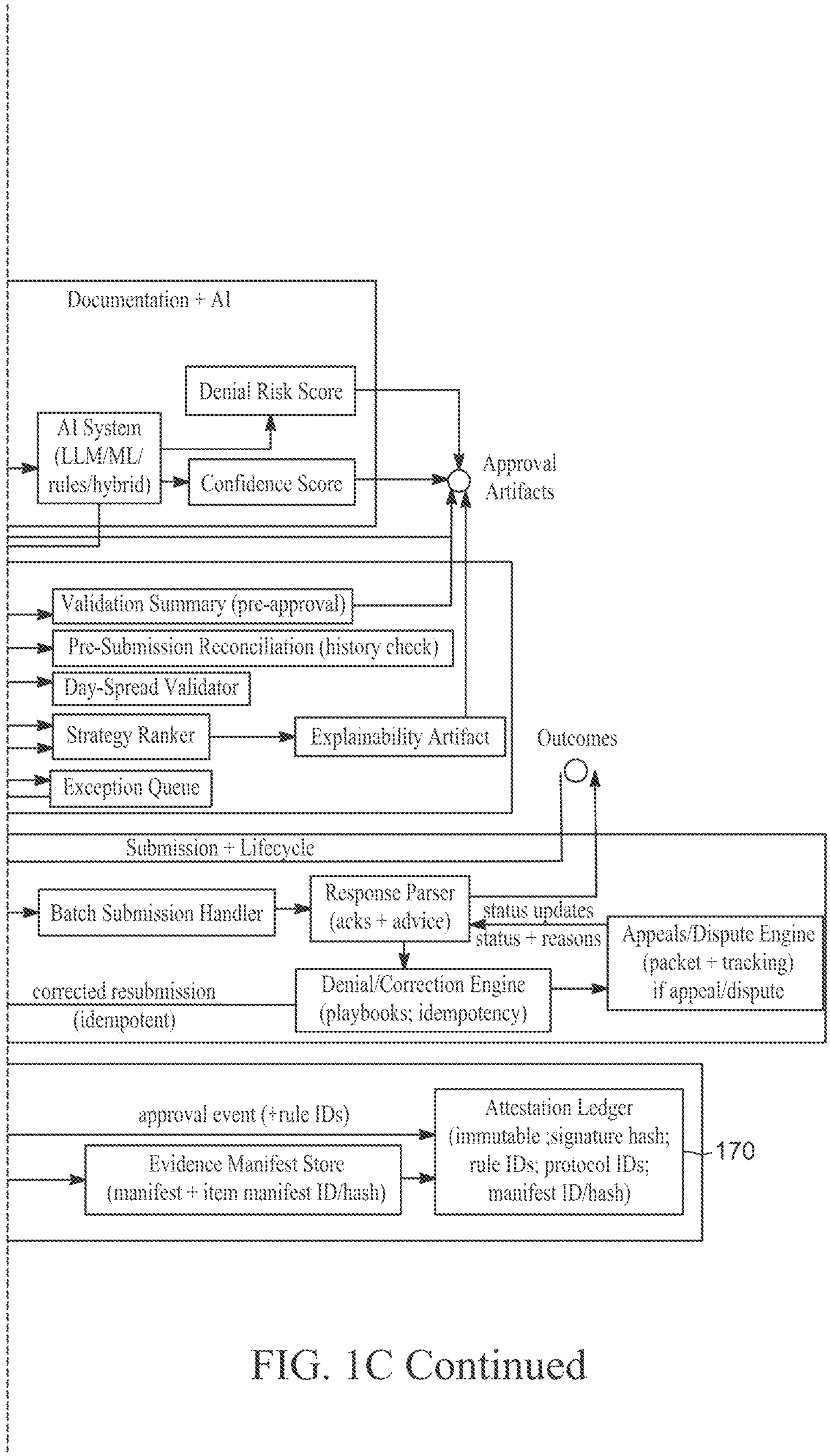

FIG. 1C illustrates a system architecture 158 for policy-driven workflow orchestration comprising multiple integrated layers that automate healthcare claim processing from event ingestion through compliance validation, approval, submission, and lifecycle management. The architecture shown in FIG. 1C may be implemented as part of the clinical workflow engine and claims lifecycle processing system described herein. The architecture may include four operational layers: a Registry and Rules layer 160, an Ingestion layer 194, a Compliance and Optimization layer 162, and an Approval and Accountability layer 166, operating beneath a unified Presentation layer 168.

As shown in FIG. 1C, the auditable workflow orchestration system 158 includes a Registry and Rules layer 160, which maintains policy regimes, eligibility criteria, and rule configurations applicable to transactions processed by the system. The registry and rules layer 160 includes a policy regime registry storing effective dates, payer scopes, and policy definitions, a rules version store configured to preserve provenance and historical versions of rules, a regime state tracker for maintaining per-period totals, and an aggregation policy store. An eligibility and policy evaluator operates within the registry and rules layer 160 to determine applicable policies and constraints based on contextual inputs, such as patient enrollment, service type, and payer requirements.

Data and events are ingested through an Ingestion layer 194, which receives activity and event data from one or more sources, including device enrollment records, clinician-generated documentation, and streaming event interfaces. The ingestion layer 194 includes an event ingestion interface configured to receive real-time or batch data, signal validators for quality checks, and a communication logger to preserve traceability. A threshold detector identifies shortfalls or anomalies in received data, while a time-window aggregator aggregates events over fixed or sliding enrollment periods. A documentation mode switch determines whether documentation is handled in real time, via auto-switching, or through time-based attribution, depending on detected conditions.

Processed data from the ingestion layer 194 is provided to a Compliance and Optimization layer 162, which applies predefined compliance constraints and optimization strategies. The compliance and optimization layer 162 includes a compliance gate configured to enforce concurrency, frequency, and unit-based limits, including medically unlikely edits (MUE) and benchmark constraints. A strategy optimizer and projected value estimator dynamically adjust processing parameters to improve approval likelihood while maintaining regulatory compliance. An outcomes feedback loop provides parameter adjustment signals based on observed outcomes, enabling continuous optimization. When exceptions are detected, exception tasks are generated and routed for further handling.

The system further includes an Approval and Accountability layer, which manages submission preparation, approval workflows, and accountability artifacts. A standardized transaction engine 164 generates compliant transaction payloads in formats such as X12, ISO 20022, or application programming interface (API)-based formats. Generated transactions are routed through a gateway or clearinghouse router for submission. A signature queue 166 manages individual or batch approvals, multi-approver routing, and evidence bundle manifests. A delegation protocol store maintains versioned and revocable delegation records to support authorized approval workflows. Approval events and submission actions are recorded for traceability.

A Presentation layer 168 provides clinician and patient interfaces through which care events, documentation status, activity data, and alerts are displayed. Shortfall alerts, exception notifications, and workflow status updates may be surfaced through the presentation layer 168 to prompt corrective actions or manual review.

In a legal services domain application, an example policy regime registry may store billing policy regimes corresponding to different legal billing models, such as contingency fee arrangements, hourly billing with client-approved rate schedules, flat-fee arrangements for specified matter types, and alternative fee arrangements with performance-based components. Each policy regime may include eligibility criteria specifying which matter types, client types, or engagement structures qualify for the regime, documentation mode attributes specifying whether time tracking is required or whether matter-based attestation is sufficient, and concurrency constraints specifying which billing arrangements cannot be combined for the same matter or client. Activity event data in the legal services domain may include attorney time entries logged through time tracking systems, paralegal and staff time entries, client communications and meetings, court appearances and filing activities, document review and drafting activities, and research time. The event ingestion interface may receive these activity events from legal practice management systems, time tracking applications, calendar systems, and document management systems.

The regime selection engine may evaluate attorney qualifications, bar admissions, and specializations against matter requirements, client approval status for billing arrangements, and jurisdiction-specific billing regulations to select an applicable billing policy regime. The system may validate proposed billing content against constraints including maximum hourly rates specified in client engagement letters, billing block rounding requirements, expense reimbursement policies and caps, and ethics rules prohibiting certain fee arrangements or billing practices. The standardized electronic transaction format for legal billing may include LEDES (Legal Electronic Data Exchange Standard) format invoices transmitted to client accounts payable systems or legal spend management platforms. The attestation ledger may record attorney approvals of billing submissions with timestamps, matter identifiers, and references to supporting time entries and expense documentation. Dispute workflows may handle client billing disputes, generate response packets containing detailed time entry justifications, and track dispute resolution through client acceptance or fee arbitration.

In a financial services domain application, the policy regime registry may store regulatory filing regimes corresponding to different reporting requirements, such as quarterly earnings reports filed with securities regulators, anti-money laundering suspicious activity reports, capital adequacy reports required under banking regulations, and transaction reporting requirements under market abuse regulations. Each policy regime may include eligibility criteria specifying which financial institutions or transaction types trigger filing requirements, documentation mode attributes specifying whether attestation by compliance officers is required, frequency limits specifying filing deadlines and periodic submission schedules, and concurrency constraints specifying when multiple reports cannot be filed simultaneously. Activity event data in the financial services domain may include transaction records from payment processing systems, account balance snapshots from core banking systems, trading activity records from securities trading platforms, customer due diligence records from know your customer systems, and compliance monitoring alerts from transaction surveillance systems. The event ingestion interface may receive these activity events from diverse financial system interfaces through APIs, message queues, or batch file transfers. The regime selection engine may evaluate regulatory jurisdiction applicability, institution type and licensing status, transaction volume thresholds that trigger reporting requirements, and materiality determinations for disclosure requirements to select applicable regulatory filing regimes. The system may validate proposed filing content against constraints including format specifications such as XBRL for financial statements or XML schemas for regulatory reports, data quality requirements specifying precision, completeness, and accuracy thresholds, submission timing windows with deadline enforcement, and calculation methodology requirements prescribed by regulatory authorities.

A standardized electronic transaction format for financial services regulatory filing may include ISO 20022 messages for payment transaction reporting, XBRL documents for financial statement filing, or regulator-specific XML schemas for specialized reports. The system may transmit filings to regulatory authority interfaces through secure electronic filing systems, regulatory gateway APIs, or authorized filing agent interfaces. Response messages may include filing acceptance acknowledgments, validation error reports, or requests for supplemental information. The attestation ledger may record compliance officer attestations of filing accuracy with timestamps, report identifiers, and references to supporting financial data sources. Dispute workflows may handle regulatory inquiry responses, generate supplemental information packets, and track regulatory examination or enforcement proceedings through resolution.

In a property and casualty insurance domain application, the policy regime registry may store claims handling regimes corresponding to different claim types, such as first-party property damage claims, third-party liability claims, subrogation recovery claims, and reinsurance recovery claims. Each policy regime may include eligibility criteria specifying coverage requirements and policy exclusions, documentation mode attributes specifying required adjuster investigation steps and documentation, unit limits corresponding to policy limits and deductibles, and concurrency constraints specifying when multiple claims cannot be processed simultaneously for related incidents. Activity event data in the insurance domain may include first notice of loss reports from policyholders or claimants, adjuster investigation notes and damage assessments, repair estimates from contractors or service providers, medical reports for injury claims, and settlement negotiation communications. The event ingestion interface may receive these activity events from claims management systems, adjuster mobile applications, third-party estimation systems, and communication platforms. The regime selection engine may evaluate policy coverage verification, liability determination and fault assessment, damage valuation and reserve adequacy, and regulatory compliance requirements for claims handling to select applicable claims processing regimes. The system may validate proposed settlement amounts against constraints including policy limit enforcement, deductible application requirements, comparative negligence calculations in jurisdictions requiring proportional liability, and claims handling regulations specifying unfair claims practices prohibitions. The standardized electronic transaction format for insurance claims may include ACORD XML standards for claims data exchange, integration messages for communication with reinsurers or third-party administrators, or proprietary APIs for specific carrier systems. Response messages may include settlement approvals, reservation of rights notices, or requests for additional investigation. The attestation ledger may record claims adjuster approvals of settlement recommendations with timestamps, claim identifiers, and references to investigation documentation. Dispute workflows may handle coverage disputes or settlement disagreements, generate dispute packets containing policy language analysis and investigation findings, and track disputes through appraisal, mediation, arbitration, or litigation proceedings.

In a government grant management domain application, the policy regime registry may store grant compliance regimes corresponding to different funding mechanisms, such as cost-reimbursement grants requiring actual cost documentation, fixed-price grants with milestone-based payment schedules, cooperative agreements with substantial federal involvement requirements, and formula grants with predetermined allocation calculations. Each policy regime may include eligibility criteria specifying organizational qualifications and program requirements, documentation mode attributes specifying financial reporting and progress reporting obligations, frequency limits specifying quarterly, semi-annual, or annual reporting deadlines, and concurrency constraints specifying restrictions on multiple federal funding sources for the same program activities. Activity event data in the government grant domain may include expenditure records from financial management systems, personnel time allocation records from payroll and time tracking systems, programmatic activity completion records documenting milestone achievement, beneficiary services records documenting program participant activities, and procurement records for grant-funded purchases. The event ingestion interface may receive these activity events from grants management systems, financial systems, and program data systems. The regime selection engine may evaluate grant award terms and conditions, federal cost principles and allowability determinations, applicable OMB (Office of Management and Budget) *circulars* or Uniform Guidance requirements, and program-specific requirements mandated by funding agencies to select applicable grant compliance regimes. The system may validate proposed financial reports and reimbursement requests against constraints including cost allocation methodology requirements, indirect cost rate limitations, matching or cost-sharing requirements, and period of performance restrictions.

The standardized electronic transaction format for government grant management may include Federal Financial Reports (SF-425) submitted through grants.gov electronic systems, Federal Expenditure Reports transmitted to pass-through entities, or program-specific reporting formats required by agencies such as NIH, NSF, or DOE. Response messages may include payment authorization notices, audit finding notifications, or requests for additional documentation. The attestation ledger may record authorized official certifications of report accuracy and compliance with grant terms, with timestamps, grant identifiers, and references to supporting financial and programmatic documentation. Dispute workflows may handle audit findings or questioned costs, generate response packets containing cost justifications and corrective action plans, and track disputes through agency appeal processes or resolution negotiations.

Across non-healthcare domains, the dispute or appeal workflow may follow a generalized pattern adapted from the healthcare appeals workflow. When an adverse determination, denial, or adjustment is received from an authority or counterparty, the system may parse the response to extract reason codes, reason classes, or explanatory remarks specific to the domain. A domain-specific response code playbook may map extracted codes to corrective actions appropriate for the domain, such as supplemental documentation requests, calculation corrections, policy interpretation arguments, or procedural compliance demonstrations. The system may generate a dispute packet comprising the original transaction identifier, the adverse determination details including reason codes and monetary adjustments, supporting documentation bundles with evidence items relevant to the dispute, and structured arguments or justifications addressing the stated reasons for adverse determination. The dispute packet format may conform to domain-specific standards, such as insurance appraisal demand formats, financial services dispute resolution protocols, or government agency appeal procedures. The system may transmit dispute packets through appropriate channels for the domain, including electronic submission portals for regulatory agencies, secure messaging systems for counterparty negotiations, or formal dispute resolution platforms for third-party arbitration or mediation. The system may track dispute status through resolution, recording intermediate status updates such as dispute received, under review, additional information requested, oral hearing scheduled, or decision pending, and final outcomes such as dispute sustained with modification, dispute overturned with original transaction approved, or partial resolution with negotiated settlement. The attestation ledger may record dispute initiation events, dispute packet submission events, and dispute resolution events, maintaining a complete audit trail of dispute handling across domains to support accountability and regulatory compliance requirements applicable to dispute processes in each domain.

FIG. 1C illustrates downstream Documentation and Artificial Intelligence components, which augment pre-submission validation and decision support. An AI system generates a denial risk score and a confidence score using rule-based, machine learning, large language model, or hybrid techniques. These scores contribute to approval artifacts and validation outputs, including validation summaries, pre-submission reconciliation checks, day-spread validation, strategy ranking, and explainability artifacts that document the rationale for AI-assisted decisions.

FIG. 1C further depicts a Submission and Lifecycle management subsystem, which includes a batch submission handler, a response parser configured to process acknowledgments and advisory messages, and a denial and correction engine that applies idempotent correction playbooks. An appeals and dispute engine manages dispute packets and tracking when appeals are initiated. Status updates and outcome data are propagated back to upstream components for monitoring and optimization.

Finally, FIG. 1C (continued) shows an Attestation and Evidence layer 170, which maintains an immutable attestation ledger storing approval events, rule identifiers, protocol identifiers, and manifest identifiers. An evidence manifest store preserves manifests and item-level hashes, enabling tamper-resistant audit trails for compliance verification, regulatory reporting, and post-hoc validation of orchestrated workflows.

FIG. 1C (continued) illustrates a closed-loop, policy-aware, and auditable workflow orchestration system 158 that automates documentation handling, compliance validation, transaction generation, submission, exception management, and approval tracking, while continuously optimizing outcomes based on feedback and analytics.

FIG. 1C (continued) illustrates additional subsystems within the workflow orchestration system 158, including Documentation and Artificial Intelligence components, Submission and Lifecycle management components, and the Attestation and Evidence layer 170. The Documentation and Artificial Intelligence subsystem provides intelligent decision support, risk assessment, and explainability. The AI system includes one or more of a large language model, a machine learning model, a rules-based inference engine, or a hybrid architecture.

The AI system generates a confidence score indicating certainty in recommendations, computed based on data quality, consistency with historical patterns, clarity of eligibility determination, and scenario complexity. Claims with confidence scores below a configurable threshold are routed to manual review. The AI system generates a denial risk score based on data quality indicators, day-spread distribution, enrollment continuity indicators, and historical payer behavior patterns. The two-dimensional risk assessment (confidence and denial risk) determines routing decisions.

The AI system generates validation summaries documenting the validation process, enumerating evaluated rules, listing constraint checks performed, recording pass or fail determinations, including rule version identifiers, identifying authoritative sources, and highlighting warnings or edge-case conditions. A pre-submission reconciliation component queries historical claim status records to detect duplicate submissions or overlapping billing periods, preventing redundant submissions. A day-spread validator ensures device-generated monitoring data meets minimum data collection requirements for remote monitoring regimes, counting distinct days and comparing to minimum requirements.

A strategy ranker produces ordered lists of permissible billing strategies, ranking based on projected reimbursement value, confidence score, denial risk score, compliance margin, and documentation burden. An explainability artifact generator produces structured outputs explaining AI recommendations, including reasoning summaries, rule version references, compliance constraint results, confidence metrics, denial risk metrics, ranking information, and alternative strategy explanations.

An exception queue receives and manages claims flagged for manual review, organizing by exception type, priority, assigned role, and exception age. Exception queue entries include flagged claim outputs, issue descriptions, suggested resolution actions, and routing information. Resolution actions are logged with resolver identity, resolution timestamp, rationale notes, and outcome. The Submission and Lifecycle management subsystem handles claim transmission, acknowledgment processing, response parsing, correction handling, and appeal management. A batch submission handler manages batch assembly and transmission, grouping claims by configurable criteria, assembling batches with functional groups and interchange envelopes, assigning batch identifiers, maintaining batch manifests, and tracking batch status. A response parser receives and interprets acknowledgments and advisory messages via multiple channels. The parser implements specialized parsers for different transaction types: An X12 TA1 parser processes interchange acknowledgments, extracting acceptance or rejection codes and error descriptions. A 999 parser processes functional acknowledgments, extracting functional group and transaction set acknowledgments with detailed error reporting. A 277CA parser processes claim acknowledgment transactions, extracting status codes and determining whether claims were accepted for adjudication, rejected, or pended. An 835 parser processes remittance advice transactions, extracting CLP segments (claim-level payment details), SVD segments (service-line payment details), and CAS segments (adjustment information with group codes, CARC codes, RARC codes, and monetary amounts).

The response parser normalizes response data, updates claim status records, and detects response patterns indicating systemic issues, generating alerts to administrators when patterns are detected. A denial playbook includes a mapping table linking combinations of CARC codes, RARC codes, and group codes to predefined corrective actions. The playbook specifies whether actions are auto-correctable or manually correctable, correction steps to perform, prerequisites, and expected outcomes. The playbook is configurable and versioned.

A denial and correction engine implements automated and manual correction workflows. For auto-correctable denials, the engine executes mapped corrective actions automatically, including adjusting units, adding modifiers, correcting demographics, or applying write-offs. For manually correctable denials, the engine generates correction tasks and routes to appropriate personnel. Correction task assignees review context, perform research, determine corrective actions, apply corrections, and approve for resubmission or escalate to appeal.

The denial and correction engine implements idempotent resubmission logic using claim control identifiers and idempotency keys. The engine checks for prior submissions, reuses identifiers or generates replacement/corrected indicators as appropriate, and maintains a submitted claims registry to prevent duplicate transmissions. An appeals and dispute engine manages appeal workflows for denied claims. The engine evaluates appealability, generates appeal packets including denied claim identifier, denial metadata, evidence bundle references, and payer-specific justifications. Appeal packets are formatted per payer requirements and submitted through appropriate channels (electronic or paper). The engine tracks appeal status through resolution, recording intermediate updates and final outcomes, and propagates results to the outcomes feedback loop.

The Attestation and Evidence layer 170 maintains immutable audit records and tamper-resistant evidence trails. An attestation ledger 192 stores append-only entries recording approval events. Each entry records claim identifier, claim version identifier, approver identifier or delegation protocol identifier, approval timestamp, signature hash, rule identifiers, protocol identifiers, and manifest identifiers or hashes. The attestation ledger is immutable, ensuring a permanent audit trail.

An evidence manifest store maintains evidence bundle manifests listing evidence items including contact logs, care plan updates, device data, attestation records, outcome measures, progress notes, laboratory results, and telehealth session data. Each manifest includes timestamps, source identifiers, and cryptographic hashes computed over evidence contents to enable integrity verification. The evidence manifest store preserves manifests throughout claim lifecycle and retention periods, supporting compliance verification, regulatory reporting, audit response, and post-hoc validation.

Figure 1D:
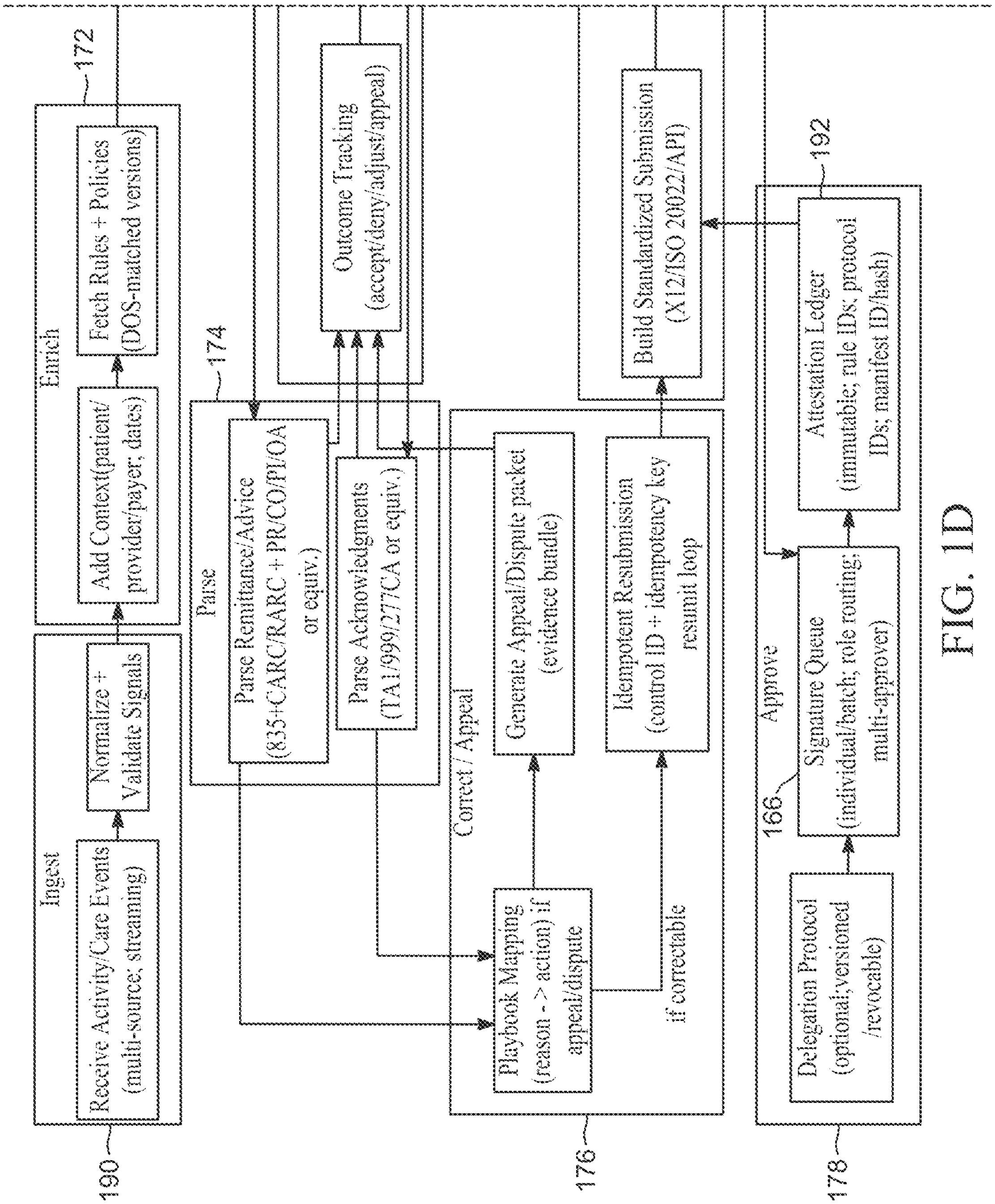
FIG. 1D illustrates a pipeline flow diagram depicting stages from event ingestion through learning feedback, according to aspects of the present disclosure.
Figure 1D:
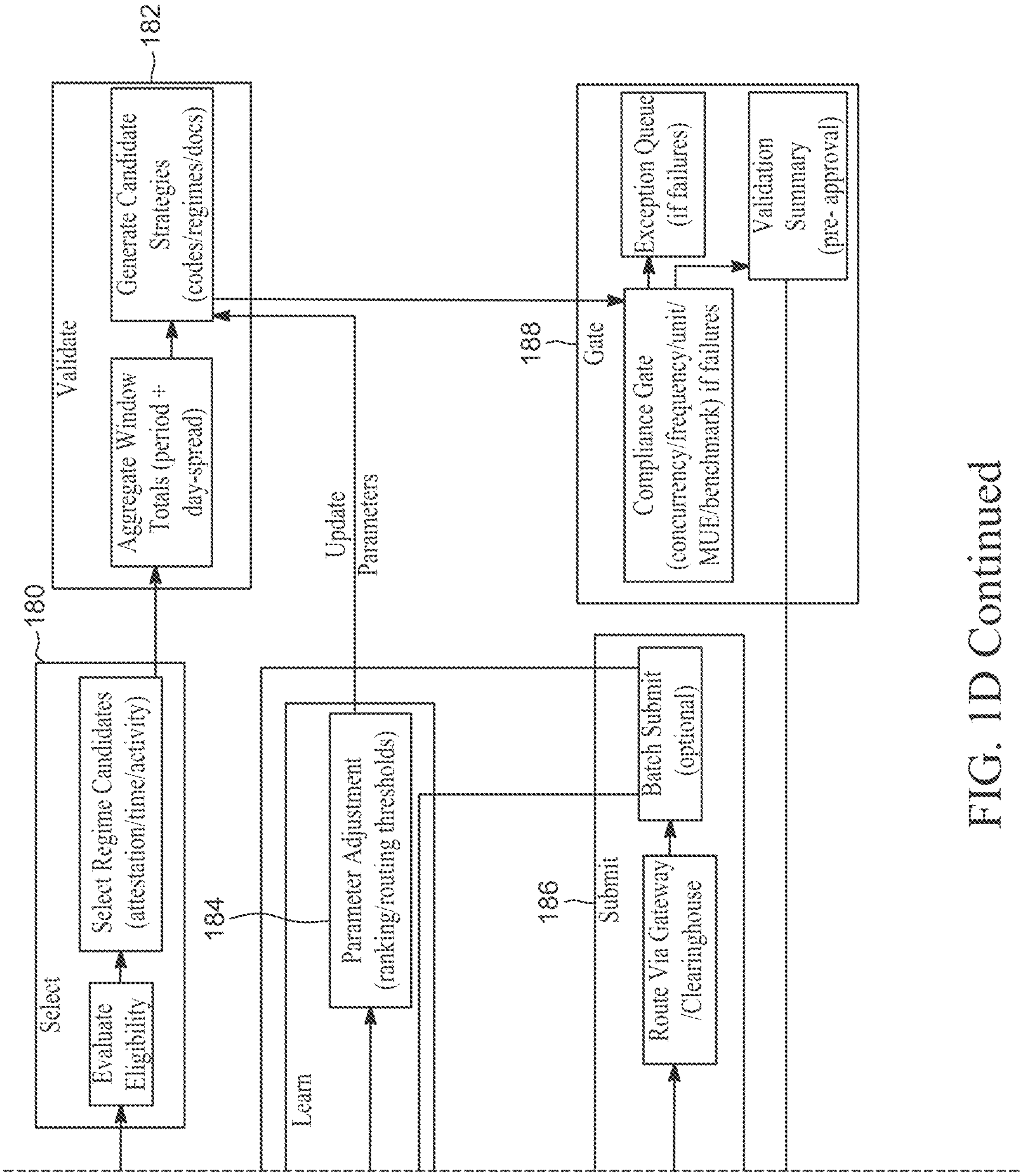

FIG. 1D illustrates an end-to-end flow diagram for automated claim ingestion, validation, correction, approval, and submission within the clinical workflow engine, in accordance with one or more embodiments of the present disclosure.

As shown in FIG. 1D, the process begins at an ingestion stage 190, where activity, care, or event data is received from one or more sources, including multi-source or streaming inputs. The received data is normalized and validated to ensure structural and semantic consistency before enrichment. At an enrichment stage 172, applicable rules and policies are applied, including the addition of contextual information such as provider details, payer data, and matched rules or policy versions. The enriched data is then parsed at stage 174, where remittance advice and responses (e.g., 835 transactions, CARC/RARC codes, or equivalent acknowledgments) are interpreted, and claim or service outcomes are identified.

Following parsing, outcome tracking is performed, enabling the system to determine whether the transaction is accepted, denied, or subject to appeal. When a correction or appeal is required, the process transitions to a correction and appeal workflow 176, where playbook mappings are applied to determine appropriate remediation steps based on denial or dispute type. If the issue is determined to be correctable, an idempotent resubmission path is initiated to generate corrected submissions without duplicative processing.

In parallel, a validation and selection flow is depicted in FIG. 1D (continued), beginning with eligibility evaluation and regime candidate selection 180. Candidate regimes are selected based on classification criteria such as activity type, jurisdiction, or payer requirements. Aggregated window totals are computed for defined periods (e.g., day, week, or month), and candidate strategies are generated and ranked at stage 182 using cost, risk, or benchmark considerations. Parameter adjustment logic 184 updates thresholds and tuning parameters based on historical outcomes and learning feedback.

Validated strategies are routed through a compliance gate 188, where concurrency, frequency, unit limits, and medically unlikely edit (MUE) benchmarks are enforced. Any compliance failures are directed to an exception queue for further handling, while compliant transactions proceed to validation summary generation for pre-approval. Once validated, claims are routed via a gateway or clearinghouse 186, optionally through batch submission mechanisms, for external submission.

Upon approval, the workflow advances to an approval and accountability stage 178, where signature queues 166 manage individual or multi-approver authorization, supported by delegation protocols that may be versioned and revocable. An attestation ledger 192 records immutable approval evidence, including signature hashes, rule identifiers, protocol identifiers, and manifest identifiers, thereby ensuring non-repudiation and auditability.

Collectively, FIG. 1D demonstrates a closed-loop, rules-driven workflow that integrates ingestion, enrichment, validation, correction, submission, approval, and attestation. The illustrated process enables automated yet compliant handling of healthcare claims and related transactions, while supporting escalation, learning-based optimization, and regulatory accountability across the entire lifecycle.

The billing regime registry may store regime attributes for a plurality of billing regime families applicable to care management programs. The billing regime families may include Advanced Primary Care Management (APCM), General Primary Care Management (GPCM), Chronic Care Management (CCM), Collaborative Care Management (CoCM), Principal Care Management (PCM), Remote Patient Monitoring (RPM), and Remote Therapeutic Monitoring (RTM). Each billing regime family may have distinct eligibility criteria, documentation requirements, and billing constraints.

APCM (Advanced Primary Care Management) may be a monthly, attestation-based billing regime applicable to specific patient populations meeting defined clinical criteria. APCM may require clinician attestation of completed care activities without tracking cumulative service minutes. APCM may be subject to one unit per calendar month frequency limits and no-additional-units constraints. APCM may have concurrency restrictions that prevent billing APCM together with certain other care management codes in the same billing period.

GPCM (General Primary Care Management) may be a monthly, attestation-based billing regime with broader patient eligibility criteria than APCM. GPCM may similarly require clinician attestation of completed care activities without cumulative minute tracking. GPCM may be subject to one unit per calendar month frequency limits and no-additional-units constraints. GPCM may have payer-specific concurrency restrictions.

CCM (Chronic Care Management) may be a monthly, time-based billing regime applicable to patients with multiple chronic conditions. CCM may require tracking of cumulative non-face-to-face service minutes per calendar month, with a minimum threshold such as twenty minutes required for billing. CCM may permit multiple units based on accumulated time in increments. CCM may serve as a fallback billing regime when attestation-based regimes such as APCM or GPCM are unavailable due to eligibility or payer coverage constraints.

CoCM (Collaborative Care Management) may be a monthly, time-based billing regime applicable to psychiatric collaborative care programs. CoCM may require tracking of cumulative service minutes for behavioral health integration activities. CoCM may have concurrency restrictions with other care management billing regimes. CoCM may require documentation of psychiatric consultation and care coordination activities.

PCM (Principal Care Management) may be a monthly billing regime applicable to patients with a single serious or complex chronic condition. PCM may have eligibility criteria distinct from CCM and may be subject to frequency limits and concurrency constraints. PCM may require documentation of care management activities focused on the principal condition.

RPM (Remote Patient Monitoring) may be a device-based billing regime comprising initial setup codes and ongoing monitoring codes. RPM may require aggregation of device-generated physiological data over monthly billing periods. RPM may have day-spread requirements specifying that data must be collected across a minimum number of distinct calendar days within the billing period. RPM monitoring codes may require a minimum number of minutes of monitoring time per billing period.

RTM (Remote Therapeutic Monitoring) may be a device-based billing regime for therapy adherence monitoring, medication response monitoring, or musculoskeletal therapy monitoring. RTM may have day-spread requirements and time thresholds similar to RPM. RTM may apply to different patient populations and clinical scenarios than RPM.

The billing regime registry may store, for each billing regime, regime attributes comprising eligibility criteria, documentation mode attributes, unit or frequency limits, concurrency constraints, applicable code families, and effective date applicability. Eligibility criteria may specify patient population requirements, diagnosis indicators, provider qualifications, and payer coverage requirements. Documentation mode attributes may specify whether the billing regime uses attestation-based documentation or time-based documentation. Unit or frequency limits may specify maximum billable units per billing period, such as one unit per calendar month. Concurrency constraints may specify which billing regimes cannot be billed together in the same billing period for the same patient. Applicable code families may specify the CPT or HCPCS codes associated with the billing regime. Effective date applicability may specify the date range during which the billing regime rules are in effect.

The billing regime registry may be configurable to add, modify, or remove billing regimes and associated regime attributes without modification to the executable code of the system. The billing regime registry may support versioning of regime attributes with effective date ranges. When billing regime rules change due to regulatory updates or payer policy changes, new versions of regime attributes may be added to the registry with appropriate effective dates. The system may select the applicable regime attribute version based on the date of service for each claim.

The system may implement regime selection logic that determines an applicable billing regime for each patient and billing period. Regime selection logic may evaluate provider role eligibility to determine whether the rendering provider meets qualification requirements for each candidate billing regime. Regime selection logic may evaluate payer coverage to determine whether the patient's payer covers each candidate billing regime. Regime selection logic may evaluate the site-of-service to determine whether the service location meets requirements for each candidate billing regime, including special rules for Rural Health Clinics (RHC) and Federally Qualified Health Centers (FQHC). Regime selection logic may evaluate diagnosis indicators to determine whether the patient's diagnoses meet clinical criteria for each candidate billing regime. Regime selection logic may evaluate patient enrollment indicators to determine whether the patient is enrolled in applicable care management programs.

The regime selection logic may implement fallback logic when a preferred billing regime is unavailable. When APCM eligibility is not met due to patient criteria, payer coverage, or provider qualifications, the system may automatically select CCM as a fallback billing regime and may switch from attestation-based documentation mode to time-based documentation mode. The system may notify the care team of the documentation mode change to ensure appropriate time tracking is initiated. When GPCM eligibility is not met, similar fallback logic may apply.

The regime selection logic may implement concurrency conflict detection that identifies when multiple billing regimes cannot be billed together in the same billing period. Concurrency conflict detection may evaluate payer-specific stacking rules that vary by payer. For example, some payers may prohibit billing APCM and CoCM in the same calendar month for the same patient. When a concurrency conflict is detected, the system may prevent claim submission for the conflicting regime combination and may suggest alternative billing strategies that avoid the conflict.

The system may implement an attestation-based documentation mode for billing regimes such as APCM and GPCM. In attestation-based documentation mode, the system may collate completed care activities for the target billing period into an attestation summary. Completed care activities may include care-plan reviews, patient contact logs, outcome measure assessments, care team communications, and other documented activities. The attestation summary may be presented to a clinician interface for review. The clinician interface may present the attestation summary with a secure electronic signature field. Upon attestation, the clinician may review the summary, provide an electronic signature, and confirm the date of attestation. The system may record the attestation with a timestamp, signer identity, claim version identifier, and references to supporting documentation. In attestation-based documentation mode, no cumulative minute tracking is required or performed.

The system may implement time-based documentation mode for billing regimes such as CCM and CoCM. In time-based documentation mode, the system may track cumulative non-face-to-face service minutes per calendar month per practitioner. Time tracking may record start and end times for care management activities, task descriptions, and practitioner identifiers. The system may aggregate tracked time across multiple practitioners and multiple activities within the billing period. Time-based documentation mode may generate time logs and minute totals for inclusion in claim documentation.

The system may automatically switch between attestation-based documentation mode and time-based documentation mode based on billing regime eligibility. When the system determines that a patient is eligible for an attestation-based billing regime such as APCM, the system may operate in attestation-based documentation mode. When the system determines that the patient is not eligible for an attestation-based billing regime, the system may switch to time-based documentation mode and may select a time-based billing regime such as CCM. The documentation mode switch may be transparent to the clinician, with the presentation layer providing a consistent workflow regardless of the underlying documentation mode.

The system may enforce one unit per calendar month frequency limits for billing regimes such as APCM and GPCM. One unit per calendar month enforcement may prevent submission of claims for more than one unit of the billing code within a single calendar month for a given patient. The system may track submitted claims and may block additional claim submissions that would exceed the frequency limit. One unit per calendar month enforcement may apply regardless of the number of care activities performed during the billing period.

The system may enforce no-additional-units constraints for billing regimes that do not permit add-on codes or additional units. No-additional-units enforcement may prevent submission of claims that include add-on codes or multiple units when the billing regime rules prohibit such submissions. The system may validate claim preparation output against no-additional-units constraints prior to presenting the claim for approval.

The system may implement a delegation protocol that enables authorized billing approvers to delegate approval authority to artificial intelligence systems or staff members within defined constraints. The delegation protocol may specify approved billing regimes for which delegated approval is permitted. The delegation protocol may specify approved code families for which delegated approval is permitted. The delegation protocol may specify payer constraints that limit delegated approval to claims for specific payers. The delegation protocol may specify patient population constraints that limit delegated approval to claims for patients meeting defined criteria. The delegation protocol may specify confidence score thresholds that require manual approval when the artificial intelligence system's confidence score falls below the threshold. The delegation protocol may specify escalation rules that define conditions triggering escalation to manual review.

The delegation protocol may be versioned with a delegation protocol version identifier. When a delegation protocol is created or modified, a new version identifier may be assigned. The delegation protocol version identifier may be recorded in the attestation ledger entry for each claim approved under the delegation protocol. Delegation protocol versioning may enable audit trail reconstruction showing which delegation rules were in effect at the time of each claim approval.

The delegation protocol may be revocable and modifiable. An authorized billing approver may revoke a delegation protocol to terminate delegated approval authority. An authorized billing approver may modify a delegation protocol to change the constraints governing delegated approval. When a delegation protocol is revoked or modified, the system may apply the updated delegation protocol version to subsequent claim preparation outputs. Claims approved under prior delegation protocol versions may retain their original approval status.

For claim preparation outputs that satisfy the delegation protocol constraints, the system may generate the approval input automatically without requiring manual entry via the signature queue. Automatic approval generation may evaluate the claim preparation output against the delegation protocol constraints, including approved billing regimes, approved code families, payer constraints, patient population constraints, and confidence score thresholds. When all constraints are satisfied, the system may create an attestation ledger entry recording the automatic approval with the delegation protocol version identifier. When any constraint is not satisfied, the system may route the claim preparation output to the signature queue for manual approval.

The system may implement an optimization engine that generates multiple permissible billing strategies for a given patient and billing period. The optimization engine may evaluate care activity data, patient eligibility indicators, provider eligibility indicators, and payer policy rules to identify candidate billing regimes. For each candidate billing regime, the optimization engine may generate one or more billing strategies specifying billing codes, documentation mode, and submission timing.

The optimization engine may evaluate permissible billing strategies against compliance constraints to filter strategies that do not satisfy the constraints. Compliance constraints may include payer-specific concurrency constraints, frequency limits, unit limits, and medically unlikely edit constraints. Strategies that violate compliance constraints may be excluded from further consideration.

The optimization engine may determine a projected reimbursement value for each permissible billing strategy that satisfies the compliance constraints. Projected reimbursement value may be calculated based on fee schedules, contracted rates, historical payment patterns, or payer-specific reimbursement data. The optimization engine may account for expected adjustments, denials, and patient responsibility amounts when calculating projected reimbursement value.

The optimization engine may rank permissible billing strategies based on projected reimbursement value. The highest-ranked strategy may be designated as the recommended billing strategy. Alternative permissible strategies may be ranked in descending order of projected reimbursement value. The optimization engine may present the recommended billing strategy and at least one alternative permissible billing strategy to the authorized billing approver in the signature queue.

The optimization engine may generate explainability artifacts that provide transparency into the strategy recommendation. Explainability artifacts may include a reasoning summary explaining why the recommended billing strategy was selected. Explainability artifacts may include references to rule versions applied during strategy evaluation. Explainability artifacts may include results of evaluated compliance constraints showing which constraints were checked and whether each constraint was satisfied. Explainability artifacts may include confidence scores or ranking information indicating the relative strength of each strategy recommendation. Explainability artifacts may be presented to the authorized billing approver along with the recommended billing strategy to facilitate informed approval decisions.

The system may generate a compliance validation summary prior to presenting claim preparation output in the signature queue. The compliance validation summary may enumerate evaluated rules and constraint checks performed during claim validation. The compliance validation summary may include rule version identifiers indicating which versions of payer rules and regulatory rules were applied. The compliance validation summary may record pass or fail determinations for each constraint check. The compliance validation summary may be presented to the authorized billing approver to provide visibility into the compliance status of the claim preparation output.

The system may generate an evidence manifest that lists evidence items supporting a claim submission. Evidence items may include contact logs documenting patient communications, care plan updates documenting care management activities, device data documenting remote monitoring activities, attestation records documenting clinician review and approval, outcome measures documenting patient health status, and progress notes documenting clinical observations. Each evidence item in the manifest may include a timestamp indicating when the evidence was created or captured and a source identifier indicating the origin of the evidence.

The evidence manifest may include a hash for integrity verification. The hash may be computed over the contents of the evidence items or over the manifest itself. The hash may enable detection of tampering or modification of evidence after the manifest is created. The manifest identifier or hash may be stored in the attestation ledger entry associated with the claim submission. The manifest identifier may be associated with the claim submission to enable the retrieval of supporting evidence during audits or appeals.

The system may implement rules ingestion that receives payer policy rules from authoritative sources. Authoritative sources may include Centers for Medicare and Medicaid Services (CMS) National Correct Coding Initiative (NCCI) quarterly updates, payer companion guides, Council for Affordable Quality Healthcare (CAQH) Committee on Operating Rules for Information Exchange (CORE) specifications, and other published policy sources. Rules ingestion may parse policy documents to extract billing rules, frequency limits, concurrency constraints, and other policy parameters.

The system may implement rules versioning that tags each ingested rule set with effective date information. Each rule set may have an effective date range specifying the dates during which the rules are applicable. The system may match the date of service for each claim to the applicable rule version based on effective date ranges. Rules versioning may enable the system to apply historically accurate rules to claims with dates of service in prior periods.

The system may store rule provenance data comprising at least a source identifier, an ingest timestamp, and a version identifier for each ingested rule set. The source identifier may indicate the authoritative source from which the rules were obtained. The ingest timestamp may indicate when the rules were ingested into the system. The version identifier may uniquely identify the rule version. Rule provenance data may be stored in an audit trail and may be associated with claim submissions to enable reconstruction of the rules applied at the time of claim generation.

The attestation ledger entry may record a rule version identifier indicating which version of payer rules and regulatory rules was applied to generate or validate the claim submission. The rule version identifier may enable auditors to determine the exact rules that were in effect at the time of claim approval. The rule version identifier may support compliance verification by demonstrating that claims were validated against applicable rules.

The system may implement Medically Unlikely Edit (MUE) validation as part of compliance constraint checking. MUE validation may apply CMS NCCI MUE constraints with Medically Unlikely Edit Adjudication Indicator (MAI) type enforcement. MAI type 1 may indicate a claim-line edit that is adjudicated per line item. MAI type 2 may indicate an absolute constraint per date of service that applies across all claim lines. MAI type 3 may indicate a clinical benchmark that triggers review but does not result in automatic denial. The system may apply the appropriate MAI type based on the billing code and may enforce unit limits accordingly.

The system may enforce monthly frequency limits that restrict the number of times a billing code may be submitted within a calendar month. Monthly frequency limits may be specified in the billing regime registry and may vary by billing regime and payer. The system may track submitted claims and may prevent submission of claims that would exceed monthly frequency limits.

The system may enforce stacking restrictions that prevent certain billing codes from being billed together in the same billing period. Stacking restrictions may be specified as concurrency constraints in the billing regime registry. The system may evaluate claim preparation output against stacking restrictions and may flag or prevent submissions that violate stacking rules.

The system architecture may include a presentation layer and a billing plane with separation between the two layers. The presentation layer may provide a unified clinical workflow interface that is independent of the selected billing regime. Clinicians may experience a consistent workflow for care coordination, documentation, and task management regardless of which billing regime applies to a given patient or billing period. The presentation layer may display care coordination tasks, patient information, and documentation requirements without exposing underlying billing logic to the clinician.

The billing plane may be hidden from the clinician and may perform billing operations, including regime selection, code selection, validation, claim generation, submission, response parsing, correction, and reconciliation. The billing plane may automatically determine the applicable billing regime for each encounter or billing period based on eligibility evaluation. The billing plane may automatically switch between different billing regimes, documentation modes, and validation rules based on patient eligibility, payer policies, and regulatory requirements. The clinician may interact with a single unified workflow while the billing plane adapts regime logic under the hood without requiring manual billing regime selection by the clinician.

In some embodiments, the clinical assessment system 100 includes a computer-implemented system for automated care-to-claim orchestration. This integrated architecture seamlessly connects clinical care activities with billing and claims processing through a coordinated set of components that automate regime selection, claim generation, and compliance validation while maintaining clinical workflow independence from underlying billing operations.

The system 100 includes an event ingestion bus to receive patient interactions and clinical signals from multiple sources. The event ingestion bus receives data including patient messaging interactions, patient portal interactions, telehealth session data, electronic medical record updates, care-team task records, laboratory result data, and device-generated monitoring data. The event ingestion bus operates as a streaming data interface that captures clinical events in real-time or near-real-time as they occur during patient care delivery.

Connected to the event ingestion bus is an extractor for converting unstructured inputs into structured clinical facts (e.g., data, entities, patient health data, etc.). The extractor receives unstructured data such as free-text clinical notes, patient-reported symptom narratives, and audio transcripts from telehealth sessions. Using natural language processing techniques, the extractor identifies clinical entities within the unstructured inputs and converts them into discrete, structured clinical facts. For example, the extractor may process a free-text note stating “patient reports severe headache for three days” and convert this unstructured input into structured clinical facts comprising: symptom=headache, severity=severe, duration=3 days. The extractor outputs structured clinical facts with standardized field names, data types, and values that enable downstream processing.

The structured clinical facts produced by the extractor may then processed by a canonical mapper that may map facts to standardized clinical schemas. The canonical mapper receives the structured clinical facts from the extractor and maps each fact to corresponding elements within standardized clinical schemas such as SNOMED CT, LOINC, HL7 fhir, or other healthcare interoperability standards. The canonical mapper ensures that clinical facts extracted from diverse source systems are normalized to common terminology and structure. For example, the canonical mapper may map a fact expressing “glucose=180 mg/dL” to the LOINC code 2345-7 (Glucose [Mass/volume] in Serum or Plasma) and map the observation value to the appropriate FHIR Observation resource structure with standardized units. The canonical mapper thereby enables interoperability and consistent interpretation of clinical facts across the system.

The mapped clinical facts are stored in a graph store including versioned nodes and edges representing patient state. The graph store maintains a temporal graph database where nodes represent clinical entities such as patients, conditions, medications, observations, and care activities, while edges represent relationships between these entities such as “patient has condition,” “medication treats condition,” or “observation indicates progression.” Each node and edge in the graph store includes version information including timestamps, version identifiers, and historical state records. When new clinical facts arrive, the graph store creates new node versions or edge versions rather than overwriting existing data, thereby preserving a complete historical record of patient state evolution over time.

A care plan update engine is configured to update care plans in response to graph changes. The care plan update engine monitors the graph store for changes in patient state that trigger care plan modifications. When the care plan update engine detects a graph change (e.g., such as a new diagnosis node being added), an observation node version indicating a value outside target range, or a medication node being discontinued and the care plan update engine evaluates predefined rules and clinical protocols to determine whether care plan updates are warranted. The care plan update engine may generate updated care plan nodes in the graph store, create task assignments for care team members, and trigger notifications to appropriate personnel based on the detected graph changes.

The system 100 further includes a billing engine configured to automate billing regime selection, validation, claim generation, and lifecycle management. The billing engine operates independently from the clinical workflow presentation layer, automatically handling billing operations without requiring clinician input regarding billing regime selection or documentation mode. The billing engine can select at least one billing regime based on provider role, patient eligibility, payer policy, and date of service. The billing engine accesses a billing regime registry that stores regime attributes for a plurality of care management billing regimes. In some embodiments, the at least one billing regime is selected from a plurality of billing regimes including: APCM (Advanced Primary Care Management), GPCM (General Primary Care Management), CCM (Chronic Care Management), CoCM (Collaborative Care Management), PCM (Principal Care Management), RPM (Remote Patient Monitoring), and RTM (Remote Therapeutic Monitoring). For each billing period, the billing engine receives regime selection inputs comprising provider role taxonomy identifying the provider’s classification (e.g., physician, nurse practitioner, clinical social worker), patient eligibility criteria indicating the patient’s diagnoses and chronic condition count, payer policy identifier specifying the patient’s insurance payer and plan, and date of service indicating when care activities occurred. The billing engine applies regime selection logic that matches these inputs against the eligibility criteria, provider qualification requirements, and payer coverage rules stored in the billing regime registry to determine which billing regime or regimes are applicable for the patient during the target billing period.

In some embodiments, when eligibility criteria for attestation-based billing regimes are satisfied, the billing engine selects APCM or GPCM when eligibility criteria are met, enforces one unit per calendar month with no additional units, and detects concurrency conflicts with other monthly care-management codes. The billing engine evaluates whether the patient meets clinical eligibility requirements (such as having two or more chronic conditions for APCM), whether the provider holds required qualifications, and whether the payer covers APCM or GPCM. When these criteria are satisfied, the billing engine selects APCM or GPCM as the billing regime. The billing engine then enforces a constraint of one unit per calendar month with no additional units permitted. For example, a single claim unit may be submitted for APCM or GPCM per calendar month regardless of the volume of care activities performed. The billing engine tracks submitted claims in a claim status registry and blocks any attempt to generate additional APCM or GPCM units within the same calendar month for the same patient. Additionally, the billing engine detects concurrency conflicts with other monthly care-management codes by evaluating stacking compatibility data that identifies which billing regime combinations are prohibited by payer policy. For example, if payer policy prohibits billing APCM concurrently with CoCM in the same month, the billing engine detects this concurrency conflict and either prevents submission of the conflicting regime combination or generates a regime adjustment recommendation for clinician or billing staff review.

For CCM and CoCM, the system tracks cumulative non-face-to-face minutes and validates the non-face-to-face minutes against monthly predefined thresholds before claim generation. When the billing engine selects CCM or CoCM as the billing regime, the system switches to time-based documentation mode and activates time tracking. The time tracker module records start times and end times for non-face-to-face care management activities performed by care team members, including activities such as care plan development, care coordination, patient education, medication management, and communication with other providers. The time tracker accumulates the total non-face-to-face minutes for the billing period and stores this cumulative time in association with the patient record. Before generating a claim for CCM or CoCM, the billing engine validates the cumulative non-face-to-face minutes against monthly predefined thresholds specified in the billing regime registry. For example, CCM may require a minimum of 20 non-face-to-face minutes per calendar month, while CoCM may require different thresholds. The billing engine compares the tracked cumulative minutes to the applicable threshold and only proceeds with claim generation when the threshold is satisfied. If the cumulative minutes fall short of the threshold, the billing engine may generate a threshold shortfall notification to care team members to encourage additional qualifying activities before the billing period ends, or may defer claim generation until sufficient minutes are accumulated.

In some embodiments, the billing engine is may enforce regime-specific validation rules including monthly frequency, stacking restrictions, and documentation mode (attestation vs time-based). Monthly frequency validation ensures that billing codes with frequency limitations—such as one unit per calendar month for APCM, GPCM, and certain RPM codes—are not billed more frequently than permitted. Stacking restrictions validation evaluates whether proposed billing code combinations violate payer-specific concurrency constraints that prohibit billing certain regime combinations in the same billing period. Documentation mode enforcement ensures that attestation-based regimes such as APCM and GPCM collect attestation records from clinicians confirming completed care activities, while time-based regimes such as CCM and CoCM collect time tracking records documenting cumulative service minutes. The billing engine automatically selects and applies the appropriate documentation mode based on the selected billing regime without requiring manual clinician selection of documentation mode.

In some embodiments, the billing engine generates claims using X12 837 transactions. When care activities are completed, documented, and validated for a billing period, the billing engine prepares claim data comprising procedure codes, diagnosis codes, patient demographics, provider identifiers, service dates, and billing amounts. The billing engine then formats this claim data into X12 837 transaction format, which is the standard EDI (Electronic Data Interchange) format for healthcare claim submissions in the United States. The billing engine may generate X12 837P (professional) transactions for physician and professional services or X12 837I (institutional) transactions for facility-based services depending on the billing entity type and service setting. The generated X12 837 transactions include all required segments and data elements according to X12 implementation guide specifications, including claim header information, service line details, and supporting documentation references.

In some embodiments, the billing engine receives and parses acknowledgments associated with the generated claims. After transmitting X12 837 claim transactions to clearinghouses or payers via EDI protocols, the billing engine receives multiple types of acknowledgment transactions indicating the status of claim processing. The billing engine is further configured to receive and parse acknowledgments (277CA) and remittance advice (835 ERA with CLP/SVD/CAS; CARC/RARC). Specifically, the billing engine receives X12 277CA (Claim Acknowledgment) transactions containing STC (Status Category and Status Code) segments that provide claim-level status indicators such as accepted, rejected, or pended. The billing engine parses the 277CA transactions to extract these status indicators and updates claim status records accordingly. Additionally, the billing engine receives X12 835 (Electronic Remittance Advice or ERA) transactions that provide detailed payment and adjustment information for adjudicated claims. The billing engine parses the 835 ERA transactions to extract CLP (Claim Payment Information) segments providing claim-level payment details, SVD (Service Payment Information) segments providing service-line-level payment details, and CAS (Claim Adjustment Segment) segments containing adjustment information. From the CAS segments, the billing engine extracts group codes (such as PR for Patient Responsibility, CO for Contractual Obligation, PI for Payer Initiated Reduction, and OA for Other Adjustment), CARC (Claim Adjustment Reason Code) values providing numeric reason codes for adjustments, and RARC (Remittance Advice Remark Code) values providing additional explanatory remarks. The billing engine stores this parsed acknowledgment and remittance data in claim tracking records to support financial reconciliation and corrective action workflows.

In some embodiments, the billing engine classifies errors, corrects, and resubmits claims. When parsed acknowledgments or remittance advice transactions indicate claim rejections, denials, or requests for additional information, the billing engine initiates corrective workflows. The billing engine classifies detected errors based on error type, severity, and correctability. For simple errors that can be corrected automatically (e.g., missing demographic information that can be retrieved from the patient registry, incorrect formatting that can be automatically corrected, or missing documentation that can be automatically attached), the billing engine applies auto-correction logic to generate corrected claim data. For complex errors requiring human judgment (e.g., coding disputes, medical necessity determinations, or policy interpretation questions), the billing engine routes the claim to an exception queue for manual review by billing specialists or clinicians. The billing engine accesses a denial playbook that maps combinations of CARC codes, RARC codes, and group codes to predefined corrective actions, enabling consistent and efficient error resolution. After errors are corrected, the billing engine resubmits the corrected claims using idempotent resubmission logic that prevents duplicate claim submissions by tracking claim control identifiers and checking for prior submissions before transmitting.

In some embodiments, the billing engine maintains claim provenance. Throughout the claim lifecycle from initial claim preparation through final payment or appeal resolution, the billing engine records provenance information that documents the history and basis for each claim. Claim provenance includes identifiers linking claims to the underlying care activities recorded in the graph store, timestamps marking when care activities occurred and when claims were generated and submitted, rule version identifiers indicating which versions of payer policy rules and billing regime rules were applied during claim validation, approver identifiers recording which authorized personnel approved the claim for submission, and evidence manifest identifiers referencing documentation bundles supporting the claim. This provenance information is stored in immutable records that cannot be altered after creation, ensuring that a complete audit trail is available for compliance verification, regulatory audits, and appeal preparation.

The system 100 includes an audit and security layer to record append-only entries with timestamps, actor identity, claim versions, and operation types. The audit and security layer maintains an attestation ledger that stores append-only entries for all significant operations including claim approvals, claim submissions, error corrections, resubmissions, and appeals. Each append-only entry includes a timestamp indicating when the operation occurred, an actor identity identifying the user account, system process, or artificial intelligence component that performed the operation, a claim version identifier uniquely identifying the specific version of claim data involved in the operation, and an operation type classifying the type of action performed (e.g., "CLAIM_APPROVED," "CLAIM_SUBMITTED," "ERROR_CORRECTED," "CLAIM_RESUBMITTED," "APPEAL_INITIATED"). The append-only nature of the attestation ledger ensures that entries cannot be modified or deleted after creation, providing tamper-resistant audit trails that satisfy regulatory requirements for healthcare billing accountability and compliance. The audit and security layer also records rule version identifiers indicating which policy rules were in effect at the time of each operation, delegation protocol identifiers when approvals are made under delegated authority, and manifest identifiers or cryptographic hashes of evidence bundles supporting claims.

In some embodiments, the system 100 further includes a presentation layer providing a unified clinician workflow independent of the selected at least one billing regime. The presentation layer includes clinician-facing user interfaces for care coordination, documentation entry, task management, and patient communication. Importantly, the presentation layer does not expose billing regime selection controls or documentation mode type to clinicians. Instead, clinicians interact with a consistent workflow for documenting care activities, updating care plans, and completing patient interactions regardless of which billing regime applies or whether attestation-based or time-based documentation is required. The billing plane including the billing engine, regime selection logic, documentation mode switching, compliance validation, and claim generation, may operate beneath the presentation layer and performs billing operations automatically without requiring manual billing regime selection by clinicians. This architectural separation allows clinicians to focus on clinical care delivery while the system automatically handles the complexity of multi-regime billing rules, payer policy requirements, documentation mode transitions, frequency limit enforcement, concurrency conflict detection, and claims processing in the background.

The care-to-claim orchestration architecture integrates with other components of the clinical assessment system 100 previously described. The event ingestion bus may receive inputs from the wearable devices 138, patient interface 110, clinician interface 112, and EMR 144. The extractor and canonical mapper may utilize capabilities of the trained LLM 102 and cognitive analysis module 116 for natural language processing and entity extraction. The graph store may be implemented as part of the patient data repository 106 or may constitute a separate temporal database. The care plan update engine may interact with the care plan library 154 and clinical workflow engine 108. The billing engine may coordinate with the time tracking and billing system 156. The audit and security layer may implement security protocols described in the Security and Privacy Boundary 904 and compliance audit functions described in the Compliance Audits and Reporting module. The presentation layer may encompass aspects of the patient interface 110, clinician interface 112, and unified presentation layer 168 described elsewhere in this specification.

Figure 41B:
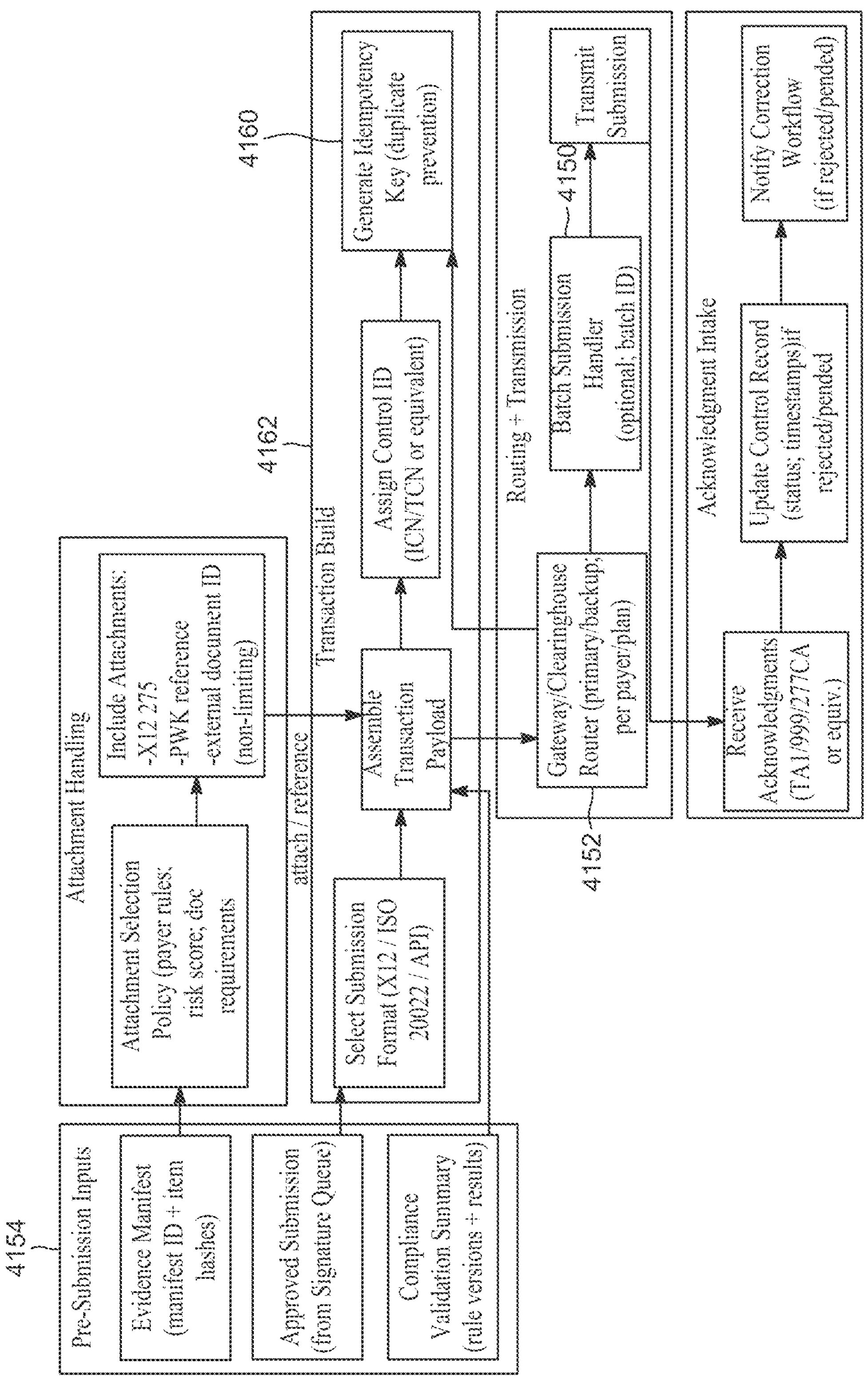
FIG. 41B illustrates an exemplary flow diagram of claim submission with batch processing, multi-clearinghouse routing, and attachment handling, according to aspects of the present disclosure.

FIG. 41B illustrates a detailed process flow for assembling, transmitting, acknowledging, and correcting a standardized electronic submission within an automated healthcare transaction management system, in accordance with one or more embodiments of the present disclosure.

As shown in FIG. 41B, the process begins with a pre-submission input stage 4154, in which evidence manifests are prepared, including manifest identifiers, item references, and associated hashes to ensure data integrity. In parallel, an approval submission queue captures transactions that have passed prior validation and are ready for downstream processing, while a compliance validation stage confirms that all applicable rules and versioned requirements have been satisfied. Attachment handling is then performed, wherein attachment selection logic applies payer-specific rules, jurisdictional policies, and documentation requirements to determine required attachments. Selected attachments are included with the submission, along with reference pointers, document identifiers, and cryptographic hashes, and are linked to the submission in a non-limiting manner.

Following attachment handling, the process advances to a transaction build stage 4162, where the submission payload is assembled. A standardized submission format is selected, such as X12 837 or X12 278, or an equivalent transaction format, and the payload is assembled accordingly. A control identifier is assigned, such as an ICN, TCN, or equivalent identifier, to uniquely identify the transaction. An idempotency key is then generated at stage 4160 to prevent duplicate submissions and ensure safe retries in the event of transmission failures.

The assembled transaction is routed for transmission at stage 4152 via a gateway or clearinghouse, based on routing logic associated with the payer, plan, or destination endpoint. The submission may be transmitted individually or as part of an optional batch submission, depending on configuration or throughput requirements. Upon transmission, an acknowledgment is received, such as an X12 999 or 277CA acknowledgment, or an equivalent response, indicating acceptance, rejection, or conditional processing status.

The system updates a control record to reflect the received acknowledgment, including status, timestamps, and any referenced identifiers. If the acknowledgment indicates a rejection or error, a correction workflow is triggered, and a notification is generated to initiate correction handling. This correction workflow may include regenerating the submission, modifying data elements, updating attachments, or reapplying rules, followed by resubmission using the previously generated idempotency key to ensure consistency and traceability.

FIG. 41B depicts a closed-loop submission lifecycle that integrates attachment management, standardized transaction construction, idempotent transmission, acknowledgment handling, and corrective feedback. The illustrated process enables reliable, compliant, and auditable electronic submissions while minimizing duplication, ensuring data integrity, and supporting automated recovery from transmission or validation errors.

Figure 42B:
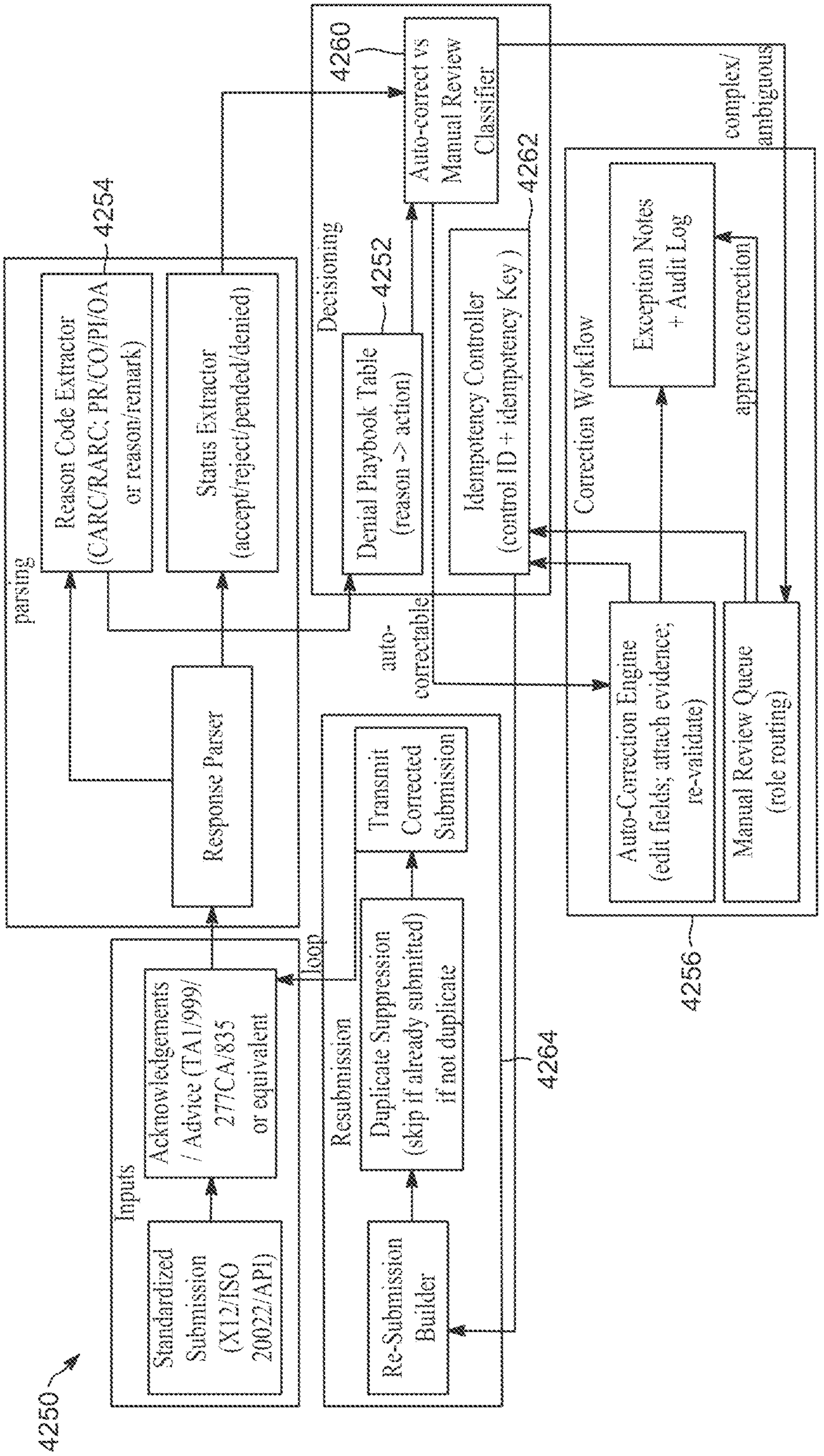
FIG. 42B illustrates an exemplary flow diagram of a correction workflow with denial playbooks and idempotent resubmission logic, according to aspects of the present disclosure.

FIG. 42B illustrates a correction and resubmission workflow that is invoked in response to acknowledgments, denials, or rejection signals received for a previously transmitted standardized transaction, in accordance with one or more embodiments of the present disclosure.

As shown in FIG. 42B, the correction and resubmission workflow 4250 begins with receipt of inputs, which may include standardized acknowledgments or advice messages such as X12 999, 277CA, or equivalent responses generated in reply to a prior standardized submission (e.g., X12 or ISO 20022 formats). These inputs are parsed by a response parser, which extracts structured response elements including acceptance indicators, rejection codes, denial codes, and explanatory remarks. A reason code extractor 4254 identifies applicable CARC, RARC, or equivalent codes and associated textual reasons, while a status extractor derives a normalized transaction status, such as accepted, rejected, or conditionally accepted.

The extracted information is evaluated by a denial playbook table 4252, which maps the identified reason codes and statuses to predefined actions, including automated correction, manual review, or escalation. An idempotency controller 4262 assigns or retrieves a control identifier and idempotency key to ensure that any subsequent correction or resubmission is uniquely tracked and protected against duplicate processing. Based on the decisioning outcome, straightforward and auto-correctable conditions are routed to an automated correction path, while complex or ambiguous conditions are routed to a manual review queue 4256.

For auto-correctable cases, an auto-correction engine 4260 applies rule-based or model-assisted edits to the affected data fields, attachments, or evidence artifacts, resulting in a corrected transaction. The corrected transaction is then passed to a resubmission builder 4264, which constructs a resubmission using a standardized submission format and applies a duplicate-prevention check to ensure consistency with the original submission. The corrected submission is then transmitted downstream for processing.

In parallel, cases requiring human intervention are routed through the correction workflow, where exception rules, audit logs, and approval checkpoints are applied. A manual review queue supports role-based routing, enabling subject-matter experts to review complex denials, approve corrective actions, or annotate exception handling decisions. Outcomes from manual review may trigger approval or correction actions, which are then fed back into the resubmission path.

FIG. 42B also depicts an integrated closed-loop denial handling and correction framework that combines automated parsing, rule-driven decisioning, idempotent control, automated correction, and human-in-the-loop review. This workflow enables efficient recovery from submission errors, reduces resubmission latency, ensures auditability, and improves overall transaction success rates within regulated healthcare transaction environments.

Figure 42C:
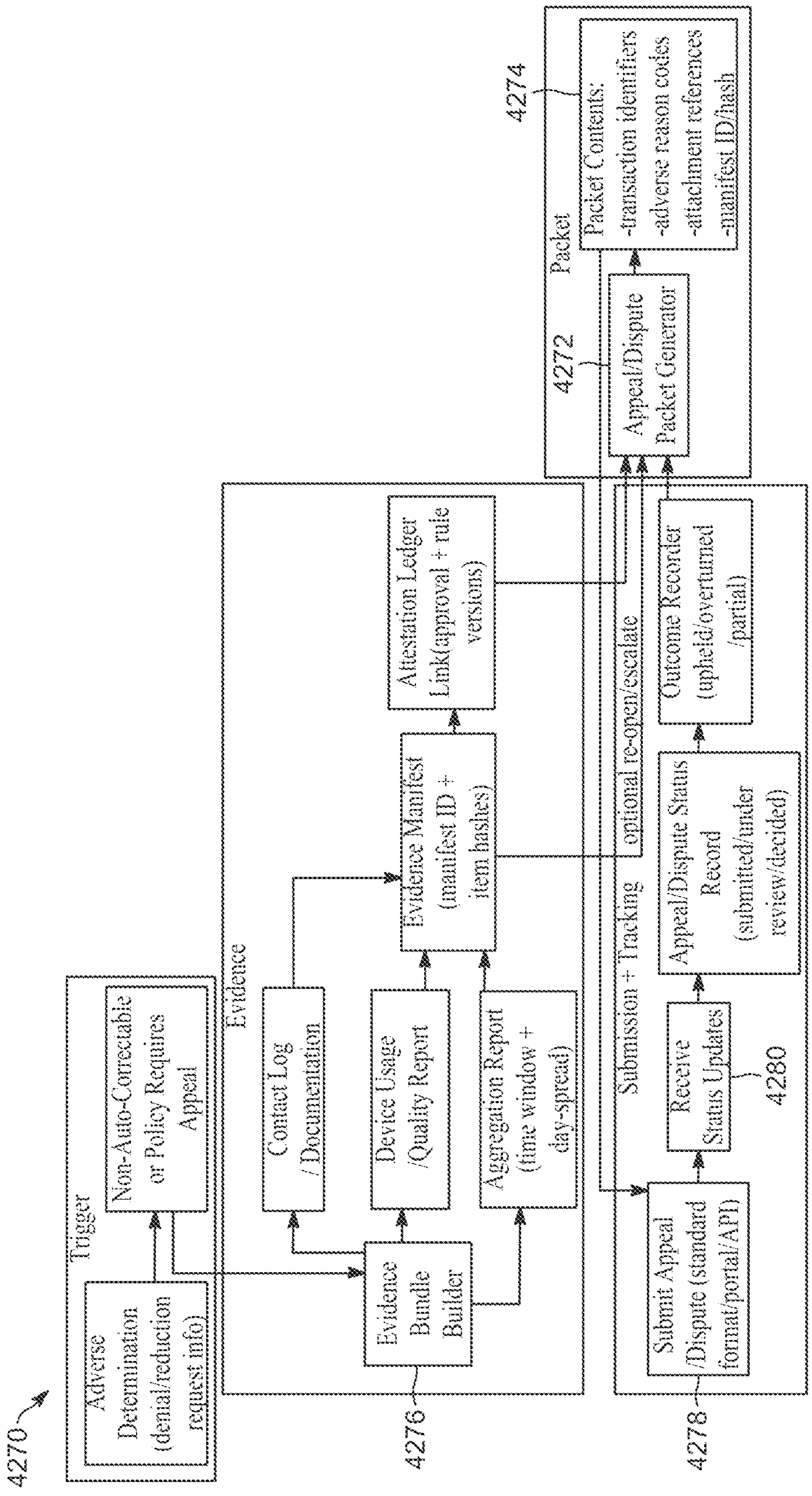
FIG. 42C illustrates an exemplary flow diagram of an appeals workflow with packet generation and status tracking, according to aspects of the present disclosure.

FIG. 42C illustrates an appeal and dispute handling workflow that is invoked when an adverse determination is identified as non-auto-correctable or requires policy-level review, in accordance with one or more embodiments of the present disclosure.

As shown in FIG. 42C, the appeal and dispute handling workflow 4270 is triggered upon detection of an adverse determination, such as a denial or partial rejection, that is classified as non-auto-correctable or designated by policy rules as requiring an appeal. In response, an evidence bundle builder 4276 is initiated to assemble supporting materials for the appeal. The evidence pipeline aggregates multiple sources of substantiating information, including contextual logs, device usage and quality reports, aggregation reports over defined time windows or day spans, and other compliance-relevant artifacts. These inputs are combined by an evidence bundle builder to generate a consolidated evidence bundle.

The generated evidence bundle is stored and referenced within an evidence manifest, which includes item identifiers and cryptographic hashes to ensure integrity and traceability. In parallel, an attestation ledger records immutable attestations associated with the appeal, including applicable rule identifiers and versioning information, thereby preserving a verifiable audit trail for downstream review.

Once the evidence bundle is finalized, an appeal or dispute packet is generated by an appeal/dispute packet generator 4272. The packet includes the compiled evidence, applicable reason codes, explanatory narratives, rule references, and manifest identifiers. Packet contents 4274 may further include payer-specific justifications, standardized denial reason mappings, and structured metadata required for formal appeal submission.

The appeal packet is then submitted via a submission interface 4278 using a standardized appeal format or payer portal API, depending on payer requirements. Following submission, a submission tracking module 4280 receives and monitors status updates, including acknowledgments, under-review indicators, partial approvals, or final determinations. Outcome updates are recorded by an outcome recorder, which tracks appeal status over time and captures resolution states for reporting and analytics.

Optionally, escalation paths may be invoked if predefined response timelines are exceeded or if intermediate outcomes indicate the need for additional review or supplemental documentation. Throughout the appeal lifecycle, all submissions, evidence artifacts, attestations, and status updates remain linked via the evidence manifest and attestation ledger, ensuring end-to-end traceability, compliance accountability, and defensible audit support.

FIG. 42C also depicts a structured, auditable appeal and dispute management framework that supports policy-driven escalation, standardized packet generation, secure evidence handling, and continuous outcome tracking within regulated healthcare transaction systems.

Figure 43B:
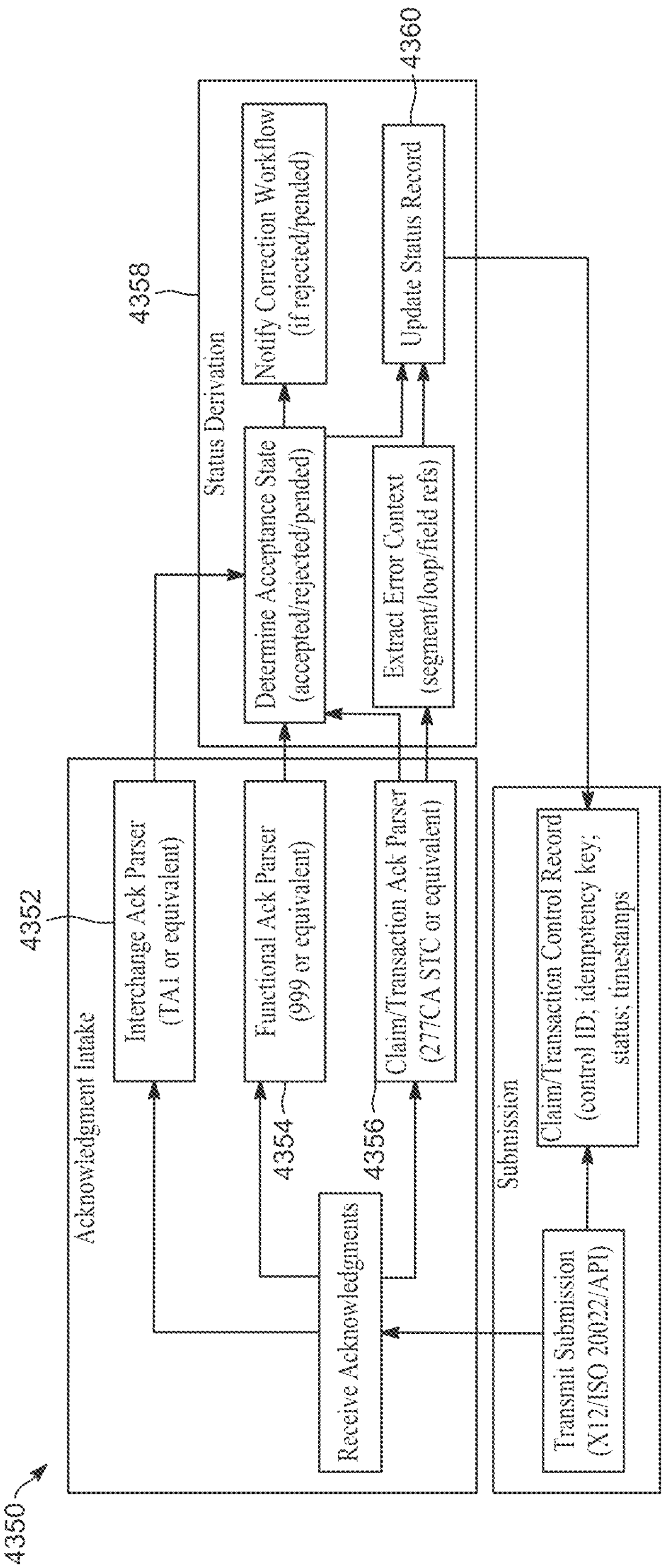
FIG. 43B illustrates an exemplary flow diagram of acknowledgment processing, including interchange, functional, and claim-level acknowledgments, according to aspects of the present disclosure.

FIG. 43B illustrates a status derivation and acknowledgment processing workflow for standardized healthcare transaction submissions, in accordance with one or more embodiments of the present disclosure.

As shown in FIG. 43B, the workflow begins when a standardized transaction submission is transmitted in a compliant format, such as an X12 or ISO 2022 API message, and corresponding acknowledgments are received by an acknowledgment intake module 4350. The acknowledgment intake module processes multiple types of inbound responses, including interchange-level acknowledgments parsed by an interchange acknowledgment parser 4352 (e.g., TA1 or equivalent), functional acknowledgments parsed by a functional acknowledgment parser 4354 (e.g., 999 or equivalent), and claim or transaction-level acknowledgments parsed by a claim/transaction acknowledgment parser 4356 (e.g., 277CA or equivalent). These parsed acknowledgments are normalized to extract structured status indicators, error codes, and processing outcomes.

The parsed acknowledgment data is provided to a status derivation module 4358, which determines an acceptance state for the submitted transaction based on the combined acknowledgment signals. The acceptance state may indicate acceptance, rejection, partial acceptance, or pending review, and is derived by correlating acknowledgment responses across interchange, functional, and transaction layers. The status derivation module further extracts contextual information, including segment-level errors or provider-identified issues, to support downstream processing.

Based on the determined acceptance state, the workflow updates a transaction status record via an update status record component 4360, thereby persisting the current state of the submission along with associated timestamps and identifiers. When the acceptance state indicates a rejection or partial failure, a correction workflow may be triggered, and notification signals are generated to initiate corrective actions or resubmission processes. Conversely, when the acceptance state indicates acceptance, the workflow may proceed to downstream financial or reporting stages without intervention.

In parallel, a submission transaction control record is maintained and updated, linking control identifiers, idempotency keys, and submission timestamps to the derived status. This linkage enables end-to-end traceability between transmitted submissions, received acknowledgments, and resulting workflow actions. Accordingly, FIG. 43B depicts a robust, multi-layer acknowledgment processing and status derivation framework that ensures accurate tracking, timely correction initiation, and auditable lifecycle management of standardized healthcare transaction submissions.

Figure 44B:
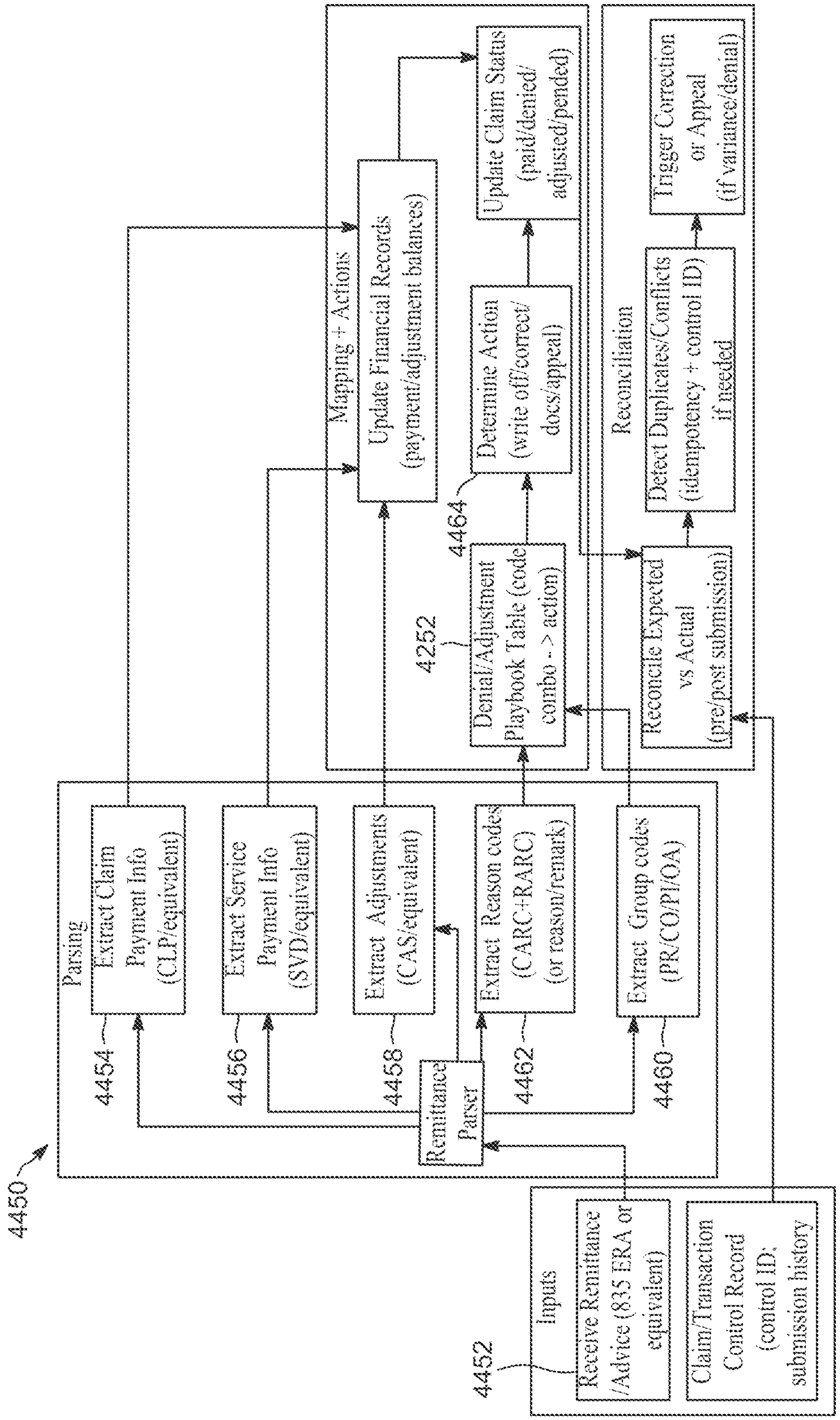
FIG. 44B illustrates an exemplary flow diagram of remittance advice parsing with segment extraction and reason code mapping, according to aspects of the present disclosure.

Referring to FIG. 44B, a remittance advice parsing workflow 4450 may be implemented by the billing engine to receive and parse X12 835 (Health Care Claim Payment/Advice) transactions. An 835 ERA parser 4452 may parse the 835 transaction, also known as Electronic Remittance Advice (ERA), to extract detailed information about claim payment decisions, adjustments, and patient responsibility amounts.

A CLP segment extractor 4454 may extract CLP (Claim Payment Information) segments from the 835 transaction. The CLP segment may provide claim-level payment information, including the claim identifier, claim status code, total claim charge amount, total claim payment amount, and patient responsibility amount. The remittance advice parsing workflow 4450 may use the CLP segment to determine overall claim payment status and to reconcile claim payments with submitted claim amounts.

A SVD segment extractor 4456 may extract SVD (Service Payment Information) segments from the 835 transaction. The SVD segment may provide service-line-level payment information, including the procedure code, service charge amount, and service payment amount. The remittance advice parsing workflow 4450 may use SVD segments to determine payment amounts for individual services within a claim and to identify services that were paid differently than billed.

A CAS segment extractor 4458 may extract CAS (Claim Adjustment Segment) segments from the 835 transaction. The CAS segment may provide adjustment information, including group codes, CARC codes, RARC codes, and adjustment amounts. A group code extractor 4460 may parse CAS segments to extract the specific reasons for claim adjustments and the amounts associated with each adjustment reason.

A CARC/RARC mapper 4462 may map extracted CARC and RARC codes to corrective actions using the denial playbook table 4252. When CAS segments indicate adjustments that may be correctable or appealable, a corrective action initiator 4464 may initiate the correction and resubmission workflow 4250 or appeal and dispute handling workflow 4270 as appropriate. When CAS segments indicate contractual adjustments (group code CO) that represent expected write-offs, the remittance advice parsing workflow 4450 may record the adjustments without initiating corrective action.

The remittance advice parsing workflow may update claim status records and financial records based on parsed remittance advice information. Claim status records may be updated to reflect payment status, payment amounts, and adjustment reasons. Financial records may be updated to reflect received payments, patient responsibility amounts, and contractual adjustments. The remittance advice parsing workflow may support financial reconciliation by matching received payments with submitted claims and identifying discrepancies that require follow-up.

The billing engine may implement RPM (Remote Patient Monitoring) and RTM (Remote Therapeutic Monitoring) monthly aggregation logic for device-based billing regimes. RPM and RTM billing regimes may use aggregation of device telemetry data over monthly billing periods, validation of day-spread requirements, and attribution of monitoring time to billing codes.

In some embodiments, the aggregation logic may implement configurable monthly aggregation window types to accommodate different billing scenarios and payer requirements. A fixed window aggregation may align aggregation periods to calendar month boundaries, such that all patient data for January is aggregated from January 1 through January 31 regardless of the patient's enrollment date. Fixed window aggregation may simplify billing operations by creating consistent monthly billing cycles aligned with organizational accounting periods and payer processing schedules. Alternatively, a sliding window aggregation may align aggregation periods to patient-specific cycle boundaries based on enrollment dates or other patient-specific milestones. For example, a patient enrolled on January 15 may have a first billing period from January 15 through February 14, a second billing period from February 15 through March 14, and subsequent periods following the same patient-specific monthly cycle. Sliding window aggregation may maximize billable services by ensuring each patient receives a full monthly billing period regardless of enrollment timing. In some embodiments, the system 100 may select the aggregation window type based on billing regime requirements, payer preferences, or configurable organizational policies stored in the billing regime registry. The selected aggregation window type may determine how device-generated data points, care activities, and service minutes are attributed to billing periods.

In operation, the system 100 may detect and handle partial billing periods that occur when patients enroll, disenroll, or experience coverage gaps during a billing period. When a patient enrolls in a care management program mid-period, the system 100 may detect the enrollment date and may determine whether the partial period from enrollment date through period end satisfies minimum requirements for billing. When a patient disenrolls or loses coverage mid-period, the system 100 may detect the disenrollment date or coverage termination date and may determine whether the partial period from period start through disenrollment date satisfies minimum requirements for billing. The system may implement a minimum partial period threshold (e.g., 5 days, 10 days, 15 days, etc.) below which no billing is permitted for the partial period. The system 100 may implement rollover policies that determine whether activities or data points occurring near billing period boundaries are attributed to a current billing period or to a subsequent billing period. A strict boundary policy may attribute all activities based strictly on the date of occurrence, with no carryover across period boundaries. A grace period policy may allow activities occurring within a specified grace period, such as 2-3 days before or after a period boundary, to be attributed to either adjacent period based on optimization logic. A provider election policy may enable care providers to designate which billing period should be credited for boundary-proximate activities, subject to compliance constraints. When coverage gaps occur mid-period due to insurance lapses or plan changes, the system may split the billing period at the gap boundaries and may evaluate each continuous coverage segment independently against billing requirements. If neither segment satisfies minimum thresholds, the system 100 may merge data across the gap if payer policies permit gap bridging, or may defer billing until a subsequent period when sufficient data has been accumulated.

In some embodiments, the system 100 may track device lifecycle events to ensure accurate attribution of device-generated data to appropriate billing periods and to maintain data continuity when devices are replaced. Device lifecycle events may include device enrollment when a monitoring device is first associated with a patient and begins transmitting data, device replacement when an existing device is substituted with a new device due to malfunction or upgrade, and device disenrollment when a device is permanently disassociated from a patient at program termination or service discontinuation.

When a device enrollment event occurs, the system may record the device identifier, patient identifier, enrollment timestamp, and device type in a device registry. Device-generated data received after the enrollment timestamp may be attributed to the enrolled patient and included in billing period aggregations. When a device replacement event occurs, the system may record the replacement timestamp, the old device identifier, and the new device identifier. Data from the old device up through the replacement timestamp may be included in aggregations, and data from the new device beginning at the replacement timestamp may be included in aggregations, ensuring continuity of data collection across the device transition. The system may treat the replacement as a single continuous monitoring episode for billing purposes, with day-spread counting continuing across the device change. When a device disenrollment event occurs, the system may record the disenrollment timestamp, and device-generated data received after the disenrollment timestamp may be excluded from billing period aggregations. The system may finalize any open billing periods affected by the disenrollment. For patients with multiple monitoring devices simultaneously enrolled, such as a patient with both a blood glucose monitor and a blood pressure monitor, the system may attribute data from each device to the appropriate billing regime and code. The system may prevent duplicate attribution of the same monitoring activity to multiple billing codes when activities could plausibly be classified under multiple regimes.

In some embodiments, the billing regime registry may store regime-specific aggregation policies that define how data points and activities are aggregated for each billing regime. Aggregation policies may vary across billing regimes to reflect different clinical monitoring patterns and payer billing rules. An aggregation policy for a billing regime may specify a rounding rule that determines how fractional time units or partial days are handled. For example, a rounding rule may specify rounding down to the nearest complete 15-minute increment for time-based regimes, rounding to the nearest whole day for day-spread counting, or no rounding with fractional values preserved for internal tracking. An aggregation policy may specify a minimum increment that defines the smallest billable unit. For example, a minimum increment of 20 minutes may require that accumulated time reach at least 20 minutes before any billing is permitted, preventing billing for minimal service durations.

In some embodiments, an aggregation policy may specify excluded event types that should not be included in aggregation calculations. For example, certain administrative communications or technical device troubleshooting activities may be excluded from billable time accumulation. An aggregation policy may specify an overlap handling rule that determines how overlapping activities by multiple care team members are attributed. A no-overlap rule may prevent simultaneous activities from being double-counted. A partial overlap rule may allow overlapping activities up to a specified threshold. An aggregation policy may specify cap rules that limit the maximum time or units that can be accumulated in a single billing period. For example, a cap rule may limit CCM billing to a maximum of 90 minutes per calendar month even if more time was documented. In some embodiments, the system 100 may have organizational policies that may track cumulative patient engagement across periods for clinical monitoring purposes even if not for billing purposes. Each aggregation policy may be versioned with effective date ranges, enabling the system to apply historically accurate aggregation rules when processing claims for prior service periods or when payer requirements change over time. The system 100 may select the applicable aggregation policy version based on the date of service or billing period associated with the claim, ensuring that the aggregation logic applied matches the rules in effect during the service period.

RPM monthly aggregation may aggregate device-generated physiological data such as blood pressure readings, blood glucose measurements, weight measurements, or pulse oximetry readings over a calendar month billing period. The aggregation logic may count the number of distinct calendar days on which device data was transmitted during the billing period. RPM billing codes may require data transmission on a minimum number of distinct days, such as sixteen days within thirty days, to satisfy billing requirements.

RTM monthly aggregation may aggregate therapy adherence data, medication response data, or musculoskeletal therapy data over a calendar month billing period. The aggregation logic may track patient engagement with therapeutic monitoring devices or applications and may count distinct engagement days within the billing period. RTM billing codes may have day-spread requirements similar to RPM codes.

The aggregation logic may validate device-generated data against signal quality criteria prior to including the data in aggregation. Signal quality criteria may include device enrollment status verification to confirm that the device is enrolled and associated with the patient. Signal quality criteria may include data completeness checks to verify that transmitted data includes required data elements. Signal quality criteria may include timestamp validity checks to verify that data timestamps fall within the billing period and are not duplicated. Signal quality criteria may include physiological plausibility range checks to verify that data values fall within clinically plausible ranges.

The aggregation logic may attribute monitoring time to billing codes based on activity type. Monitoring time may be classified as device monitoring time for automated data collection and review, interactive communication time for patient-provider communications related to monitoring data, or treatment management time for clinical activities performed in response to monitoring data. The aggregation logic may deterministically resolve attribution conflicts when activities could be attributed to multiple billing codes and may associate classified activities with a single billing regime and billing period.

The aggregation logic may detect when accumulated data points or monitoring time are below thresholds required for billing prior to billing period deadlines. When threshold shortfalls are detected, the billing engine may generate threshold shortfall notifications to clinician interfaces, patient interfaces, or care coordinator interfaces. Threshold shortfall notifications may encourage additional patient engagement or device usage to meet billing requirements before the billing period ends. The billing engine may log threshold shortfall notifications as intervention events for inclusion in evidence bundles.

The system may implement cross-domain generalization that extends the billing pipeline architecture beyond healthcare to other regulated transaction environments. The architecture may be generalized using terminology that applies across multiple domains while maintaining the core pipeline structure and approval-gating mechanisms.

In the generalized architecture, the billing regime registry may be referred to as a policy regime registry that stores regime attributes for a plurality of policy regimes applicable to the target domain. The policy regime registry may store eligibility criteria, documentation mode attributes, unit or frequency limits, concurrency constraints, applicable classification codes, and effective date applicability for each policy regime. The policy regime registry may be configurable to add, modify, or remove policy regimes without modification to executable code.

In the generalized architecture, the authorized billing approver may be referred to as an authorized transaction approver associated with an authority identifier. The authorized transaction approver may be an individual or entity with authority to approve transactions within the target domain. The signature queue may present proposed transaction content and strategy to the authorized transaction approver for approval.

In the generalized architecture, the clearinghouse interface may be referred to as a gateway interface that connects to transaction processing networks or authority interfaces within the target domain. The standardized electronic transaction format may include X12 transaction sets for healthcare domains, ISO 20022 messages for financial services domains, or other standardized formats appropriate to the target domain.

In the generalized architecture, the appeal workflow may be referred to as a dispute workflow that generates dispute packets and initiates dispute resolution processes. The dispute packet may include transaction identifiers, prior response codes and reason classes, and references to supporting documents. The dispute workflow may track dispute status based on electronic status updates from authorities or counterparties.

The cross-domain generalization may enable application of the pipeline architecture to regulated transaction environments, including legal billing, government grant management, insurance claims processing, financial regulatory filings, and other domains that share characteristics with healthcare billing, such as policy-based eligibility determination, compliance validation, approval workflows, standardized transaction formats, and dispute mechanisms.

Figure 52:
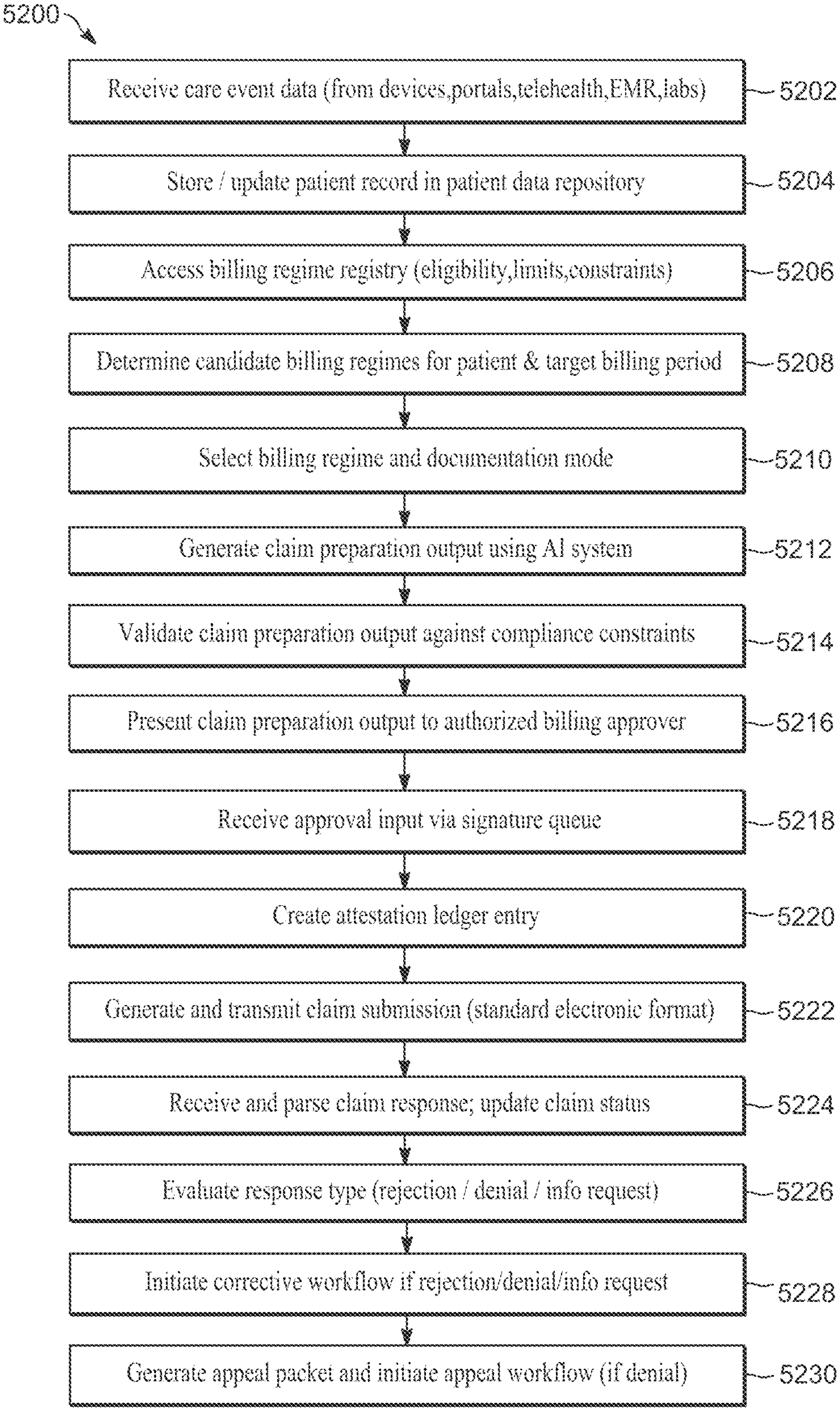
FIG. 52 illustrates a flowchart of a method for generating, validating, submitting, and managing reimbursement claims based on care activity data, according to aspects of the present disclosure.

Referring to FIG. 52, a method 5200 for generating, validating, submitting, and managing reimbursement claims based on care activity data may be performed by the billing engine. The method 5200 may begin at a step 5202, where the billing engine receives, via an event ingestion interface, care event data for a patient from a plurality of sources. The plurality of sources may include at least one of patient messaging interactions, patient portal interactions, telehealth session data, electronic medical record updates, care-team task records, laboratory result data, or device-generated monitoring data. At step 5204, the method 5200 may include storing or updating, based on the care event data, a patient record in a patient data repository.

At a step 5206, the method 5200 may include accessing a billing regime registry that stores, for each of a plurality of billing regimes, regime attributes comprising at least one of eligibility criteria, documentation mode, unit or frequency limits, concurrency constraints, applicable code families, and effective date applicability. At a step 5208, the method 5200 may include determining, for the patient and a target billing period, at least one candidate billing regime based on at least one of the care event data, patient eligibility indicators, provider eligibility indicators, payer policy rules, and a date of service.

At a step 5210, the method 5200 may include selecting a billing regime from among the at least one candidate billing regime and determining a documentation mode corresponding to the selected billing regime. The documentation mode may be selected from at least an attestation-based documentation mode and a time-based documentation mode. At a step 5212, the method 5200 may include generating claim preparation output using an artificial intelligence system comprising one or more of a large language model, a machine learning model, a rules-based inference engine, or a hybrid thereof.

At step 5214, the method 5200 may include validating the claim preparation output against compliance constraints prior to transmitting a claim submission. The compliance constraints may include at least one of payer-specific concurrency constraints, frequency limits, unit limits, or medically unlikely edit constraints. At a step 5216, the method 5200 may include presenting, via a user interface, the claim preparation output to an authorized billing approver associated with a billing identifier in a signature queue.

At step 5218, the method 5200 may include receiving an approval input via the signature queue. At a step 5220, the method 5200 may include, in response to the approval input, creating an attestation ledger entry that records at least a claim identifier, a claim version identifier, an identifier of the authorized billing approver, and an approval timestamp. At a step 5222, the method 5200 may include generating and transmitting, based on the validated and approved claim preparation output, a claim submission in a standardized electronic transaction format to a clearinghouse interface or payer interface.

At a step 5224, the method 5200 may include receiving at least one response to the claim submission, parsing the at least one response to determine a claim status or error classification, and updating a claim status record. At step 5226, the method 5200 may evaluate whether the at least one response indicates a rejection, denial, or request for additional information. At step 5228, when the at least one response indicates a rejection, denial, or request for additional information, the method 5200 may include initiating a corrective workflow. At a step 5230, when the at least one response indicates a denial, the method 5200 may include generating an appeal packet and initiating an appeal workflow.

The method may include accessing a billing regime registry that stores, for each of a plurality of billing regimes, regime attributes comprising at least one of eligibility criteria, documentation mode, unit or frequency limits, concurrency constraints, applicable code families, and effective date applicability. The method may include determining, for the patient and a target billing period, at least one candidate billing regime based on at least one of the care event data, patient eligibility indicators, provider eligibility indicators, payer policy rules, and a date of service.

The method may include selecting a billing regime from among the at least one candidate billing regime and determining a documentation mode corresponding to the selected billing regime. The documentation mode may be selected from at least an attestation-based documentation mode and a time-based documentation mode. In the attestation-based documentation mode, the method may include collating completed care activities for the target billing period into an attestation summary for review. In the time-based documentation mode, the method may include tracking cumulative service time for the target billing period.

The method may include generating claim preparation output using an artificial intelligence system. The artificial intelligence system may include one or more of a large language model, a machine learning model, a rules-based inference engine, or a hybrid thereof. The claim preparation output may include at least one of a billing code recommendation, a claim data structure, or a documentation bundle identifier. The artificial intelligence system may generate, for the claim preparation output, a confidence score. The confidence score may indicate the artificial intelligence system's certainty in the billing code recommendation or claim data structure. The method may include routing the claim preparation output to manual review when the confidence score fails to satisfy a threshold. The threshold may be configurable by billing regime, payer, or code family.

The method may include validating the claim preparation output against compliance constraints prior to transmitting a claim submission. The compliance constraints may include at least one of payer-specific concurrency constraints, frequency limits, unit limits, or medically unlikely edit constraints. Validating against the compliance constraints may include detecting payer-specific concurrency conflicts between a first billing regime and a second billing regime for a same patient and target billing period. Validating against the compliance constraints may include enforcing a frequency rule of one unit per calendar month for at least one billing regime. Validating against the compliance constraints may include enforcing a no-additional-units constraint for at least one billing regime. Validating against the compliance constraints may include applying medically unlikely edit validation, including at least one of a claim-line edit constraint, an absolute date-of-service constraint, and a clinical benchmark constraint.

The method may include generating, prior to presenting in the signature queue, a compliance validation summary that enumerates evaluated rules and constraint checks, includes associated rule version identifiers, and records pass or fail determinations for each constraint. The method may include presenting, via a user interface, the claim preparation output to an authorized billing approver associated with a billing identifier in a signature queue. The method may include receiving an approval input via the signature queue.

The method may include, in response to the approval input, creating an attestation ledger entry that records at least a claim identifier, a claim version identifier, an identifier of the authorized billing approver, and an approval timestamp. The attestation ledger entry may further record an identifier of a rule version applied to generate or validate the claim submission. The method may include receiving, from the authorized billing approver, a delegation protocol specifying at least one of approved billing regimes, approved code families, payer constraints, patient population constraints, confidence score thresholds, or escalation rules. For claim preparation outputs that satisfy the delegation protocol, the method may include generating the approval input without requiring manual entry via the signature queue and recording, in the attestation ledger entry, a delegation protocol version identifier. The method may include receiving an update that revokes or modifies the delegation protocol and applying a modified delegation protocol version to subsequent claim preparation outputs.

The signature queue may support receiving approvals from a plurality of authorized billing approvers in a sequential or parallel approval chain. In a sequential approval chain, a first authorized billing approver must provide approval before a second authorized billing approver receives the claim preparation output for review. In a parallel approval chain, multiple authorized billing approvers may review and approve the claim preparation output simultaneously. The attestation ledger may record approval inputs from each approver in the approval chain, including timestamps and approver identifiers for each approval.

Presenting to the authorized billing approver may include selecting the authorized billing approver from among a plurality of potential approvers based on at least one of billing regime, payer, code family, confidence score, risk score, claim amount, authority level, or classification code family. The system may maintain approver role assignments that associate approvers with specific billing regimes, payers, code families, or claim amount thresholds. The system may route claims to appropriate approvers based on claim characteristics and approver role assignments.

The method may include generating and transmitting, based on the validated and approved claim preparation output, a claim submission in a standardized electronic transaction format to a clearinghouse interface or payer interface. The standardized electronic transaction format may include an X12 837 claim submission transaction. The method may include routing the claim submission to one of a plurality of clearinghouse interfaces based on at least one of a payer identifier, a plan identifier, or routing rules. The method may include aggregating a plurality of claim preparation outputs into a batch, presenting the batch in a consolidated signature queue for bulk approval, and, upon receiving a bulk approval input, submitting corresponding claim submissions.

The method may include assembling a documentation bundle comprising at least one of contact logs, care plan updates, outcome measures, or progress notes, and linking the documentation bundle to the claim submission using an electronic attachment mechanism. The electronic attachment mechanism may include at least one of an X12 275 transaction or a paperwork reference segment comprising an external document identifier.

The method may include receiving at least one response to the claim submission, parsing the at least one response to determine a claim status or error classification, and updating a claim status record. Receiving the at least one response may include receiving an X12 TA1 interchange acknowledgment and an X12 999 functional acknowledgment. Receiving the at least one response may include receiving an X12 277CA claim acknowledgment transaction and parsing at least one claim status segment to classify a submission error prior to adjudication. Receiving the at least one response may include receiving an X12 835 remittance advice transaction and parsing the remittance advice transaction to extract at least one of a claim payment segment, a service payment segment, or a claim adjustment segment. Parsing the remittance advice transaction may include extracting a group code and at least one claim adjustment code comprising at least one of a claim adjustment reason code or a remittance advice remark code, and mapping extracted codes to corrective actions using a denial playbook table. The group code may be selected from PR, CO, PI, and OA.

The method may include, when the at least one response indicates a rejection, denial, or request for additional information, initiating a corrective workflow. The corrective workflow may include at least one of generating corrected claim data, generating or linking documentation, resubmitting a corrected claim submission, or routing the claim to manual review. Initiating the corrective workflow may include detecting duplicate claim submissions using a claim control identifier and preventing redundant resubmission by applying idempotent resubmission logic.

The method may include, when the at least one response indicates a denial, generating an appeal packet and initiating an appeal workflow. The appeal workflow may include at least one of transmitting the appeal packet via a standardized electronic transaction format or a payer interface, associating additional documentation with the appeal packet, and tracking appeal status updates. Generating the appeal packet may include generating an appeal packet that includes at least one of an identifier of the denied claim submission, denial metadata extracted from a remittance advice transaction, or one or more documentation bundle identifiers.

The method may include tracking outcomes comprising at least one of claim approval, claim denial, claim adjustment, recoupment, or appeal outcome, and updating one or more strategy ranking parameters based on the tracked outcomes. The method may include ingesting payer policy rules from one or more authoritative sources and storing rule provenance data comprising at least a rule source identifier and an ingestion timestamp.

In some embodiments, the method 5200 may include be performed by a computer-implemented system for managing reimbursement claims. The system may include a processor; and memory storing instructions that, when executed by the processor, cause the processor to: receive care event data for a patient, the care event data comprising one or more of: patient messaging interactions, patient portal interactions, telehealth session data, electronic medical record updates, care-team task records, laboratory result data, and device-generated monitoring data, access a billing regime registry that stores regime attributes for a plurality of billing regimes, automatically select an applicable billing regime for the patient based on the care event data and stored regime attributes, generate, using an artificial intelligence system, claim preparation output for the selected billing regime, validate the claim preparation output against compliance constraints, present the claim preparation output for approval, and upon receiving approval, generate an attestation record. The process 5200 may further include generating and transmitting, based on the validated and approved claim preparation output, a claim submission in a standardized electronic transaction format to a clearinghouse interface or a payer interface and receiving and parsing a response to the claim submission. In this method 5200, when the response indicates an error condition, the method may automatically initiate a corrective workflow and when the response indicates a denial, the method may initiate an appeal workflow.

Figure 53:
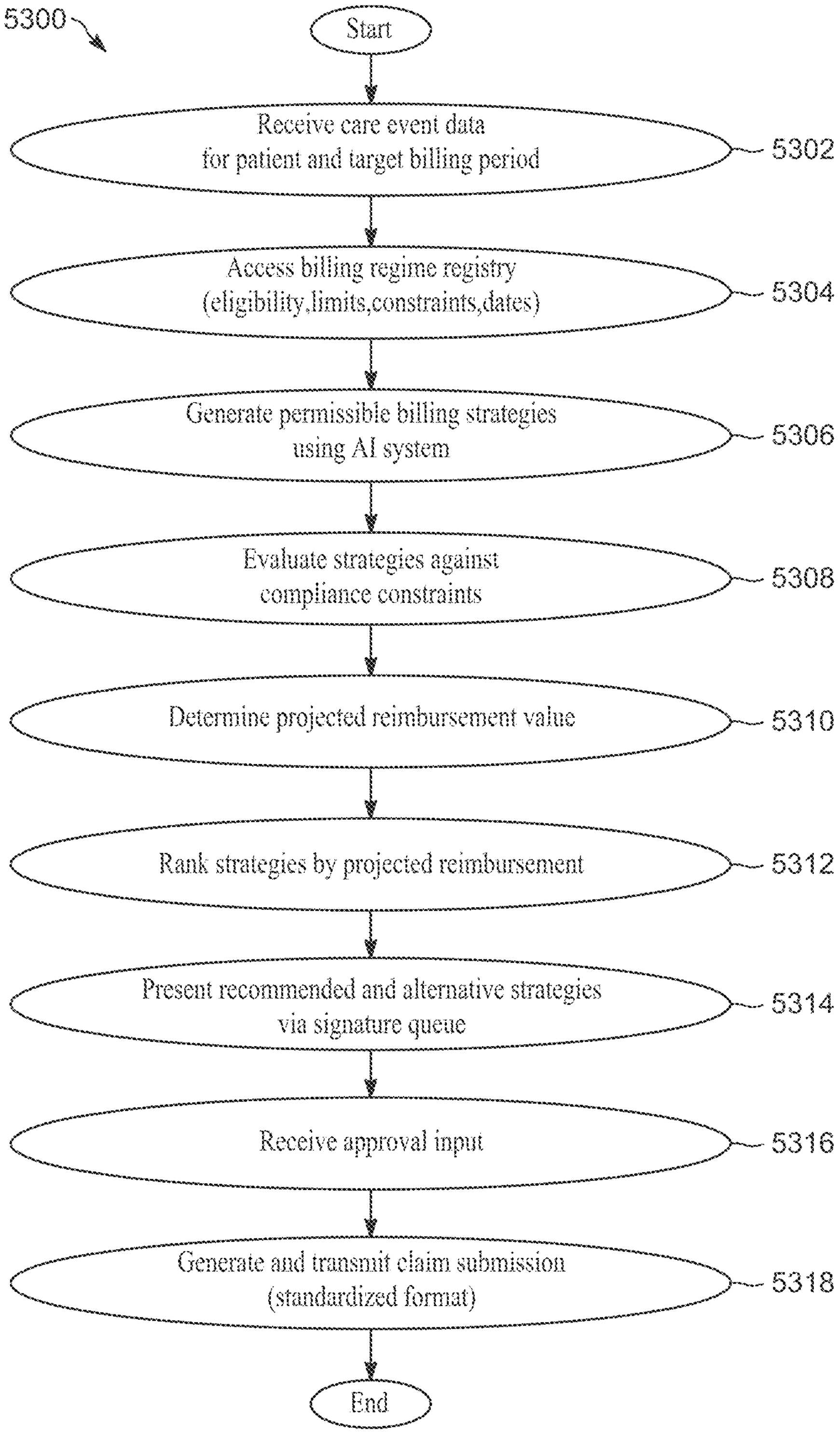
FIG. 53 illustrates a flowchart of a method for optimizing billing strategy selection for reimbursement claims, according to aspects of the present disclosure.

Referring to FIG. 53, a method 5300 for optimizing billing strategy selection for reimbursement claims based on care activity data may be performed by the billing engine. The method 5300 may begin at a step 5302, where the billing engine receives care event data for a patient for a target billing period. At a step 5304, the method 5300 may include accessing a billing regime registry storing regime attributes comprising at least eligibility criteria, unit or frequency limits, concurrency constraints, documentation mode attributes, and effective date applicability.

At a step 5306, the method 5300 may include generating, using an artificial intelligence system comprising one or more of a large language model, a machine learning model, a rules-based inference engine, or a hybrid thereof, a plurality of permissible billing strategies. Each permissible billing strategy may specify at least one of a billing regime, a set of billing codes, a documentation mode, or a submission timing. At a step 5308, the method 5300 may include evaluating the permissible billing strategies against compliance constraints comprising at least one of payer-specific concurrency constraints, frequency limits, unit limits, or medically unlikely edit constraints.

At a step 5310, the method 5300 may include determining, for each permissible billing strategy that satisfies the compliance constraints, a projected reimbursement value. At a step 5312, the method 5300 may include ranking the permissible billing strategies based on projected reimbursement value. At a step 5314, the method 5300 may include presenting, via an approval interface comprising a signature queue, a recommended billing strategy and at least one alternative permissible billing strategy to an authorized billing approver associated with a billing identifier.

At step 5316, the method 5300 may include receiving an approval input via the signature queue. At a step 5318, the method 5300 may include, upon receiving the approval input, outputting instructions that cause the generation and transmission of a claim submission corresponding to the approved billing strategy in a standardized electronic transaction format.

The method may include generating, using an artificial intelligence system, a plurality of permissible billing strategies. The artificial intelligence system may include one or more of a large language model, a machine learning model, a rules-based inference engine, or a hybrid thereof. Each permissible billing strategy may specify at least one of a billing regime, a set of billing codes, a documentation mode, or a submission timing. The artificial intelligence system may generate, for each permissible billing strategy, a confidence score.

The method may include evaluating the permissible billing strategies against compliance constraints. The compliance constraints may include at least one of payer-specific concurrency constraints, frequency limits, unit limits, or medically unlikely edit constraints. Evaluating against the compliance constraints may include detecting payer-specific concurrency conflicts between a first billing regime and a second billing regime for the same patient and target billing period. Evaluating against the compliance constraints may include enforcing a frequency rule of one unit per calendar month for at least one billing regime. Evaluating against the compliance constraints may include enforcing a no-additional-units constraint for at least one billing regime. Evaluating against the compliance constraints may include determining whether to apply a capped-unit monthly billing regime or a time-based regime that permits multiple units in the target billing period based on the projected reimbursement value and satisfaction of the compliance constraints. Evaluating against the compliance constraints may include applying medically unlikely edit validation, including at least one of a claim-line constraint, an absolute date-of-service constraint, or a clinical benchmark constraint.

The method may include determining, for each permissible billing strategy that satisfies the compliance constraints, a projected reimbursement value. The method may include ranking the permissible billing strategies based on projected reimbursement value. Presenting may include ordering displayed strategies based on at least one of the projected reimbursement value or confidence score. Strategies with higher confidence scores or higher projected reimbursement values may be presented more prominently in the signature queue.

The method may include presenting, via an approval interface comprising a signature queue, a recommended billing strategy and at least one alternative permissible billing strategy to an authorized billing approver associated with a billing identifier. Presenting to the authorized billing approver may include presenting an explainability artifact comprising at least a reasoning summary for the recommended billing strategy, references to rule versions applied, results of evaluated compliance constraints, and confidence or ranking information.

The method may include, upon receiving an approval input via the signature queue, outputting instructions that cause the generation and transmission of a claim submission corresponding to the approved billing strategy. The method may include tracking outcomes comprising at least one of claim approval, claim denial, claim adjustment, recoupment, or appeal outcome, and updating one or more strategy ranking parameters based on the tracked outcomes. The learning loop may adjust routing thresholds, confidence score thresholds, or strategy ranking weights based on tracked outcomes without requiring model retraining. Outcomes feedback may flow from the response parser to the optimizer to enable continuous improvement of strategy recommendations.

Referring to FIG. 1D, a method for generating, validating, submitting, and managing reimbursement claims for monthly billing regimes based on care activity data, may be performed by the billing engine. The method may include receiving, via an event ingestion interface, care event data for a patient from a plurality of sources. The plurality of sources may include at least one of device telemetry, patient application interactions, asynchronous clinician messaging, telehealth session data, electronic medical record updates, care-team task records, or laboratory result data. The method may include storing or updating, based on the care event data, a patient record in a patient data repository.

In some embodiments, the method 5300 may be a computer-implemented method for optimizing billing strategy selection for reimbursement claims. The method may include receiving care event data for a patient for a target billing period, accessing a billing regime registry storing regime attributes comprising at least eligibility criteria, unit or frequency limits, concurrency constraints, documentation mode attributes, and effective date applicability, generating, using an artificial intelligence system, a plurality of permissible billing strategies, each permissible billing strategy specifying at least one of: a billing regime, a set of billing codes, a documentation mode, or a submission timing. The method 5300 may further include evaluating the permissible billing strategies against compliance constraints comprising at least one of: payer-specific concurrency constraints, frequency limits, unit limits, or medically unlikely edit constraints, determining, for each permissible billing strategy that satisfies the compliance constraints, a projected reimbursement value, ranking the permissible billing strategies based on the projected reimbursement value, and causing presentation of a recommended billing strategy, and at least one alternative permissible billing strategy to an authorized billing approver associated with a billing identifier. Upon receiving an approval responsive to the presentation of the recommended billing strategy, the method may include outputting instructions that cause generation and transmission of a claim submission corresponding to the approved billing strategy.

Figure 54:
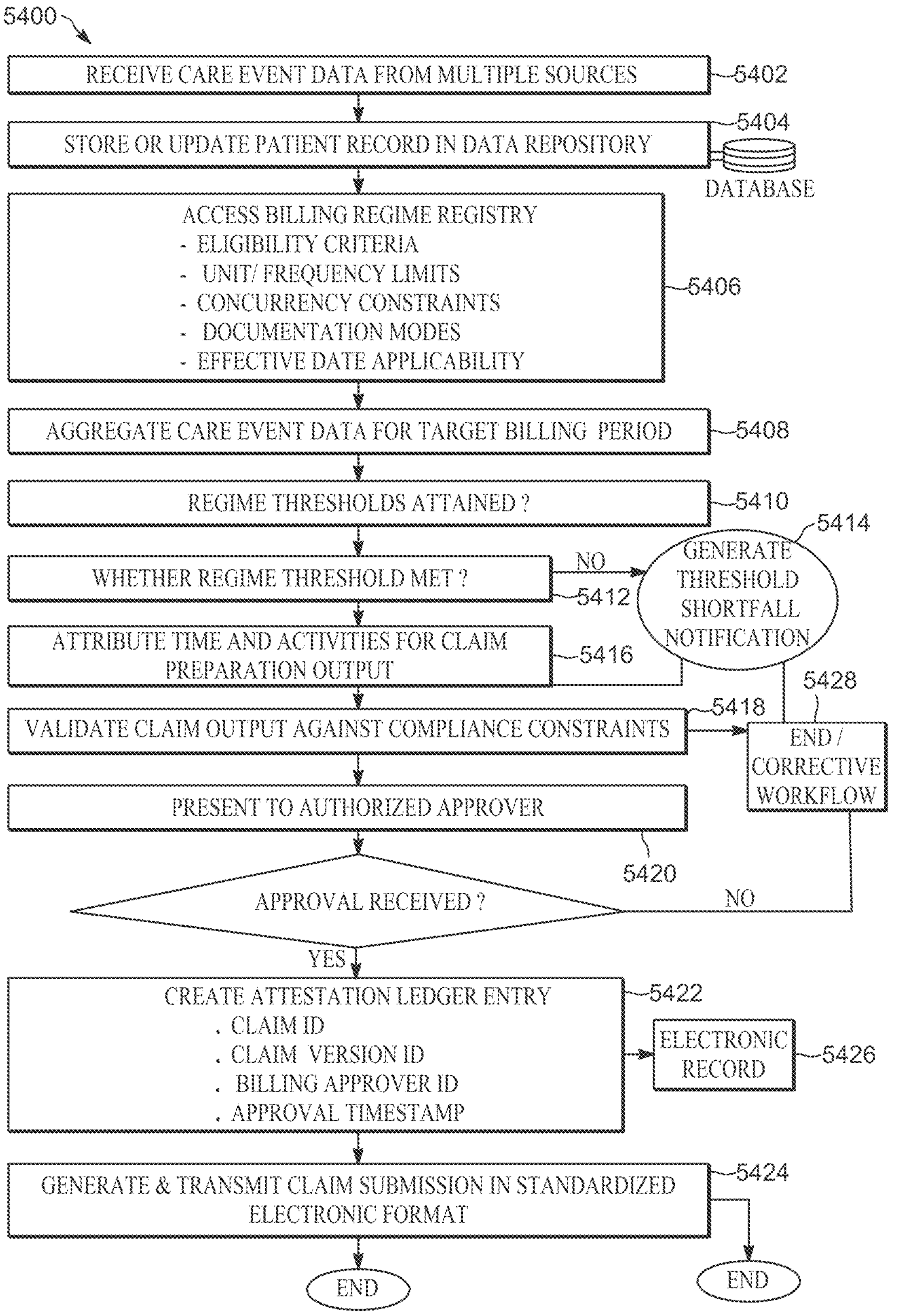
FIG. 54 illustrates a flowchart of a method for generating, validating, submitting, and managing reimbursement claims for monthly billing regimes based on care activity data, according to aspects of the present disclosure.

Referring to FIG. 54, a method 5400 for generating, validating, submitting, and managing reimbursement claims for monthly billing regimes based on care activity data may be performed by the billing engine. The method 5400 may begin at a step 5402, where the billing engine receives, via an event ingestion interface, care event data for a patient from a plurality of sources comprising at least one of device telemetry, patient application interactions, asynchronous clinician messaging, telehealth session data, electronic medical record updates, care-team task records, or laboratory result data. At step 5404, the method 5400 may include storing or updating, based on the care event data, a patient record in a patient data repository.

At a step 5406, the method 5400 may include accessing a billing regime registry that stores, for each of a plurality of billing regimes, regime attributes comprising at least one of eligibility criteria, documentation mode attributes, unit or frequency limits, concurrency constraints, applicable code families, and effective date applicability. At a step 5408, the method 5400 may include aggregating, for a target billing period, at least a portion of the care event data. At step 5410, the method 5400 may include detecting whether one or more regime-specific thresholds for the target billing period are attained based on the aggregated data.

At step 5412, the method 5400 may evaluate whether the regime-specific thresholds are met. At step 5414, when the thresholds are not met, the method 5400 may include generating a threshold shortfall notification to a clinician interface, patient interface, or care coordinator interface. At a step 5416, the method 5400 may include attributing at least one of time or activities to a billing regime and the target billing period to form claim preparation output.

At step 5418, the method 5400 may include validating the claim preparation output against compliance constraints prior to transmitting a claim submission. At a step 5420, the method 5400 may include presenting the claim preparation output to an authorized billing approver associated with a billing identifier in a signature queue and receiving an approval input. At a step 5422, the method 5400 may include, in response to the approval input, creating an attestation ledger entry that records at least a claim identifier, a claim version identifier, an identifier of the authorized billing approver, an approval timestamp, and an evidence bundle manifest identifier.

At a step 5424, the method 5400 may include generating and transmitting, based on the validated and approved claim preparation output, a claim submission in a standardized electronic transaction format to a clearinghouse interface or payer interface. At a step 5426, the method 5400 may include receiving at least one electronic response to the claim submission, parsing the at least one electronic response to determine a claim status or error classification, and updating a claim status record. At a step 5428, the method 5400 may include initiating a corrective workflow when the response indicates a rejection, or generating an appeal packet and initiating an appeal workflow when the response indicates a denial.

The method may include detecting whether one or more regime-specific thresholds for the target billing period are attained based on the aggregated data. The regime-specific thresholds may include a minimum cumulative time threshold for time-based billing regimes. The regime-specific thresholds may include a minimum day-spread requirement specifying that data must be collected across a minimum number of distinct calendar days within the billing period. The method may include validating device-generated data against signal quality criteria prior to including the data in aggregation. The signal quality criteria may include device enrollment status verification, data completeness checks, timestamp validity checks, and physiological plausibility range checks.

The method may include attributing at least one of time or activities to a billing regime and the target billing period to form claim preparation output. The attributing may include classifying activities as device monitoring time, interactive communication time, or treatment management time. The attributing may include deterministically resolving attribution conflicts when activities could be attributed to multiple billing codes. The method may include detecting partial billing periods due to mid-period enrollment, disenrollment, or coverage gaps, and applying a rollover policy that determines whether activities occurring near a billing period boundary are attributed to the current billing period or to a subsequent billing period. The processor may switch from the attestation-based documentation mode to the time-based documentation mode in response to determining that the patient is not eligible for an attestation-based billing regime for the target billing period. The system may automatically switch between documentation modes in response to determining that an eligibility or policy condition is no longer satisfied.

The method may include validating the claim preparation output against compliance constraints prior to transmitting a claim submission. The compliance constraints may include at least one of payer-specific concurrency constraints, frequency limits, unit limits, or medically unlikely edit constraints. The method may include generating, prior to presenting in the signature queue, a compliance validation summary that enumerates evaluated rules and constraint checks.

The method may include presenting the claim preparation output to an authorized billing approver associated with a billing identifier in a signature queue and receiving an approval input. The method may include, in response to the approval input, creating an attestation ledger entry that records at least a claim identifier, a claim version identifier, an identifier of the authorized billing approver, and an approval timestamp. The method may include generating an evidence bundle manifest that lists evidence items with timestamps and sources, storing a manifest identifier or hash in the attestation ledger entry, and associating the manifest identifier with the claim submission.

The system 100 may implement multi-approver routing capabilities that enable claim preparation outputs for utilizing approvals from multiple authorized personnel to be routed through approval chains with sequential or parallel approval workflows. Multi-approver routing may be used with and/or for high-value claims, high-risk billing regimes, complex clinical scenarios, or organizational policy requirements. An example approval chain configuration may be defined as a data structure specifying the sequence and conditions for multi-approver processing. The approval chain configuration may be associated with specific billing regimes, code families, claim amounts, payer types, or other claim characteristics. Each approval chain configuration may specify two or more approver roles or individual approver identifiers who then provide approval before the claim can proceed to submission. In a sequential approval chain, approvers generally provide approval in a defined order. The claim preparation output may proceed to claim submission generation after all approvers in the sequential chain have provided approval.

In a parallel approval chain, multiple approvers may receive the claim preparation output in respective signature queues simultaneously. Each approver may independently review and provide approval without dependencies on other approvers' decisions. The claim preparation output may proceed to claim submission generation when a specified threshold of approvers have provided approval. The threshold may indicate that all approvers to approve (unanimous approval), a majority of approvers to approve, or a specified minimum number of approvers to approve. Parallel approval chains may reduce approval timeline compared to sequential chains while still providing multi-approver oversight.

In some embodiments, routing logic may consider claim amount thresholds, with claims exceeding specified amounts requiring additional approver levels. Routing logic may consider billing regime risk classification, with higher-risk regimes requiring multi-approver oversight. Routing logic may consider payer-specific requirements, with certain payers or payer types requiring enhanced approval processes. In some embodiments, routing logic may consider historical denial patterns, with claims similar to previously denied claims indicating additional review. For each approval chain, the system may maintain an approval chain status data structure that tracks which approvers have provided approval, which approvers are currently reviewing, which approvers have rejected or requested modifications, the timestamps of each approval action, and any comments or justifications provided by approvers. The approval chain status may be displayed in user interfaces accessible to approvers and administrative personnel, providing visibility into approval progress.

In some embodiments, the system 100 may implement batch approval capabilities that enable authorized approvers to review and approve multiple claim preparation outputs simultaneously through a consolidated signature queue interface, thereby improving approval efficiency for high-volume billing operations. The batch approval process may begin with the system aggregating multiple claim preparation outputs that satisfy common characteristics. Batch aggregation criteria may include a common billing regime, such that all claim preparation outputs for Chronic Care Management (CCM) billing in a target billing period are aggregated into a single batch. Batch aggregation criteria may include a common payer, such that all claim preparation outputs for a specific insurance payer are aggregated into a batch for streamlined payer-specific review. Batch aggregation criteria may include a common authorized approver, such that all claim preparation outputs requiring approval from a specific billing identifier are aggregated into a batch presented in that approver's signature queue. Batch aggregation criteria may include a common confidence score range, such that all claim preparation outputs with confidence scores between specified thresholds are aggregated for batch review. Batch aggregation criteria may include a common validation status, such that all claim preparation outputs that passed compliance validation without warnings are aggregated separately from claims with validation warnings or exceptions. The system 100 may present aggregated claim preparation outputs in a consolidated signature queue interface that displays batch-level summary information and individual claim details. The consolidated signature queue interface may display a batch header containing batch metadata, including the total number of claims in the batch, the total claim amount across all claims in the batch, the billing regime or other common aggregation characteristics, the date range or billing period covered by the batch, and aggregate validation results indicating whether all claims in the batch passed compliance validation without exceptions. The consolidated signature queue interface may display a claim list table with one row per claim preparation output in the batch. Each row may display key claim attributes including patient identifier or patient name, service dates or billing period, procedure codes included in the claim, claim amount, confidence score if generated by an artificial intelligence system, and validation status indicating whether the claim passed all compliance checks. The claim list table may support interactive sorting by any displayed column, filtering to show subsets of claims based on user-specified criteria, and selection of individual claims for detailed review in an expanded claim detail view. The consolidated signature queue interface may provide a bulk approval control that enables the authorized billing approver to approve all claims in the batch with a single approval interaction. The bulk approval control may be implemented as a user interface button, such as an "Approve All Claims in Batch" control, or as a single electronic signature field that, when signed, constitutes approval of the entire batch. The bulk approval input generation process may create individual approval input data structures for each claim preparation output in the batch. Each generated approval input may be associated with the same approver identifier corresponding to the billing identifier of the authorized approver who performed the bulk approval action, the same approval timestamp corresponding to the time when the bulk approval control was activated, and the same approval action indicator indicating that approval was granted. The system may process each generated approval input through the standard approval workflow, creating individual attestation ledger entries for each approved claim in the batch. Each attestation ledger entry created for a batch-approved claim may include standard attestation data, including the claim identifier, claim version identifier, approver identifier, and approval timestamp. Additionally, each attestation ledger entry may include a batch identifier that indicates the claim was approved as part of a batch approval process. The batch identifier may link all claims approved together in a single batch, enabling auditors and compliance personnel to identify batch approvals and distinguish them from individual approvals.

In some embodiments, the batch approval capabilities may be combined with delegation protocol capabilities to enable hybrid approval workflows. For example, a delegation protocol may specify that CCM claims satisfying specified constraints are eligible for automatic approval, while CCM claims not satisfying the constraints are aggregated into batches for manual batch approval rather than requiring individual manual approval of each claim. This hybrid approach may balance automation efficiency with human oversight, enabling high-throughput approval processing while maintaining appropriate review for claims outside delegation protocol boundaries.

The method may include generating and transmitting, based on the validated and approved claim preparation output, a claim submission in a standardized electronic transaction format to a clearinghouse interface or payer interface. The method may include routing the claim submission to one of a plurality of clearinghouse interfaces based on at least one of a payer identifier, a plan identifier, or routing rules. The method may include aggregating a plurality of claim preparation outputs into a batch, presenting the batch in a consolidated signature queue for bulk approval, and, upon receiving a bulk approval input, submitting corresponding claim submissions.

The method may include receiving at least one electronic response to the claim submission, parsing the at least one electronic response to determine a claim status or error classification, and updating a claim status record. The method may include, when the at least one electronic response indicates a rejection, denial, or request for additional information, initiating a corrective workflow. Initiating the corrective workflow may include detecting potential duplicate submissions using a claim control identifier and applying idempotent resubmission logic to prevent redundant transmissions. The method may include mapping detected denial reasons specific to monthly regimes to corrective actions using a denial playbook.

The method may include, when the at least one electronic response indicates a denial, generating an appeal packet and initiating an appeal workflow. Generating the appeal packet may include including an evidence bundle comprising at least a time aggregation report, device usage evidence, and one or more clinician attestations. The method may include, prior to generating the claim submission, reconciling against historical claim status records to determine whether a claim for the same patient, billing regime, and target billing period was previously submitted, paid, denied, or remains under appeal, and in response, suppressing a redundant submission or adjusting the claim submission.

Figure 55:
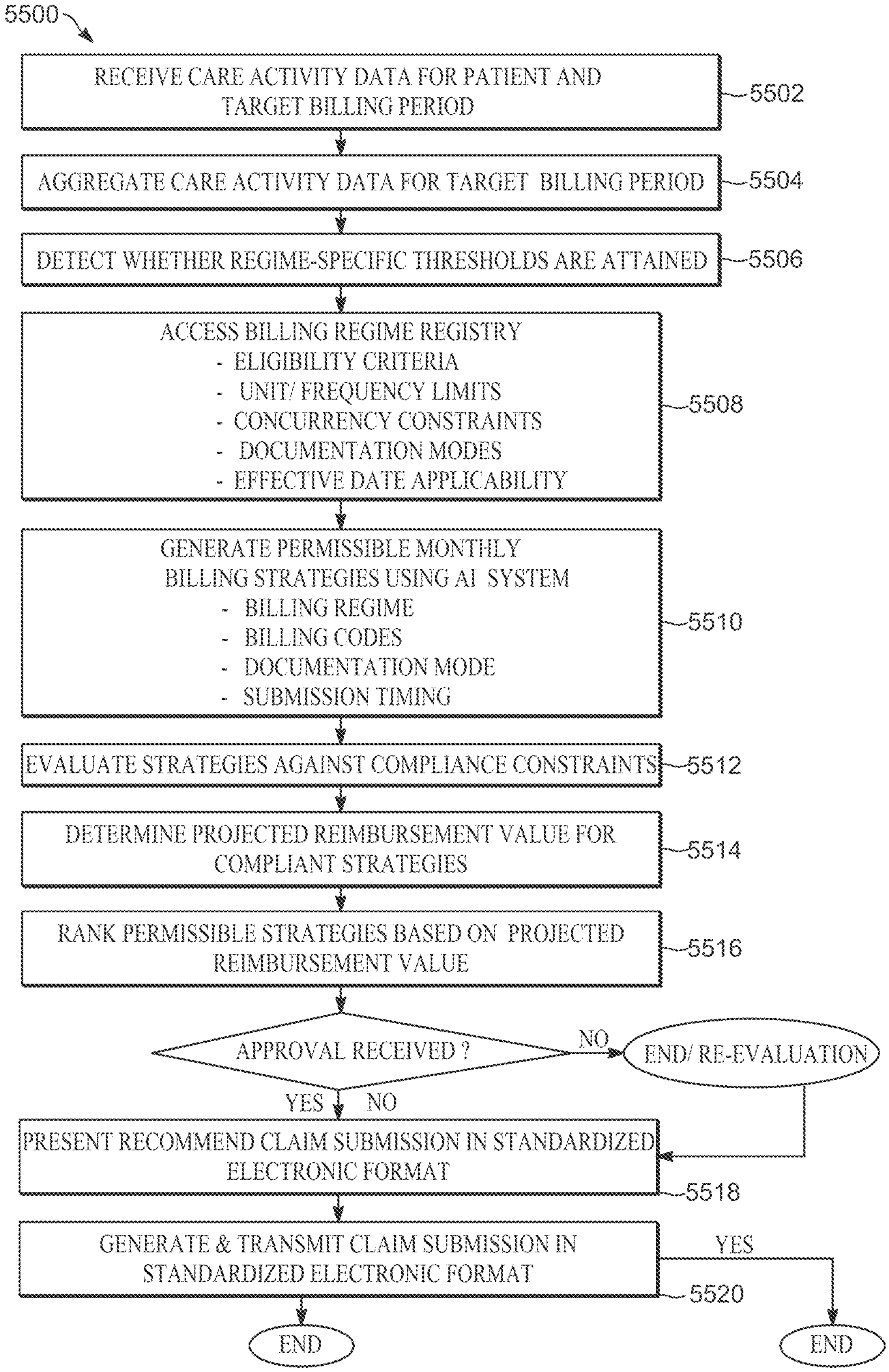
FIG. 55 illustrates a flowchart of a method for optimizing the selection of monthly billing regimes for reimbursement claims, according to aspects of the present disclosure.

Referring to FIG. 55, a method 5500 for optimizing the selection of monthly billing regimes for reimbursement claims may be performed by the billing engine. The method 5500 may begin at a step 5502, where the billing engine receives, for a patient and a target billing period, care activity data. At step 5504, the method 5500 may include aggregating, for the target billing period, at least a portion of the care activity data. At step 5506, the method 5500 may include detecting whether one or more regime-specific thresholds for the target billing period are attained based on the aggregated data.

At a step 5508, the method 5500 may include accessing a billing regime registry storing regime attributes comprising at least eligibility criteria, unit or frequency limits, concurrency constraints, documentation mode attributes, and effective date applicability. At a step 5510, the method 5500 may include generating, using an artificial intelligence system comprising one or more of a large language model, a machine learning model, a rules-based inference engine, or a hybrid thereof, a plurality of permissible monthly billing strategies across a plurality of billing regimes. Each strategy may specify at least one of a billing regime, a set of billing codes, a documentation mode, or a submission timing.

At a step 5512, the method 5500 may include evaluating the plurality of permissible monthly billing strategies against compliance constraints comprising at least one of payer-specific concurrency constraints, frequency limits, unit limits, or medically unlikely edit constraints. At step 5514, the method 5500 may include determining, for each strategy that satisfies the compliance constraints, a projected reimbursement value. At step 5516, the method 5500 may include ranking the permissible monthly billing strategies based on the projected reimbursement value.

At a step 5518, the method 5500 may include presenting a recommended monthly billing strategy and at least one alternative permissible monthly billing strategy to an authorized billing approver associated with a billing identifier in a signature queue. Presenting to the authorized billing approver may include presenting an explainability artifact comprising at least a reasoning summary for the recommended monthly billing strategy, references to rule versions applied, results of evaluated compliance constraints, and confidence or ranking information. At a step 5520, the method 5500 may include, upon receiving an approval input, causing the generation and transmission of a claim submission corresponding to the approved monthly billing strategy in a standardized electronic transaction format.

The method may include accessing a billing regime registry storing regime attributes comprising at least eligibility criteria, unit or frequency limits, concurrency constraints, documentation mode attributes, and effective date applicability. The billing regime registry may be configurable to add, modify, or remove billing regimes and associated regime attributes without modification to the executable code of the system. Configuration changes may be applied through administrative interfaces or configuration files. The method may include generating, using an artificial intelligence system, a plurality of permissible monthly billing strategies across a plurality of billing regimes. The artificial intelligence system may include one or more of a large language model, a machine learning model, a rules-based inference engine, or a hybrid thereof. Each strategy may specify at least one of a billing regime, a set of billing codes, a documentation mode, or a submission timing.

The method may include evaluating the plurality of permissible monthly billing strategies against compliance constraints. The compliance constraints may include at least one of payer-specific concurrency constraints, frequency limits, unit limits, or medically unlikely edit constraints. The method may include determining, for each strategy that satisfies the compliance constraints, a projected reimbursement value. The method may include ranking the permissible monthly billing strategies based on the projected reimbursement value.

The method may include presenting a recommended monthly billing strategy and at least one alternative permissible monthly billing strategy to an authorized billing approver associated with a billing identifier in a signature queue. Presenting to the authorized billing approver may include presenting an explainability artifact comprising at least a reasoning summary for the recommended monthly billing strategy, references to rule versions applied, results of evaluated compliance constraints, and confidence or ranking information. The method may include, upon receiving an approval input, causing the generation and transmission of a claim submission corresponding to the approved monthly billing strategy in a standardized electronic transaction format.

Figure 56:
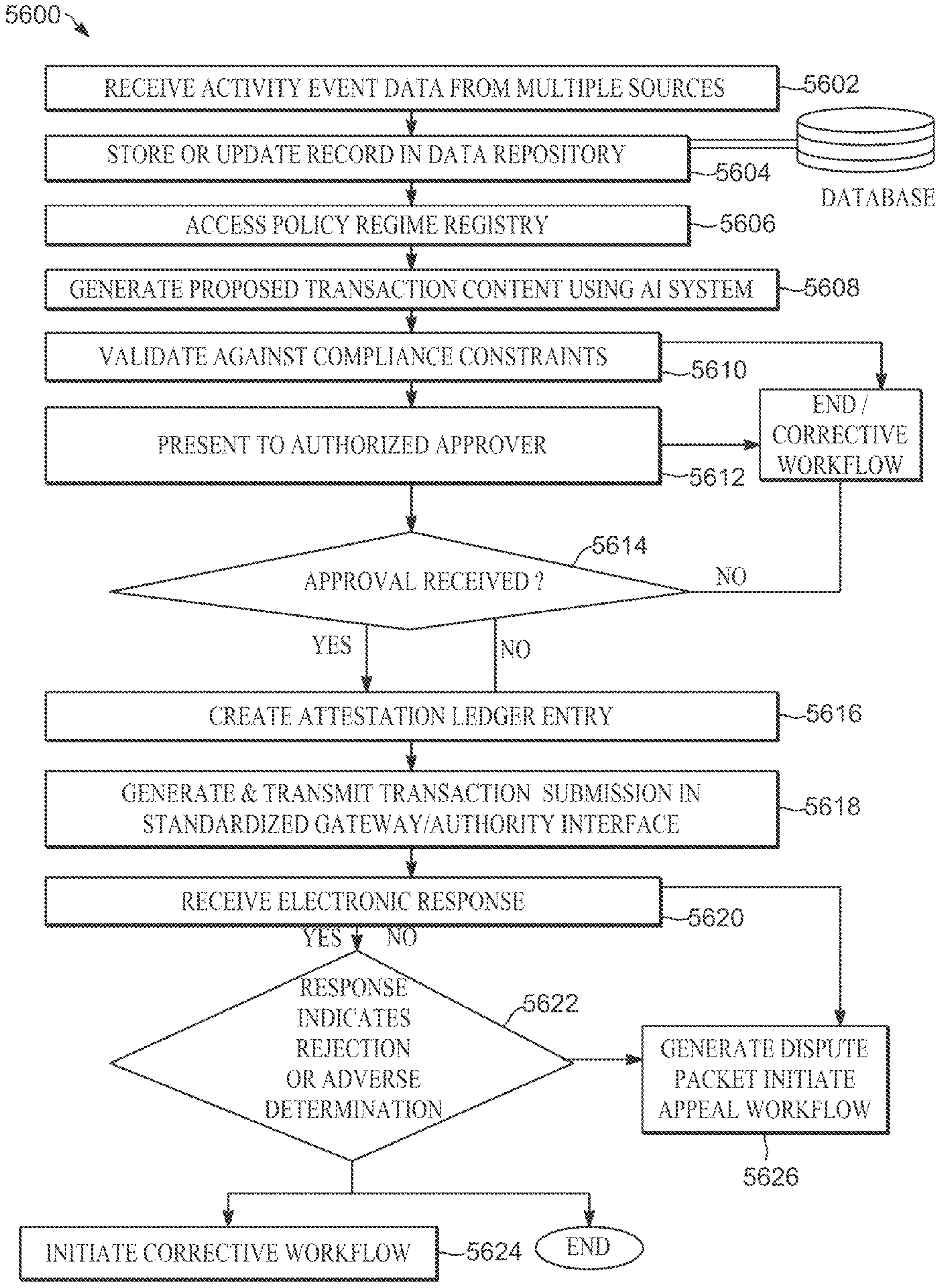
FIG. 56 illustrates a flowchart of a method for generating, validating, submitting, and managing regulated transactions based on activity data, according to aspects of the present disclosure.

Referring to FIG. 56, a method 5600 for generating, validating, submitting, and managing regulated transactions based on activity data may be performed in a generalized embodiment. The method 5600 may begin at a step 5602, where the system receives, via an event ingestion interface, activity event data for an entity from a plurality of sources comprising at least one of system integrations, user interfaces, messaging channels, document feeds, workflow systems, or third-party APIs. At step 5604, the method 5600 may include storing or updating, based on the activity event data, a record in a data repository.

At a step 5606, the method 5600 may include accessing a policy regime registry that stores, for each of a plurality of policy regimes, regime attributes comprising at least one of eligibility criteria, documentation mode attributes, unit or frequency limits, concurrency constraints, applicable classification codes, and effective date applicability. At a step 5608, the method 5600 may include generating, using an artificial intelligence system comprising one or more of a large language model, a machine learning model, a rules-based inference engine, or a hybrid thereof, proposed transaction content comprising one or more classification codes and an associated strategy based on at least the activity event data and the policy regime registry.

At step 5610, the method 5600 may include validating the proposed transaction content and strategy against compliance constraints prior to transmitting a transaction submission. The compliance constraints may include at least one of concurrency constraints, frequency limits, unit caps, or benchmark-type constraints. At step 5612, the method 5600 may include presenting the proposed transaction content and strategy to an authorized transaction approver associated with an authority identifier in a signature queue. At step 5614, the method 5600 may include receiving an approval input via the signature queue.

At step 5616, the method 5600 may include, in response to the approval input, creating an attestation ledger entry that records at least a transaction identifier, a transaction version identifier, an identifier of the authorized transaction approver, and an approval timestamp. At a step 5618, the method 5600 may include generating and transmitting, based on the validated and approved transaction content and strategy, a transaction submission in a standardized electronic transaction format to a gateway interface or authority interface. The standardized electronic transaction format may include at least one of an ANSI X12 transaction set or an ISO 20022 message.

At a step 5620, the method 5600 may include receiving at least one electronic response to the transaction submission, parsing the at least one electronic response to determine a transaction status or error classification, and updating a transaction status record. At a step 5622, the method 5600 may evaluate whether the at least one electronic response indicates a rejection, adverse determination, denial, or adjustment. At step 5624, when the at least one electronic response indicates a rejection or a request for additional information, the method 5600 may include initiating a corrective workflow. At a step 5626, when the at least one electronic response indicates an adverse determination, denial, or adjustment, the method 5600 may include generating a dispute packet and initiating a dispute or appeal workflow.

The method may include accessing a policy regime registry that stores, for each of a plurality of policy regimes, regime attributes comprising at least one of eligibility criteria, documentation mode attributes, unit or frequency limits, concurrency constraints, applicable classification codes, and effective date applicability. The method may include generating, using an artificial intelligence system, proposed transaction content comprising one or more classification codes and an associated strategy based on at least the activity event data and the policy regime registry. The artificial intelligence system may include one or more of a large language model, a machine learning model, a rules-based inference engine, or a hybrid thereof.

The method may include validating the proposed transaction content and strategy against compliance constraints prior to transmitting a transaction submission. The compliance constraints may include at least one of concurrency constraints, frequency limits, unit caps, or benchmark-type constraints. The method may include presenting the proposed transaction content and strategy to an authorized transaction approver associated with an authority identifier in a signature queue and receiving an approval input.

The method may include, in response to the approval input, creating an attestation ledger entry that records at least a transaction identifier, a transaction version identifier, an identifier of the authorized transaction approver, and an approval timestamp. The method may include generating and transmitting, based on the validated and approved transaction content and strategy, a transaction submission in a standardized electronic transaction format to a gateway interface or authority interface. The standardized electronic transaction format may include at least one of an ANSI X12 transaction set or an ISO 20022 message.

The method may include receiving at least one electronic response to the transaction submission, parsing the at least one electronic response to determine a transaction status or error classification, and updating a transaction status record. The method may include, when the at least one electronic response indicates a rejection or a request for additional information, initiating a corrective workflow. The method may include, when the at least one electronic response indicates an adverse determination, denial, or adjustment, generating a dispute packet and initiating a dispute or appeal workflow.

Figure 57:
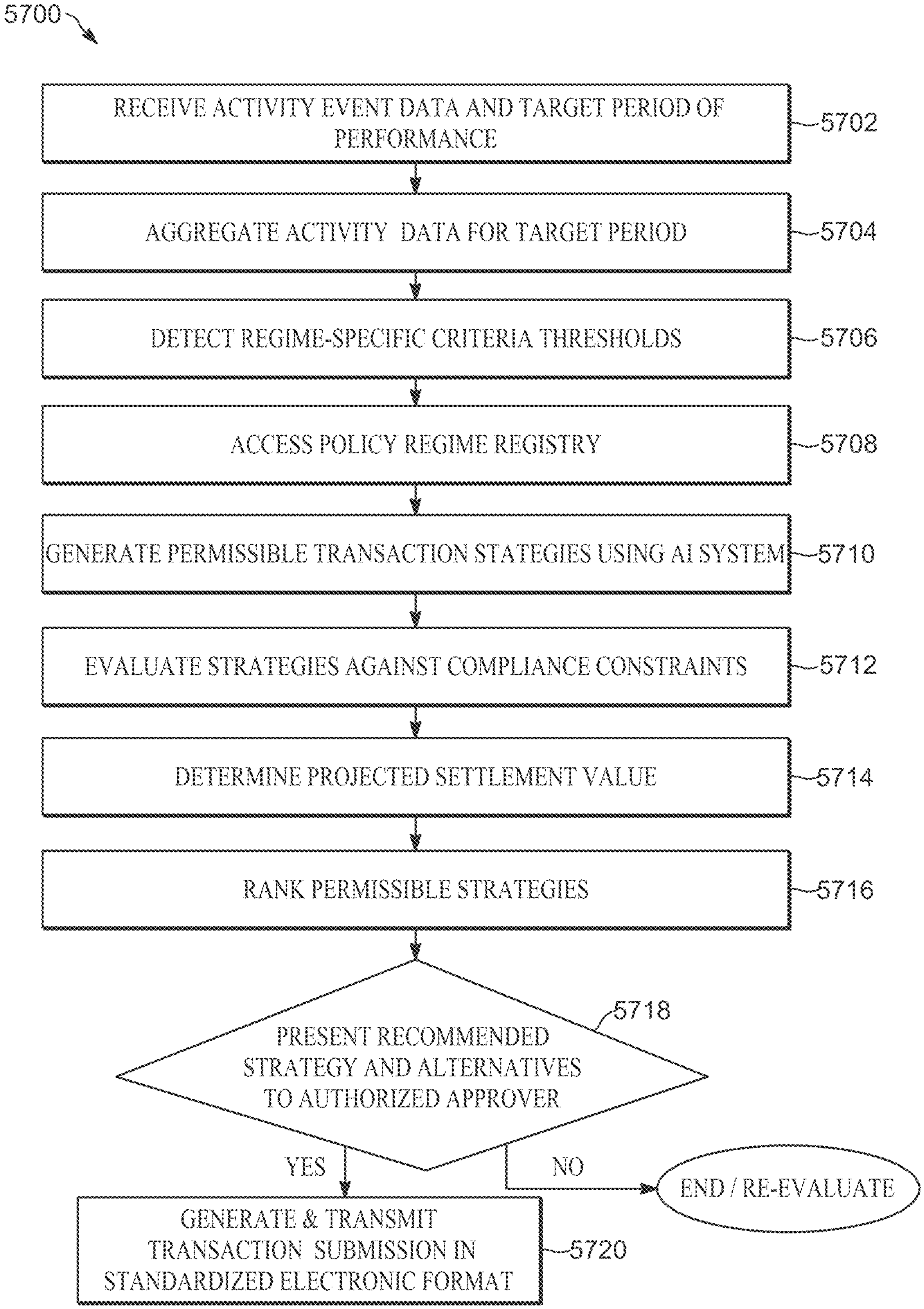
FIG. 57 illustrates a flowchart of a method for optimizing the selection of transaction strategies for regulated transactions, according to aspects of the present disclosure.

Referring to FIG. 57, a method 5700 for optimizing the selection of transaction strategies for regulated transactions may be performed in a generalized embodiment. The method 5700 may begin at a step 5702, where the system receives activity event data for an entity and a target period of performance. At a step 5704, the method 5700 may include aggregating, for the target period of performance, at least a portion of the activity event data. At a step 5706, the method 5700 may include detecting, based on the aggregated data, whether one or more regime-specific criteria thresholds are attained.

At a step 5708, the method 5700 may include accessing a policy regime registry storing regime attributes comprising at least eligibility criteria, unit or frequency limits, concurrency constraints, documentation mode attributes, and effective date applicability. At a step 5710, the method 5700 may include generating, using an artificial intelligence system comprising one or more of a large language model, a machine learning model, a rules-based inference engine, or a hybrid thereof, a plurality of permissible transaction strategies. Each permissible transaction strategy may specify at least one of a policy regime, a set of classification codes, a documentation mode, or a submission timing.

At step 5712, the method 5700 may include evaluating the plurality of permissible transaction strategies against the compliance constraints to identify strategies that satisfy the compliance constraints. At step 5714, the method 5700 may include determining, for each strategy that satisfies the compliance constraints, a projected settlement value. At step 5716, the method 5700 may include ranking the permissible transaction strategies based on the projected settlement value.

At a step 5718, the method 5700 may include presenting a recommended transaction strategy and at least one alternative permissible transaction strategy to an authorized transaction approver associated with an authority identifier in a signature queue. Presenting to the authorized transaction approver may include presenting an explainability artifact comprising at least a reasoning summary for the recommended transaction strategy, references to rule versions applied, results of evaluated compliance constraints, and confidence or ranking information. At a step 5720, the method 5700 may include, upon receiving an approval input, causing the generation and transmission of a transaction submission corresponding to the approved transaction strategy in a standardized electronic transaction format.

The method may include accessing a policy regime registry storing regime attributes comprising at least eligibility criteria, unit or frequency limits, concurrency constraints, documentation mode attributes, and effective date applicability. The method may include generating, using an artificial intelligence system, a plurality of permissible transaction strategies. The artificial intelligence system may include one or more of a large language model, a machine learning model, a rules-based inference engine, or a hybrid thereof. Each permissible transaction strategy may specify at least one of a policy regime, a set of classification codes, a documentation mode, or a submission timing.

The method may include evaluating the plurality of permissible transaction strategies against the compliance constraints to identify strategies that satisfy the compliance constraints. The method may include determining, for each strategy that satisfies the compliance constraints, a projected settlement value. The method may include ranking the permissible transaction strategies based on the projected settlement value.

The method may include presenting a recommended transaction strategy and at least one alternative permissible transaction strategy to an authorized transaction approver associated with an authority identifier in a signature queue. Presenting to the authorized transaction approver may include presenting an explainability artifact comprising at least a reasoning summary for the recommended transaction strategy, references to rule versions applied, results of evaluated compliance constraints, and confidence or ranking information. The method may include, upon receiving an approval input, causing the generation and transmission of a transaction submission corresponding to the approved transaction strategy in a standardized electronic transaction format.

The billing plane architecture may provide various technical effects and improvements over conventional healthcare billing systems. The compliance gate validation may increase clean-claim rates by catching errors before submission. Pre-submission validation against concurrency rules, frequency limits, unit caps, and medically unlikely edit constraints may reduce claim rejections. The validation summary may provide approvers with confidence that claims are compliant before approval.

Automated compliance validation may reduce denial rates by ensuring claims satisfy payer-specific requirements prior to submission. The denial playbook mapping may enable faster corrective action and successful resubmission when denials occur. Learning loop feedback may continuously improve strategy selection to avoid historically denied patterns, thereby reducing future denial rates.

Automated claim preparation and submission may reduce time from care event to claim submission, thereby reducing accounts receivable days. Real-time acknowledgment parsing may enable faster error detection and correction. Batch processing and multi-clearinghouse routing may improve submission throughput for high-volume billing operations.

Denial playbook mapping of claim adjustment reason codes and remittance advice remark codes to corrective actions may improve resubmission success rates. Idempotent resubmission logic may prevent duplicate submissions and associated rejections. Evidence bundle assembly may provide documentation needed for successful appeals.

Automated validation and acknowledgment parsing may reduce manual processing time and associated processing latency. Real-time threshold detection for remote patient monitoring and remote therapeutic monitoring regimes may enable timely billing. Streaming event ingestion may reduce latency from care event to claim preparation.

Deterministic rule application via versioning may ensure consistent and reproducible claim processing. The attestation ledger may provide an immutable audit trail of approvals and rule versions applied. The Evidence bundle manifests with hashes may ensure documentation integrity and support auditability requirements.

Delegation protocols may enable physicians to delegate routine approvals while retaining accountability, thereby improving scalability. Batch approval and submission may support high-volume billing operations. Multi-clearinghouse routing may enable enterprise-scale deployments across multiple payers and clearinghouses.

Standardized electronic transaction formats, including X12 and ISO 20022 may ensure compatibility with payers and clearinghouses. FHIR-compliant data structures may enable integration with electronic medical record systems. Multi-source event ingestion may support diverse care activity data sources and improve interoperability across healthcare systems.

Figure 58:
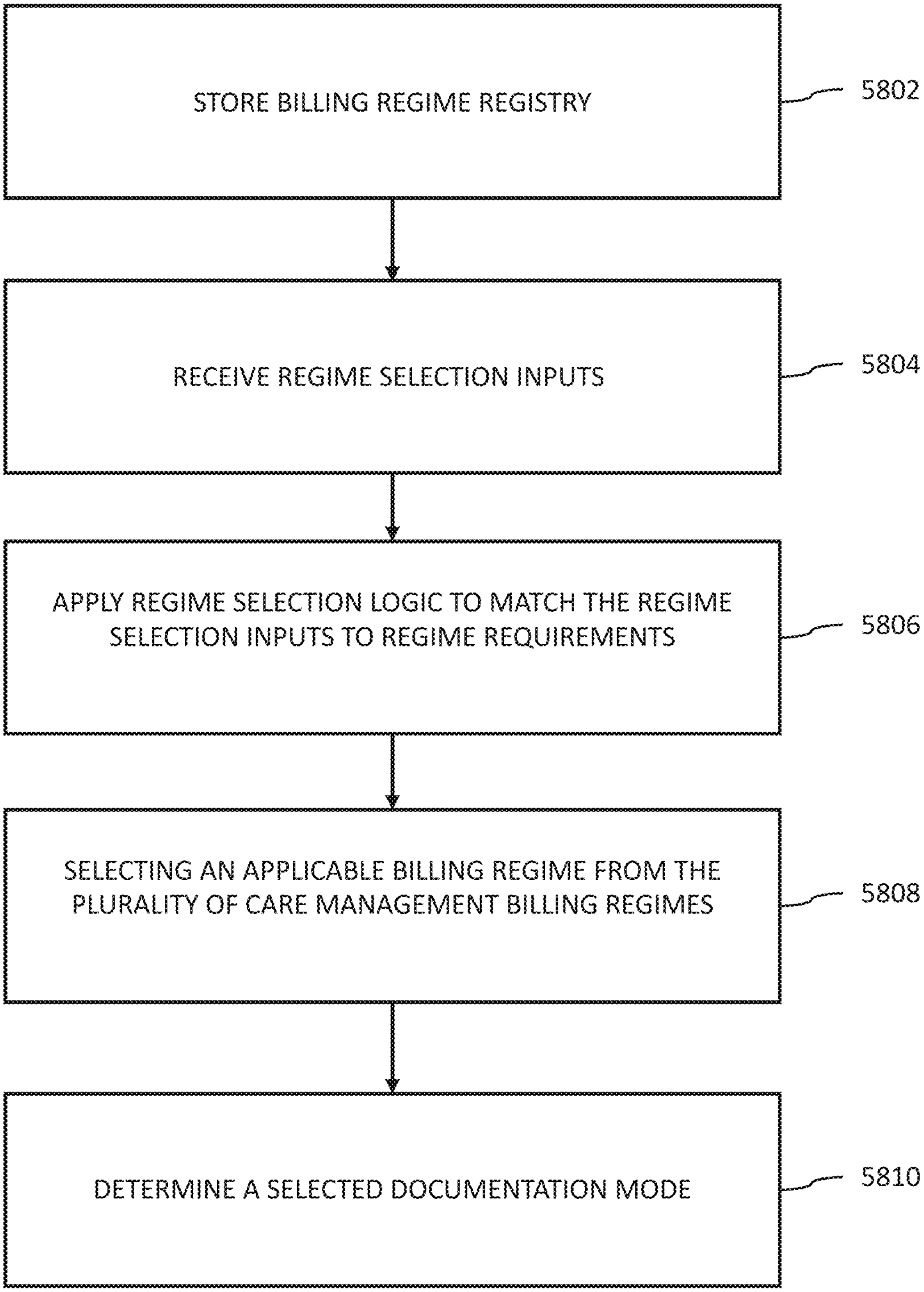
FIG. 58 illustrates a flowchart of a method for automated healthcare billing regime selection and documentation mode determination, in accordance with aspects of the present disclosure.

FIG. 58 illustrates a flowchart depicting a method 5800 for automated healthcare billing regime selection and claim processing, in accordance with aspects of the present disclosure. The method 5800 demonstrates the integration of components from the Registry and Rules layer 160 (FIG. 1C) and the eligibility evaluation and regime selection stage 180 (FIG. 1D) to automatically select applicable billing regimes and determine appropriate documentation modes without requiring manual clinician input.

At block 5802, the process 5800 includes storing a billing regime registry including a plurality of care management billing regimes. For example, the billing regime registry, maintained in the Registry and Rules layer 160, stores regime definitions for multiple billing regime families including APCM, GPCM, CCM, CoCM, PCM, RPM, and RTM. For each billing regime in the registry, the system maintains associated attributes including documentation mode type attribute indicating whether the regime uses attestation-based documentation mode or time-based documentation mode, frequency limitation rules specifying temporal constraints such as one unit per calendar month or multiple units permitted based on accumulated time or activities, unit restriction rules defining maximum billable quantities or caps on units per billing period, and stacking compatibility data identifying which other billing regimes cannot be billed concurrently within the same billing period for the same patient due to payer-specific concurrency constraints or regulatory restrictions. The billing regime registry serves as a policy database referenced throughout the regime selection process.

At block 5804, the method 5800 includes receiving regime selection inputs including multiple data elements necessary for evaluating regime applicability. For example, the regime selection inputs are received from the Ingestion layer 194 and enrichment stage 172 (FIG. 1D), where care event data has been augmented with contextual information. Received inputs include provider role taxonomy identifying the provider's role classification (physician, nurse practitioner, physician assistant, clinical social worker, etc.), provider qualifications including licenses, certifications, and specialty credentials, site of service indicating where care activities were performed (office, telehealth, rural health clinic, federally qualified health center, patient home), patient eligibility criteria including diagnoses, chronic condition counts, program enrollment status, and consent documentation, payer policy identifier indicating the patient's insurance payer and plan type, and date of service indicating when care activities occurred. These inputs may collectively define the context within which regime selection must occur.

At block 5806, the method 5800 includes applying regime selection logic to match the received regime selection inputs to regime requirements stored in the billing regime registry. The regime selection logic, implemented by the eligibility and policy evaluator in the Registry and Rules layer 160, performs matching operations including evaluating provider role taxonomy against provider role requirements defined in regime attributes to determine whether the provider holds the required specialty or role classification for regimes with provider restrictions, validating provider qualifications against provider qualification requirements to confirm that required licenses, certifications, or credentials are held by the provider, matching site of service against site of service requirements in regime attributes to verify that care was delivered at locations permitted for each regime, evaluating patient eligibility criteria against patient eligibility requirements defined in regime attributes to confirm that the patient meets clinical criteria such as minimum chronic condition counts or required diagnosis categories, verifying payer coverage by confirming that the identified payer covers the billing regime being evaluated and that the patient's plan type is compatible with regime requirements, and matching date of service to effective date ranges in regime attributes to select rule versions applicable on the service date. The regime selection logic produces a match score or Boolean determination for each billing regime in the registry, indicating whether the regime's requirements are satisfied given the received inputs.

At block 5808, the method 5800 includes evaluating whether any billing regimes from the plurality matched the regime selection inputs and selecting an applicable billing regime from the care management billing regimes and determines a selected documentation mode corresponding to the selected billing regime. The documentation mode determination accesses the documentation mode type attribute stored in the billing regime registry for the selected regime. The processor determines whether the selected billing regime belongs to a first portion of the plurality of billing regimes that use attestation-based documentation mode or a second portion of the plurality of billing regimes that use time-based documentation mode. Attestation-based mode is determined for billing regimes such as APCM and GPCM, where clinicians review completed care activities and provide attestation without tracking cumulative service time. Time-based mode is determined for billing regimes such as CCM and CoCM, where cumulative non-face-to-face service minutes are tracked and validated against minimum thresholds. The determined documentation mode controls downstream processing pathways for documentation assembly and claim preparation.

At block 5810, the method 5800 determines a selected documentation mode processor evaluates whether the determined selected documentation mode is attestation-based mode includes an attestation-based mode for a first portion of the plurality of regimes and a time-based mode for a second portion of the plurality of regimes. For example, determining the selected documentation mode may include querying the billing regime registry and evaluating the documentation mode type attribute associated with the selected billing regime. The method 5800 may include accessing the regime record from the billing regime registry maintained in the Registry and Rules layer 160 (FIG. 1C), extracting the documentation mode type attribute, and evaluating whether the attribute indicates attestation-based documentation or time-based documentation. For regimes such as APCM and GPCM where the documentation mode type attribute is set to "ATTESTATION," the method 5800 determines that the regime belongs to a first portion of the plurality of billing regimes and assigns attestation-based mode as the selected documentation mode. For regimes such as CCM, CoCM, PCM, RPM, and RTM where the documentation mode type attribute is set to "TIME_BASED," the method 5800 determines that the regime belongs to a second portion of the plurality of billing regimes and assigns time-based mode as the selected documentation mode. The determination result is transmitted to the documentation mode switch component in the Ingestion layer 194 (FIG. 1C), which activates the appropriate processing pathway.

When attestation-based mode is determined, the documentation mode switch directs the system to collate completed care activities into an attestation summary for clinician review and signature without tracking cumulative service minutes. When time-based mode is determined, the documentation mode switch directs the system to track cumulative service minutes, extract minimum time threshold values from the regime's unit restriction rules, validate accumulated time against the threshold, and generate time logs as part of the claim preparation output. This deterministic, rule-based determination executes through a single database query and conditional evaluation, completing in microseconds and ensuring consistent, predictable behavior that enables the unified presentation layer 168 (FIG. 1C) to provide a consistent clinician-facing interface while the underlying billing plane automatically handles documentation mode switching.

In some embodiments, the method 5800 includes logging attestation details in the attestation ledger 192, including clinician identity, timestamp, claim version identifier, and references to supporting documentation. Simultaneously, the method 5800 may enforce a one-unit-per-calendar-month constraint by checking the regime state tracker for existing APCM or GPCM billings in the current month, blocking any additional unit generation if a constraint violation is detected. This validation may occur during claim preparation, preventing non-compliant submissions before finalization. The systems described herein may also implement a secondary detection layer that evaluates the unit count in incoming claim requests, rejecting any attempt to generate multiple units within a single calendar month (e.g., such as a request to bill two APCM units) to ensure redundant protection against frequency violations. In some embodiments, the method 5800 includes detecting eligibility failures for attestation-based regimes by checking for missing diagnosis codes, payer policy exclusions, or denied authorizations. When such failures occur, the method 5800 automatically pivots to time-based regimes (CCM or CoCM), switches documentation requirements from attestation to time tracking, and notifies the care team of the regime transition. This fallback mechanism activates during regime selection when preferred attestation approaches prove ineligible, allowing claims to proceed under alternative documentation methods rather than failing entirely.

In some embodiments, the documentation mode transitions to time-based tracking, activating the time capture module to record start times, end times, and activity descriptions for care activities. This enables accumulation of the non-face-to-face minutes used for billing under the fallback regime. The system notifies care team members about the regime change, the reason for the fallback, and the shift to time-based documentation requirements. This automated fallback mechanism maintains continuous billing coverage when preferred regimes become unavailable, preventing reimbursement gaps while ensuring compliance with the new regime's documentation standards.

After the billing regime and documentation mode are selected, the standardized transaction engine formats the claim data into compliant X12 transaction structures. The engine may determine whether to generate X12 837P transactions for physician services or X12 837I transactions for facility-based services based on the billing entity type and site of service, then may populate the claim fields according to X12 specifications with procedure codes, diagnosis codes, patient demographics, provider identifiers, and service dates before transmitting the transactions to clearinghouses or payers via EDI protocols. The systems described herein may monitor for acknowledgment responses after transmission, receiving X12 TA1 interchange acknowledgments that indicate technical acceptance or rejection, and X12 999 functional acknowledgments reflecting functional acceptance or rejection status. The response parser extracts acknowledgment status codes from both transaction types and logs them in the claim tracking database for tracking purposes. A TA1 parser may process interchange-level acknowledgments, identifying whether the X12 structure was technically acceptable or rejected based on the interchange acknowledgment code.

A 999 parser may handle functional group and transaction set acknowledgments, capturing detailed error information including segment and element identifiers when functional errors occur. Each acknowledgment may be associated with a respective and corresponding claim identifier in the database, thereby updating the claim status to reflect whether technical acceptance, functional acceptance, or correction is requested or indicated. This real-time tracking allows rapid identification and remediation of errors before claims reach adjudication.

The method 5800 also processes X12 277CA claim acknowledgment transactions containing STC segments that provide claim-level status indicators-accepted, rejected, or pended. The 277CA parser extracts status category codes, specific status indicators like "Acknowledgment/Forwarded" or "Rejected/Invalid Data," entity identifier codes showing which payer or clearinghouse issued the status, and effective dates. The method 5800 may then interpret the extracted status indicators to update the claim tracking database accordingly.

Additionally, the method 5800 may generate X12 276 claim status inquiry transactions for claims held in pending status, transmitting the claims to payers or clearinghouses and receiving X12 277 claim status response transactions in return. The method 5800 may further include extracting updated claim status indicators from the X12 277 responses and refreshing the claim tracking database accordingly. When a claim remains pending beyond a configured threshold, the system either generates an additional X12 276 inquiry or escalates the claim to manual review. The configured threshold may be set globally, per payer, or by claim type based on expected processing timelines The 276 transaction may include the claim identifier, patient identifier, provider identifier, and service date range from the original submission to enable the payer to locate and provide updated status information.

Upon receiving the 277 response, the systems described herein may parse the response to identify any status changes, such as transitions from pending medical review to accepted for payment or denial. If the claim remains pending and cumulative elapsed time surpasses a secondary escalation threshold, the system triggers escalation actions including more frequent 276 inquiries, alerts to billing supervisors, or direct contact with payer representatives to investigate adjudication delays. The response parser receives X12 835 ERA transactions from payers containing detailed payment and adjustment information for adjudicated claims. The 835 parser extracts CLP segments to retrieve claim-level data such as the patient control number, claim status code, total submitted charge, total paid amount, and patient responsibility. SVD segments are parsed to obtain service-level payment details for each procedure code, including the line item charge and paid amounts, which allows tracking of individual services that were paid in full versus those that were adjusted or denied. CAS segments are processed to capture adjustment information comprising group codes (PR, CO, PI, OA), CARC codes providing specific numeric reason codes for adjustments, RARC codes with explanatory remarks, and the monetary amounts tied to each adjustment reason.

This extracted payment and adjustment data flows into the claim tracking database and financial reconciliation systems, supporting reconciliation of expected versus actual payments, identification of denials requiring corrective action or appeals, and tracking of contractual adjustments for financial reporting purposes. For each denial, the systems described herein may extract group codes (PR, CO, PI, OA), CARC codes, and RARC codes from the remittance advice and use these combinations as lookup keys against a denial playbook mapping table. The playbook retrieves the appropriate correction action (e.g., requesting documentation, applying contractual write-off, re-coding the claim, or escalating to manual review, etc.) and automatically triggers execution. The denial playbook may function as a decision table that specifies whether each action is auto-correctable or requires manual intervention, along with the specific correction steps and expected outcomes.

Upon retrieving the mapped action, the method 5800 may include executing the action. For example, documentation requests generate tasks routed to providers, contractual write-offs update financial records when group code CO indicates accepted adjustments, claim re-coding adjusts procedure codes or modifiers for resubmission when coding errors are identified, and/or manual review escalation creates exception queue entries when human judgment is requested. This automated approach reduces manual effort, accelerates correction cycles, and improves resubmission success by consistently applying playbook-driven responses to common denial patterns.

In some embodiments, the method 5800 may also include accessing CMS NCCI Medically Unlikely Edit data with unit limits for each procedure code, and applying an appropriate MAI enforcement type: MAI type 1 restricts units per claim line, MAI type 2 restricts units per date of service across lines, and MAI type 3 flags claims exceeding clinical benchmarks for review without automatic denial. Additionally, payer-specific monthly frequency limits may be used to prevent overbilling, and stacking restriction rules block incompatible code combinations within a calendar month. Together, these validations ensure claims comply with both clinical and billing standards. MAI type 3 enforcement flags claims for potential post-payment audit when clinical benchmarks are exceeded. The method 5800 may also apply payer-specific monthly frequency limits from the regime attributes and enriched payer policy data, such as restricting certain procedure codes to a single unit per calendar month. The method 5800 may further access stacking restriction rules to identify incompatible code combinations that cannot be billed together within the same calendar month, blocking claim generation when concurrent billing is attempted. This layered approach combines CMS NCCI rules applicable across Medicare and Medicaid payers with payer-specific validation rules to ensure comprehensive compliance.

The validation further incorporates bundling rules that prevent separate billing of bundled procedure codes, along with modifier requirements including CPT modifier 76 for repeat procedures by the same physician, CPT modifier 77 for repeat procedures by a different physician, CPT modifier 91 for repeat clinical diagnostic laboratory tests, and anatomic modifiers for specific body locations. When bundled code combinations appear in claim preparation output, the method 5800 flags the combinations, and validation failures are marked with error codes indicating the specific rule violated, with suggested corrections generated for each flagged issue. In some embodiments, the method 5800 flags affected claim lines with error codes tied to the specific validation rule violated and generates corrective recommendations such as appending required modifiers, removing bundled codes, or selecting alternative procedure codes. For auto-correctable issues, these corrections are applied automatically by the denial and correction engine prior to claim submission, while others are routed to the exception queue for manual review. This approach reduces claim rejections and enhances overall coding accuracy.

In some embodiments, the method 5800 retrieves billing policy rule sets from authoritative sources including CMS NCCI quarterly updates, insurance payer companion guides, and CAQH CORE specifications. Each rule extracted from these sources is assigned an effective date range with start and end dates, then stored for use during claim validation. Alongside the rules themselves, the systems described herein maintain metadata capturing the authoritative source identifier, ingestion timestamp, and version identifier for each rule. This metadata populates and maintains the billing regime registry and rules version store, ensuring the system operates with current and accurate billing policies for regime selection, compliance validation, and claim preparation. The method 5800 may include retrieving these rule sets through automated downloads from CMS websites or APIs for NCCI updates, API access or web scraping of payer portals for companion guides, and retrieval of CAQH CORE specifications defining standardized operating rules for healthcare transactions. validation logic stay synchronized with changing regulatory and payer requirements. The versioning and provenance tracking allow rules to be applied accurately based on the date of service, supporting audit trails and enabling reconstruction of the policy landscape at any historical moment.

In operation of method 5800, when a claim arrives with a specific date of service, the systems described herein may query the stored rules to find versions with effective date ranges that cover that date, then applies the matching rule version to validate the claim. The audit trail captures the rule source, version identifier, and timestamp of application, creating a complete record of which policy governed the claim at the time of service. The method 5800 may then apply the historical rule versions during compliance validation at the compliance gate and may check the claim against IUE limits, frequency restrictions, concurrency constraints, bundling rules, and other policy parameters as they existed on the service date. An audit trail is maintained recording the rule source identifier, version identifier, and application timestamp for each rule applied, enabling compliance verification and supporting regulatory audits by demonstrating which rules were in effect and applied at the time of billing.

The method 5800 further includes managing clearinghouse configuration data for multiple clearinghouses (e.g., Waystar, Availity, Change Healthcare, etc.) with format normalization for both outbound submissions and inbound acknowledgments to maintain consistency across different clearinghouse requirements. Each claim receives an identifier from either ICN (Internal Control Number) or TCN (Transaction Control Number), and the method may then maintain a registry of previously submitted claims to detect duplicate submissions before transmission, implementing idempotent resubmission logic that blocks transmission when a duplicate is identified. The multi-clearinghouse routing may be handled by the gateway or clearinghouse router within the Approval and Accountability layer and the gateway/clearinghouse routing and submission stage, presenting a unified interface to upstream components while routing claims to different clearinghouses based on payer requirements. The processor stores clearinghouse configuration including connection parameters, format specifications, and payer routing rules that map payer identifiers to preferred vendors. Outbound normalization converts the standardized X12 837 transaction into clearinghouse-specific formats by adjusting field formats and applying vendor-specific encoding rules, while inbound normalization transforms acknowledgments and remittances into a standardized internal format.

In some embodiments, the method 5800 may assign unique claim identifiers to each generated claim and maintains a submitted claims registry to detect duplicate submissions. When a duplicate is identified through idempotent resubmission logic, transmission is prevented and the user is alerted rather than allowing duplicate claims to reach payers. This approach leverages relationships with multiple clearinghouse vendors while maintaining a consistent submission interface for upstream components. The orchestration logic evaluates patient risk indicators, care context, provider capabilities, and payer requirements to generate intervention assignments that specify the intervention type, delivery timeline, appropriate provider role, and SLA for completion. When an assigned provider becomes unavailable, the system automatically reassigns to an alternative provider with matching qualifications. SLA approaching notifications trigger as deadlines near, and all assignments are logged with timestamps, actor identities, and decision rationale for audit purposes. This integration of clinical risk assessment with billing requirements ensures interventions are properly assigned, documented, and tracked to meet both quality and compliance standards.

When an assigned provider becomes unavailable due to schedule changes or workload constraints, the processor automatically reassigns the intervention to an alternative provider meeting the same role qualifications and availability criteria. All assignment actions, reassignments, and SLA notifications are logged with timestamps, assigning actor identities, reassignment reasons, and decision provenance explaining the basis for each assignment decision. This orchestration ensures care interventions are systematically planned, assigned, tracked, and escalated when delays approach SLA thresholds, thereby improving clinical delivery and billing documentation completeness.

In some embodiments, the method 5800 may include maintaining a unified presentation layer that clinicians interact with for care coordination and documentation, deliberately withholding billing regime selection controls and documentation mode type from view. Beneath this interface sits a billing plane containing the regime registry, selection logic, attestation and time-tracking components, and compliance validation-all operating transparently to clinicians. This billing plane automatically determines applicable billing regimes per encounter or calendar month, selects corresponding procedure codes, switches between attestation-based and time-based modes as needed, enforces frequency and unit restrictions, and generates validated claims without exposing billing operations through the clinician-facing interface. The billing plane automatically determines whether documented care plan reviews contribute to attestation-based documentation for APCM and GPCM or time-based minute accumulation for CCM and CoCM. As clinicians complete patient contacts, the system transparently tracks these activities according to the selected documentation mode without exposing billing details. This architectural approach minimizes clinician cognitive burden, prevents billing-related documentation errors from incorrect regime or code selection, and prioritizes clinical decision-making over billing constraints while maintaining accurate and compliant background billing operations. The presentation layer surfaces clinically relevant information, whereas the billing plane manages multi-regime rules, payer requirements, documentation mode transitions, compliance checks, frequency limits, and claim generation behind the scenes.

For claim submission, the method 5800 may include assembling documentation bundles containing care plan updates, patient contact logs, and outcome measures. These bundles transmit either as X12 275 attachment transactions or as PWK segments embedded within X12 837 claims, with each segment referencing the corresponding documentation bundle. The system maintains cross-references linking transmitted bundles to their associated claim submissions through claim identifiers. After claim preparation and validation, the processor gathers evidence items from the attestation and evidence layer to construct bundles that include care plan documents reflecting patient goals and interventions, communication logs from the ingestion layer, and outcome measurement data.

In some embodiments, the method 5800 may include checking payer-specific attachment requirements to determine the appropriate transmission mechanism. For payers accepting X12 275 transactions, the processor generates structured attachments with document type codes and identifiers enabling payer matching. For payers requiring inline references, the processor creates PWK segments specifying documentation type, transmission method, and attachment control numbers that reference bundles in secure repositories accessible to payers.

Documentation bundles are transmitted through the selected mechanism (e.g., X12 275 transactions routed through the clearinghouse or PWK-referenced documents uploaded to payer portals). Cross-reference data may be maintained to link each documentation bundle to its corresponding claim, supporting payer review and appeal preparation. This approach ensures claims include required supporting documentation regardless of payer technical specifications, reducing documentation-related denials and improving acceptance rates.

In some embodiments, the method 5800 may also calculate performance metrics including clean claim rate as a percentage of first-submission acceptances, denial rate as a percentage of rejections, and accounts receivable days measuring the average elapsed time from claim submission. acceptance status on first submission without requesting correction or resubmission. The denial rate counts claims receiving $0 payment through remittance advice divided by total submitted claims. The accounts receivable days metric measures the average interval from claim submission through the gateway to payment receipt, reflecting cash flow efficiency. The resubmission success rate tracks corrected claims through the correction workflow, calculating what percentage ultimately achieve acceptance after initial rejection. These metrics demonstrate that the automated regime selection combined with frequency, unit, and concurrency enforcement produces measurable improvements: clean claim rates reaching at least 90%, denial rates dropping below 10%, and accounts receivable days falling below 30 days.

These gains may stem from accurate regime matching to patient and provider characteristics, proactive compliance validation preventing non-compliant submissions, enforcement mechanisms blocking violations before submission, and feedback loops continuously optimizing strategy selection based on outcomes. The result is fewer rejections, faster payment cycles, and improved reimbursement realization compared to baseline manual approaches.

For RHC and FQHC settings, the method applies encounter-based billing rules specific to these site-of-service types. When a transition from office-based to RHC or FQHC settings is detected, the system automatically selects equivalent billing regime codes appropriate for the new site of service. This extends the regime selection logic by implementing special billing rules that account for how RHC and FQHC facilities operate under encounter-based payment methodologies, where care management services may be bundled into encounter rates or request alternative billing codes compared to traditional office settings. Upon identifying an RHC or FQHC site of service, the processor retrieves the applicable encounter-based billing parameters to ensure proper code selection. and notifies billing staff of the transition and its impact on billing methodology. The system may also adjust regime attributes or recalibrate eligibility checks to account for site-specific requirements. This approach maintains compliance across different care settings, avoids claim rejections from using office-based codes in RHC/FQHC environments, and preserves continuity of care management when patients move between settings.

Example 1. A computer-implemented system for automated care to claim orchestration, comprising: an event ingestion bus configured to receive patient interactions and clinical signals; an extractor configured to convert unstructured inputs into structured clinical facts; a canonical mapper configured to map facts to standardized clinical schemas; a graph store comprising versioned nodes and edges representing patient state; a care-plan update engine configured to update care plans in response to graph changes; a billing engine configured to: select at least one billing regime based on provider role, patient eligibility, payer policy, and date of service; enforce regime-specific validation rules including monthly frequency, stacking restrictions, and documentation mode (attestation vs time-based); generate claims using X12 837 transactions; receive and parse acknowledgments associated with the generated claims; classify errors, correct, and resubmit; and maintain claim provenance; an audit and security layer configured to record append-only entries with timestamps, actor identity, claim versions, and operation types; and a presentation layer providing a unified clinician workflow independent of the selected at least one billing regime.

Example 2. The computer-implemented system of example 1, wherein the at least one billing regime is selected from a plurality of billing regimes including: APCM, GPCM, CCM, CoCM, PCM, RPM, and RTM.

Example 3. The computer-implemented system of example 1, wherein the billing engine is further configured to receive and parse acknowledgments (277CA) and remittance advice (835 ERA with CLP/SVD/CAS; CARC/RARC).

Example 4. The computer-implemented system of example 1, wherein the billing engine: selects APCM or GPCM when eligibility criteria are met, enforces one unit per calendar month with no additional units, and detects concurrency conflicts with other monthly care-management codes.

Example 5. The computer-implemented system of example 1, wherein, for CCM and CoCM, the system tracks cumulative non-face-to-face minutes and validates the non-face-to-face minutes against monthly predefined thresholds before claim generation.

Example 6. A computer-implemented healthcare billing automation system comprising: a billing regime registry storing a plurality of care management billing regimes, wherein each billing regime is associated with: a documentation mode type selected from attestation-based or time-based, frequency limitation rules, unit restriction rules, and stacking compatibility data indicating which other billing regimes cannot be billed concurrently within a calendar month; a regime selection engine configured to: receive regime selection inputs comprising provider role taxonomy, provider qualifications, site of service, patient eligibility criteria, payer policy identifier, and date of service; apply regime selection logic matching the regime selection inputs to regime requirements stored in the billing regime registry;

select an applicable billing regime from the plurality of care management billing regimes; and output a selected documentation mode comprising attestation-based mode when the applicable billing regime is Advanced Primary Care Management (APCM) or General Primary Care Management (GPCM), and time-based mode when the applicable billing regime is Chronic Care Management (CCM) or Collaborative Care Management (CoCM); an attestation capture engine configured to operate when the selected documentation mode is attestation-based mode; a one unit per month enforcement engine configured to enforce a billing constraint that one unit per calendar month is permitted for billing codes from APCM or GPCM regime families, a concurrency detection engine configured to: scan billing codes to identify a first billing code and a second billing code for a given patient and calendar month, retrieve stacking compatibility data for the first billing code, determine whether the second billing code violates the stacking compatibility data, flag a concurrency conflict when a stacking violation is detected, retrieve payer-specific stacking rules from a payer policy database, and either prevent claim submission or generate a regime adjustment recommendation based on the payer-specific stacking rules.

Example 7. The computer-implemented system of example 6, wherein the plurality of care management billing regimes comprise: APCM (Advanced Primary Care Management), GPCM (General Primary Care Management), CCM (Chronic Care Management), CoCM (Collaborative Care Management), PCM (Principal Care Management), RPM (Remote Patient Monitoring), and RTM (Remote Therapeutic Monitoring).

Example 8. The computer-implemented system of example 6, wherein the attestation capture engine is further configured to: collate completed care activities into a reviewable summary comprising care plan reviews, contact logs, outcome measures, and care team communications; present the reviewable summary through a clinician interface; receive an electronic signature and timestamp from the clinician interface; and record attestation metadata comprising signer identity, attestation timestamp, claim version identifier, and links to supporting documentation files.

Example 9. The computer-implemented system of example 6, wherein the attestation capture engine is further configured to detect when a claim generation request includes additional units beyond one unit for a calendar month, and block claim generation when additional units beyond the one unit limit are detected.

Example 10. The computer-implemented system of example 6, further comprising a fallback logic engine configured to: detect whether APCM or GPCM eligibility is unsatisfied based on at least one of: patient qualification failure indicated by absence of one or more diagnosis codes, payer non-coverage indicated by payer policy data, or prior authorization denial indicated by authorization status data; in response to detecting that APCM or GPCM eligibility is unsatisfied, automatically select CCM or CoCM as a fallback regime; switch the selected documentation mode from attestation-based mode to time-based mode; trigger a time tracking module to begin tracking cumulative non-face-to-face minutes; and generate a notification to care team members indicating a regime change to the fallback regime and the documentation mode switch.

Example 11. The computer-implemented system of example 6, further comprising a transaction generation engine configured to: generate X12 837P professional claim transactions or X12 837I institutional claim transactions in EDI format; populate claim fields with procedure codes, diagnosis codes, patient demographics, provider identifiers, and service dates; and transmit the generated X12 837P or X12 837I transactions to at least one clearinghouse or payer via EDI transmission protocols.

Example 12. The computer-implemented system of example 11, further comprising an acknowledgment processing engine configured to: receive X12 TA1 interchange acknowledgment transactions indicating technical acceptance or technical rejection at an interchange level; receive X12 999 functional acknowledgment transactions indicating functional acceptance or functional rejection; parse the X12 TA1 and 999 transactions to extract acknowledgment status codes; and log acknowledgment status codes in a claim tracking database.

Example 13. The computer-implemented system of example 12, further comprising a claim status processing engine configured to: receive X12 277CA claim acknowledgment transactions comprising STC (status code) segments; parse the STC segments to extract claim-level status indicators comprising accepted, rejected, or pended; and update claim status in the claim tracking database based on the extracted claim-level status indicators.

Example 14. The computer-implemented system of example 13, further comprising a claim status inquiry engine configured to: generate X12 276 claim status inquiry transactions for claims in pending status; transmit the X12 276 transactions to payers or clearinghouses; receive X12 277 claim status response transactions; parse the X12 277 transactions to extract updated claim status indicators; update the claim tracking database with the extracted updated claim status indicators; and in response to determining that a claim remains in pending status beyond a predefined threshold time period, trigger a follow-up action comprising generating an additional X12 276 inquiry or escalating to manual review.

Example 15. The computer-implemented system of example 6, further comprising a remittance processing engine configured to: receive X12 835 Electronic Remittance Advice (ERA) transactions; parse the X12 835 transactions to extract CLP (claim payment) segments comprising claim-level payment information; parse the X12 835 transactions to extract SVD (service payment) segments comprising service-level payment information; and parse the X12 835 transactions to extract CAS (claim adjustment) segments comprising adjustment data.

Example 16. The computer-implemented system of example 6, further comprising a denial classification engine configured to: extract from CAS segments: group codes selected from PR (patient responsibility), CO (contractual obligation), PI (payer-initiated reduction), and OA (other adjustment); extract from CAS segments: CARC (Claim Adjustment Reason Code) values; extract from CAS segments: RARC (Remittance Advice Remark Code) values; access a denial playbook comprising a mapping table linking combinations of CARC codes and RARC codes to predefined correction actions; for a given extracted CARC code and RARC code combination, retrieve a mapped correction action from the denial playbook; automatically trigger execution of the mapped correction action, wherein correction actions comprise at least one of: requesting documentation, applying contractual write-off, re-coding the claim, or escalating to manual review.

Example 17. The computer-implemented system of example 6, further comprising a rule matching engine configured to: receive a claim with a specified date of service; query stored billing rules to identify rule sets with effective date ranges encompassing the specified date of service;

select an applicable rule version based on the effective date range match; apply the selected applicable rule version to validate the claim; log in an audit trail: a rule source identifier associated with the selected applicable rule version, a version identifier, and an application timestamp.

Example 18. A computer-implemented method for automated healthcare billing regime selection and claim processing, the method comprising: storing, by a processor, a billing regime registry comprising a plurality of care management billing regimes, wherein each billing regime is associated with a documentation mode type, frequency limitation rules, unit restriction rules, and stacking compatibility data; receiving, by the processor, regime selection inputs comprising provider role taxonomy, provider qualifications, site of service, patient eligibility criteria, payer policy identifier, and date of service; applying, by the processor, regime selection logic to match the regime selection inputs to regime requirements; selecting, by the processor, an applicable billing regime from the plurality of care management billing regimes; determining, by the processor, a selected documentation mode comprising attestation-based mode for a first portion of the plurality of regimes and a time-based mode for a second portion of the plurality of regimes.

Example 19. The computer-implemented method of example 18, further comprising in response to determining that the selected documentation mode is an attestation-based mode: collating, by the processor, completed care activities into a reviewable summary; presenting, by the processor, the reviewable summary through a clinician interface; receiving, by the processor, an electronic signature and timestamp; recording, by the processor, attestation metadata comprising signer identity, attestation timestamp, claim version identifier, and links to supporting documentation; and enforcing, by the processor, for Advanced Primary Care Management (APCM) or General Primary Care Management (GPCM) billing codes, a one unit per calendar month billing constraint by detecting and blocking claim generation attempts including additional units beyond one unit.

Example 20. The computer-implemented method of example 19, further comprising detecting, by the processor, concurrency conflicts by: scanning billing codes for a given patient and calendar month; identifying a first billing code and a second billing code; determining whether the second billing code violates stacking compatibility data for the first billing code; in response to detecting a stacking violation, flagging a concurrency conflict and preventing claim submission or generating a regime adjustment recommendation based on payer-specific stacking rules.

Example 21. The computer-implemented method of example 18, further comprising: detecting, by the processor, that APCM or GPCM eligibility is not satisfied; automatically selecting, by the processor, Chronic Care Management (CCM) or Collaborative Care Management (CoCM) as a fallback regime; switching, by the processor, the selected documentation mode from attestation-based mode to time-based mode; triggering, by the processor, time tracking to begin tracking cumulative non-face-to-face minutes; generating, by the processor, a notification to care team members indicating a regime change.

Example 22. The computer-implemented method of example 18, further comprising: generating, by the processor, X12 837P professional claim transactions or X12 837I institutional claim transactions in EDI format; transmitting, by the processor, the generated transactions to at least one clearinghouse or payer via EDI transmission protocols; receiving, by the processor, X12 TA1 interchange acknowledgment transactions indicating technical acceptance or rejection; receiving, by the processor, X12 999 functional acknowledgment transactions indicating functional acceptance or rejection; receiving, by the processor, X12 277CA claim acknowledgment transactions comprising STC segments; parsing, by the processor, the STC segments to extract claim-level status indicators; and updating, by the processor, claim status based on the extracted claim-level status indicators.

Example 23. The computer-implemented method of example 22, further comprising: receiving, by the processor, X12 835 Electronic Remittance Advice (ERA) transactions; parsing, by the processor, the X12 835 transactions to extract CLP segments, SVD segments, and CAS segments; extracting, by the processor, from CAS segments: group codes selected from PR, CO, PI, and OA; extracting, by the processor, from CAS segments: CARC codes and RARC codes; accessing, by the processor, a denial playbook comprising a mapping table linking CARC and RARC code combinations to correction actions; retrieving, by the processor, a mapped correction action for the extracted CARC and RARC code combination; and automatically triggering, by the processor, execution of the mapped correction action.

Example 24. The computer-implemented method of example 18, further comprising: accessing, by the processor, CMS NCCI Medically Unlikely Edit (MUE) data comprising unit limits and MAI types; applying, by the processor, MAI type 1 enforcement by limiting units per claim line item; applying, by the processor, MAI type 2 enforcement by limiting units per date of service; applying, by the processor, MAI type 3 enforcement by flagging claims exceeding clinical benchmarks for review without automatic denial; enforcing, by the processor, monthly frequency limit rules; and enforcing, by the processor, stacking restriction rules preventing concurrent billing of incompatible codes within a calendar month.

Example 25. The computer-implemented method of example 18, further comprising: retrieving, by the processor, billing policy rule sets from authoritative sources comprising CMS NCCI quarterly update files, payer companion guides, and CAQH CORE specifications; parsing, by the processor, the retrieved rule sets to extract individual billing rules; assigning, by the processor, an effective date range to each extracted billing rule; storing, by the processor, rule provenance metadata comprising rule source identifier, ingestion timestamp, and version identifier; for a claim with a specified date of service, matching, by the processor, the date of service to a rule set with an effective date range encompassing the date of service; applying, by the processor, the matched rule set to validate the claim; and logging, by the processor, in an audit trail the rule source identifier, version identifier, and application timestamp.

Example 26. The computer-implemented method of example 18, further comprising: maintaining, by the processor, clearinghouse configuration data for a plurality of clearinghouses; normalizing, by the processor, outbound claim submission format for each clearinghouse; normalizing, by the processor, inbound acknowledgment format into a standardized internal format; assigning, by the processor, a claim identifier selected from ICN (Internal Control Number) or TCN (Transaction Control Number) to each generated claim; before transmitting a claim, comparing, by the processor, the claim identifier to a submitted claims registry; when the claim identifier matches an entry in the submitted claims registry, detecting, by the processor, a duplicate submission attempt; and preventing, by the processor, transmission of the claim when a duplicate submission attempt is detected through idempotent resubmission logic.

Example 27. The computer-implemented method of example 18, further comprising: receiving, by the processor, patient risk indicators comprising at least one of PHQ-9 scores, GAD-7 scores, or glucose trend data; receiving, by the processor, care context data, provider role taxonomy data, provider availability data, and policy constraint data; applying, by the processor, orchestration decision logic to determine an intervention assignment comprising patient identifier, intervention type, target time and date, assigned provider role, escalation SLA, and documentation requirements; generating, by the processor, SLA approaching notifications when elapsed time reaches a threshold percentage of the escalation SLA; upon detecting an assigned provider has become unavailable, automatically reassigning, by the processor, the intervention to an alternative provider; and logging, by the processor, all intervention assignments with timestamps, actor identities, and decision provenance data.

Example 28. The computer-implemented method of example 18, further comprising: providing, by the processor, a unified presentation layer comprising a clinician-facing user interface that does not expose billing regime selection or documentation mode type; and operating, by the processor, a billing plane beneath the unified presentation layer, wherein the billing plane automatically determines applicable billing regimes, selects procedure codes, switches between attestation-based and time-based modes, enforces frequency and unit restriction rules, and generates, validates, and submits claims without exposing billing-specific operations to a clinician.

Example 29. The computer-implemented method of example 18, further comprising: calculating, by the processor, a clean claim rate metric, a denial rate metric, an accounts receivable days metric, and a resubmission success rate metric, wherein performing the regime selection, one unit per month enforcement, and concurrency detection increases the clean claim rate to at least 90%, decreases the denial rate to below 10%, and decreases the accounts receivable days to below 30 days.

Example 30. The computer-implemented method of example 18, wherein the regime selection logic comprises: for RHC or FQHC site of service, applying, by the processor, encounter-based billing regime rules; detecting, by the processor, site of service transitions; and upon detecting a transition, automatically selecting, by the processor, equivalent billing regime code families appropriate for a transitioned site of service.

Example 31. A computer-implemented method for generating, validating, submitting, and managing reimbursement claims for monthly billing regimes based on care activity data, the method comprising: (a) receiving, via an event ingestion interface, care event data for a patient from a plurality of sources comprising at least one of: device telemetry, patient application interactions, asynchronous clinician messaging, telehealth session data, electronic medical record updates, care-team task records, or laboratory result data; (b) storing or updating, based on the care event data, a patient record in a patient data repository; (c) accessing a billing regime registry that stores, for each of a plurality of billing regimes, regime attributes comprising at least one of: eligibility criteria, documentation mode attributes, unit or frequency limits, concurrency constraints, applicable code families, and effective date applicability; (d) aggregating, for a target billing period, at least a portion of the care event data; (e) detecting whether one or more regime-specific thresholds for the target billing period are attained based on the aggregated data; (f) attributing at least one of time or activities to a billing regime and the target billing period to form claim preparation output; (g) validating the claim preparation output against compliance constraints prior to transmitting a claim submission, the compliance constraints comprising at least one of: payer-specific concurrency constraints, frequency limits, unit limits, or medically unlikely edit constraints; (h) presenting the claim preparation output to an authorized billing approver associated with a billing identifier in a signature queue and receiving an approval input; (i) in response to the approval input, creating an attestation ledger entry that records at least a claim identifier, a claim version identifier, an identifier of the authorized billing approver, and an approval timestamp; (j) generating and transmitting, based on the validated and approved claim preparation output, a claim submission in a standardized electronic transaction format to a clearinghouse interface or payer interface; (k) receiving at least one electronic response to the claim submission, parsing the at least one electronic response to determine a claim status or error classification, and updating a claim status record; (l) when the at least one electronic response indicates a rejection, denial, or request for additional information, initiating a corrective workflow; and (m) when the at least one electronic response indicates a denial, generating an appeal packet and initiating an appeal workflow.

Example 32. The method of example 31, wherein aggregating comprises aggregating the care event data into monthly time windows using at least one of: fixed windows aligned to calendar boundaries or sliding windows aligned to a patient-specific cycle boundary.

Example 33. The method of example 31, further comprising detecting a partial billing period due to at least one of mid-period enrollment, disenrollment, or a coverage gap, and applying a rollover policy that determines whether activities occurring near a billing period boundary are attributed to the current billing period or to a subsequent billing period, and maintaining per-patient regime state tracking for the billing period.

Example 34. The method of example 31, further comprising validating device-generated data against signal quality criteria prior to including the device-generated data in aggregation, the signal quality criteria comprising at least one of: device enrollment status, data completeness, timestamp validity, or physiological plausibility range, and verifying that data was collected across a minimum number of distinct calendar days within the billing period as specified by regime-specific rules stored in the billing regime registry.

Example 35. The method of example 31, wherein attributing comprises classifying activities as at least one of device monitoring time, interactive communication time, or treatment management time, and deterministically resolving attribution conflicts to associate the classified activities to a single billing regime and the target billing period.

Example 36. The method of example 31, further comprising logging patient communication events comprising at least one of: outbound notifications, patient responses, or interactive sessions, and including the logged communication events in an evidence bundle.

Example 37. The method of example 31, further comprising tracking device enrollment lifecycle events comprising at least one of initial enrollment, device replacement, or disenrollment, and associating device-generated data with a corresponding enrolled device segment within the target billing period.

Example 38. The method of example 31, wherein detecting the regime-specific thresholds comprises applying a regime-specific aggregation policy stored in the billing regime registry, the aggregation policy specifying at least one of: a rounding rule, a minimum increment, excluded event types, overlap handling, cap rules, carryover rules, or attribution precedence, and the aggregation policy is versioned with effective dates.

Example 39. The method of example 31, further comprising excluding, from aggregation, events classified as duplicates or overlapping beyond a permitted overlap threshold, and selecting a canonical event according to a provenance ranking.

Example 40. The method of example 31, further comprising generating, prior to presenting in the signature queue, a compliance validation summary that enumerates evaluated constraints and rule versions, includes outcomes of monthly aggregation and threshold checks, and records pass or fail determinations.

Example 41. The method of example 31, further comprising receiving, from the authorized billing approver, a delegation protocol specifying at least one of: approved billing regimes, evidence minima, confidence thresholds, escalation rules, payer constraints, or patient population constraints; automatically generating the approval input when the claim preparation output satisfies the delegation protocol; and recording, in the attestation ledger entry, a delegation protocol version identifier.

Example 42. The method of example 41, further comprising receiving an update that revokes or modifies the delegation protocol and applying an updated delegation protocol version to subsequent claim preparation outputs.

Example 43. The method of example 31, further comprising routing exceptions comprising at least a data quality failure, a missing day-spread condition, or a missing enrollment indicator to a role-based exception queue, tracking resolution actions, and re-evaluating the compliance validation summary.

Example 44. The method of example 31, further comprising detecting, prior to a billing period deadline, that accumulated time or data points are below a threshold required for billing and generating a threshold shortfall notification to at least one of: a clinician interface, a patient interface, or a care coordinator interface, and logging the notification as an intervention event for inclusion in the evidence bundle.

Example 45. The method of example 31, further comprising, prior to generating the claim submission, reconciling against historical claim status records to determine whether a claim for the same patient, billing regime, and target billing period was previously submitted, paid, denied, or remains under appeal, and in response suppressing a redundant submission or adjusting the claim submission.

Example 46. The method of example 31, further comprising routing the claim submission to one of a plurality of clearinghouse interfaces based on at least one of a payer identifier, a plan identifier, or routing rules.

Example 47. The method of example 31, wherein initiating the corrective workflow comprises detecting potential duplicate submissions using a claim control identifier and applying idempotent resubmission logic to prevent redundant transmissions.

Example 48. The method of example 31, further comprising aggregating a plurality of claim preparation outputs into a batch, presenting the batch in a consolidated signature queue for bulk approval, and, upon receiving a bulk approval input, submitting corresponding claim submissions.

Example 49. The method of example 31, further comprising mapping detected denial reasons specific to monthly regimes to corrective actions using a denial playbook.

Example 50. The method of example 31, wherein generating the appeal packet comprises including an evidence bundle comprising at least a time aggregation report, device usage evidence, and one or more clinician attestations.

Example 51. The method of example 31, further comprising generating an evidence bundle manifest that lists evidence items with timestamps and sources, storing a manifest identifier or hash in the attestation ledger entry, and associating the manifest identifier with the claim submission.

Example 52. The method of example 31, wherein at least one of the threshold detection, attribution, or strategy ranking is performed using an artificial intelligence system comprising one or more of: a large language model, a machine learning model, a rules-based inference engine, or a hybrid thereof.

Example 53. A computer-implemented method for optimizing selection of monthly billing regimes for reimbursement claims, the method comprising: (a) receiving, for a patient and a target billing period, care activity data; (b) aggregating, for the target billing period, at least a portion of the care activity data; (c) detecting whether one or more regime-specific thresholds for the target billing period are attained based on the aggregated data; (d) accessing a billing regime registry storing regime attributes comprising at least eligibility criteria, unit or frequency limits, concurrency constraints, documentation mode attributes, and effective date applicability; (e) generating, using an artificial intelligence system comprising one or more of: a large language model, a machine learning model, a rules-based inference engine, or a hybrid thereof, a plurality of permissible monthly billing strategies across a plurality of billing regimes, each strategy specifying at least one of: a billing regime, a set of billing codes, a documentation mode, or a submission timing; (f) evaluating the plurality of permissible monthly billing strategies against compliance constraints comprising at least one of: payer-specific concurrency constraints, frequency limits, unit limits, or medically unlikely edit constraints; (g) determining, for each strategy that satisfies the compliance constraints, a projected reimbursement value; (h) ranking the permissible monthly billing strategies based on the projected reimbursement value; (i) presenting a recommended monthly billing strategy and at least one alternative permissible monthly billing strategy to an authorized billing approver associated with a billing identifier in a signature queue; and (j) upon receiving an approval input, causing generation and transmission of a claim submission corresponding to the approved monthly billing strategy in a standardized electronic transaction format.

Example 54. The method of example 53, wherein presenting to the authorized billing approver comprises presenting an explainability artifact comprising at least a reasoning summary for the recommended monthly billing strategy, references to rule versions applied, results of evaluated compliance constraints, and confidence or ranking information.

Example 55. A non-transitory computer-readable storage medium storing instructions that, when executed by one or more processors, cause the one or more processors to perform operations comprising: (a) receiving, via an event ingestion interface, care event data for a patient from a plurality of sources comprising at least one of: device telemetry, patient application interactions, asynchronous clinician messaging, telehealth session data, electronic medical record updates, care-team task records, or laboratory result data; (b) storing or updating, based on the care event data, a patient record in a patient data repository; (c) accessing a billing regime registry that stores, for each of a plurality of billing regimes, regime attributes comprising at least one of: eligibility criteria, documentation mode attributes, unit or frequency limits, concurrency constraints, applicable code families, and effective date applicability; (d) aggregating, for a target billing period, at least a portion of the care event data; (e) detecting whether one or more regime-specific thresholds for the target billing period are attained based on the aggregated data; (f) attributing at least one of time or activities to a billing regime and the target billing period to form claim preparation output; (g) validating the claim preparation output against compliance constraints comprising at least one of: payer-specific concurrency constraints, frequency limits, unit limits, or medically unlikely edit constraints; (h) presenting the claim preparation output to an authorized billing approver associated with a billing identifier in a signature queue and receiving an approval input; (i) in response to the approval input, creating an attestation ledger entry that records at least a claim identifier, a claim version identifier, an identifier of the authorized billing approver, and an approval timestamp; (j) generating and transmitting, based on the validated and approved claim preparation output, a claim submission in a standardized electronic transaction format to a clearinghouse interface or payer interface; (k) receiving at least one electronic response to the claim submission, parsing the at least one electronic response to determine a claim status or error classification, and updating a claim status record; (l) when the at least one electronic response indicates a rejection, denial, or request for additional information, initiating a corrective workflow; and (m) when the at least one electronic response indicates a denial, generating an appeal packet and initiating an appeal workflow.

Example 56. The non-transitory computer-readable storage medium of example 55, wherein the operations further comprise generating an evidence bundle manifest that lists evidence items with timestamps and sources, storing a manifest identifier or hash in the attestation ledger entry, and associating the manifest identifier with metadata for the claim submission.

Example 57. The non-transitory computer-readable storage medium of example 55, wherein the operations further comprise aggregating a plurality of claim preparation outputs for a monthly cohort, presenting the cohort for batch approval in the signature queue, and submitting corresponding claim submissions in a batch.

Example 58. The non-transitory computer-readable storage medium of example 55, wherein the operations further comprise generating a denial risk score based on at least one of data quality, day-spread distribution, enrollment continuity, or historical payer behavior, using the denial risk score to route a claim preparation output to manual review or to expand an evidence bundle, and selecting attachments for submission using at least one of an X12 275 transaction, a paperwork reference segment, or an external document identifier based on an attachment selection policy.

Example 59. A non-transitory computer-readable storage medium storing instructions that, when executed by one or more processors, cause the one or more processors to perform operations comprising: (a) receiving, for a patient and a target billing period, care activity data; (b) aggregating, for the target billing period, at least a portion of the care activity data; (c) detecting whether one or more regime-specific thresholds for the target billing period are attained based on the aggregated data; (d) accessing a billing regime registry storing regime attributes comprising at least eligibility criteria, unit or frequency limits, concurrency constraints, documentation mode attributes, and effective date applicability; (e) generating, using an artificial intelligence system comprising one or more of: a large language model, a machine learning model, a rules-based inference engine, or a hybrid thereof, a plurality of permissible monthly billing strategies across a plurality of billing regimes, each strategy specifying at least one of: a billing regime, a set of billing codes, a documentation mode, or a submission timing; (f) evaluating the plurality of permissible monthly billing strategies against compliance constraints comprising at least one of: payer-specific concurrency constraints, frequency limits, unit limits, or medically unlikely edit constraints; (g) determining, for each strategy that satisfies the compliance constraints, a projected reimbursement value; (h) ranking the permissible monthly billing strategies based on the projected reimbursement value; (i) presenting a recommended monthly billing strategy and at least one alternative permissible monthly billing strategy to an authorized billing approver associated with a billing identifier in a signature queue; and (j) upon receiving an approval input, causing generation and transmission of a claim submission corresponding to the approved monthly billing strategy in a standardized electronic transaction format.

Example 60. The non-transitory computer-readable storage medium of example 59, wherein presenting to the authorized billing approver comprises presenting an explainability artifact comprising at least a reasoning summary for the recommended monthly billing strategy, references to rule versions applied, results of evaluated compliance constraints, and confidence or ranking information.

Example 61. A computer-implemented system for managing reimbursement claims, the system comprising: a processor; and memory storing instructions that, when executed by the processor, cause the processor to: receive care event data for a patient, the care event data comprising one or more of: patient messaging interactions, patient portal interactions, telehealth session data, electronic medical record updates, care-team task records, laboratory result data, and device-generated monitoring data; access a billing regime registry that stores regime attributes for a plurality of billing regimes; automatically select an applicable billing regime for the patient based on the care event data and stored regime attributes; generate, using an artificial intelligence system, claim preparation output for the selected billing regime; validate the claim preparation output against compliance constraints; present the claim preparation output for approval; upon receiving approval, generate an attestation record; generate and transmit, based on the validated and approved claim preparation output, a claim submission in a standardized electronic transaction format to a clearinghouse interface or a payer interface; receive and parse a response to the claim submission; when the response indicates an error condition, automatically initiate a corrective workflow; and when the response indicates a denial, initiate an appeal workflow.

Example 62. The system of example 61, wherein: the artificial intelligence system comprises one or more of: a large language model, a machine learning model, a rules-based inference engine, or a hybrid thereof, the artificial intelligence system generates a confidence score for the claim preparation output; and the processor routes the claim preparation output to manual review when the confidence score fails to satisfy a threshold.

Example 63. The system of example 61, further comprising: a unified presentation layer providing a clinician-facing user interface for care coordination and documentation entry, wherein the user interface does not expose billing regime selection to a clinician; and a billing plane operating beneath the unified presentation layer, wherein the billing plane performs the automatically selecting, the generating, the validating, and the transmitting operations without requiring manual billing regime selection by the clinician.

Example 64. The system of example 61, wherein the plurality of billing regimes comprise: Advanced Primary Care Management (APCM), General Primary Care Management (GPCM), Chronic Care Management (CCM), Collaborative Care Management (CoCM), Principal Care Management (PCM), Remote Patient Monitoring (RPM), and Remote Therapeutic Monitoring (RTM).

Example 65. The system of example 61, wherein: the regime attributes comprise documentation mode attributes indicating an attestation-based documentation mode or a time-based documentation mode; when the selected billing regime uses the attestation-based documentation mode, the processor collates completed care activities into an attestation summary for approval; and when the selected billing regime uses the time-based documentation mode, the processor tracks cumulative service time and validates the cumulative service time against a threshold before generating the claim preparation output.

Example 66. The system of example 61, wherein the processor is further configured to: receive, from an authorized approver, a delegation protocol specifying at least one of: approved billing regimes, approved code families, payer constraints, patient population constraints, or confidence score thresholds; for claim preparation outputs satisfying the delegation protocol, automatically generate the approval without requiring manual input; and record, in the attestation record, a delegation protocol version identifier.

Example 67. The system of example 61, wherein: the standardized electronic transaction format comprises an X12 837 claim submission transaction; and the processor populates the X12 837 transaction with procedure codes, diagnosis codes, patient demographics, provider identifiers, and service dates.

Example 68. The system of example 67, wherein the response comprises one or more of: an X12 TA1 interchange acknowledgment indicating technical acceptance or rejection at an interchange level; an X12 999 functional acknowledgment indicating functional acceptance or rejection; an X12 277CA claim acknowledgment transaction comprising status code segments; and the processor parses the status code segments to extract claim-level status indicators and updates a claim status record.

Example 69. The system of example 67, wherein: the response comprises an X12 835 Electronic Remittance Advice transaction; the processor parses the X12 835 transaction to extract claim adjustment segments comprising group codes and claim adjustment reason codes; the processor accesses a denial playbook comprising a mapping table linking claim adjustment reason codes to corrective actions; and the corrective workflow comprises executing a mapped corrective action retrieved from the denial playbook.

Example 70. The system of example 61, wherein the processor is further configured to: retrieve billing policy rule sets from authoritative sources comprising Centers for Medicare and Medicaid Services updates or payer companion guides; assign an effective date range to each retrieved billing policy rule set; store rule provenance metadata comprising a rule source identifier, an ingestion timestamp, and a version identifier; and for the claim submission, select an applicable rule version based on a date of service matching the effective date range.

Example 71. A computer-implemented method for optimizing billing strategy selection for reimbursement claims, the method comprising: receiving care event data for a patient for a target billing period; accessing a billing regime registry storing regime attributes comprising at least eligibility criteria, unit or frequency limits, concurrency constraints, documentation mode attributes, and effective date applicability; generating, using an artificial intelligence system, a plurality of permissible billing strategies, each permissible billing strategy specifying at least one of: a billing regime, a set of billing codes, a documentation mode, or a submission timing; evaluating the permissible billing strategies against compliance constraints comprising at least one of: payer-specific concurrency constraints, frequency limits, unit limits, or medically unlikely edit constraints; determining, for each permissible billing strategy that satisfies the compliance constraints, a projected reimbursement value; ranking the permissible billing strategies based on the projected reimbursement value; causing presentation of a recommended billing strategy, and at least one alternative permissible billing strategy to an authorized billing approver associated with a billing identifier; and upon receiving an approval responsive to the presentation of the recommended billing strategy, outputting instructions that cause generation and transmission of a claim submission corresponding to the approved billing strategy.

Example 72. The computer-implemented method of example 71, wherein causing presentation of the recommended billing strategy and at least one alternative permissible billing strategy comprises ordering the billing strategies for display based on predefined ranking criteria.

Example 73. The computer-implemented method of example 71, wherein evaluating against the compliance constraints comprises detecting a conflict between the billing strategies.

Example 74. The computer-implemented method of example 71, wherein the artificial intelligence system generates an explainability output for the recommended billing strategy.

Example 75. A non-transitory computer-readable storage medium for use in conjunction with a computer, the computer-readable storage medium storing program instructions that, when executed by the computer, cause the computer to carry out one or more operations comprising: receiving care event data for a patient, the care event data comprising one or more of: patient messaging interactions, patient portal interactions, telehealth session data, electronic medical record updates, care-team task records, laboratory result data, and device-generated monitoring data; accessing a billing regime registry that stores regime attributes for a plurality of billing regimes; automatically selecting an applicable billing regime for the patient based on the care event data and stored regime attributes; generating, using an artificial intelligence system, claim preparation output for the selected billing regime; validating the claim preparation output against compliance constraints; presenting the claim preparation output for approval; upon receiving approval, generating an attestation record; generating and transmitting, based on the validated and approved claim preparation output, a claim submission in a standardized electronic transaction format to a clearinghouse interface or a payer interface; receiving and parse a response to the claim submission; when the response indicates an error condition, initiating a corrective workflow; and when the response indicates a denial, initiating an appeal workflow.

Example 76. The non-transitory computer-readable storage medium of example 75, wherein the operations further comprise: the artificial intelligence system comprises one or more of: a large language model, a machine learning model, a rules-based inference engine, or a hybrid thereof, the artificial intelligence system generates a confidence score for the claim preparation output; and the processor routes the claim preparation output to manual review when the confidence score fails to satisfy a threshold.

Example 77. The non-transitory computer-readable storage medium of example 75, wherein the operations further comprise: providing a clinician-facing user interface for care coordination and documentation entry, wherein the user interface does not expose billing regime selection to a clinician; and performing the automatically selecting, the generating, the validating, and the transmitting operations without requiring manual billing regime selection by the clinician.

Example 78. The non-transitory computer-readable storage medium of example 75, wherein the plurality of billing regimes comprise: Advanced Primary Care Management (APCM), General Primary Care Management (GPCM), Chronic Care Management (CCM), Collaborative Care Management (CoCM), Principal Care Management (PCM), Remote Patient Monitoring (RPM), and Remote Therapeutic Monitoring (RTM).

Example 79. The non-transitory computer-readable storage medium of example 75, wherein: the regime attributes comprise documentation mode attributes indicating an attestation-based documentation mode or a time-based documentation mode; when the selected billing regime uses the attestation-based documentation mode, the processor collates completed care activities into an attestation summary for approval; and when the selected billing regime uses the time-based documentation mode, the processor tracks cumulative service time and validates the cumulative service time against a threshold before generating the claim preparation output.

Example 80. The non-transitory computer-readable storage medium of example 75, wherein the operations further comprise: receiving, from an authorized approver, a delegation protocol specifying at least one of: approved billing regimes, approved code families, payer constraints, patient population constraints, or confidence score thresholds; for claim preparation outputs satisfying the delegation protocol, automatically generating the approval without requiring manual input; and recording, in the attestation record, a delegation protocol version identifier.

Example 81. The non-transitory computer-readable storage medium of example 75, wherein: the standardized electronic transaction format comprises an X12 837 claim submission transaction; and the processor populates the X12 837 transaction with procedure codes, diagnosis codes, patient demographics, provider identifiers, and service dates.

Example 82. The non-transitory computer-readable storage medium of example 81, wherein the response comprises one or more of: an X12 TA1 interchange acknowledgment indicating technical acceptance or rejection at an interchange level; an X12 999 functional acknowledgment indicating functional acceptance or rejection; an X12 277CA claim acknowledgment transaction comprising status code segments; and the processor parses the status code segments to extract claim-level status indicators and updates a claim status record.

Example 83. The non-transitory computer-readable storage medium of example 81, wherein: the response comprises an X12 835 Electronic Remittance Advice transaction; the processor parses the X12 835 transaction to extract claim adjustment segments comprising group codes and claim adjustment reason codes; the processor accesses a denial playbook comprising a mapping table linking claim adjustment reason codes to corrective actions; and the corrective workflow comprises executing a mapped corrective action retrieved from the denial playbook.

Example 84. The non-transitory computer-readable storage medium of example 81, wherein the operations further comprise: retrieving billing policy rule sets from authoritative sources comprising Centers for Medicare and Medicaid Services updates or payer companion guides; assigning an effective date range to each retrieved billing policy rule set; storing rule provenance metadata comprising a rule source identifier, an ingestion timestamp, and a version identifier; and for the claim submission, selecting an applicable rule version based on a date of service matching the effective date range.

Example 85. A computer-implemented method for generating, validating, submitting, and managing regulated transactions based on activity data, the method comprising: (a) receiving, via an event ingestion interface, activity event data for an entity from a plurality of sources comprising at least one of: system integrations, user interfaces, messaging channels, document feeds, workflow systems, or third-party APIs; (b) storing or updating, based on the activity event data, a record in a data repository; (c) accessing a policy regime registry that stores, for each of a plurality of policy regimes, regime attributes comprising at least one of: eligibility criteria, documentation mode attributes, unit or frequency limits, concurrency constraints, applicable classification codes, and effective date applicability; (d) generating, using an artificial intelligence system comprising one or more of: a large language model, a machine learning model, a rules-based inference engine, or a hybrid thereof, proposed transaction content comprising one or more classification codes and an associated strategy based on at least the activity event data and the policy regime registry; (e) validating the proposed transaction content and strategy against compliance constraints prior to transmitting a transaction submission, the compliance constraints comprising at least one of: concurrency constraints, frequency limits, unit caps, or benchmark-type constraints; (f) presenting the proposed transaction content and strategy to an authorized transaction approver associated with an authority identifier in a signature queue and receiving an approval input; (g) in response to the approval input, creating an attestation ledger entry that records at least a transaction identifier, a transaction version identifier, an identifier of the authorized transaction approver, and an approval timestamp; (h) generating and transmitting, based on the validated and approved transaction content and strategy, a transaction submission in a standardized electronic transaction format to a gateway interface or authority interface; (i) receiving at least one electronic response to the transaction submission, parsing the at least one electronic response to determine a transaction status or error classification, and updating a transaction status record; (j) when the at least one electronic response indicates a rejection or a request for additional information, initiating a corrective workflow; and (k) when the at least one electronic response indicates an adverse determination, denial, or adjustment, generating a dispute packet and initiating a dispute or appeal workflow.

Example 86. The method of example 85, wherein generating the proposed transaction content and strategy comprises generating a confidence score, and the method further comprises routing to manual review when the confidence score fails to satisfy a threshold.

Example 87. The method of example 85, wherein the policy regime registry stores regime provenance comprising at least a source identifier, an ingestion timestamp, and an effective date range for each regime.

Example 88. The method of example 85, further comprising selecting, based on a date of action or a period of performance, a rule version applicable to the transaction from the policy regime registry.

Example 89. The method of example 85, wherein the documentation mode attributes comprise at least an attestation-based documentation mode and an activity- or time-based accumulation mode.

Example 90. The method of example 85, further comprising automatically switching between documentation modes in response to determining that an eligibility or policy condition is no longer satisfied.

Example 91. The method of example 85, wherein validating against the compliance constraints comprises enforcing at least one of: a concurrency rule, a frequency limit, a unit cap, or a benchmark-type constraint applied to a transaction line item or to an overall period of performance.

Example 92. The method of example 85, further comprising receiving, from the authorized transaction approver, a delegation protocol specifying at least one of: approved policy regimes, approved classification codes, thresholds or confidence criteria, escalation rules, or authority constraints; automatically generating the approval input when the proposed transaction content and strategy satisfy the delegation protocol; and recording, in the attestation ledger entry, a delegation protocol version identifier.

Example 93. The method of example 92, further comprising receiving an update that revokes or modifies the delegation protocol and applying an updated delegation protocol version to subsequent transaction submissions.

Example 94. The method of example 85, wherein receiving the approval input comprises receiving approvals from a plurality of authorized transaction approvers in a sequential or parallel approval chain, and wherein presenting comprises routing to approvers based on at least one of: regime, authority, classification code family, confidence score, risk score, or transaction amount.

Example 95. The method of example 85, further comprising aggregating a plurality of proposed transaction contents into a batch, presenting the batch in a consolidated signature queue for bulk approval, and, upon receiving a bulk approval input, submitting corresponding transaction submissions.

Example 96. The method of example 85, further comprising routing the transaction submission to one of a plurality of gateway interfaces based on at least one of: an authority identifier, a counterpart identifier, a network, or routing rules.

Example 97. The method of example 85, wherein initiating the corrective workflow comprises detecting potential duplicate submissions using a transaction control identifier and applying idempotent resubmission logic to prevent redundant transmissions.

Example 98. The method of example 85, further comprising assembling a supporting documentation bundle and linking the bundle to the transaction submission using at least one of: a standardized supporting documentation message or an external document identifier.

Example 99. The method of example 85, wherein receiving the at least one electronic response comprises receiving and parsing at least one of: an interchange acknowledgment, a functional acknowledgment, or a transaction-level acknowledgment, and updating the transaction status record based on acceptance or rejection codes.

Example 100. The method of example 85, wherein receiving the at least one electronic response further comprises receiving and parsing a settlement or remittance advice message, extracting at least one of an amount, an adjustment, a reason code, a reason class, or a remark code, and mapping at least one of a reason code, a reason class, or a remark code to one or more corrective actions using a response code playbook.

Example 101. The method of example 85, wherein generating the dispute packet comprises including at least a transaction identifier, a prior response code and reason class, and references to supporting documents, and tracking a dispute status based on electronic status updates.

Example 102. The method of example 85, further comprising generating an evidence bundle manifest that lists evidence items with timestamps and sources, storing a manifest identifier or hash in the attestation ledger entry, and associating the manifest identifier with the transaction submission.

Example 103. The method of example 85, further comprising, prior to generating the transaction submission, reconciling against historical transaction status records to determine whether a transaction for the same entity, policy regime, and period of performance was previously submitted, accepted, rejected, or remains under dispute, and in response suppressing a redundant submission or adjusting the transaction submission.

Example 104. The method of example 85, wherein the policy regime registry is configurable to add, modify, or remove policy regimes and associated regime attributes without modification to executable code.

Example 105. A computer-implemented method for optimizing selection of transaction strategies for regulated transactions, the method comprising: (a) receiving activity event data for an entity and a target period of performance; (b) aggregating, for the target period of performance, at least a portion of the activity event data; (c) detecting, based on the aggregated data, whether one or more regime-specific criteria thresholds are attained; (d) accessing a policy regime registry storing regime attributes comprising at least eligibility criteria, unit or frequency limits, concurrency constraints, documentation mode attributes, and effective date applicability; (e) generating, using an artificial intelligence system comprising one or more of: a large language model, a machine learning model, a rules-based inference engine, or a hybrid thereof, a plurality of permissible transaction strategies that specify at least one of: a policy regime, a set of classification codes, a documentation mode, or a submission timing; (f) evaluating the plurality of permissible transaction strategies against the compliance constraints to identify strategies that satisfy the compliance constraints; (g) determining, for each strategy that satisfies the compliance constraints, a projected settlement value; (h) ranking the permissible transaction strategies based on the projected settlement value; (i) presenting a recommended transaction strategy and at least one alternative permissible transaction strategy to an authorized transaction approver associated with an authority identifier in a signature queue; and (j) upon receiving an approval input, causing generation and transmission of a transaction submission corresponding to the approved transaction strategy in a standardized electronic transaction format.

Example 106. The method of example 105, wherein presenting comprises ordering transaction strategies based on at least one of: the projected settlement value or the confidence score.

Example 107. The method of example 105, further comprising tracking outcomes comprising at least one of: acceptance, rejection, adjustment, chargeback, or dispute outcome, and updating one or more strategy ranking parameters based on the tracked outcomes.

Example 108. The method of example 105, wherein presenting to the authorized transaction approver comprises presenting an explainability artifact comprising at least a reasoning summary for the recommended transaction strategy, references to rule versions applied, results of evaluated compliance constraints, and confidence or ranking information.

Example 109. A non-transitory computer-readable storage medium storing instructions that, when executed by one or more processors, cause the one or more processors to perform operations comprising: (a) receiving, via an event ingestion interface, activity event data for an entity from a plurality of sources comprising at least one of: system integrations, user interfaces, messaging channels, document feeds, workflow systems, or third-party APIs; (b) storing or updating, based on the activity event data, a record in a data repository; (c) accessing a policy regime registry that stores, for each of a plurality of policy regimes, regime attributes comprising at least one of: eligibility criteria, documentation mode attributes, unit or frequency limits, concurrency constraints, applicable classification codes, and effective date applicability; (d) generating, using an artificial intelligence system comprising one or more of: a large language model, a machine learning model, a rules-based inference engine, or a hybrid thereof, proposed transaction content comprising one or more classification codes and an associated strategy based on at least the activity event data and the policy regime registry; (e) validating the proposed transaction content and strategy against compliance constraints comprising at least one of: concurrency constraints, frequency limits, unit caps, or benchmark-type constraints; (f) presenting the proposed transaction content and strategy to an authorized transaction approver associated with an authority identifier in a signature queue and receiving an approval input; (g) in response to the approval input, creating an attestation ledger entry that records at least a transaction identifier, a transaction version identifier, an identifier of the authorized transaction approver, and an approval timestamp; (h) generating and transmitting, based on the validated and approved transaction content and strategy, a transaction submission in a standardized electronic transaction format to a gateway interface or authority interface; (i) receiving at least one electronic response to the transaction submission, parsing the at least one electronic response to determine a transaction status or error classification, and updating a transaction status record; (j) when the at least one electronic response indicates a rejection or a request for additional information, initiating a corrective workflow; and (k) when the at least one electronic response indicates an adverse determination, denial, or adjustment, generating a dispute packet and initiating a dispute or appeal workflow.

Example 110. The non-transitory computer-readable storage medium of example 109, wherein the operations further comprise receiving a delegation protocol from the authorized transaction approver, automatically generating the approval input when protocol constraints are satisfied, and recording a delegation protocol version identifier in the attestation ledger entry.

Example 111. The non-transitory computer-readable storage medium of example 109, wherein the operations further comprise aggregating a plurality of proposed transaction contents into a batch, presenting the batch in a consolidated signature queue for bulk approval, and, upon receiving a bulk approval input, submitting corresponding transaction submissions.

Example 112. The non-transitory computer-readable storage medium of example 109, wherein the operations further comprise generating a reject-risk score based on at least one of: data quality indicators, distribution across a period of performance, enrollment or authority compliance continuity, or historical authority behavior, using the reject-risk score to route a proposed transaction to manual review or to expand a supporting documentation bundle, and selecting attachments for submission using a policy that specifies at least one standardized supporting documentation message or an external document identifier.

Example 113. The non-transitory computer-readable storage medium of example 109, wherein transmitting the transaction submission in the standardized electronic transaction format comprises generating and transmitting a message conforming to at least one of an ANSI X12 transaction set or an ISO 20022 message.

Example 114. A non-transitory computer-readable storage medium storing instructions that, when executed by one or more processors, cause the one or more processors to perform operations comprising: (a) receiving activity event data for an entity and a target period of performance; (b) aggregating, for the target period of performance, at least a portion of the activity event data; (c) detecting, based on the aggregated data, whether one or more regime-specific criteria thresholds are attained; (d) accessing a policy regime registry storing regime attributes comprising at least eligibility criteria, unit or frequency limits, concurrency constraints, documentation mode attributes, and effective date applicability; (e) generating, using an artificial intelligence system comprising one or more of: a large language model, a machine learning model, a rules-based inference engine, or a hybrid thereof, a plurality of permissible transaction strategies that specify at least one of: a policy regime, a set of classification codes, a documentation mode, or a submission timing; (f) evaluating the plurality of permissible transaction strategies against the compliance constraints to identify strategies that satisfy the compliance constraints; (g) determining, for each strategy that satisfies the compliance constraints, a projected settlement value; (h) ranking the permissible transaction strategies based on the projected settlement value; (i) presenting a recommended transaction strategy and at least one alternative permissible transaction strategy to an authorized transaction approver associated with an authority identifier in a signature queue; and (j) upon receiving an approval input, causing generation and transmission of a transaction submission corresponding to the approved transaction strategy in a standardized electronic transaction format.

References in the specification to "one embodiment," "an embodiment," "an illustrative embodiment," "some embodiments," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments, whether or not explicitly described.

As used in the description and claims, the singular form “a”, “an”, and “the” include both singular and plural references unless the context clearly dictates otherwise. At times, the claims and disclosure may include terms such as “a plurality,” “one or more,” or “at least one;” however, the absence of such terms is not intended to mean, and should not be interpreted to mean, that a plurality is not conceived.

The term “about” or “approximately,” when used before a numerical designation or range (e.g., to define a length or pressure), indicates approximations which may vary by (+) or (−) 5%, 1%, or 0.1%. All numerical ranges provided herein are inclusive of the stated start and end numbers. The term “substantially” indicates mostly (i.e., greater than 50%) or essentially all of a device, substance, or composition.

As used herein, the term “comprising” or “includes” is intended to mean that the devices, systems, and methods include the recited elements, and may additionally include any other elements. “Consisting essentially of” shall mean that the devices, systems, and methods include the recited elements and exclude other elements of essential significance to the combination for the stated purpose. Thus, a system or method consisting essentially of the elements as defined herein would not exclude other materials, features, or steps that do not materially affect the basic and novel characteristic(s) of the claimed disclosure. “Consisting of” shall mean that the devices, systems, and methods include the recited elements and exclude anything more than a trivial or inconsequential element or step. Embodiments defined by each of these transitional terms are within the scope of this disclosure.

The examples and illustrations included herein show, by way of illustration and not of limitation, specific embodiments in which the subject matter may be practiced. Other embodiments may be utilized and derived therefrom, such that structural and logical substitutions and changes may be made without departing from the scope of this disclosure. Such embodiments of the inventive subject matter may be referred to herein individually or collectively by the term “invention” merely for convenience and without intending to voluntarily limit the scope of this application to any single invention or inventive concept if more than one is in fact disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A computer-implemented healthcare billing automation system comprising:

at least one processor; and at least one memory coupled to the at least one processor and storing instructions that, when executed by the at least one processor, cause the system to implement:

a billing regime registry storing a plurality of care management billing regimes, wherein each billing regime is associated with: a documentation mode type selected from attestation-based or time-based, frequency limitation rules, unit restriction rules, and stacking compatibility data indicating which other billing regimes cannot be billed concurrently within a calendar month;

a regime selection engine configured to:

receive regime selection inputs comprising provider role taxonomy, provider qualifications, site of service, patient eligibility criteria, payer policy identifier, and date of service;

apply regime selection logic matching the regime selection inputs to regime requirements stored in the billing regime registry;

select an applicable billing regime from the plurality of care management billing regimes; and output a selected documentation mode comprising attestation-based mode when the applicable billing regime is Advanced Primary Care Management (APCM) or General Primary Care Management (GPCM), and time-based mode when the applicable billing regime is Chronic Care Management (CCM) or Collaborative Care Management (CoCM);

an attestation capture engine configured to operate when the selected documentation mode is attestation-based mode;

a one unit per month enforcement engine configured to enforce a billing constraint that one unit per calendar month is permitted for billing codes from APCM or GPCM regime families, a concurrency detection engine configured to:

scan billing codes to identify a first billing code and a second billing code for a given patient and calendar month, retrieve stacking compatibility data for the first billing code, determine whether the second billing code violates the stacking compatibility data, flag a concurrency conflict when a stacking violation is detected, retrieve payer-specific stacking rules from a payer policy database, and either prevent claim submission or generate a regime adjustment recommendation based on the payer-specific stacking rules; and a transaction submission engine configured to:

generate a claim in accordance with the selected billing regime and the selected documentation mode;

assign a claim identifier selected from an Internal Control Number or a Transaction Control Number to each generated claim;

compare the claim identifier to a submitted claims registry before transmitting the generated claim;

prevent transmission of the generated claim when the claim identifier matches an entry in the submitted claims registry; and update a control record in the submitted claims registry to reflect a duplicate submission status, a detection timestamp, and one or more referenced identifiers associated with the prevented transmission.

2. The computer-implemented system of claim 1, wherein the plurality of care management billing regimes comprise: APCM (Advanced Primary Care Management), GPCM (General Primary Care Management), CCM (Chronic Care Management), CoCM (Collaborative Care Management), PCM (Principal Care Management), RPM (Remote Patient Monitoring), and RTM (Remote Therapeutic Monitoring).

3. The computer-implemented system of claim 1, wherein the attestation capture engine is further configured to:

collate completed care activities into a reviewable summary comprising care plan reviews, contact logs, outcome measures, and care team communications;

present the reviewable summary through a clinician interface;

receive an electronic signature and timestamp from the clinician interface; and record attestation metadata comprising signer identity, attestation timestamp, claim version identifier, and links to supporting documentation files.

4. The computer-implemented system of claim 1, wherein the attestation capture engine is further configured to detect when a claim generation request includes additional units beyond one unit for a calendar month, and block claim generation when additional units beyond the one unit limit are detected.

5. The computer-implemented system of claim 1, further comprising a fallback logic engine configured to:

detect whether APCM or GPCM eligibility is unsatisfied based on at least one of: patient qualification failure indicated by absence of one or more diagnosis codes, payer non-coverage indicated by payer policy data, or prior authorization denial indicated by authorization status data;

in response to detecting that APCM or GPCM eligibility is unsatisfied, automatically select CCM or CoCM as a fallback regime;

switch the selected documentation mode from attestation-based mode to time-based mode;

trigger a time tracking module to begin tracking cumulative non-face-to-face minutes; and generate a notification to care team members indicating a regime change to the fallback regime and the documentation mode switch.

6. The computer-implemented system of claim 1, further comprising a transaction generation engine configured to:

generate X12 837P professional claim transactions or X12 837I institutional claim transactions in EDI format;

populate claim fields with procedure codes, diagnosis codes, patient demographics, provider identifiers, and service dates; and transmit the generated X12 837P or X12 837I transactions to at least one clearinghouse or payer via EDI transmission protocols.

7. The computer-implemented system of claim 6, further comprising an acknowledgment processing engine configured to:

receive X12 TA1 interchange acknowledgment transactions indicating technical acceptance or technical rejection at an interchange level;

receive X12 999 functional acknowledgment transactions indicating functional acceptance or functional rejection;

parse the X12 TA1 and 999 transactions to extract acknowledgment status codes; and log acknowledgment status codes in a claim tracking database.

8. The computer-implemented system of claim 7, further comprising a claim status processing engine configured to:

receive X12 277CA claim acknowledgment transactions comprising STC (status code) segments;

parse the STC segments to extract claim-level status indicators comprising accepted, rejected, or pended; and update claim status in the claim tracking database based on the extracted claim-level status indicators.

9. The computer-implemented system of claim 8, further comprising a claim status inquiry engine configured to:

generate X12 276 claim status inquiry transactions for claims in pending status;

transmit the X12 276 transactions to payers or clearinghouses;

receive X12 277 claim status response transactions;

parse the X12 277 transactions to extract updated claim status indicators;

update the claim tracking database with the extracted updated claim status indicators; and in response to determining that a claim remains in pending status beyond a predefined threshold time period, trigger a follow-up action comprising generating an additional X12 276 inquiry or escalating to manual review.

10. The computer-implemented system of claim 1, further comprising a remittance processing engine configured to:

receive X12 835 Electronic Remittance Advice (ERA) transactions;

parse the X12 835 transactions to extract CLP (claim payment) segments comprising claim-level payment information;

parse the X12 835 transactions to extract SVD (service payment) segments comprising service-level payment information; and parse the X12 835 transactions to extract CAS (claim adjustment) segments comprising adjustment data.

11. The computer-implemented system of claim 1, further comprising a denial classification engine configured to:

extract from CAS segments: group codes selected from PR (patient responsibility), CO (contractual obligation), PI (payer-initiated reduction), and OA (other adjustment);

extract from CAS segments: CARC (claim Adjustment Reason Code) values;

extract from CAS segments: RARC (Remittance Advice Remark Code) values;

access a denial playbook comprising a mapping table linking combinations of CARC codes and RARC codes to predefined correction actions;

for a given extracted CARC code and RARC code combination, retrieve a mapped correction action from the denial playbook;

automatically trigger execution of the mapped correction action, wherein correction actions comprise at least one of: requesting documentation, applying contractual write-off, re-coding the claim, or escalating to manual review.

12. The computer-implemented system of claim 1, further comprising a rule matching engine configured to:

receive a claim with a specified date of service;

query stored billing rules to identify rule sets with effective date ranges encompassing the specified date of service;

select an applicable rule version based on the effective date range match;

apply the selected applicable rule version to validate the claim;

log in an audit trail: a rule source identifier associated with the selected applicable rule version, a version identifier, and an application timestamp.

13. The computer-implemented healthcare billing automation system of claim 1, wherein the regime selection engine is further configured to:

evaluate, against requirements stored in the billing regime registry, a plurality of regime selection factors including provider role taxonomy, provider qualifications, site of service, patient eligibility criteria, and payer coverage for each billing regime in the plurality of care management billing regimes;

match the date of service against effective date ranges stored in the billing regime registry to retrieve a rule version applicable on the date of service; and generate a match determination for each billing regime in the plurality of care management billing regimes based on the evaluated regime selection factors and the retrieved rule version, and select an applicable billing regime based on the match determination.

14. A computer-implemented method for automated healthcare billing regime selection and claim processing, the method comprising:

storing, by at least one processor executing instructions stored in at least one non-transitory computer-readable memory, a billing regime registry comprising a plurality of care management billing regimes, wherein each billing regime is associated with a documentation mode type, frequency limitation rules, unit restriction rules, and stacking compatibility data;

receiving, by the at least one processor, regime selection inputs comprising provider role taxonomy, provider qualifications, site of service, patient eligibility criteria, payer policy identifier, and date of service;

applying, by the at least one processor, regime selection logic to match the regime selection inputs to regime requirements stored in the billing regime registry;

selecting, by the at least one processor, an applicable billing regime from the plurality of care management billing regimes;

determining, by the at least one processor, a selected documentation mode comprising attestation-based mode for a first portion of the plurality of regimes and a time-based mode for a second portion of the plurality of regimes;

generating, by the at least one processor, a claim in accordance with the selected billing regime and the selected documentation mode;

assigning, by the at least one processor, a claim identifier to each generated claim;

comparing, by the at least one processor, the claim identifier to a submitted claims registry before transmitting the generated claim;

preventing transmission of the generated claim when the claim identifier matches an entry in the submitted claims registry; and updating a control record in the submitted claims registry to reflect a duplicate submission status, a detection timestamp, and one or more referenced identifiers associated with the prevented transmission.

15. The computer-implemented method of claim 14, further comprising in response to determining that the selected documentation mode is an attestation-based mode:

collating, by the at least one processor, completed care activities into a reviewable summary;

presenting, by the at least one processor, the reviewable summary through a clinician interface;

receiving, by the at least one processor, an electronic signature and timestamp;

recording, by the processor, attestation metadata comprising signer identity, attestation timestamp, claim version identifier, and links to supporting documentation; and enforcing, by the at least one processor, for Advanced Primary Care Management (APCM) or General Primary Care Management (GPCM) billing codes, a one unit per calendar month billing constraint by detecting and blocking claim generation attempts including additional units beyond one unit.

16. The computer-implemented method of claim 15, further comprising detecting, by the at least one processor, concurrency conflicts by:

scanning billing codes for a given patient and calendar month;

identifying a first billing code and a second billing code;

determining whether the second billing code violates stacking compatibility data for the first billing code;

in response to detecting a stacking violation, flagging a concurrency conflict and preventing claim submission or generating a regime adjustment recommendation based on payer-specific stacking rules.

17. The computer-implemented method of claim 14, further comprising:

detecting, by the at least one processor, that APCM or GPCM eligibility is not satisfied;

automatically selecting, by the processor, Chronic Care Management (CCM) or Collaborative Care Management (CoCM) as a fallback regime;

switching, by the at least one processor, the selected documentation mode from attestation-based mode to time-based mode;

triggering, by the at least one processor, time tracking to begin tracking cumulative non-face-to-face minutes;

generating, by the at least one processor, a notification to care team members indicating a regime change.

18. The computer-implemented method of claim 14, further comprising:

generating, by the at least one processor, X12 837P professional claim transactions or X12 837I institutional claim transactions in EDI format;

transmitting, by the at least one processor, the generated transactions to at least one clearinghouse or payer via EDI transmission protocols;

receiving, by the at least one processor, X12 TA1 interchange acknowledgment transactions indicating technical acceptance or rejection;

receiving, by the at least one processor, X12 999 functional acknowledgment transactions indicating functional acceptance or rejection;

receiving, by the at least one processor, X12 277CA claim acknowledgment transactions comprising STC segments;

parsing, by the at least one processor, the STC segments to extract claim-level status indicators; and updating, by the at least one processor, claim status based on the extracted claim-level status indicators.

19. The computer-implemented method of claim 18, further comprising:

receiving, by the at least one processor, X12 835 Electronic Remittance Advice (ERA) transactions;

parsing, by the at least one processor, the X12 835 transactions to extract CLP segments, SVD segments, and CAS segments;

extracting, by the at least one processor, from CAS segments: group codes selected from PR, CO, PI, and OA;

extracting, by the at least one processor, from CAS segments: CARC codes and RARC codes;

accessing, by the at least one processor, a denial playbook comprising a mapping table linking CARC and RARC code combinations to correction actions;

retrieving, by the at least one processor, a mapped correction action for the extracted CARC and RARC code combination; and automatically triggering, by the at least one processor, execution of the mapped correction action.

20. The computer-implemented method of claim 14, further comprising:

accessing, by the at least one processor, CMS NCCI Medically Unlikely Edit (MUE) data comprising unit limits and MAI types;

applying, by the at least one processor, MAI type 1 enforcement by limiting units per claim line item;

applying, by the at least one processor, MAI type 2 enforcement by limiting units per date of service;

applying, by the at least one processor, MAI type 3 enforcement by flagging claims exceeding clinical benchmarks for review without automatic denial;

enforcing, by the at least one processor, monthly frequency limit rules; and enforcing, by the at least one processor, stacking restriction rules preventing concurrent billing of incompatible codes within a calendar month.

21. The computer-implemented method of claim 14, further comprising:

retrieving, by the at least one processor, billing policy rule sets from authoritative sources comprising CMS NCCI quarterly update files, payer companion guides, and CAQH CORE specifications;

parsing, by the at least one processor, the retrieved rule sets to extract individual billing rules;

assigning, by the at least one processor, an effective date range to each extracted billing rule;

storing, by the processor, rule provenance metadata comprising rule source identifier, ingestion timestamp, and version identifier;

for a claim with a specified date of service, matching, by the at least one processor, the date of service to a rule set with an effective date range encompassing the date of service;

applying, by the at least one processor, the matched rule set to validate the claim; and logging, by the at least one processor, in an audit trail the rule source identifier, version identifier, and application timestamp.

22. The computer-implemented method of claim 14, further comprising:

maintaining, by the at least one processor, clearinghouse configuration data for a plurality of clearinghouses;

normalizing, by the at least one processor, outbound claim submission format for each clearinghouse;

normalizing, by the at least one processor, inbound acknowledgment format into a standardized internal format;

assigning, by the at least one processor, a claim identifier selected from ICN (Internal Control Number) or TCN (Transaction Control Number) to each generated claim;

before transmitting a claim, comparing, by the at least one processor, the claim identifier to a submitted claims registry;

when the claim identifier matches an entry in the submitted claims registry, detecting, by the at least one processor, a duplicate submission attempt; and preventing, by the at least one processor, transmission of the claim when a duplicate submission attempt is detected through idempotent resubmission logic.

23. The computer-implemented method of claim 14, further comprising:

receiving, by the at least one processor, patient risk indicators comprising at least one of PHQ-9 scores, GAD-7 scores, or glucose trend data;

receiving, by the at least one processor, care context data, provider role taxonomy data, provider availability data, and policy constraint data;

applying, by the at least one processor, orchestration decision logic to determine an intervention assignment comprising patient identifier, intervention type, target time and date, assigned provider role, escalation SLA, and documentation requirements;

generating, by the at least one processor, SLA approaching notifications when elapsed time reaches a threshold percentage of the escalation SLA;

upon detecting an assigned provider has become unavailable, automatically reassigning, by the at least one processor, the intervention to an alternative provider; and logging, by the at least one processor, all intervention assignments with timestamps, actor identities, and decision provenance data.

24. The computer-implemented method of claim 14, further comprising:

providing, by the at least one processor, a unified presentation layer comprising a clinician-facing user interface that does not expose billing regime selection or documentation mode type; and operating, by the at least one processor, a billing plane beneath the unified presentation layer, wherein the billing plane automatically determines applicable billing regimes, selects procedure codes, switches between attestation-based and time-based modes, enforces frequency and unit restriction rules, and generates, validates, and submits claims without exposing billing-specific operations to a clinician.

25. The computer-implemented method of claim 16, further comprising:

calculating, by the at least one processor, a clean claim rate metric, a denial rate metric, an accounts receivable days metric, and a resubmission success rate metric, wherein performing the regime selection, one unit per month enforcement, and concurrency detection increases the clean claim rate to at least 90%, decreases the denial rate to below 10%, and decreases the accounts receivable days to below 30 days.

26. The computer-implemented method of claim 14, wherein the regime selection logic comprises:

for RHC or FQHC site of service, applying, by the at least one processor, encounter-based billing regime rules;

detecting, by the at least one processor, site of service transitions; and upon detecting a transition, automatically selecting, by the at least one processor, equivalent billing regime code families appropriate for a transitioned site of service.

27. A non-transitory computer-readable storage medium storing executable program instructions that, when executed by a processor, cause the processor to perform operations comprising:

storing a billing regime registry comprising a plurality of care management billing regimes, wherein each billing regime is associated with a documentation mode type, frequency limitation rules, unit restriction rules, and stacking compatibility data;

receiving regime selection inputs comprising provider role taxonomy, provider qualifications, site of service, patient eligibility criteria, payer policy identifier, and date of service;

applying regime selection logic to match the regime selection inputs to regime requirements stored in the billing regime registry;

selecting an applicable billing regime from the plurality of care management billing regimes;

determining a selected documentation mode comprising attestation-based mode for a first portion of the plurality of regimes and a time-based mode for a second portion of the plurality of regimes;

generating a claim in accordance with the selected billing regime and the selected documentation mode;

assigning a claim identifier to each generated claim;

comparing the claim identifier to a submitted claims registry before transmitting the generated claim;

preventing transmission of the generated claim when the claim identifier matches an entry in the submitted claims registry; and updating a control record in the submitted claims registry to reflect a duplicate submission status, a detection timestamp, and one or more referenced identifiers associated with the prevented transmission.

28. The non-transitory computer-readable storage medium of claim 27, wherein the operations further comprise:

generating X12 837P professional claim transactions or X12 837I institutional claim transactions in EDI format and transmitting the generated transactions to at least one clearinghouse or payer via EDI transmission protocols;

receiving X12 TA1 interchange acknowledgment transactions and parsing the X12 TA1 transactions to extract interchange acceptance or rejection indicators;

receiving X12 999 functional acknowledgment transactions and parsing the X12 999 transactions to extract functional acceptance or rejection indicators;

receiving X12 277CA claim acknowledgment transactions comprising STC segments and parsing the STC segments to extract claim-level status indicators comprising accepted, rejected, or pended; and updating claim status in a claim tracking database based on the extracted interchange acceptance or rejection indicators, functional acceptance or rejection indicators, and claim-level status indicators.

29. The non-transitory computer-readable storage medium of claim 27, wherein the operations further comprise:

providing a unified presentation layer comprising a clinician-facing user interface that does not expose billing regime selection or documentation mode type to a clinician; and operating a billing plane beneath the unified presentation layer, wherein the billing plane automatically determines applicable billing regimes, selects procedure codes, switches between attestation-based and time-based documentation modes, enforces frequency and unit restriction rules, and generates, validates, and submits claims without exposing billing-specific operations through the unified presentation layer.

30. The non-transitory computer-readable storage medium of claim 27, wherein the regime selection logic includes operations comprising:

evaluating, against requirements stored in the billing regime registry, a plurality of regime selection factors including provider role taxonomy, provider qualifications, site of service, patient eligibility criteria, and payer coverage for each billing regime in the plurality of care management billing regimes;

matching the date of service against effective date ranges stored in the billing regime registry to retrieve a rule version applicable on the date of service; and generating a match determination for each billing regime in the plurality of care management billing regimes based on the evaluated regime selection factors and the retrieved rule version, and selecting an applicable billing regime based on the match determination.

* * * * *